(12) United States Patent
Ylonen

(10) Patent No.: US 10,171,508 B2
(45) Date of Patent: Jan. 1, 2019

(54) PROVISIONING NEW VIRTUAL MACHINE WITH CREDENTIALS

(71) Applicant: SSH Communications Security OYJ, Helsinki (FI)

(72) Inventor: Tatu J. Ylonen, Espoo (FI)

(73) Assignee: SSH Communications Security OYJ, Helsinki (FI)

( * ) Notice: Subject to any disclaimer, the term of this patent is extended or adjusted under 35 U.S.C. 154(b) by 0 days.

(21) Appl. No.: 15/277,491

(22) Filed: Sep. 27, 2016

(65) Prior Publication Data

US 2017/0019386 A1 Jan. 19, 2017

Related U.S. Application Data

(63) Continuation of application No. 14/367,462, filed as application No. PCT/FI2012/051294 on Dec. 21, 2012, now Pat. No. 9,515,999.
(Continued)

(51) Int. Cl.
*H04L 29/06* (2006.01)
*H04L 9/08* (2006.01)
(Continued)

(52) U.S. Cl.
CPC ............ *H04L 63/20* (2013.01); *G06F 21/575* (2013.01); *H04L 9/083* (2013.01); *H04L 9/0891* (2013.01); *H04L 9/14* (2013.01); *H04L 9/30* (2013.01); *H04L 9/321* (2013.01); *H04L 9/3263* (2013.01); *H04L 9/3268* (2013.01); *H04L 61/1523* (2013.01); *H04L 63/0428* (2013.01); *H04L 63/0435* (2013.01); *H04L 63/0442* (2013.01); *H04L 63/061* (2013.01); *H04L 63/062* (2013.01); *H04L 63/065* (2013.01); *H04L 63/08* (2013.01); *H04L 63/0807* (2013.01); *H04L 63/10* (2013.01); *H04L 63/101* (2013.01); *H04L 63/166* (2013.01); *H04L 67/42* (2013.01); *H04L 67/10* (2013.01)

(58) Field of Classification Search
CPC ....... H04L 63/20; H04L 9/083; H04L 9/0891; H04L 9/321; H04L 9/3263; H04L 63/0428; H04L 63/0435; H04L 63/0442; H04L 63/061; H04L 63/062; H04L 63/08; H04L 63/0807; H04L 63/10; G06F 21/575
See application file for complete search history.

(56) References Cited

U.S. PATENT DOCUMENTS 6,148,404 A 11/2000 Yatsukawa
6,301,661 B1 10/2001 Shambroom
(Continued)

OTHER PUBLICATIONS

Related U.S. Appl. No. 14/367,462, filed Jun. 20, 2014.
(Continued)

*Primary Examiner* — Yonas A Bayou
(74) *Attorney, Agent, or Firm* — Banner & Witcoff, Ltd.

(57) ABSTRACT

Certain embodiments provide means for managing automated access to computers, e.g., using SSH user keys and other kinds of trust relationships. Certain embodiments also provide for managing certificates, Kerberos credentials, and cryptographic keys. Certain embodiments provide for remediating legacy SSH key problems and for automating configuration of SSH keys, as well as for continuous monitoring.

22 Claims, 51 Drawing Sheets

Related U.S. Application Data

(60) Provisional application No. 61/578,389, filed on Dec. 21, 2011, provisional application No. 61/646,978, filed on May 15, 2012, provisional application No. 61/693,278, filed on Aug. 25, 2012, provisional application No. 61/697,768, filed on Sep. 6, 2012, provisional application No. 61/721,278, filed on Nov. 1, 2012.

(51) Int. Cl.
| | | |
|---|---|---|
| *H04L 9/32* | (2006.01) | |
| *G06F 21/57* | (2013.01) | |
| *H04L 29/12* | (2006.01) | |
| *H04L 9/14* | (2006.01) | |
| *H04L 9/30* | (2006.01) | |
| H04L 29/08 | (2006.01) | |

(56) References Cited

U.S. PATENT DOCUMENTS

| | | |
|---|---|---|
| 6,678,734 B1 | 1/2004 | Haatainen et al. |
| 6,681,017 B1 | 1/2004 | Matias et al. |
| 7,082,536 B2 | 7/2006 | Filipi-Martin et al. |
| 7,260,224 B1 | 8/2007 | Ingle et al. |
| 7,552,115 B2 | 6/2009 | Kalach et al. |
| 7,577,729 B1 | 8/2009 | Umbehocker et al. |
| 7,707,405 B1 | 4/2010 | Gilman et al. |
| 13,316,429 | 11/2012 | Long et al. |
| 8,683,560 B1 * | 3/2014 | Brooker ............... H04L 63/08 726/6 |
| 8,724,816 B2 | 5/2014 | Shi et al. |
| 8,776,192 B2 | 7/2014 | Schiefelbein |
| 8,856,869 B1 | 10/2014 | Brinskelle |
| 8,874,685 B1 | 10/2014 | Hollis et al. |
| 9,026,805 B2 | 5/2015 | Acar et al. |
| 9,215,235 B1 | 12/2015 | Jacobsen et al. |
| 9,336,324 B2 | 5/2016 | Lomme et al. |
| 9,455,975 B2 * | 9/2016 | Brooker ............... H04L 63/08 |
| 9,531,754 B2 | 12/2016 | Alon et al. |
| 9,680,839 B2 * | 6/2017 | Faitelson ............... G06F 21/41 |
| 2002/0143855 A1 | 10/2002 | Traversat et al. |
| 2002/0191619 A1 | 12/2002 | Shafer |
| 2004/0167984 A1 | 8/2004 | Herrmann |
| 2004/0205229 A1 | 10/2004 | Stojancic |
| 2005/0251808 A1 * | 11/2005 | Gbadegesin ........ H04L 63/0254 719/310 |
| 2006/0031510 A1 | 2/2006 | Beck et al. |
| 2006/0259809 A1 | 11/2006 | Mishra et al. |
| 2007/0043860 A1 | 2/2007 | Pabari |
| 2007/0083665 A1 | 4/2007 | Miao |
| 2007/0199072 A1 | 8/2007 | Plummer |
| 2008/0040775 A1 | 2/2008 | Hoff et al. |
| 2009/0106551 A1 | 4/2009 | Boren et al. |
| 2009/0138703 A1 * | 5/2009 | Schneider ............... G06F 21/31 713/155 |
| 2009/0172774 A1 | 7/2009 | Koti et al. |
| 2009/0185685 A1 | 7/2009 | DeRobertis et al. |
| 2009/0199290 A1 | 8/2009 | McCullough et al. |
| 2009/0285399 A1 | 11/2009 | Schneider |
| 2010/0023491 A1 * | 1/2010 | Huang ................... H04L 41/28 707/E17.014 |
| 2010/0070881 A1 * | 3/2010 | Hanson ................ G06Q 10/06 715/753 |
| 2010/0100778 A1 | 4/2010 | Sullivan |
| 2010/0212013 A1 | 8/2010 | Kim et al. |
| 2010/0262625 A1 * | 10/2010 | Pittenger ........... G06F 17/30525 707/783 |
| 2011/0061111 A1 * | 3/2011 | Faitelson .............. G06F 21/604 726/28 |
| 2011/0126272 A1 | 5/2011 | Betzler et al. |
| 2011/0184989 A1 * | 7/2011 | Faitelson ............ G06F 21/6218 707/784 |
| 2011/0196893 A1 | 8/2011 | Bates et al. |
| 2011/0197065 A1 | 8/2011 | Stauth et al. |
| 2011/0225467 A1 | 9/2011 | Betzler et al. |
| 2011/0252418 A1 | 10/2011 | Havivi et al. |
| 2011/0258432 A1 | 10/2011 | Rao et al. |
| 2011/0276695 A1 | 11/2011 | Maldaner |
| 2011/0277019 A1 | 11/2011 | Pritchard, Jr. |
| 2011/0291803 A1 | 12/2011 | Bajic et al. |
| 2012/0011161 A1 * | 1/2012 | Marathe ................ G06F 21/604 707/785 |
| 2012/0078965 A1 * | 3/2012 | Laitkorpi ............ G06F 21/6218 707/785 |
| 2012/0096263 A1 | 4/2012 | Shi et al. |
| 2012/0110576 A1 * | 5/2012 | Lin .......................... G06F 9/50 718/1 |
| 2012/0185563 A1 | 7/2012 | Sugiyama et al. |
| 2012/0204032 A1 | 8/2012 | Wilkins et al. |
| 2012/0216241 A1 | 8/2012 | Alon et al. |
| 2012/0233668 A1 | 9/2012 | Leafe et al. |
| 2012/0266209 A1 | 10/2012 | Gooding et al. |
| 2013/0086092 A1 | 4/2013 | James et al. |
| 2013/0117554 A1 | 5/2013 | Ylonen |
| 2013/0179951 A1 | 7/2013 | Broustis et al. |
| 2013/0227286 A1 | 8/2013 | Brisson |
| 2013/0298182 A1 | 11/2013 | May |
| 2014/0075567 A1 | 3/2014 | Raleigh et al. |
| 2014/0164774 A1 | 6/2014 | Nord et al. |
| 2014/0215217 A1 | 7/2014 | Gronowski et al. |
| 2014/0317409 A1 * | 10/2014 | Bartok .................... H04L 63/06 713/171 |
| 2015/0013000 A1 | 1/2015 | Linnakangas et al. |
| 2015/0222604 A1 | 8/2015 | Ylonen |
| 2016/0044035 A1 | 2/2016 | Huang |

OTHER PUBLICATIONS

Non-Final OA dated Jul. 6, 2017, of U.S. Appl. No. 15/441,369.
Final Office Action dated Sep. 16, 2016 of U.S. Appl. No. 13/723,204.
Third Party Submission under 37 CFR 1.290 of U.S. Appl. No. 13/723,204.
Non-final office action dated Feb. 26, 2015 of U.S. Appl. No. 13/723,204.
Non-final office action dated Feb. 19, 2016 of U.S. Appl. No. 13/723,204.
Non-final office action dated Apr. 13, 2017 of U.S. Appl. No. 13/723,204.
Final office action dated Oct. 4, 2013 of U.S. Appl. No. 13/723,204.
Non-final office action dated Apr. 5, 2013 of U.S. Appl. No. 13/723,204.
Examiner Interview Summary dated Feb. 1, 2017 of U.S. Appl. No. 13/723,204.
Final office action dated Jul. 6, 2017 of U.S. Appl. No. 15/441,369.
David Wagner, UC Berkeley, Object Capabilities for Security, Jul. 6, 2017, 30 pages.
Daniel J. Barrett and Richard E. Silverman, "SSH, the Secure Shell, The Definitive Guide", Mar. 13, 2001, O'Reilly, pp. 1-542.
Non-final OA dated Jul. 13, 2017 of U.S. Appl. No. 15/441,339.
Non-Final OA dated May 1, 2017, of U.S. Appl. No. 15/250,085.
Non-final OA dated May 19, 2017, of U.S. Appl. No. 15/278,124.
Non-final OA dated May 22, 2017, of U.S. Appl. No. 15/296,365.
Third-Party Submission under 37 CFR 1.290 Concise Description of Relevance of U.S. Appl. No. 15/278,124 dated Feb. 1, 2017.
Aug. 17, 2017 U.S. Final Office Action—U.S. Appl. No. 15/250,085.
Aug. 24, 2017 U.S. Notice of Allowance—U.S. Appl. No. 15/441,339.
Nov. 27, 2017 U.S. Non-Final Office Action—U.S. Appl. No. 15/250,085.
Apr. 10, 2018 U.S. Final Office Action—U.S. Appl. No. 15/278,124.
Apr. 10, 2018 U.S. Non-Final Office Action—U.S. Appl. No. 15/296,365.
Apr. 26, 2018 U.S. Final Office Action—U.S. Appl. No. 15/250,085.
Jun. 19, 2018 U.S. Final Office Action—U.S. Appl. No. 15/673,577.
Jun. 27, 2018 U.S. Non-Final Office Action—U.S. Appl. No. 15/673,625.
Jun. 25, 2018 U.S. Non-Final Office Action—U.S. Appl. No. 15/459,287.
Mar. 13, 2018 U.S. Final Office Action—U.S. Appl. No. 15/459,287.

(56) References Cited

OTHER PUBLICATIONS

Sep. 13, 2018 U.S. Final Office Action—U.S. Appl. No. 15/278,124.
Sep. 18, 2018 U.S. Notice of Allowance—U.S. Appl. No. 15/296,365.
Aug. 31, 2018 U.S. Non-Final Office Action—U.S. Appl. No. 15/250,085.

* cited by examiner

| | 3500 MANAGEMENT SYSTEM |
|---|---|
| 3501 | DEPLOYMENT TOOL |
| 3502 | DISCOVERY TOOL |
| 3503 | KEY USE MONITOR |
| 3504 | UNUSED KEY REMOVER |
| 3505 | KEY PROTECTOR |
| 3506 | KEY INSTALLER |
| 3507 | KEY REMOVER |
| 3508 | TRUST RELATIONSHIP INSTALLER |
| 3509 | TRUST RELATIONSHIP REMOVER |
| 3510 | NON-KEY TRUST RELATIONSHIP INSTALLER |
| 3511 | NON-KEY TRUST RELATIONSHIP REMOVER |
| 3512 | EXTERNAL KEY DETECTOR |
| 3513 | KEY ROTATOR |
| 3514 | TRUST RELATIONSHIP CONVERTER |
| 3515 | COMMAND EXTRACTOR |
| 3516 | COMMAND RESTRICTION ENFORCER |
| 3517 | SCRIPT ANALYZER |
| 3518 | IP ADDRESS DETECTOR |
| 3519 | IP ADDRESS RESTRICTION ENFORCER |
| 3520 | PASSPHRASE ADDER |

FIG. 35 A

| | |
|---|---|
| 3521 | PASSPHRASE PROVIDER |
| 3522 | KERBEROS CREDENTIAL ROTATOR |
| 3523 | CERTIFICATE DISCOVERER |
| 3524 | CERTIFICATE MANAGER |
| 3525 | CERTIFICATE AUTHORITY |
| 3526 | REGISTRATION AUTHORITY |
| 3527 | APPROVAL TRACKER |
| 3528 | TICKETING API |
| 3529 | TICKETING SYSTEM |
| 3530 | REPORT GENERATOR |
| 3531 | AUDIT TOOL |
| 3532 | CONTINUOUS MONITORING TOOL |
| 3533 | VIRUS SPREAD ANALYZER |
| 3534 | INSIDER THREAT ANALYZER |
| 3535 | POTENTIAL BACKDOOR ANALYZER |
| 3536 | DECOMMISSIONING ANALYZER |
| 3537 | CONFIGURATION GUI |
| 3538 | CONFIGURATION UPDATER |
| 3539 | HOST KEY TOOL |
| 3540 | CLOUD INSTANCE MANAGER |
| 3541 | BACK-END MANAGER |

FIG. 35 B

| | |
|---|---|
| 3542 | UPGRADE HANDLER |
| 3543 | TPM DRIVER |
| 3544 | DATABASE |
| 3545 | JOB EXECUTOR |
| 3546 | MAINTENANCE WINDOW MANAGER |
| 3547 | USER INTERFACE |
| 3548 | COMMUNICATIONS INTERFACE |
| 3549 | AGENTLESS INTERFACE |
| 3550 | AGENT INTERFACE |
| 3551 | POWERBROKER INTERFACE |
| 3552 | CONNECTOR API |
| 3553 | PRIVILEGE ESCALATOR |
| 3554 | PRIVILEGE TRANSFORMER |
| 3555 | KERBEROS LIBRARY |
| 3556 | KERBEROS KDC |
| 3557 | LDAP INTERFACE |
| 3558 | EXTENSION API |
| 3559 | PRIVILEGED ACCESS MANAGER |
| 3560 | CONFIGURATION DATABASE |
| 3561 | SYMMETRIC KEY MANAGER |
| 3562 | KMIP PROTOCOL |
| 3563 | DASHBOARD |

FIG. 35 C

| | 3600 DEPLOYMENT TOOL | |
|---|---|---|
| 3601 | PASSWORD-BASED DEPLOYER |
| 3602 | SSH KEY BASED DEPLOYER |
| 3603 | SCRIPTED DEPLOYER |
| 3604 | ACCOUNT CREATOR |
| 3605 | MANAGEMENT CREDENTIAL INSTALLER |
| 3606 | PRIVILEGE ESCALATION CONFIGURATOR |
| 3607 | LOGGING CONFIGURATOR |
| 3608 | NETWORK SCANNER |
| 3609 | HOST KEY EXTRACTOR |
| 3610 | AGENT |
| 3611 | INITIAL CONNECTION AUTHORIZER |
| 3612 | GROUP INSTALLER |
| 3613 | NON-OS DEVICE DEPLOYER |

FIG. 36

| | 3700 DISCOVERY TOOL |
|---|---|
| 3701 | AUTHORIZED KEY DISCOVERER |
| 3702 | IDENTITY KEY DISCOVERER |
| 3703 | SSH VERSION DISCOVERER |
| 3704 | USER INFORMATION SOURCE DISCOVERER |
| 3705 | USER ACCOUNT DISCOVERER |
| 3706 | CONFIGURATION READER |
| 3707 | CONFIGURATION PARSER |
| 3708 | KERBEROS DISCOVERER |
| 3709 | ACTIVE DIRECTORY DISCOVERER |
| 3710 | APPLICATION DISCOVERER |
| 3711 | APPLICATION-SPECIFIC DISCOVERER |
| 3712 | CERTIFICATE DISCOVERER |
| 3713 | TPM DISCOVERER |
| 3714 | NON-KEY TRUST RELATIONSHIP DISCOVERER |

FIG. 37

PROVISIONING NEW VIRTUAL MACHINE WITH CREDENTIALS

TECHNICAL FIELD

Certain embodiments relate to computer and network security, particularly to identity and access management and key management.

BACKGROUND OF THE INVENTION

The Secure Shell (SSH) protocol is one of the most widely used cryptographic protocols today. SSH is frequently used for remote administration, secure file transfers, backups, and process-to-process communication.

The Secure Shell (SSH) protocol is described in the Internet Engineering (IETF) standards RFC 4250, The Secure Shell (SSH) Protocol Assigned Numbers, Internet Engineering Task Force, January 2006; RFC 4251, The Secure Shell (SSH) Protocol Architecture, Internet Engineering Task Force, January 2006; RFC 4252, The Secure Shell (SSH) Authentication Protocol, Internet Engineering Task Force, January 2006; RFC 4253, The Secure Shell (SSH) Transport Layer Protocol, Internet Engineering ask Force, January 2006; and RFC 4254, The Secure Shell (SSH) Connection Protocol, Internet Engineering Task Force, January 2006. They are freely available for downloading at www.ietf.org. The original protocol was invented and developed by the present inventor in 1995-1999, and then standardized by the IETF.

The SSH protocol and related client and server software applications are now included in many Unix and Linux versions, such as IBM AIX, HP-UX, Solaris, Red Hat, SUSE, Ubuntu, etc. Popular implementations of the SSH protocol include the open source OpenSSH, which is based on the present inventor's free SSH version 1.12 from 1995, and the commercial Tectia SSH client and server from SSH Communications Security Corporation.

Some of the largest enterprises in the world have hundreds of thousands of computers and up to about a hundred thousand servers running various versions of Unix, Linux, and Windows operating systems on their network. Large enterprises commonly run thousands of different business applications that interact with each other and transmit data and files to/from each other in an automated fashion. A large enterprise typically has tens of thousands of hosts running SSH servers.

The term "host" means a computer or generally any computing node or apparatus on a network that has its own IP address and/or domain name (though some hosts can be multi-homed, that is, have more than one IP address or more than one domain name). A computer can be any kind of computer, such as general purpose computer, desktop computer, server computer, embedded system, mainframe, mobile device, cluster of computers, or a distributed computer. A host can also be a virtual machine.

An IP network is a network that communicates using the Internet Protocol (RFC 791, RFC 2460, or a later version thereof). An IP address means an IPv4 addresses, an IPv6 addresses, and/or an address for a future communication protocol that can be used for similar purposes. TCP/IP means the Transmission Control protocol (RFC 793), and UDP means the User Datagram Protocol (RFC 768), or a later version thereof.

To automate file transfers and other communication between computers and applications, companies often use public key authentication according to the SSH protocol. Public key authentication and how to set it up is described in RFC 4252 and the books D. Barrett et al: SSH, the Secure Shell: The Definitive Guide, O'Reilly, 2001; H. Dwivedi: Implementing SSH: Strategies for Optimizing the Secure Shell, Wiley, 2004; and A. Carasik: Unix Secure Shell, McGraw-Hill, 1999.

Generally, public key authentication is just one method for implementing passwordless logins. A passwordless login is a mechanism whereby a program running under a user account on a first host can gain access to a second account on a second host (though they could also be the same account and same host), without needing to have an interactive user supply a password, typically to execute a command on the second host or to transfer files to/from the second host. Other known mechanisms for passwordless authentication include, e.g., Kerberos-based authentication (possibly using Active Directory), host-based authentication in SSH, traditional ".rhosts" authentication in old rlogin/rsh programs, hard-coding a password in a script (e.g., supplying it on a command line), and fetching a password from a password vault from a script. However, with the SSH protocol, the public key authentication is often the preferred method, because with it one cannot gain access to the private key (the authentication credential in this case) from the second account.

Kerberos authentication can also be used for implementing passwordless logins. Kerberos is described in RFC 4120, The Kerberos Network Authentication Service (V5), Internet Engineering Task Force, July 2005. Kerberos is often used using GSSAPI, which is described in RFC 2743, Generic Security Service Application Program Interface Version 2, Update 1, Internet Engineering Task Force, January 2000.

Some organizations use public key authentication to grant authorizations and access rights to individual users. A user is given authorization to log into certain accounts based on the user's role. For example, an Oracle administrator might be given a private key that authorizes the administrator to log into any Oracle database account in his/her department. When a user's role changes, the old access rights would be removed and new ones might be added in accordance with the new role. Removing the user's access basically means de-authorizing the access.

Another use of public key authentication is to allow administrators to log into shared accounts on jump servers that can then be used to access numerous other systems, such as point-of-sale terminals in a retail environment.

An authorized key means identification of a cryptographic key whose possession authorizes access to a user account on a host.

An identity key means a cryptographic key whose possession authorizes access to a user account on a host. The term is also used for a cryptographic key is configured for an SSH client so that the SSH client may attempt to use it for authentication using public key authentication according to the SSH protocol when logging into an SSH server.

Authorized keys and identity keys are collectively called user keys (or SSH user keys).

Host keys, on the other hand, are used for authenticating hosts (e.g., to prevent man-in-the-middle attacks at protocol level). Host keys do not alone authorize access to any user accounts. Host keys are typically key pairs used for public key cryptography, with the public key called the public host key and the private key called the private host key. An SSH client or SSH server may have known hosts, associations of a host (name or IP address) with a public host key or an identifier for a public key.

A key fingerprint is an identifier for a key that essentially uniquely identifies a key pair. It may be, e.g., a hash value computed from a public key, converted into an ASCII string in some manner. There are several known ways to convert a public key into a key fingerprint, including computing a hash value of an encoded representation of the public key, and representing the hash value in hex. Several different methods for generating fingerprints from a key are in use by different implementations.

Commonly, an authorized key is a public key from a key pair used in public key cryptography, where possession of the corresponding private key authorizes access to the user account (with, e.g., RSA and DSA cryptosystems, the public key uniquely identifies the key pair and therefore the private key). An authorized key may be identified, e.g., by the public key itself or by a key fingerprint computed from the public key. The private key may be configured as an identity key for one or more SSH clients on one or more user accounts on one or more hosts. The same authorized key may be configured as an authorized key for one or more SSH servers on one or more user accounts on one or more hosts.

An SSH client may also access an identity key indirectly, such as through an SSH agent.

Some hosts may not really have the concept of separate user accounts, in which case an authorized key may just grant access to the host (the host is then considered to have an implicit user account on it).

In large organizations, the number of different file transfers and authentications that they manage grows very large, and such organizations sometimes have hundreds of system administrators each managing some hundreds of computers. It is difficult for system administrators, security administrators to keep track of what authorized public key login connections exist, what each connection is used for, and when the connection can/should be removed.

It is currently nearly impossible for organizations to change the authentication keys because of the amount of manual work involved, yet any prudent security practice would require changing authorization keys regularly. Key rotation, renewal, and recertification are terms also used to refer to changing the cryptographic authorization keys, with no substantial difference in meaning.

Furthermore, there is currently no practical way for the organizations to prevent an administrator from copying a private key, and continuing to use the private key after changing roles or leaving the job, and many organizations never remove authorized keys because it is too difficult and expensive or prone to cause service disruption.

There are also other mechanisms for providing automated access in SSH, including host-based authentication, Kerberos authentication, PKI-based public key authentication, hard-coded passwords, and passwords stored in a password vault.

Generally, when automated access has been configured from a first account to a second account, a trust relationship is said to exist from the first account to the second account. Trust relationships are also called connections or automated login connections or passwordless logins in this specification. The first account is often called a source account (on a source host) and the second account is often called a destination account (on a destination host).

Many large enterprises are known to have several hundred thousand to over a million public-private key pairs used as SSH authentication keys. Many large enterprises have sizable teams setting up SSH authentication keys. The combined cost of managing key pairs and authorizations in large enterprises is substantial, and therefore solutions for the more efficiently and more securely managing them are very much needed.

An independent verification of the problem can be found in the paper G. Kent and B. Shestra: Unsecured SSH—The Challenge of Managing SSH Keys and Associations, SecureIT, 2010. It also teaches many of the underlying concepts relating to authorized keys and identity keys and proper (manual) configuration for automated access using SSH. However, it is very limited in its teachings about automating SSH key management or assisting key remediation processes in large environments.

BRIEF SUMMARY OF THE INVENTION

Certain embodiments manage automated access between user accounts on devices or hosts in a computer network. In certain embodiments, a management system causes a first user account on a first host to be able to log into a second user account on a second host in an automatic manner.

Certain embodiments relate to managing SSH user keys for authorizing automated access between hosts. In certain embodiments, a management system installs an identity key on a first user account and an authorized key on a second user account on a second host in an automatic manner.

Certain embodiments relate to managing certificates for Public Key Infrastructure (PKI) based authentication, e.g., for the SSL/TLS protocol. Certain embodiments relate to managing Kerberos credentials. Certain embodiments relate to managing symmetric keys (or generally, encryption keys). Certain embodiments relate to managing keys and/or certificates for the IPSec protocol.

Certain embodiments combine many of the teachings of this description, such as an embodiment comprising a computer program product for discovering, remediating and/or managing SSH keys, non-key trust relationships, certificates, Kerberos credentials, symmetric keys, and configuration files. Certain embodiments may further comprise client-side Kerberos libraries and applications, a Kerberos Key Distribution Center (KDC), an LDAP directory, a policy manager user interfaces, a configuration database, a ticketing/approval system, and/or a database system. An example is illustrated, e.g., in FIGS. 34 and 35.

Certain embodiments may also be combined into a set of computer products (or hardware appliances) comprising multiple computer program products (or appliances) that comprise one or more embodiments described herein in one or more of the computer program products in the set, such as a computer program product implementing a management system framework product, a certificate management product (optionally utilizing the framework), an SSH key management product (optionally utilizing the framework), a symmetric key management product (optionally utilizing the framework), and a Kerberos or Active Directory management or interface product (optionally utilizing the framework). Such products could be grouped and packaged in any combination, including on one or more computer-readable medium or downloaded from the Internet. An example is illustrated in, e.g., FIGS. 35A, 35B, and 35C, showing multiple components that could be sold separately or as a set.

Certain embodiments are hardware appliances comprising hardware and software components for performing similar things as certain computer software product embodiments when used on a computer.

Certain embodiments are complex systems, such as telecommunications exchanges or networks (including 4G infrastructure and elements thereof), vehicles (with embedded computer with secure remote access, often involving automated access), power distribution networks or components thereof (including power meters where encryption/authentication keys are managed), aerospace or naval systems comprising or being part of a key management system, industrial automation systems and connected devices, and office systems and appliances. An example is illustrated in, e.g., FIGS. 1 and 35.

Certain embodiments may reduce the cost of managing encryption and authentication keys and other authorization mechanisms in large organizations and to improve the security of their computing infrastructure by enabling authentication key removals, key renewals, key rotation, and proper auditing of existing access rights. Examples are illustrated in, e.g., FIGS. 2, 7, 8, 9, 16, 17, 18, 21, 31, 33, 34, 35, and 36.

Certain embodiments may reduce risk relating to computer virus attacks and insider threats. An example is illustrated, e.g., in FIG. 40.

Certain embodiments may reduce risk organizations face from malicious insiders and backdoors that may be created in their IT systems. Examples are illustrated in, e.g., FIGS. 2, 8, 9, 34, 35, 38, 39, 41, 42, 46, and 47.

Certain embodiments may help organizations remediate problems involving their legacy SSH user keys and other legacy trust relationships, keys, certificates, and credentials. Examples are illustrated in, e.g., FIGS. 1, 2, 12, 14, 22, 23, 25, 26, 27, 28, 30, 34, 35, 38, 39, 40, 41, 42, 43, 44, 45, and 46.

Certain embodiments may enable automated installation of approved trust relationships and, in certain cases, provide substantial cost savings. Examples are illustrated in, e.g., FIGS. 3, 4, 5, 6, 7, 9, 13, 15, 16, 17, 21, 34, and 35.

Certain embodiments may enable discovering existing SSH user keys on hosts without installing a management agent on the host (such installation can be costly and cause disruption of operations). Examples are illustrated in, e.g., FIGS. 1, 3, 4, 6, 10, 12, 14, 19, 22, 23, 24, 25, 26, 27, 28, 32, 34, 35, 36, 37, 38, 41, 46, and 47.

Certain embodiments may enable management of certificates on hosts without installing a management agent on the hosts. Examples are illustrated in, e.g., FIGS. 1, 3, 4, 6, 12, 34, 35, 36, 37, and 43.

Certain embodiments may reduce risk of disruptions to IT operations by limiting certain modifications made to IT systems to planned maintenance windows, which can reduce risk of system outages. Examples are illustrated in, e.g., FIGS. 1, 3, 4, 34, and 35.

Certain embodiments may reduce the privileges required for a management agent or account used by an agentless management system, which in certain cases substantially improves overall security and provides additional defense in depth against programming errors and cyberattacks.

Certain embodiments may enable organizations to properly control access to their IT systems on the platform level; in certain embodiments such control is needed to achieve the main aspects on information security, including confidentiality, integrity, and continued operation of systems. Many organizations are required by government and industry regulations to implement adequate information security.

Certain embodiments may enable organizations to know and control who can access what systems and/or applications in their IT environment. Examples are illustrated in, e.g., FIGS. 1, 34, 35, 39, 42, 44, and 46.

Certain embodiments may enable organizations to effectively rotate their Kerberos credentials for functional accounts. Examples are illustrated in, e.g., FIGS. 34, 35, and 44.

Certain embodiments may enable organizations to manage symmetric encryption keys for storage systems, file encryption, and other purposes. Examples are illustrated in, e.g., FIGS. 34, 35, and 45. In certain embodiments the management of symmetric encryption keys can be performed without having a management agent installed on a managed host, as illustrated in, e.g., FIGS. 3, 4, and 6. In addition to symmetric keys, certain embodiments may also manage other kinds of keys, such private keys for public key cryptography.

There are also other embodiments illustrated in the detailed description and the drawings that are believed by the inventor(s) to be novel, inventive, and useful.

This Summary is included so as to introduce, in an abbreviated form, various topics to be elaborated upon below in the Detailed Description. Title, Abstract, Technical field, Background, and this Summary are not intended to limit the scope of the claims.

BRIEF DESCRIPTION OF THE SEVERAL VIEWS OF THE DRAWING(S)

The attached drawings illustrate certain aspects, embodiments, and elements.

FIGS. 35A, 35B, and 35C illustrates some possible components of a management system (together, they form FIG. 35).

FIG. 36 illustrates some possible components of a deployment tool.

FIG. 37 illustrates some possible components of a discovery tool.

Figure 38:
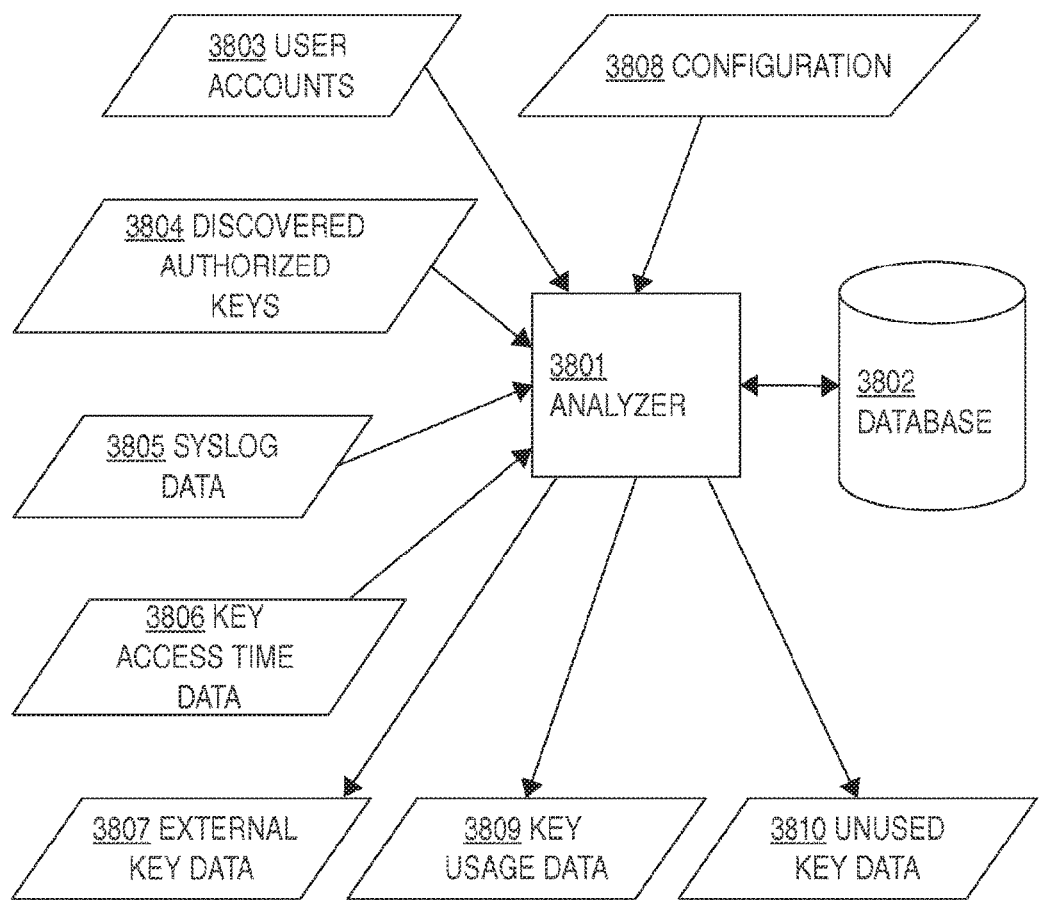

FIG. 38 illustrates data flow in a key usage analyzer.

Figure 39:
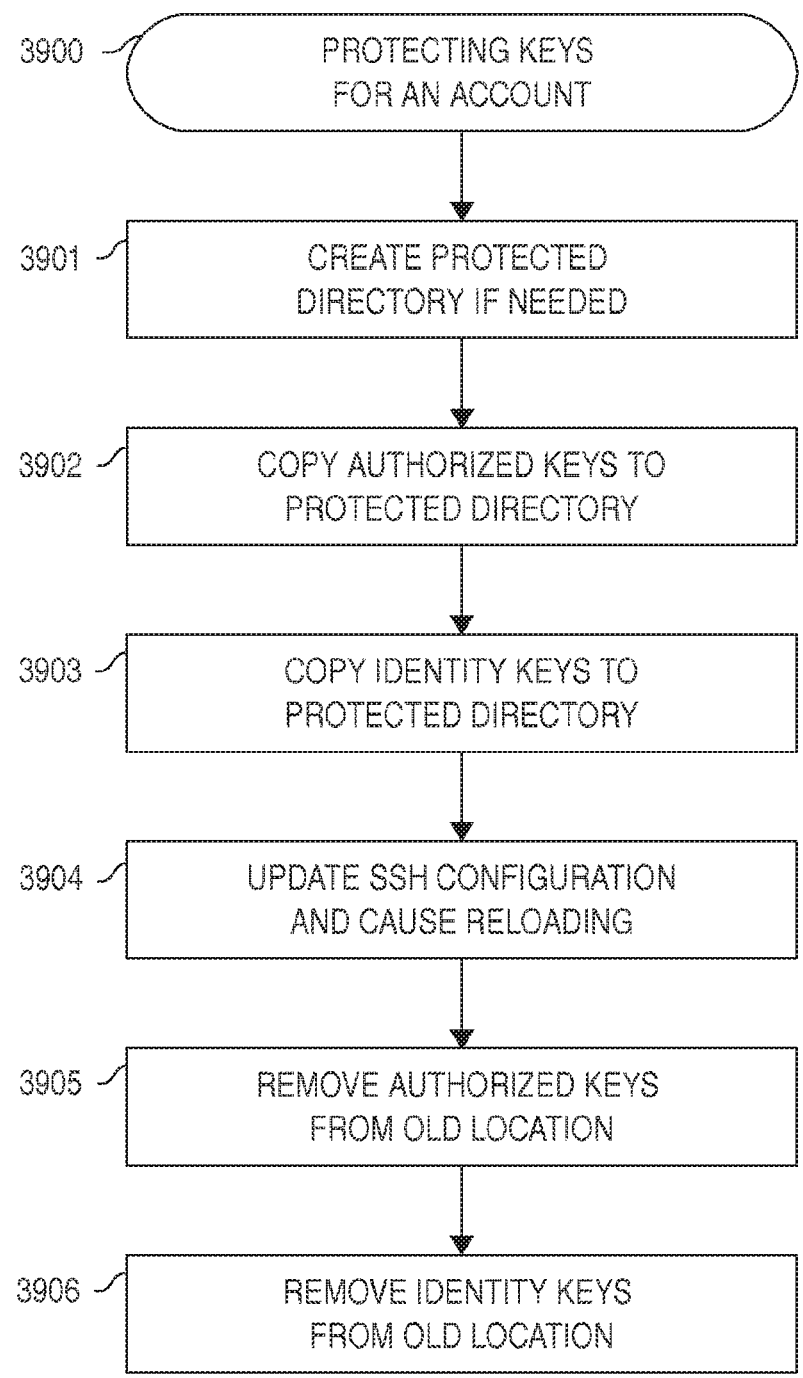

FIG. 39 illustrates protecting keys for an account.

Figure 40:
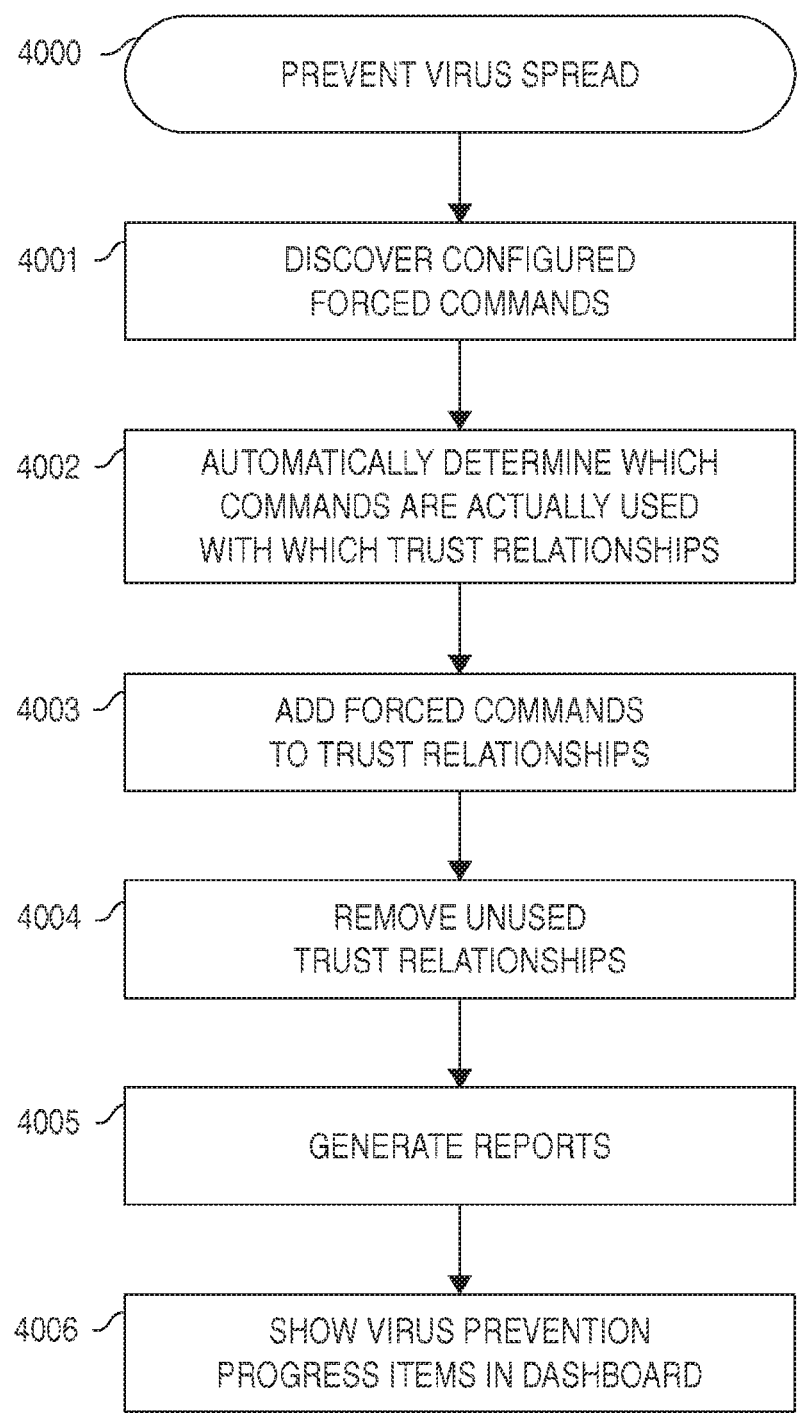

FIG. 40 illustrates preventing virus spread in an environment.

Figure 41:
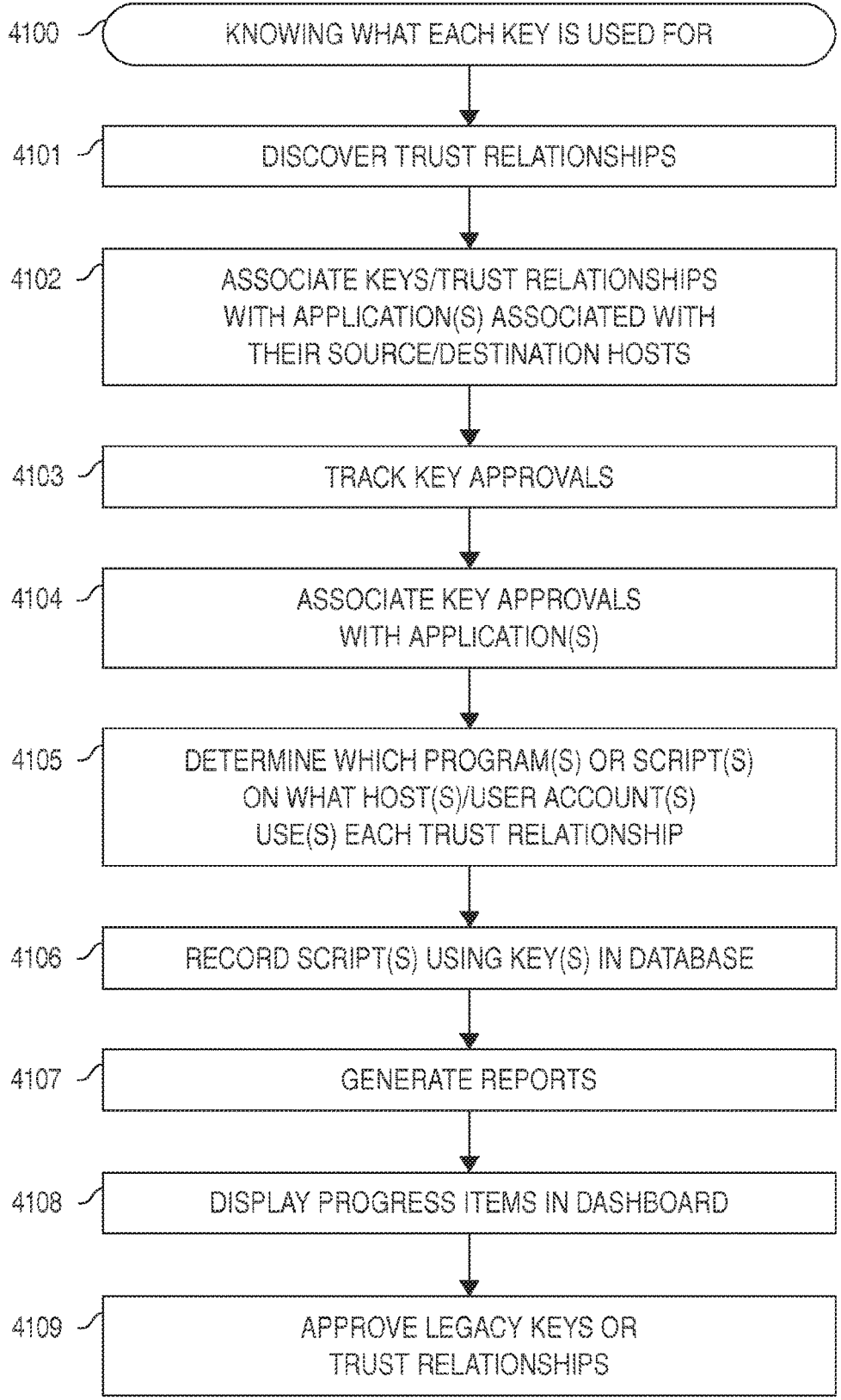

FIG. 41 illustrates tracking what each key in an environment is used for.

Figure 42:
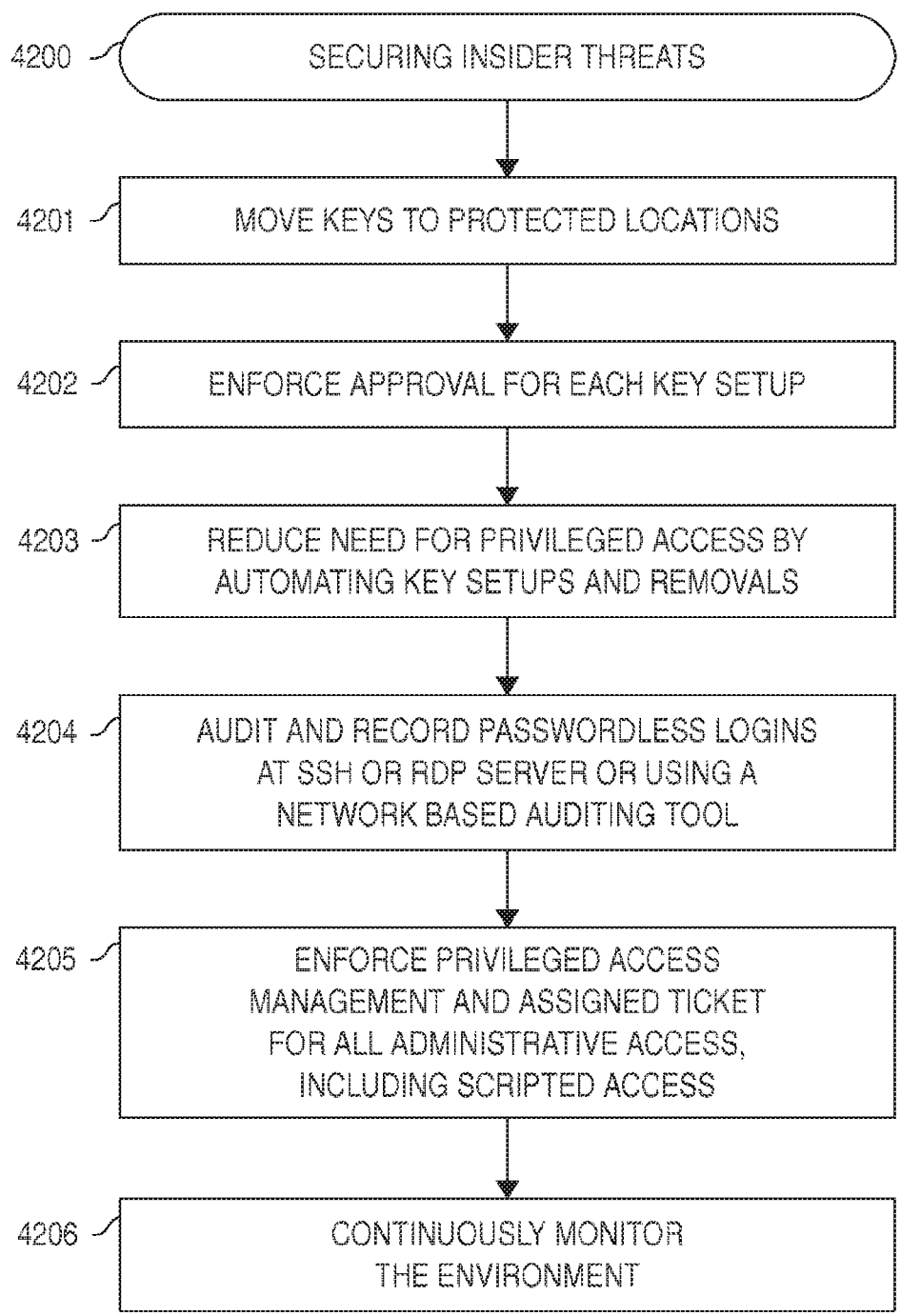

FIG. 42 illustrates securing an environment against insider threats.

Figure 43:
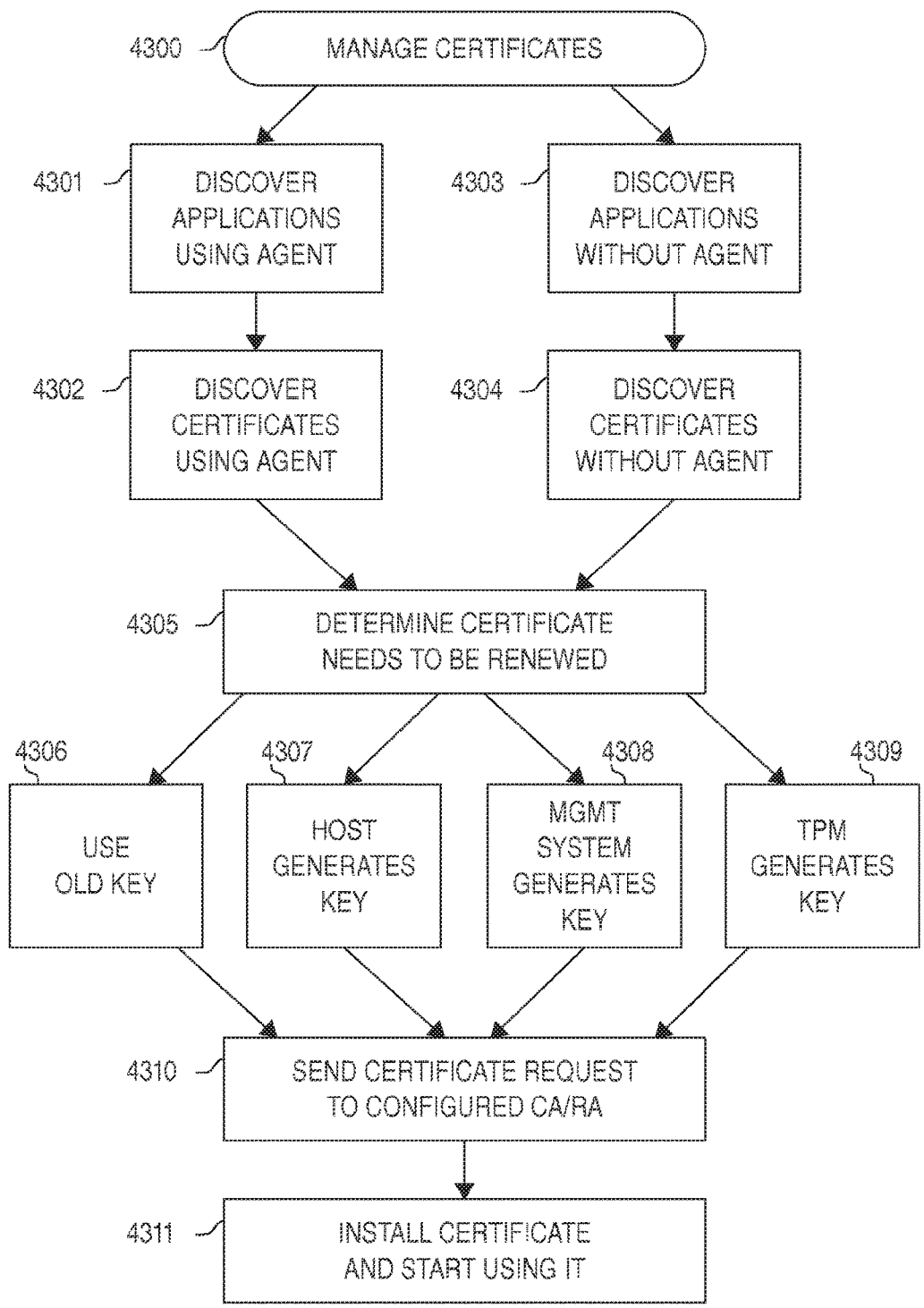

FIG. 43 illustrates managing certificates in relation to a Public Key Infrastructure (PKI).

Figure 44:
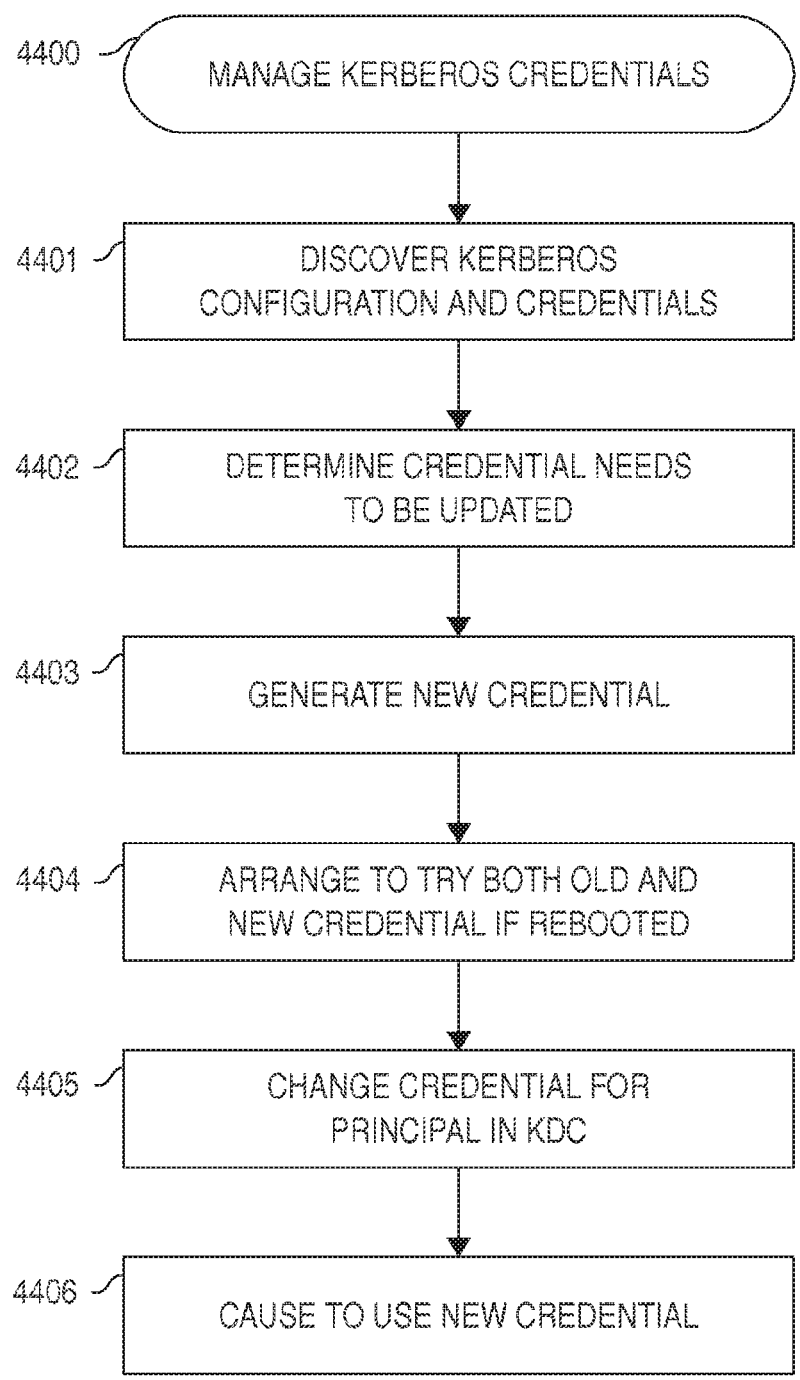

FIG. 44 illustrates managing Kerberos credentials.

Figure 45:
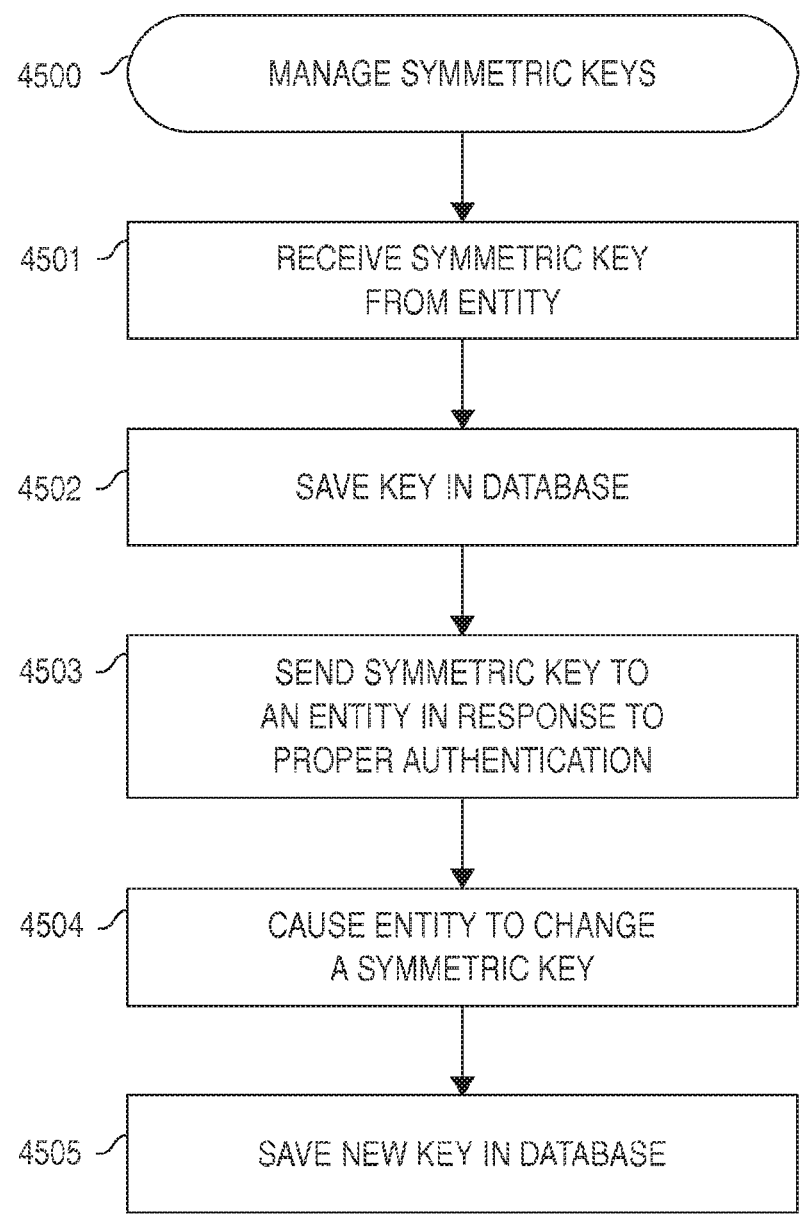

FIG. 45 illustrates managing symmetric keys.

Figure 46:
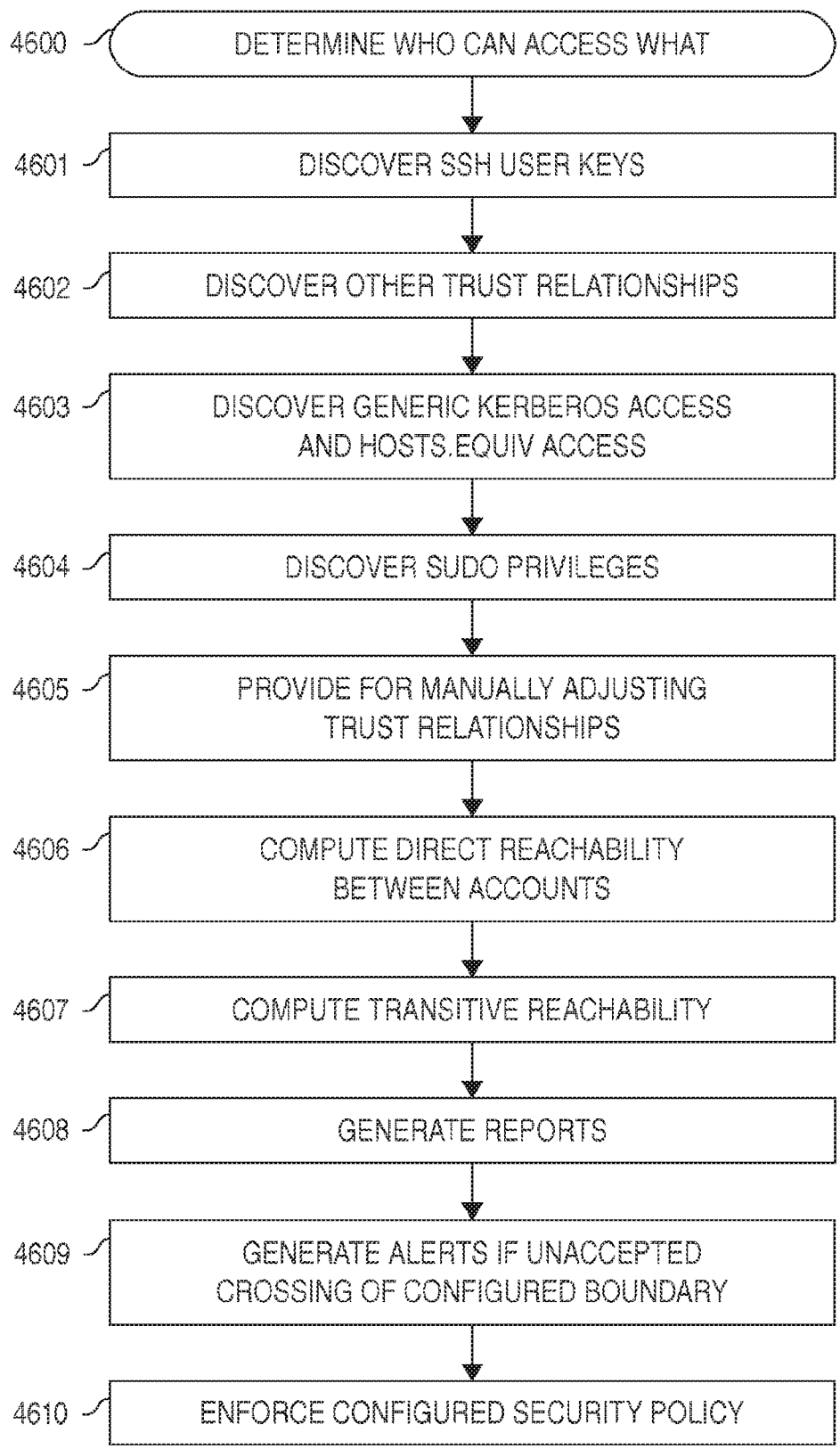

FIG. 46 illustrates determining who can access what.

Figure 47:
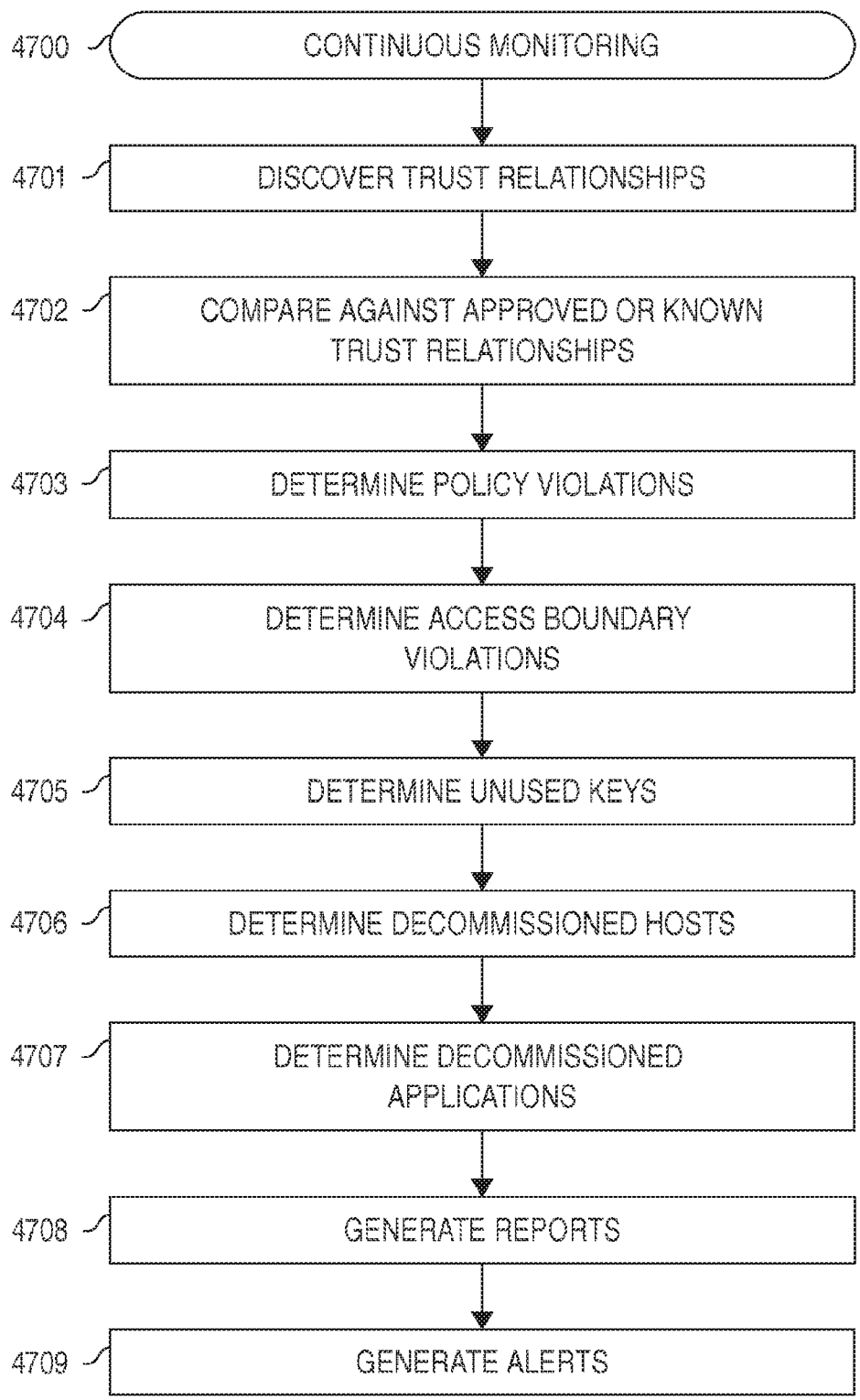

FIG. 47 illustrates continuous monitoring.

Figure 48:
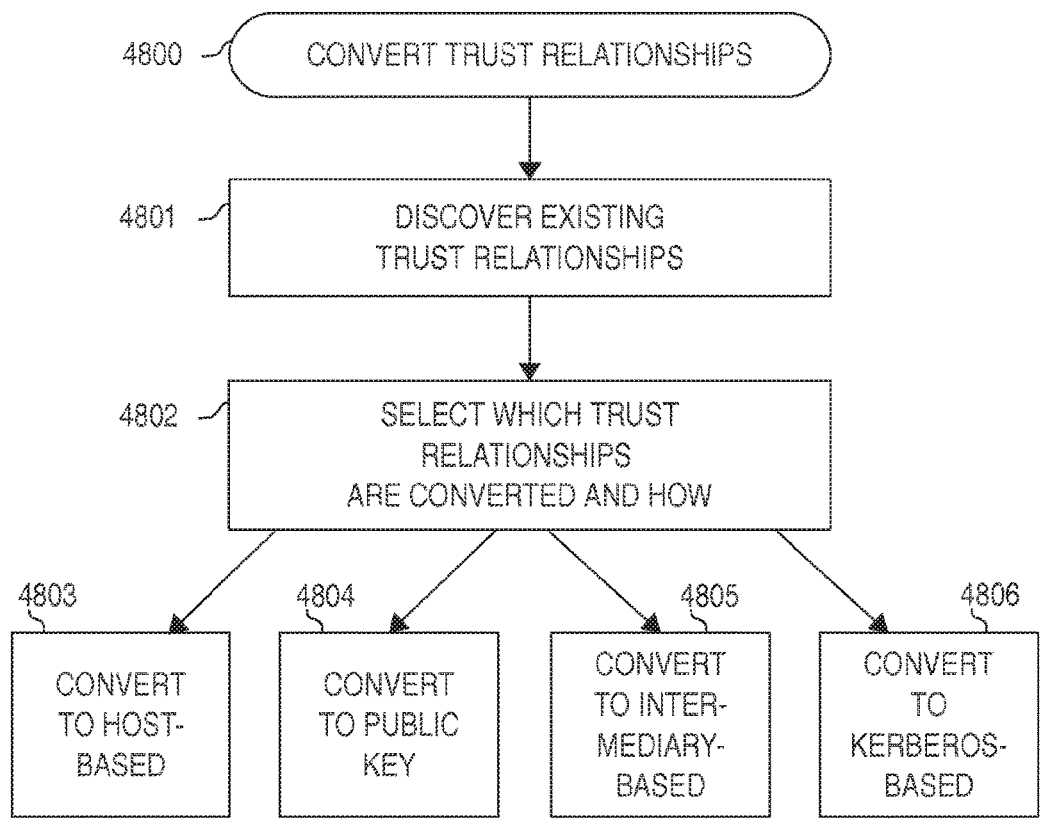

FIG. 48 illustrates converting trust relationships.

Figure 49:
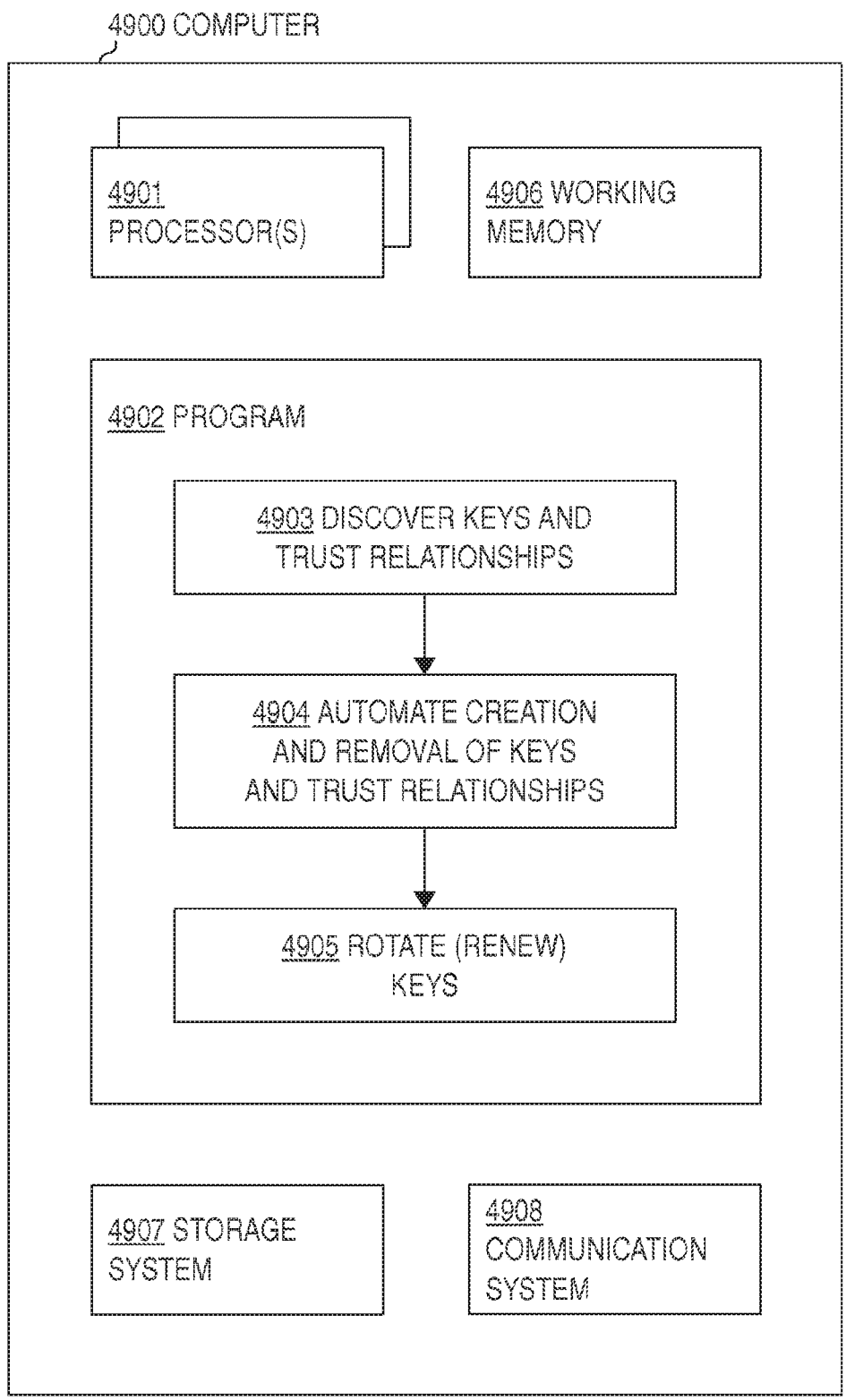

FIG. 49 illustrates a system for and method for discovering existing keys and trust relationships.

DETAILED DESCRIPTION OF THE INVENTION

Certain aspects, embodiments, and elements of the invention will now be described in view of the drawings. It is clear to a person skilled in the art that many variations of the embodiments are possible; for example, method steps could be rearranged, divided, combined, or executed by different parts of a system or apparatus, and any action indicated as performed may just be caused to be performed (and actually executed by a different component).

Some flowcharts include steps that may be omitted in some embodiments. In many cases, flowchart steps may be performed in quick sequence, but in some embodiments performing a step in a flowchart may take weeks or months as a computer might have a maintenance window only, e.g., once per month, and updates may need to be limited to such maintenance windows, or the entire infrastructure might be locked down from changes for months (e.g., during a typical lock-down period before Christmas in the retail industry).

Performing a method or method step may involve, e.g., creating a job record and executing the job (possibly including operations on a host) or spawning multiple subjobs and waiting for their completion. The waiting may mean, e.g., saving the current job record in a database, and reactivating its execution when its subjobs have been completed.

Also, since many of the described steps are something a management system performs on a managed host (e.g., by causing the managed host to perform at least part of the step), and the managed computer may be unavailable at any given time due to system crashes, network outages, maintenance, testing, or other reasons, the management system should preferably be able to retry actions that were not initially successful at a later time. A higher-level flowchart might only continue after an earlier operation has been completed on all related computers. Such error handling and retries have been omitted from most flowcharts for simplicity but should be understood to be present in some embodiments.

A computer may break and can generally be decommissioned at any time. Thus the management system should eventually complete any outstanding operations for such decommissioned systems in order to not leave related higher-level operations incomplete (which might at least confuse users).

Given the combined teaching of the various embodiments herein, a person skilled in the art can combine the teachings with the other embodiments. Not all described embodiments include all the details to improve clarity and keep the length of the description reasonable.

This specification generally assumes that the reader is familiar with enterprise security, encryption protocols, SSH protocol, OpenSSH, Tectia SSH Server/Client, basic IP networking concepts, basic firewall concepts, Unix/Linux, Windows, and relational databases, as might be expected from, e.g., a programmer with a background in large scale system administration and network security or from a development team in this area.

Any version of the SSH protocol may be used, including future versions.

Figure 1:
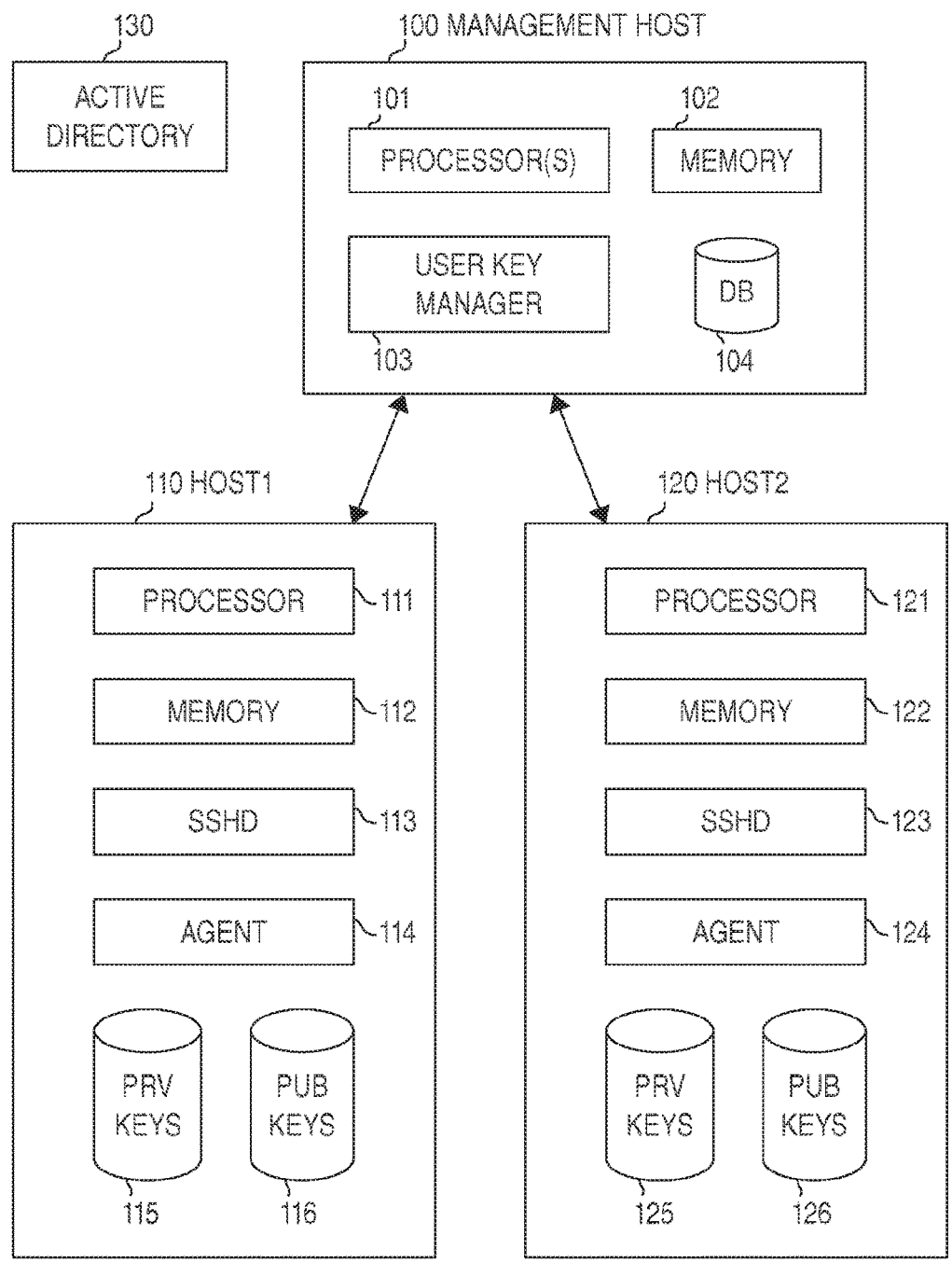
FIG. 1 illustrates a management system for managing SSH user keys.

FIG. 1 illustrates the architecture of a user key management system for SSH (though generally, the same architecture could also be used for, e.g., host key and configuration management) in an embodiment. User key management for SSH refers to the management of the public-private key pairs used for public key authentication of users according to the SSH protocol (e.g., authentication keys and identity keys) and the management of the related aspects of SSH server and client configuration files.

A management host (100) comprises one or more processors (101), such as Intel Xeon processors, main memory (102) (e.g., SDRAM memory) connected to one or more of the processors, a computer-readable non-volatile memory organized into a database, file system and/or registry (all of which are considered to be databases, jointly and separately) for storing information (104) and connected to one or more of the processors and/or the main memory, and software for managing SSH user authentication keys (or performing other management operations for the hosts) (103), typically installed in the non-volatile memory and copied at least partially to the main memory for execution by one or more of the processors, though it could also reside in, e.g., some kind of read-only memory and could also be partially implemented in hardware.

In addition to the components mentioned, a computer also comprises other components normally understood to be included in a computer, such as power supplies, en-closures, displays, I/O devices, disk drives, network interfaces, buses, motherboards, etc., and intercon-nections between as normally understood in the art. Any current or future technology may be used for implementing the computer, and any described component or method may be implemented as hardware logic or state machines or as software state machines or programs. A computer may also be any apparatus with data processing capability, such as a robot, vehicle, communication system, industrial control system, point-of-sale system, handheld terminal/scanner, vehicle, etc.

The management system software may run on more than one host, and typically comprises both back-end components for communicating with managed hosts and front-end components implementing a user interface for communicating with users (e.g., system administrators, security administrators, and IT security auditors). The management system may also provide an API (Application Programming Interface) for scripting and integration with other software packages (e.g., a command-line, function call or web services API for integrating with ticketing or change control systems). The components may all be present on the same computer, or may be distributed on multiple computers. The management host in FIG. 1 illustrates a management system where several of the components are implemented on the same computer.

The user key manager (103) communicates with a database/storage system (104). It may run on a single computer, or it may run on multiple computers in a distributed fashion (e.g., one or more back-ends handling communication with managed computers and one or more front-ends providing a web-based user interface to administrators), and the database may be on the same computer or on a different computer (advantageously, it is a distributed database supporting replication to multiple computers, such as an Oracle or a MySQL data-base). For simplicity, they are described as a single system on a single host in this drawing.

The management system or user key manager (103) or manager or managing means (these terms are used interchangeably herein) communicates with one or more managed hosts (110, 120). The communication is advantageously over an IP network, and may be through intermediate switches, routers, firewalls, NAT (Network Address Translation), etc. It may also utilize co-operating devices, such as hosts acting as management back-ends facilitating communication with and performing actions on managed hosts or on behalf of managed hosts. It may also be through proxy agents that handle agentless management of hosts on which running an agent is not possible or desirable for whatever reason, and may use connectors (software modules implementing operations on a particular type of machine/software, often custom-made as part of an integration project) to implement management of otherwise unsupported or special platforms.

The managed environment comprises the managed hosts and may also comprise components of the management system and/or external directories or systems that the management system somehow manages.

Advantageously, essential state of the management system is stored in the database, and the management back-ends and proxy agents can be restarted at any time without disrupting the operation of the management system or allowing requests to go unprocessed. Thus, requests are advantageously inserted into the database when they are received, and as they are processed, their state in the database is changed.

In an embodiment, security-critical information in the database is encrypted using a key that is not stored in the database, but is stored on front-ends and back-ends or in a separate vault for encryption keys, accessed using, e.g., the OASIS KMIP protocol (OASIS Key Management Interoperability Protocol).

A managed host typically comprises one or more processors (111, 121) connected to a memory (112, 122), an SSH server (113, 123) and/or SSH client, and optionally a management agent (114, 124) (a management agent is typically not present when agentless management is used for the host), a store or database for private keys (115, 125) and for public keys (116, 126). The store or database is typically in some kind of non-volatile storage connected to the processor(s), such as magnetic disk or flash memory, advantageously within a file system and/or a database format for at least part of the non-volatile memory.

Additionally, a managed host may include any other components and connections that may be required or advantageous in a particular kind of computer or apparatus, as is known in the art.

The management agent is a relatively small piece of software that runs on a managed computer and communicates with the management system. The management agent may connect to the management system regularly (or may maintain substantially constant connection), or the management system may be able to connect to the management agent (e.g., using TCP/IP, possibly using SSH or SSL/TLS protocol).

The management agent typically runs as a daemon or service under an operating system, but it may also be invoked periodically by, e.g., the cron program on Unix/Linux. It may also be an application program that is invoked via the SSH server (possibly as an SSH protocol "service"). It may also use UDP for communication, may permit initiation of communication in one or both directions, may keep a connection open continuously, and may use a NAT traversal mechanism for permitting communication across NAT devices, such as STUN, which is described in RFC 3489, Simple Traversal of User Datagram Protocol (STUN) through Network Address Translators (NATs), Internet Engineering Task Force, March 2003.

A host may also be managed without an agent. In this case, typically the management system (or some assisting module, such as a proxy agent or connector or co-operating host) may connect to the host and log in using password, public key authentication (e.g., using a private key held by the management system to authenticate to the host as "root"), or some other suitable authentication method. The management system then uses this connection (or another connection opened using this connection) to execute commands on the management host and perform file transfers to/from it to perform management actions, such as reading operating system type, SSH server/client version, user data, group data, user information directory (e.g., Active Directory (130) or LDAP) configuration, public keys, etc., deriving public keys or fingerprints from found private keys, and creating new private keys, modify configuration files, add/remove public keys, or other operations, including those described elsewhere herein.

The output of commands executed on the host by the management system and the contents of, e.g., read configuration and key files are advantageously parsed by the management system to extract information about the host, its configuration, users, keys, etc. The management system may also send scripts or batch jobs to the managed hosts to perform various operations.

In an embodiment, the management system uses the PowerBroker software from BeyondTrust or another tool for executing commands on a number of managed hosts to perform operations on those hosts.

Advantageously, the management system prepares a script to perform operations on one or more hosts, submits that to be executed on the host (either automatically or assisted by a human operator who submits the script for execution), and receives results from executing the script, which the management system (or one of its components) then analyzes to extract information and to determine which operations on which hosts were successfully executed.

In an embodiment, the management system uses RPC (Remote Procedure Call) mechanisms for communicating with a host. This may be, e.g., SunRPC on Unix systems or .NET in Microsoft Windows environments (.NET is also available on many Unix/Linux platforms through the Mono cross-platform open source .NET development framework).

A server host usually means a computer used as a server in a network, typically in a machine room, as opposed to desktop, laptop, tablet, or mobile device. However, the distinction is not always clear, and, e.g., a desktop computer may also be used as a server in some situations.

A server computer usually has an SSH server (i.e., an SSH protocol implementation, such as a software product, that acts as a server according to the SSH protocol) installed.

A desktop computer usually only has an SSH client (i.e., an SSH protocol implementation, such as a software product, that acts as a client according to the SSH protocol) installed.

Some computers may have both an SSH server and an SSH client installed. Sometimes the same software package may implement both an SSH client and an SSH server.

An SSH client may have one or more identity keys configured for it. Identity keys can be, e.g., used for authenticating a user to an SSH server (or more precisely, for proving having right to access an account). Typically, identity keys are associated with a particular user account on the host having the SSH client installed. They can be, e.g., stored in the user's home directory (though most SSH clients allow the location to be configured).

Identity keys are usually stored in files, and may be encrypted using a passphrase. An identity key with an empty passphrase is not protected by a passphrase (and may not be encrypted at all), whereas an identity key with a non-empty passphrase is said to be protected by a passphrase (and is encrypted by an encryption key derived from the passphrase).

An SSH server may have one or more authorized keys configured for it. An SSH server uses authorized keys, e.g., for determining whether a login attempt using public key authentication should be accepted. Typically, authorized keys are associated with a particular user account on the host having the SSH server installed, and grant access only to that user account. Sometimes fingerprints of keys may be configured instead of the actual public keys as authorized keys.

Typically each user account and host has its own set of user keys, and additionally, the host has host keys used for host authentication.

Some user accounts may be functional accounts (also called process accounts—generally system or application accounts not used by ordinary users) used by programs running on the host. Any of these may be managed by a management system.

The terms user, user account, and account are used interchangeably in this description, unless the context indicates otherwise. Not all users or user accounts necessarily refer to people; rather, the terms are often used in a technical sense where they may refer to authentication/authorization or identity and access management principals/entities in a computer, in addition to or instead of real people. Sometimes the term "user" refers to an account belonging to a real user (person) and the user's account in a computer interchangeably or simultaneously, and sometimes it just refers to a person (e.g., a system administrator).

An administrator or system administrator generally means a person (and/or associated account) whose job it is to manage or administer a system or acts in such role.

A "root account" refers to a kind of privileged account. In Unix/Linux, a root account can generally bypass privilege restrictions (though there are systems, such as SELinux and certain NFS file systems, where some restrictions apply even for root users). On Windows, essentially equivalent concepts include "Local Administrator" and/or "Domain Administrator".

Many systems have also other kinds of privileged accounts. A privileged account just means an account that can perform operations that normal users should not be allowed to perform, such as bypassing normal access controls, installing/removing software, managing subsystems such as printing, or having access to sensitive files (such as an account for an Oracle database having access to raw database files bypassing the database software).

Active Directory (130) illustrates a centralized repository for user information and login credentials. It may be accessed using, e.g., protocols such as Kerberos and/or LDAP. Additional libraries or third-party products, such as Quest Vintela or Centrify DirectControl may be used to provide access to the directory. Other directories that may also be used, including NIS (Network Information System) on Solaris (and other Unix/Linux platforms), virtual directory services from various vendors, RACF (Resource Access Control Facility), and various federated identity services. User information may also be obtained from, e.g., local password files (including shadow password files) or databases.

Figure 2:
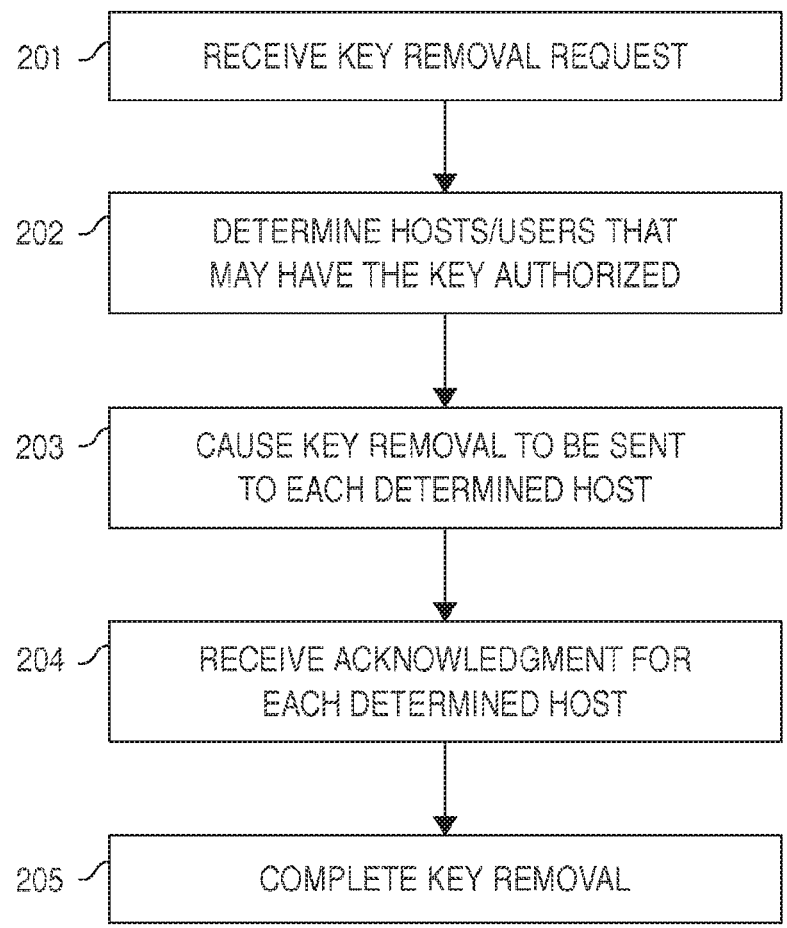
FIG. 2 illustrates processing a request to remove a key from authorized keys files on one or more hosts in a management system.

FIG. 2 illustrates processing a request to remove a public key from the authorized keys files on managed hosts in an embodiment. This is an operation that may be performed, for example, when a user leaves the company or when a key is no longer used (because its original use is no longer relevant, or the key has been renewed and a new key is now being used instead), or the key has been compromised (e.g., potentially fallen into the hands of a hacker).

First, a request to remove a key is received (201). The request may come, e.g., from a web-based user interface, an API used to integrate the management system to a ticketing/approval/change control process at an enterprise (e.g., a Web Services 2.0, Microsoft .NET, or SOAP API), or from a command line. The request may be transmitted, e.g., as a program invocation, function call, RPC (Remote Procedure Call), HTTP (Hypertext Transport Protocol) request, message, textual command, or through a record in a database.

HTTP (Hypertext Transfer Protocol) is described in RFC 2616, Hypertext Transfer Protocol—HTTP/1.1, Internet Engineering Task Force, June 1999.

SOAP (Simple Object Access Protocol) is described in SOAP Version 1.2 Part0: Primer (2nd ed.), W3C (World Wide Web Consortium), April 2007; SOAP Version 1.2 Part1: Messaging Framework (2nd ed.), W3C (World Wide Web Consortium), April 2004; and SOAP Version 1.2 Part2: Adjucts (2nd ed.), W3C (World Wide Web Consortium), April 2004.

Another variant of RPC (Remote Procedure Call) is described RFC 5531, RPC: Remote procedure Call Protocol Specification Version 2, Internet Engineering Task Force, May 2009.

They and other suitable protocols may also be used for communication between the management system and managed hosts in some embodiments.

To process the request, it is determined which hosts may have the key authorized for some user (202) (this may also return hosts where the key is actually not in use, if accurate information is not available). In an embodiment, no information is available about which hosts have which keys, and this returns all managed hosts. In another embodiment, a database contains information about which hosts and/or users have the key, and only those hosts are returned. In yet another embodiment, there is another data store that contains information about where the public key is stored (e.g., a file stored on the same host(s) as the private key), and this data store is used to obtain information about which hosts have the key. When it is said that the set of hosts is returned, it is not meant that an explicit set would necessarily be constructed and returned; rather, it is just used to refer to any means for restricting the set of hosts from which the key is looked for.

Then, a key removal request is caused to be sent to each host that may have the key authorized for some user (203) (if it is known which users have the key, then a request may be sent for each such user on each host where the user may have the key, or many users may be combined into a single request, or, e.g., the request may be sent without a user to cause an agent to scan for the key from all users on the host(s)) (though some users could be excluded from the scan). The request may be sent via an agent or using agentless management, or using any other suitable mechanism. It may also be stored in a database for later sending (e.g., at a time when there is a maintenance window for the host in question, or when lock-down period ends).

An acknowledgment is then received for each determined host (204). The acknowledgment may come from a host (e.g., by sending a message over the management connection from an agent), a proxy agent implementing agentless management, or the management system itself if, e.g., a host having a pending request is decommissioned and removed from the management system.

When acknowledgments have been received for the hosts/users for which a request was sent to a host, the key removal is completed (205) by, e.g., updating its state in a database, sending a confirmation/reply to an API request that initiated the operation, removing the request from a list of pending requests in a user interface, logging request completion, updating statistics, and/or deleting the request from the database. The private key corresponding to the public key may also be deleted (either at this step, or already when removing the public keys; generally, the time is not constrained).

The original request may specify the key using its public key, its private key, a fingerprint of the key (SSH-related IETF standards describe at least one way of computing SSH key fingerprint), or some other suitable means for identifying an authorized key and/or an identity key.

Figure 3:
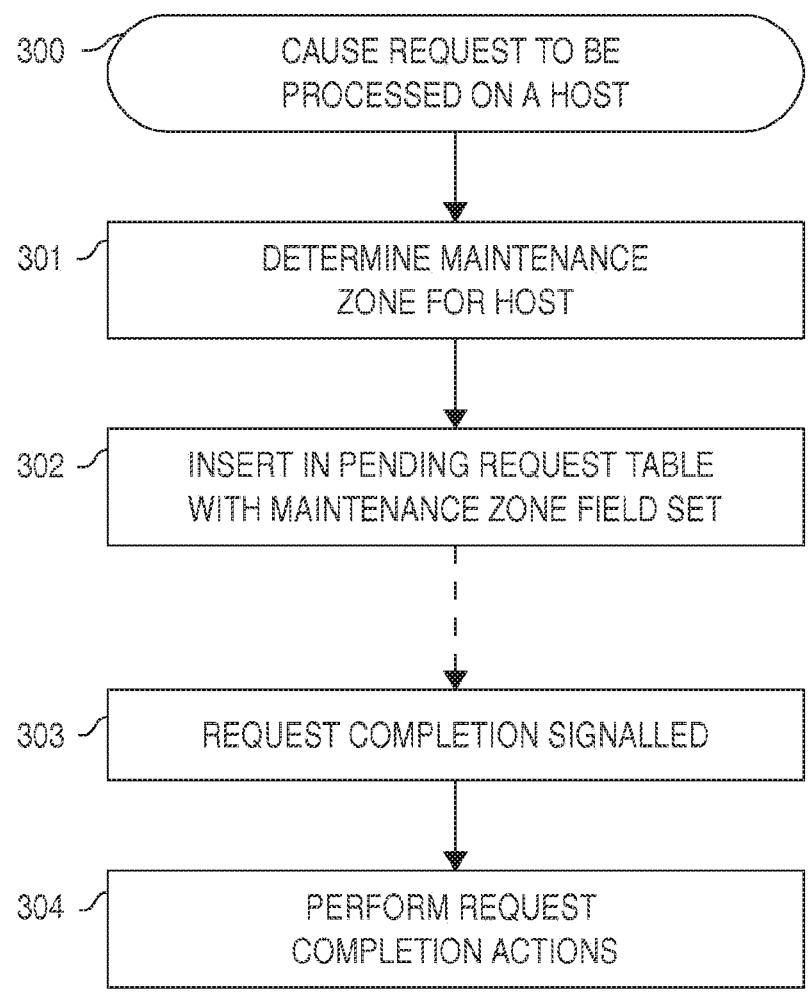
FIG. 3 illustrates causing a request to be processed on a host during a maintenance window applicable to the request in a management system.

FIG. 3 illustrates causing a request to be processed during a maintenance window on a host (300) in an embodiment (maintenance windows are times when installations and modifications may be made on a computer; sometimes they are also called scheduled downtime or green zones). A host's maintenance window is said to be open when requests can be processed for the host. A maintenance window may be indicated for a host, e.g., by associating a host with a maintenance zone (which is essentially a group of hosts having a maintenance window at the same time) or by specifying maintenance window information separately for the host. Maintenance window may be automatically at certain time (e.g., certain time on certain day of each week). In some cases a maintenance window is only available when specially enabled for a host (e.g., by clicking a button that permits maintenance operations or request processing on a host for a certain period of time).

In an embodiment, there is a plurality of designated maintenance zones, and each host is assigned to a maintenance zone. The maintenance zone specifies the time when updates may be made to hosts that belong to the zone. A zone may also specify different times for different types of updates—for example, software installations and upgrades might be permitted only on the second Tuesday each month from 3 am to 4 am, whereas user key additions might be permitted at any time and removals every night from 4 am to 5 am. In some maintenance zones automatic updates might not be permitted at all, and an update can only take place when expressly confirmed by clicking a button in a user interface.

First, a maintenance zone is determined for the host on which the request is to be processed (301). This could, for example, perform an SQL SELECT query to look up a host record from a table and read a maintenance zone field from the host record.

A request record is inserted in a pending request table with a maintenance zone field set to the maintenance zone of the host (302). Alternatively, the record could be inserted without the maintenance zone field, and queries for requests in a particular maintenance zone could perform a join of a host table and a request table in a database. If a host is moved from one maintenance zone to another, then in an embodiment all pending requests for the host are updated to change their maintenance zone field to refer to the new maintenance zone of the host.

The request then remains in the request table until something (e.g., a management back-end node) signals that it is complete (303) (e.g., by updating its state in a database).

Request completion actions are then performed for the request (304). Such completion actions may involve, e.g., sending a confirmation to an API request, changing the request's state in a user interface, and/or signaling to a higher-level request that the request has completed, and continuing processing of the higher-level request if its last outstanding sub-request was completed.

In an embodiment, the maintenance window(s) for a host are indicated in a configuration management database. A configuration management database according to this embodiment has one or more fields or tables identifying when updates (or other maintenance operations) may be performed on a host. In an embodiment, each host record or application record contains fields indicating the beginning and end of a regular maintenance window for the host or application; in another embodiment, there are field(s) for the next maintenance window. In another embodiment, there is a separate table whose records identify a host or an application, and then the beginning and end (or alternatively duration) of a maintenance window. Maintenance windows may also be indicated for groups of hosts instead of individual hosts. Applications may mean business applications that may comprise one or more software packages executing on one or more user accounts on one or more hosts, and can be thought of identifying groups of hosts here.

Figure 4:
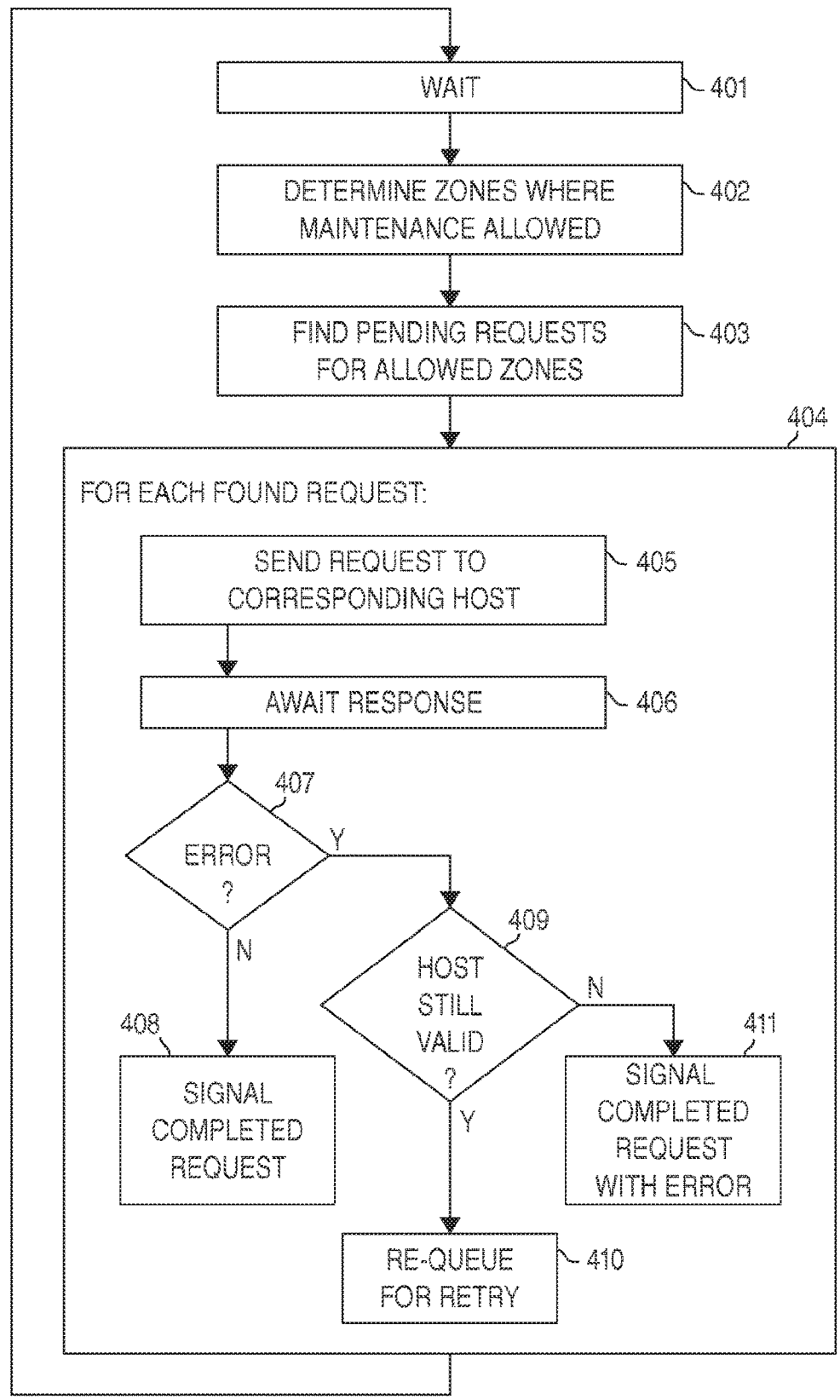
FIG. 4 illustrates processing pending maintenance requests by a repetitive process in a management system.

FIG. 4 illustrates processing pending requests by a repetitive process in an embodiment.

A wait (401) illustrates waiting before going through the other operations again. The wait may be, e.g., waiting for next invocation by a cron job, timer, or a "sleep" for, e.g., five minutes.

When operation resumes, zones where maintenance is currently allowed are determined (402), e.g., by looping over zone definitions and checking if now is the allowed time or by having a next window start time in each zone, and looking for zones where the current time is larger than the next window start time (where current time exceeds the end of the window, the next window start time should be updated and the zone not processed). It is also possible to have buttons in a user interface to "start maintenance now" and "stop doing maintenance now", controlling whether maintenance for the zone is currently allowed.

Then, pending requests for the allowed zones are looked up (403). Some requests may be set to run as soon as possible, without checking whether maintenance for the affected host(s) is allowed, and such requests would also be looked up.

In an embodiment, a value in a state field in each looked up request record is changed to indicate it is currently being processed, with a timeout value after which it will be assumed inoperative if not completed, in which case it can be automatically restarted. In an embodiment, a request record has a field indicating the time when running it can next be attempted. In an embodiment, steps (402) and (403) are omitted and maintenance zones, if any, are taken into account in the value of the field indicating when running the request can next be attempted (e.g., setting the value to the beginning of the next maintenance window when a request record is created, and optionally updating the field when the maintenance window for a host to which the request relates is changed).

Then, each looked up request is processed (404). The request (or something derived from it) is sent to a host associated with the request (405), a response from the host is waited for (406), a return code, or output from performing the request is checked (407), and if no error was detected, execution continues to signal that the request was completed (408) and/or to perform other completion actions. If an error occurred, it is checked whether the host is still valid (e.g., has not been decommissioned) (409), and if so, the request is re-queued and will be retried later (410) (re-queueing may involve, e.g., changing a status field in a database). If the host is no longer valid (it is known that the request will not be completed), it is signaled that the request has completed with an error (411) and/or other completion actions are performed.

In an embodiment, a request is sent to a host by connecting to the host using the SSH protocol, obtaining a shell (command interpreter) at the host, and sending commands to the shell over the SSH protocol and reading responses, possibly in multiple iterations.

In an embodiment, an agent program running on a host connects to the management system using the SSH protocol (authenticating the management system by its host key and authenticating into the management system using, e.g., public key authentication) and runs a shell at the client (managed host) side, allowing the management system to send commands to the shell and read responses.

In an embodiment, an agent program runs constantly and periodically connects to the management system; in another embodiment, an agent program is periodically run as a "cron job". The agent program may be able to execute requests such as "receive file", "send file", "cause SSH server to re-read its configuration file". Generally, any method for communicating with the managed host and the management system may be used.

In an embodiment, a request to be performed on a host is divided into multiple sub-requests or commands sent to the host. The sub-requests or commands may be operating system specific or SSH version specific; the management system may obtain the host's operating system version, e.g., by running the "uname -a" command on the host or reading Windows version using an agent program and sending the version to the management system.

Not all request records necessarily relate to a particular host (e.g., for requests for generating reports from information in a database). Also, some requests may relate to more than one host. One method for processing such requests is to divide them into sub-requests, one for each host. For simplicity, FIG. 4 only shows processing for those requests that relate to a particular host.

Figure 5:
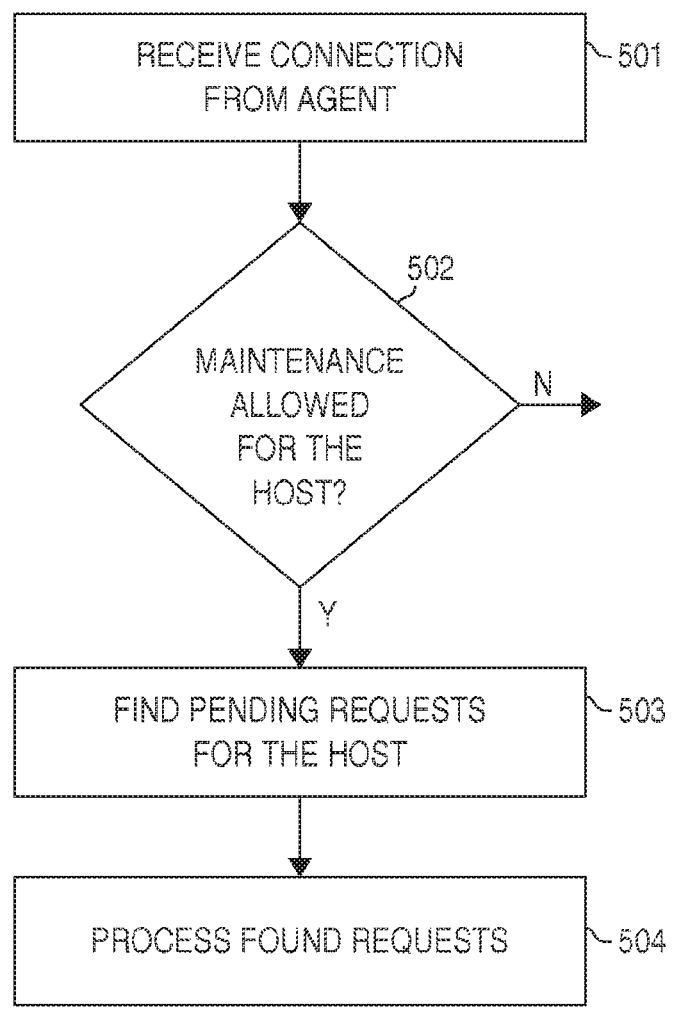
FIG. 5 illustrates handling a connection from a management agent in a management system.

FIG. 5 illustrates handling a connection from a management agent in a management system in an embodiment. First, the connection is received (501), then it is checked if maintenance is allowed for the host (502) (e.g., by looking up its maintenance zone and checking whether maintenance is allowed for the zone) (this step is optional). Then, pending requests for the host running the management agent are looked up (503), and they are processed (504). In an embodiment, the actions after receiving the connection are inside a loop and are repeated as long as maintenance is allowed and there are pending requests for the host, typically processing one request at a time.

Figure 6:
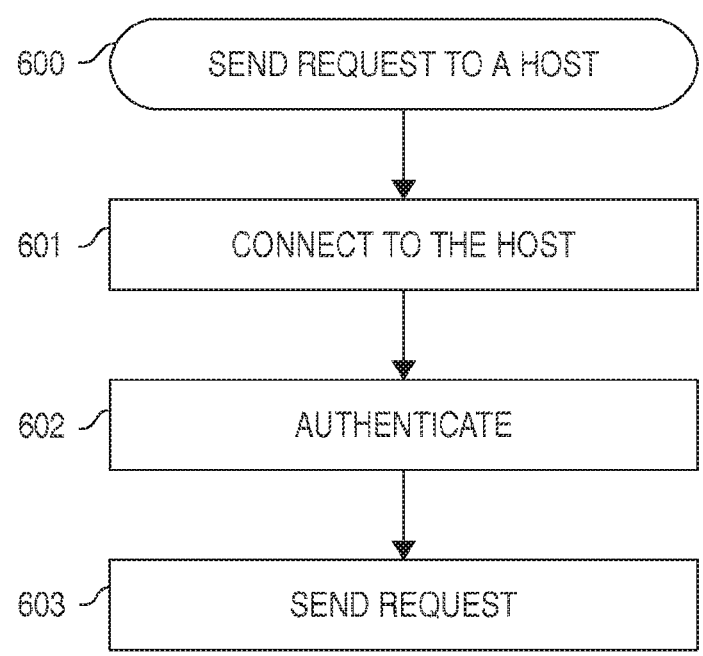
FIG. 6 illustrates sending a request to a host.

FIG. 6 illustrates sending a request to a host in an agentless host embodiment or in an embodiment where the management system contacts a management agent at a host (600). First, the management system connects to the host (601) and authenticates to the host (602), e.g., using the SSH protocol and public key authentication as root or other suitable privileged user (or non-privileged user and then using "sudo", as described later herein in more detail). Having a connection, the management system sends one or more requests to the host (603) (possibly in a loop as in the case where an agent establishes the connection).

In an embodiment, the management system further authenticates the host by its host key.

Figure 7:
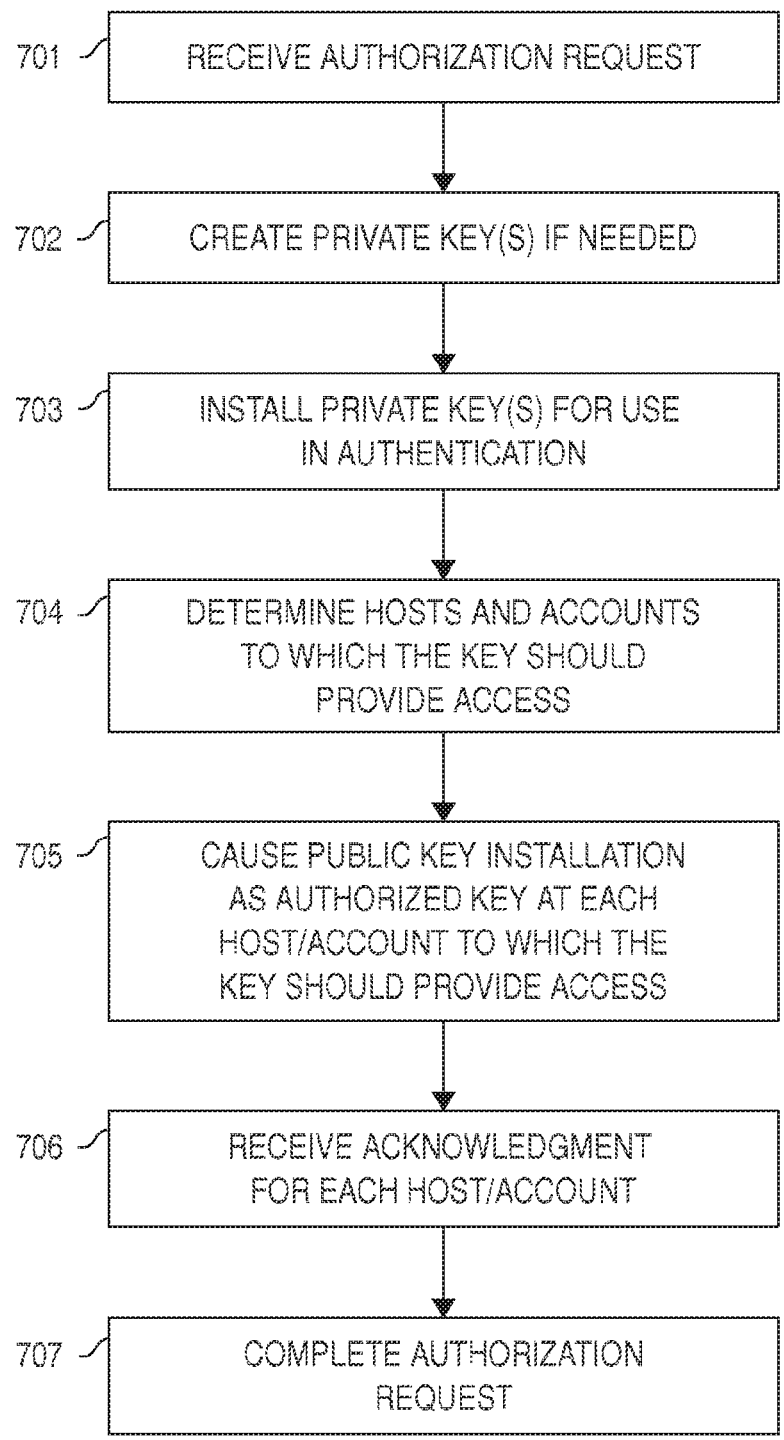
FIG. 7 illustrates processing a request to authorize a first account to log in as a second account in a management system.

FIG. 7 illustrates processing a request by a management system to authorize a first account on a first host to log into a second account on a second host in an embodiment. The accounts and hosts may also identify groups of accounts or groups of hosts.

First, an authorization request is received (701). If the first account does not yet have a private key, a private key is created (or caused to be created) for it (702), for example, by sending a request to this effect to an agent or connecting to the first host using SSH and running the ssh-keygen command without an agent. The private key could be generated by the management system, the first host, or a third party. The resulting private key is added (or caused to be added) to SSH configuration files on the first host as needed to make it usable for public key authentication as an identity key (703).

In an embodiments, the host may actually represent multiple hosts (e.g., in a cluster), and they may be caused to share the same private key for the account. A public key corresponding to the private key is copied to the management system (if not generated/computed by the management system) and from there to the host of the second account (though, in an embodiment, it is copied directly from the first account to the host where it is needed).

Then, it is determined which host(s) and accounts the public key should be added to as an authorized key (704). In an embodiment, the destination account may be present on many different hosts, or may refer to a clustered host, and the authorized key may actually need to be copied to multiple hosts (see description for later drawings). Then, the management system causes the public key to be installed on each of the determined hosts (if any) for the account(s) to which the key should provide access (705).

As each request is processed, an acknowledgment is received for each completed sub-request (706), and when sub-requests are complete, the authorization request is complete (707), its completion is signaled and/or the API notifies a ticketing system that the request has been processed, removes it from a pending list in the user interface, etc.

In an embodiment, processing a request to install keys on a group of hosts involves inserting sub-requests in a table, and changing the status of the current request to indicate that it needs completion signals from the sub-requests. The sub-requests have a field identifying their higher-level (parent) request. Each sub-request installs the authorized key on one host (or some subset of the hosts), and signals the parent request when it is done. The parent request continues running when its sub-requests have signaled completion.

Figure 8:
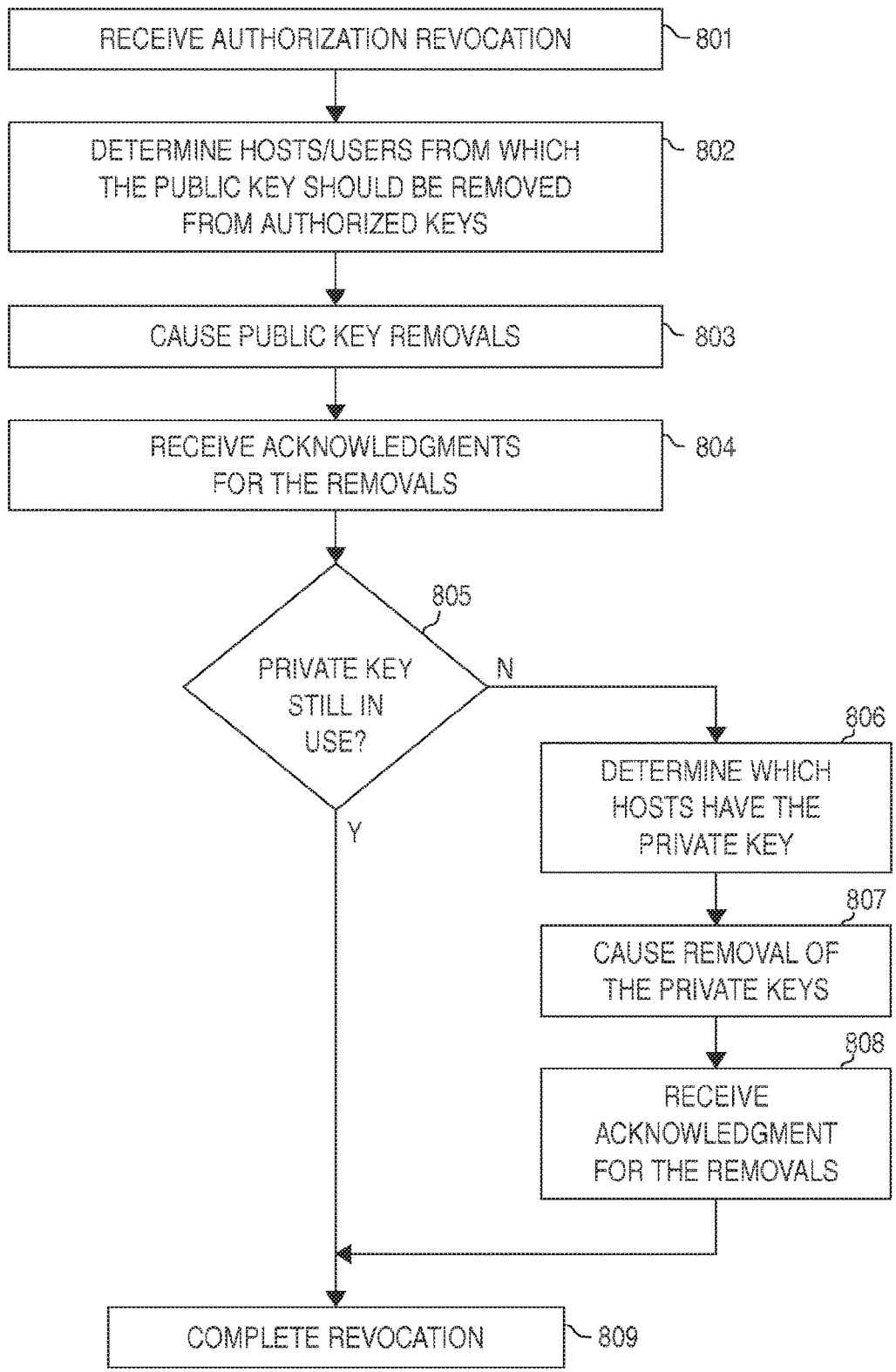
FIG. 8 illustrates processing a request to revoke authorization of a first account to access a second account in a management system.

FIG. 8 illustrates processing a request to revoke authorization of a first account on a first host to access a second account on a second host by a management system in an embodiment. The accounts and hosts may also identify groups of accounts or groups of hosts.

First, the request is received (801), the affected hosts/accounts are determined (802), the public keys to be removed are caused to be removed (803) by creating a sub-request to remove an authorized key for each affected host, and acknowledgments for the sub-requests having completed are received (804). It is checked whether the private key is still needed (805) (e.g., whether the corresponding public key still exists for some account), and if not, it is determined which host(s) have the private key (806), sub-requests are created to remove the private key (807), acknowledgment of completion of the sub-request is received (808), and completion of the authorization revocation request is signaled (809) and/or related actions performed.

When determining the affected hosts/accounts in (804) and (802), it is advantageous to have information in a database about keys and where each key is stored. The tables can first be constructed during a discovery phase, and thereafter updated whenever new keys are found or added using the management system or removed by the management system (or otherwise). For example, one could have a table "pubkeys", with fields "host", "user", and "keyid" used for storing information about keys. Hosts and users having a particular key could be found by selecting records by the "keyid" field.

In an embodiment, authorizations can be requested or revoked only for functional accounts, and the management system denies any requests to authorize connections between interactive user accounts or between an interactive user account and a functional account.

In an embodiment, the accounts may represent groups of users/accounts, and the request means to authorize any of the accounts in the first group to access any of the accounts in the second group. In this case the request may be processed as a separate request for each user in the first group, and steps (704) and (802) extract the hosts and users to which the second group maps.

In an embodiment, the authorizations are between groups of accounts, and the key management system dynamically adds and removes keys to/from accounts based on their memberships in groups.

How a group is mapped to users and hosts depends on the group. If the group is defined as a list of accounts, then the group is expanded to include those accounts (the account names on the list may or may not include a host name or realm designation, as for Windows domains or Kerberos realms). If a group is defined in a /etc/group file on some computer, then it includes those users on that computer listed on the line for the group in question in that file (the /etc/group file contains lines that comprise a group name and a comma-separated list of group member user names). If a group is defined using Organizational Unit (OU) fields in Active Directory or LDAP, the group includes those accounts whose OU field(s) match those specified in the group constraints, and can be determined by making a query against the directory with the OU constraints in place (and similarly for other constraints on the distinguished name or other attributes of User objects in the directory).

To find hosts and users affected by addition of an account, one also must consider clusters of computers and accounts that are present on multiple hosts in the managed environment, as well as requests that refer to groups of accounts. In an embodiment, the managed environment has a set of accounts (stored in a directory service, e.g., Active Directory, LDAP, NIS) that exist on more than one computer. The accounts may or may not have shared (or networked) home directories.

For accounts in a directory service, a method typically exists for mapping the identity of a user into a login name on a particular host (in an embodiment, the user name is stored in a field of the User object in Active Directory or LDAP, and the method comprises looking up the user object from the directory and reading the user name field from the object; the exact method depends on the type of directory used but is know in the art and is usually needed for normal login processing on the servers).

Figure 9:
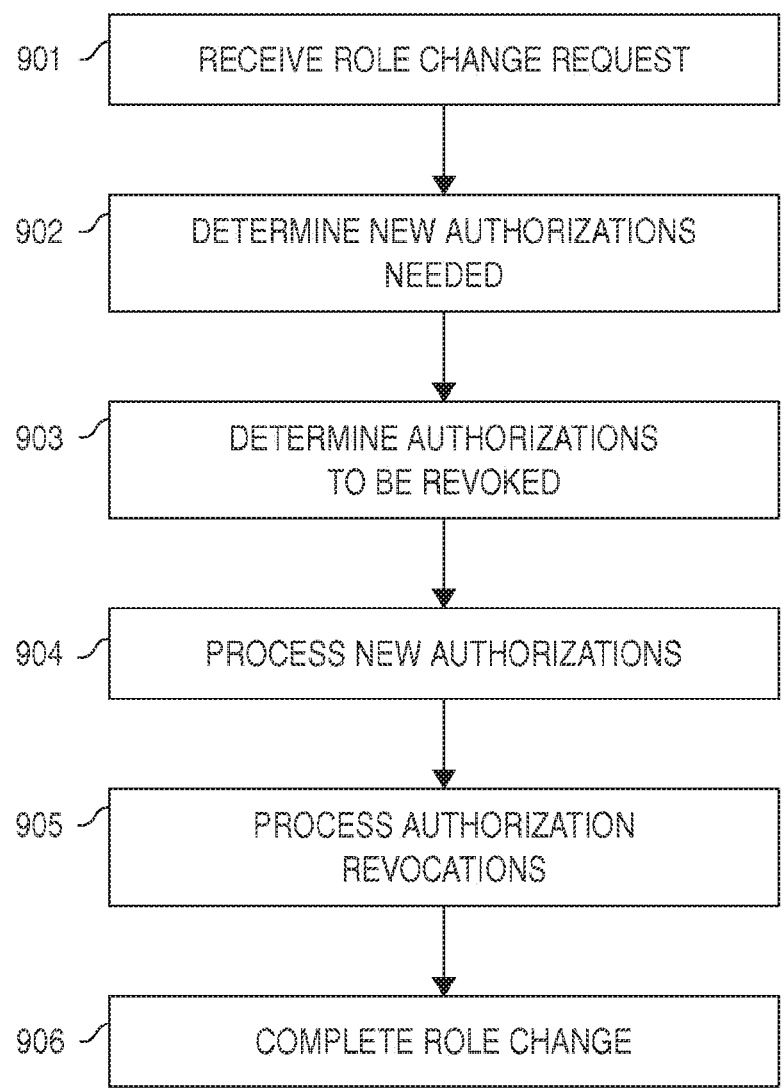
FIG. 9 illustrates processing a role change request for an account in a management system where a role implies certain access rights specified for the role.

FIG. 9 illustrates processing a role change request for an account where a role implies certain access rights specified for the role in an embodiment. The request is received (901), e.g., from a user interface or API (possibly indirectly through a database), it is determined which new authorizations are needed (902), it is determined which authorizations should be revoked (903), the new authorizations are processed (904), the authorization revocations are processed (905), and completion of the request is signaled (906) and/or other completion actions performed.

The processing of a request may be optimized by first computing which keys at which accounts would need to be removed when the user is detached from the old role, computing which new keys should be added at which accounts for the user's new role, and only deleting those keys that would not be re-added for the new role, and only adding those keys for the new role that are not already in the system (as indicated by a table containing information about stored keys). Similar optimization can be applied to any authorization or revocation request of the type described here. (Of course, it would also be possible to just first delete keys authorized only based on the old role(s) (if any), and then add keys authorized based on the new role(s) (if any).

Generally, a role may imply a set of accounts (or other resources, such as computers, applications, or data) that the user may access. Giving a user a role may imply, among other things, authorizing the user to connect to each of the accounts specified for the role, and removing a role from a user may imply removing the authorization for the user to connect to each of the authorizations specified for the role (unless authorized by a remaining role or other authorization).

The role change above was described as if a user can have only one role, but it can be easily extended to multiple roles (having multiple roles is roughly equivalent to having "super-roles" that are sets of roles, and imply access to any resource permitted by any of the underlying roles).

Figure 10:
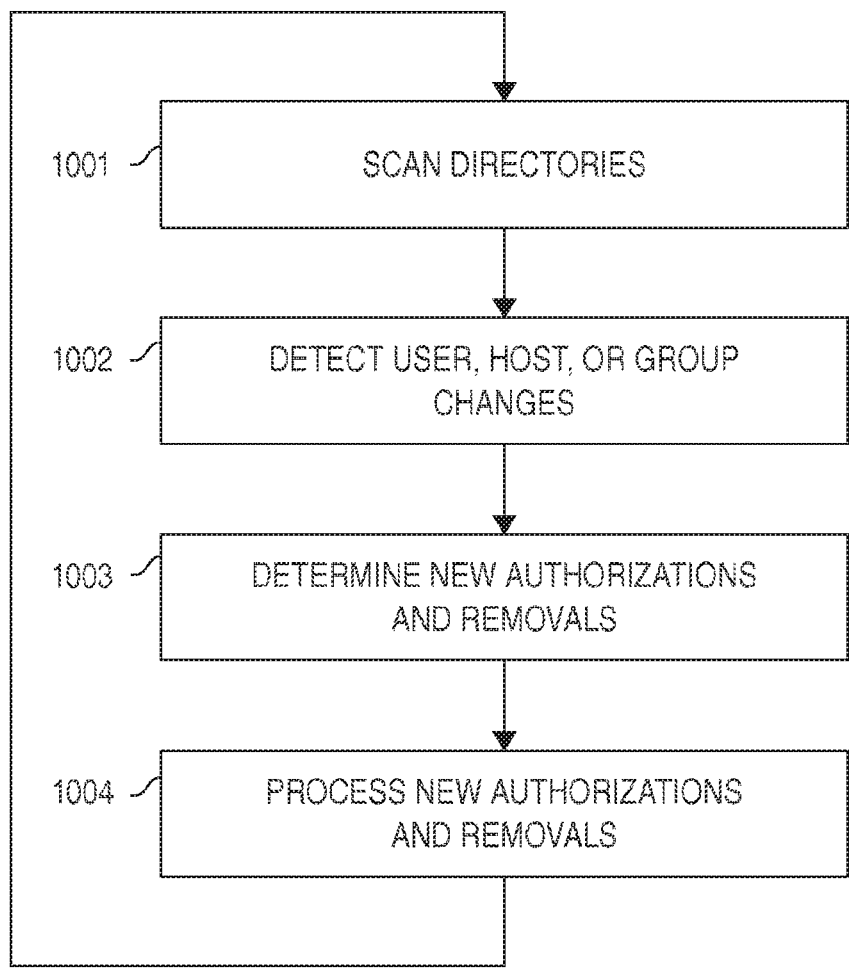
FIG. 10 illustrates scanning one or more user information directories (e.g., Active Directory) for changes to user, group, or host information in a management system.

FIG. 10 illustrates scanning one or more user information directories (e.g., Active Directory) for changes to user, group, or host information in an embodiment. One or more directories are scanned for changes (1001) (e.g., by making a query to an LDAP directory and enumerating User, Host, and/or Group objects—the naming of the objects depends on the schema), changes in user, host, or group information are detected (1002), required new authorizations and/or removals of authorizations are determined (1003) and related requests created, and the authorization and removal requests are processed (1004).

There are several possible methods for detecting changes in a directory service. One method is to scan the entire directory (or the areas that may contain relevant objects) and keep a local copy of the directory as it was when last scanned (the local copy may not need to store the entire objects; it is sometimes enough to store some relevant fields, such as the user name and distinguished name).

Another method is to keep a poll query against the database active, the poll query being such that any changed records are returned. A further approach is to have an API (e.g., function call, SOAP API, web services API, or command-line command) for indicating that data for a particular user, host, or group has changed; such an API could be used to integrate the management system to an identity and access management system by causing such a system to inform the management system using the API whenever a change is made (perhaps also providing a change tracking/approval reference, which would be beneficial for associating the changes with the appropriate reference).

In an embodiment, if a user account is added, the account's roles are specified by the groups as specified in a user information directory. The user might then be automatically given the roles implied by the groups. Alternatively, roles could be indicated by the user's distinguished name, such as OU fields. If a user's groups or distinguished name changes, it would be handled like a role change.

Not all organizations store host group information in a directory. When they do, addition of a host to a host group may cause previous authorizations of access using the host group to be re-evaluated. The processing is similar to revoking accesses granted by the rule, and then re-adding them. This may be implemented using the optimization above. The same applies to removing a host from a host group.

A management system may record in a database authorized connections from one account (or group of accounts) to another account (or group of accounts). When there is a change in a group, trust relationships based on rules using any affected group may be revoked and re-authorized (preferably using optimizations similar to those described above so that no keys are unnecessarily removed and then re-added).

The affected groups for a user are generally those groups that the user is a member of (directly or indirectly—indirectly meaning, e.g., through subgroups or other mechanisms implying indirect membership in a particular directory structure/grouping mechanism).

The affected groups for a host are generally those host groups that the host is a member of (directly or indirectly).

When groupings are changed from the user interface, the effect is essentially the same as if they had been changed in a directory.

A new request or change may cause a key to be removed before adding it has even been completed. Such situations may be handled by cancelling the request to add it; another alternative is to process requests in the order in which they were created.

In an embodiment, a request or background job is used for bringing configured trust relationships for an account up to date. The current state of permitted trust relationships is maintained in a database (using, e.g., source host, source account, destination host, destination account, permitted command to execute, and type of trust relationship (public key vs. host-based authentication vs. Kerberos vs. PKI) as fields in a database table), and whenever an account on a host is updated (a request to update it runs), trust relationships where the account is either the source or destination are looked up, and the configuration files (including authorized keys and identity keys) for the account are updated accordingly.

Figure 11A:
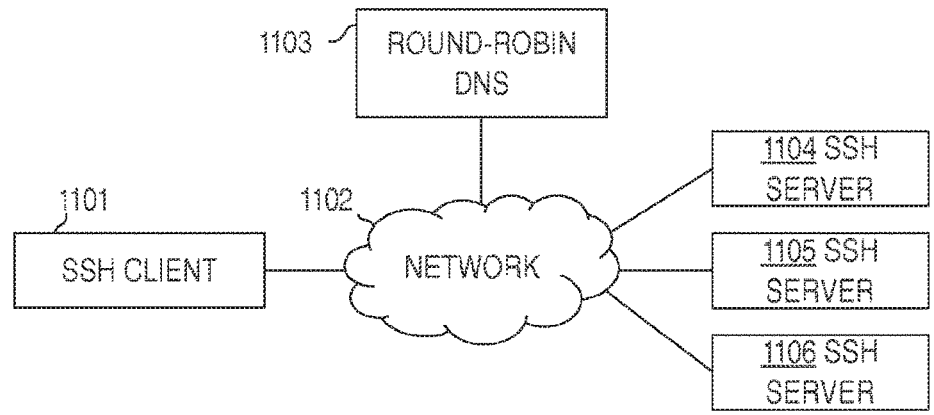
FIG. 11A illustrates a cluster of computers that share a domain name and whose IP addresses are provided in a round-robin fashion by a DNS server and that share the same host key.

FIG. 11A illustrates a cluster of computers that share a domain name and whose IP addresses are provided in a round-robin fashion by a DNS server and that share the same host key in an embodiment.

Round-robin DNS is a mechanism where a DNS (Domain Name Service) server has multiple IP addresses corresponding to a domain name. It returns a list of IP addresses for such hosts (not necessarily all configured addresses). However, round-robin DNS rotates the list so that different queries return the addresses in different order (in round-robin DNS, generally, the one returned first in the previous query is moved to the end of the list). Such arrangements are used, e.g., for load balancing purposes (when requests are approximately equally expensive, such as with many web sites) and fault tolerance (if one host is down, some requests may fail but most are likely to go through, thus the failure of one host will affect only a small fraction of users).

If an SSH connection is made to a domain name using round-robin DNS, the connection may be made to any of the hosts having the same domain name. Thus, such hosts may be treated as logically equivalent for SSH key management purposes (they may have the same host key or clients may be given all of their host keys as valid keys for the domain name; granting access to one of them may grant access to all of them; allowing one of them to make a connection to some account may mean allowing any of them to make the connection [with the same private key or a different private key]).

In the figure, an SSH client (1101) is connected to a network (1102) and uses a domain name for which round-robin DNS is used by a DNS server (1103) to connect to any of a plurality of SSH servers (1101, 1105, 1106).

Figure 11B:
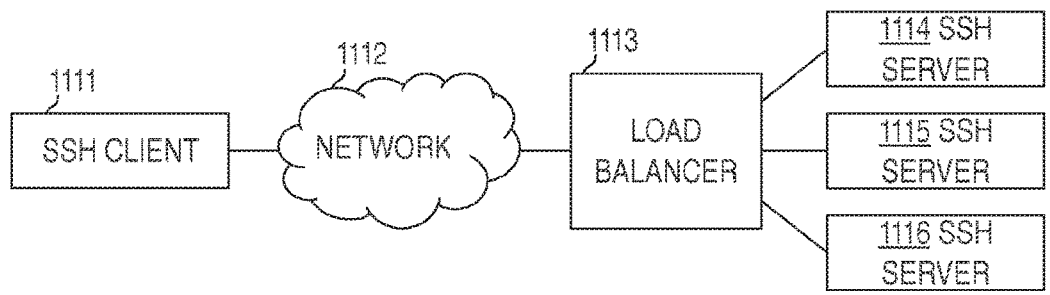
FIG. 11B illustrates a cluster of computers connected to a network via a load balancing device that may redirect a connection to an IP address to any computer in the cluster.

FIG. 11B illustrates a cluster of computers connected to a network via a load balancing device that may redirect a connection to an IP address to any computer in the cluster in an embodiment.

Some services use a special device to balance load between servers (typically web servers). The load balancer may be relatively smart, and may be able to, e.g., direct the same HTTP session to the same server even if several TCP/IP connections are made. The load balancer is visible to the network using just one IP address, and connects to several servers behind it using their own IP addresses (though they could also be connected to distinct ports on the load balancer).

An SSH client (1111) connects through a network (1112) to a load balancer (1113) which directs the connection (e.g., using NAT) to an SSH server (1114, 1115, 1116) behind it. Since the servers look like a single server to the client, they may have the same host key (or alternatively, the client may be configured to accept any of their host keys as the host key for the load balancer's IP address and/or host name).

Figure 11C:
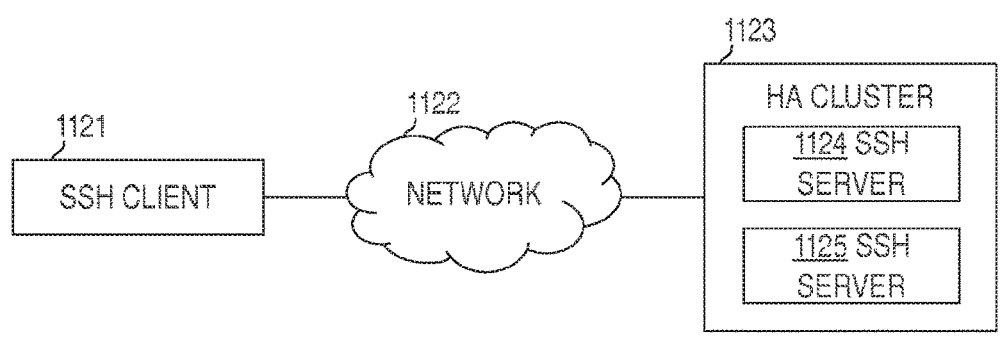
FIG. 11C illustrates a cluster of computers in a high-availability configuration that looks like a single computer to other computers.

FIG. 11C illustrates a cluster of computers in a high-availability configuration that looks like a single computer to other computers in an embodiment. An SSH client (1121) connects through a network (1122) to a high-availability cluster (3123) that comprises two or more nodes each having an SSH server (1124, 1125). Typically one of the nodes in the cluster would be active and another would be standby. If the active node fails, the other node will activate. Special synchronization protocols are usually used to synchronize data on the nodes during normal operation. Since they may switch over at any time, both nodes may have the same host key, or the client may be configured to accept each of their host keys for the IP address.

Figure 12:
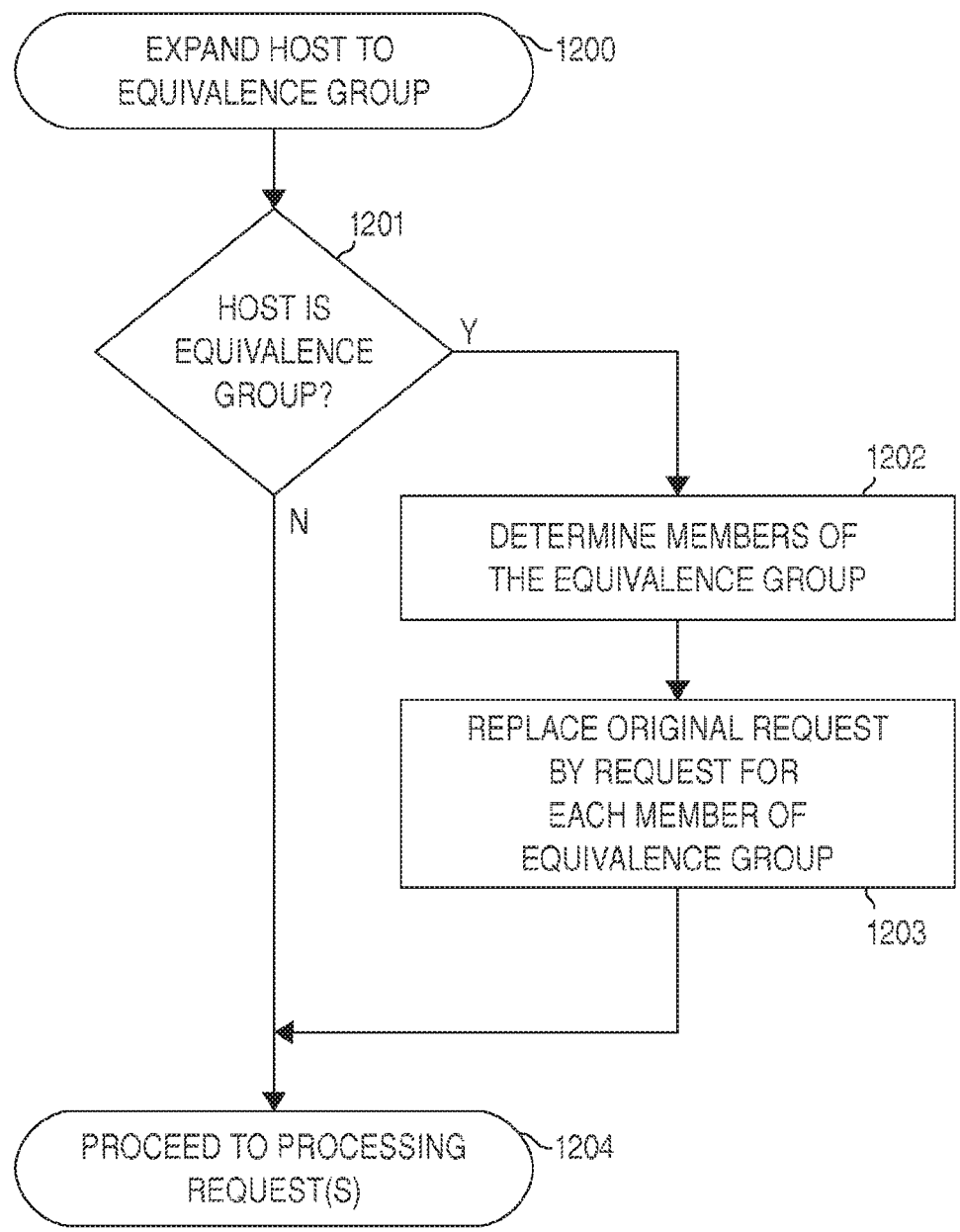
FIG. 12 illustrates expanding a host to an equivalence group representing a cluster of computers.

FIG. 12 illustrates expanding a host to an equivalence group representing a cluster of computers in an embodiment.

A host equivalence group is a group of hosts that should either have the same host key or that share a name and/or IP address (in a cluster configuration), and clients should be configured to accept any of their host keys for the shared name and/or IP address. Generally, also an authorization to connect to/from one of the hosts in the equivalence group should mean an authorization to connect to/from any of the hosts in the equivalence group. Host equivalence groups may arise in each of the situations described in FIGS. 11A, 11B, and 11C. They also arise in various other high-availability, hot standby, and disaster recovery configurations.

To expand a host name to an equivalence group (1200), it is first checked if the host belongs to or represents a host equivalence group (1201) (e.g., by reading information for the host from a database, and checking an "equivalence group" field in the host information record). If it does not belong to or represent a host equivalence group, nothing special needs to be done and any request using the host can be processed normally (1204). If the host belongs to or represents an equivalence group, the members of the equivalence group are determined (1202) (e.g., by making a query to the database searching for host records with the "equivalence group" field set to the desired group), and the original request is replaced by a request for each member of the equivalence group (1203) (advantageously, replaced here means that a sub-request is created for each member host, and the original request just waits for the sub-requests to complete; the sub-requests may be marked as to no longer require equivalence group expansion, to prevent infinite repeated expansions, as also the members refer to the equivalence group). After expansion, each resulting request is processed normally (1204).

Figure 13:
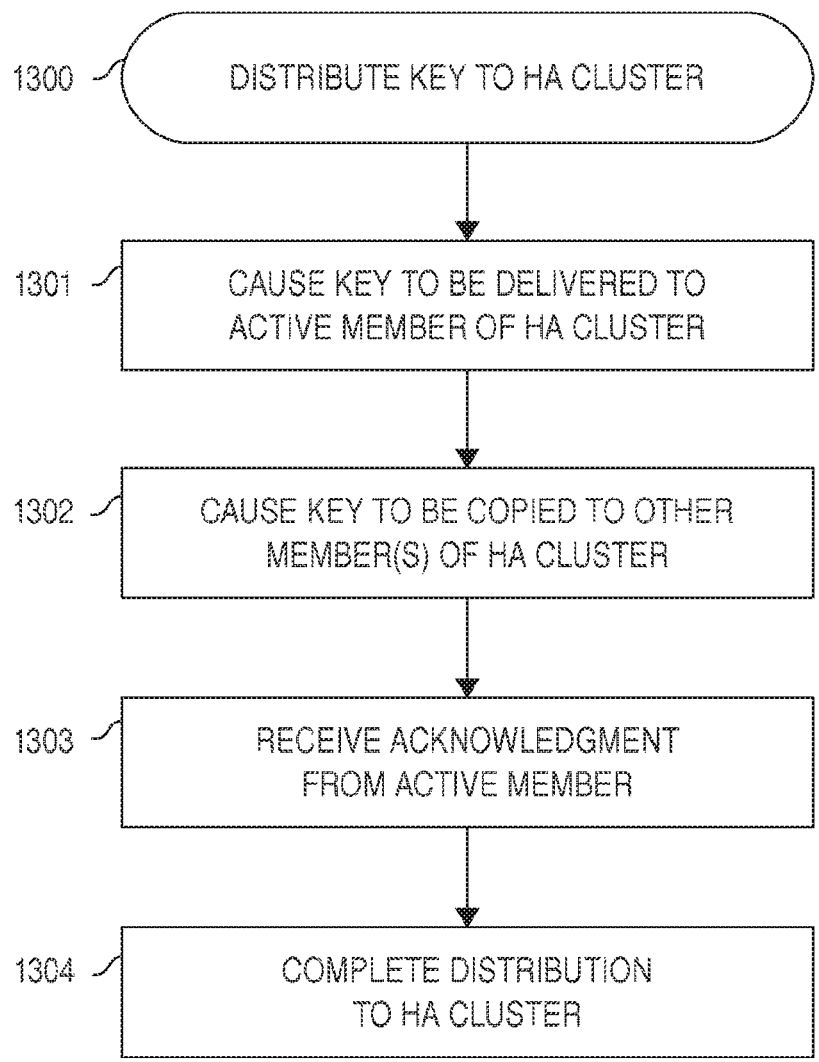
FIG. 13 illustrates distributing a key to a high-availability cluster.

FIG. 13 illustrates distributing a key to a high-availability cluster (1300) in an embodiment. The key is delivered to one member of the high-availability cluster (1301), it is copied to the other member(s) of the cluster (1302), acknowledgment is received from a member (1303), and the distribution is signaled complete (1304) and/or related actions performed.

Figure 14:
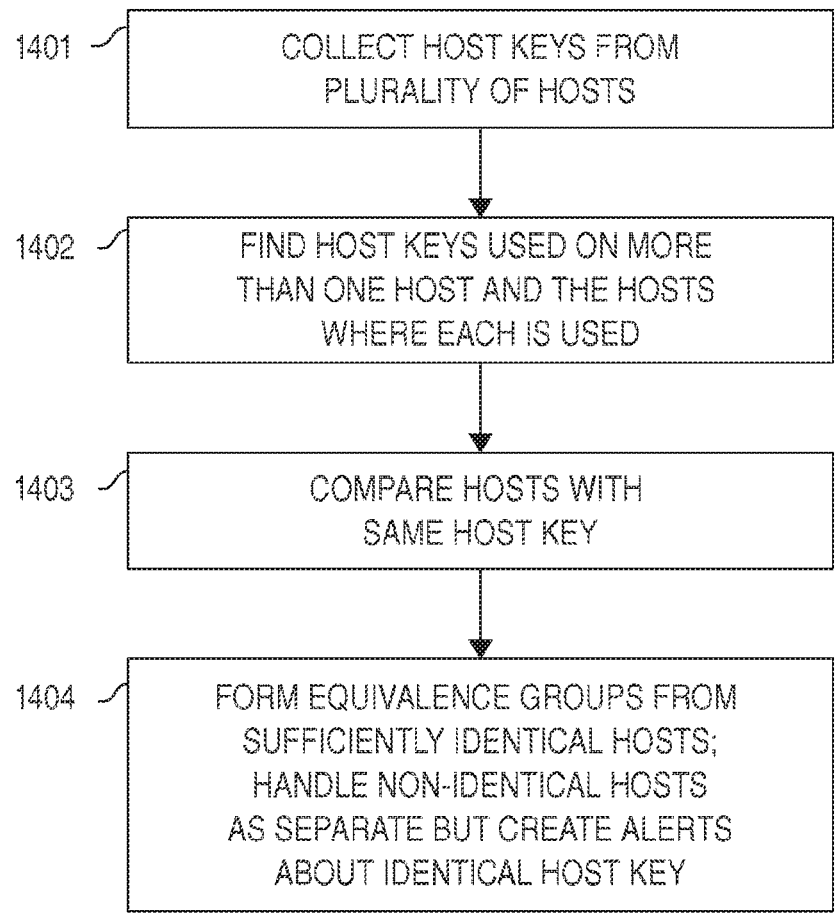
FIG. 14 illustrates automatically detecting equivalence groups for clusters of computers using existing host key information.

FIG. 14 illustrates automatically detecting host equivalence groups for clusters of computers using existing host key information in an embodiment. Host keys are collected from a plurality of hosts (1401), host keys used on more than one host are identified and for each key it is determined where it is used (1402), the hosts having the same host key are compared to determine if they are likely to be in the same cluster (1403), and host equivalence groups are formed from sufficiently identical hosts (1404). When comparing hosts, factors determining whether they are sufficiently identical may include whether they have the same user data sources with the same filters (have the same non-local users), have the same users (including local users), mount the same network file systems, have the same operating system and version, have the same patches installed, and/or have the same software packages installed.

A problem in automatic host equivalence group detection is that some companies use the same host key for multiple hosts even if they should not be in the same host equivalence group. (This practice is not recommended and causes significant security problems.) However, since it exists in practice, a solution is needed for coping with such environments without unduly creating host equivalence groups.

In an embodiment, one or more host keys may be configured as non-host-equivalence-group-forming. Such host keys are then ignored for this purpose.

In an embodiment, one or more hosts may be configured to be exempted from participating in host equivalence group detection based on their host name or IP address(es), possibly using ranges or subnets of IP addresses.

In an embodiment, host groups may be configured manually by listing host names or IP addresses, or a range or subnet of IP addresses, that are to be grouped to the same host equivalence group.

Figure 15:
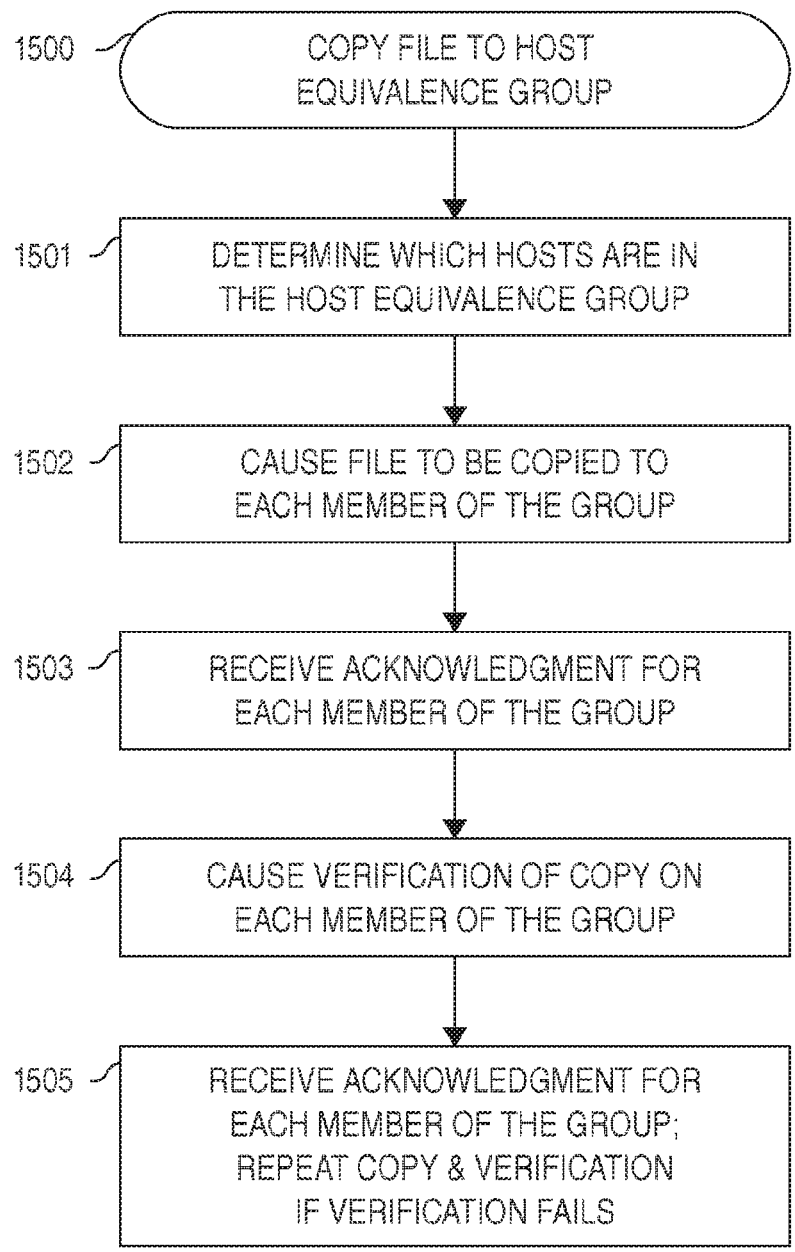
FIG. 15 illustrates copying a file to hosts in a host equivalence group. Modification of a file on hosts in a host equivalence group can be performed analogously.

FIG. 15 illustrates copying a file to hosts in a host equivalence group (1500) in an embodiment. Modification of a file on hosts in a host equivalence group can be performed analogously. It is determined which hosts are in the host equivalence group (1501), copying the file to each member of the group is caused (1502) (e.g., by creating a sub-request to copy it), acknowledgment is received for each member of the group (1503), optionally verification of copy on each member is caused (1504) (e.g., by creating sub-requests for verifying; verifying could mean comparing a cryptographic hash computed from the file), receiving acknowledgments that the verifications have completed, and completing the overall request to copy if verifications were successful, and re-copying and re-verifying at least those copies where verification failed (1505). The verification part could equivalently be integrated into the copying request, both being performed before signaling completion of the sub-request.

When we say a file is copied to a host, it may mean copying either to a system directory or to a location within a user's home directory. Other operations besides copying (e.g., removing, modifying a file, changing registry values, etc) can be implement in an analogous fashion to multiple hosts within a host equivalence group.

Figure 16:
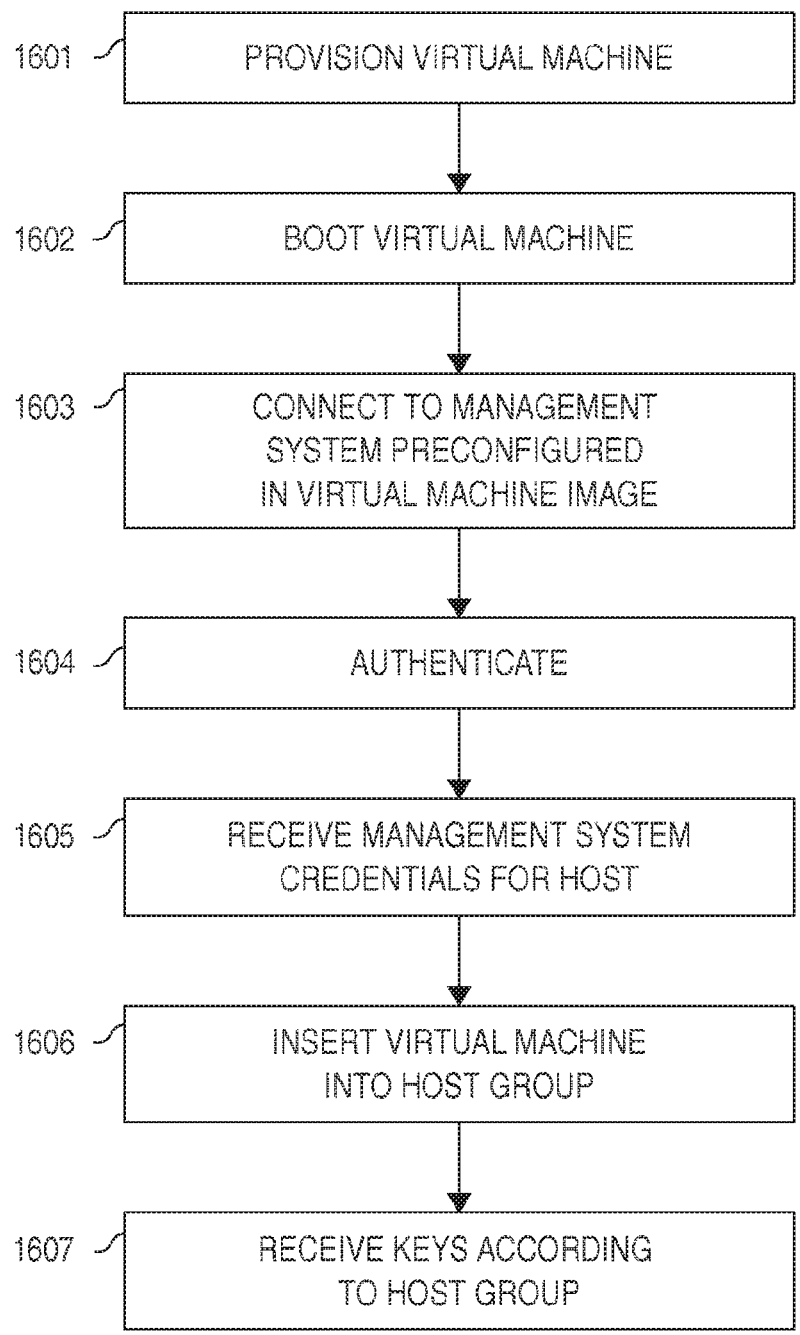
FIG. 16 illustrates provisioning a new virtual machine and enrolling it in a management system in an embodiment where management system information is preconfigured in the virtual machine image.

FIG. 16 illustrates provisioning a new virtual machine and enrolling it in a management system in an embodiment where management system information is preconfigured in the virtual machine image.

The virtual machine is provisioned (1601), the virtual machine is booted (1602), the virtual machine connects to the management system (1603) using configured management system address and authentication information (e.g., public key for the management system), and the virtual machine authenticates with the management system (1604) (e.g., verifying that the management system possesses the private key for the management system, and/or the management system verifies that the connecting virtual machine knows a shared secret, in this case the public key). The virtual machine receives credentials for itself from the management system (1605) (the credentials allowing it to authenticate itself to the management system and vice versa; the credentials may be, e.g., a shared secret or a public key for the management system and a private key for the virtual machine). The virtual machine is inserted into a host group on the management system, the group specified in the virtual machine image or based on installed software (1606), and the virtual machine receives keys from the management system (1607) based on its host group. The keys may include host keys for other hosts in the environment. They may also include public user keys that authorize certain accounts on other hosts to log into the virtual machine using public key authentication. They may also include private keys that authorize the new virtual machine to log into certain other hosts.

Provisioning a virtual machine means creating and starting a new virtual machine, as the word is normally used in the virtualization art. Any known virtualization environment may be used, including VMware, Xen, VirtualBox, and/or KVM.

Figure 17:
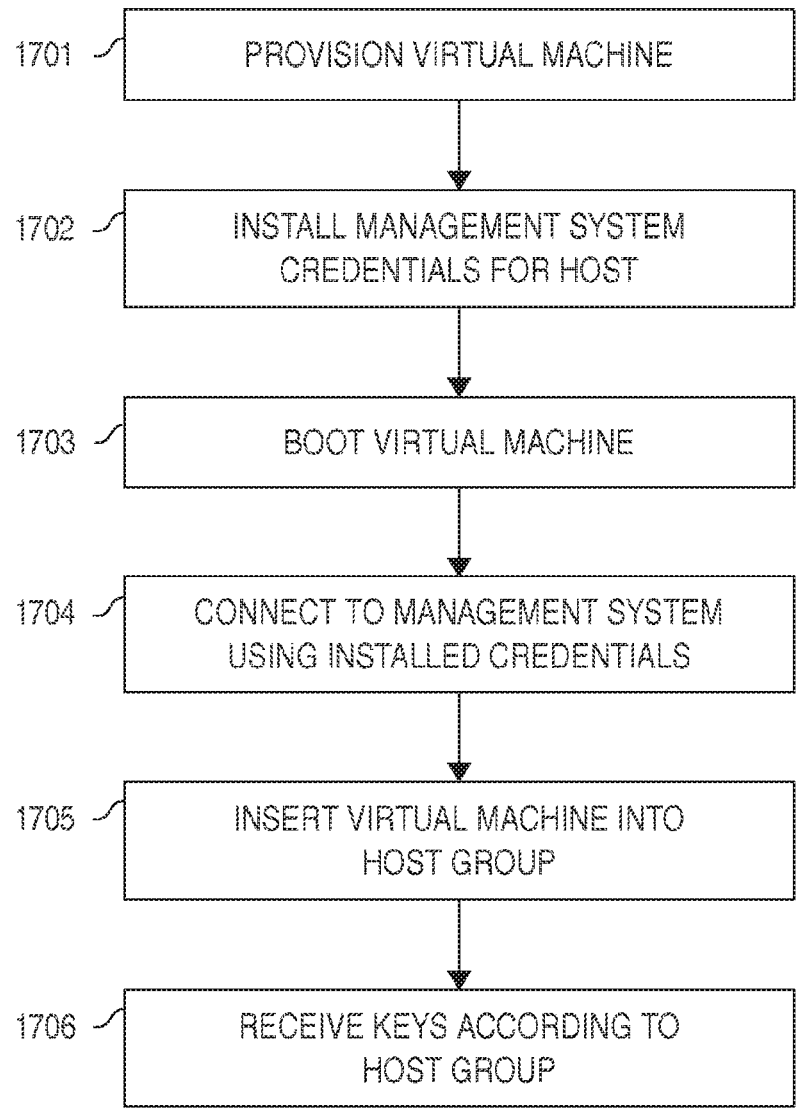
FIG. 17 illustrates provisioning a new virtual machine and enrolling it in a management system in an embodiment where management system is installed on the new virtual machine before booting it or during early stages of its boot/self-configuration process.

FIG. 17 illustrates provisioning a new virtual machine and enrolling it in a management system in an embodiment where management system credentials are installed on the new virtual machine before booting it or during the early stages of its boot/self-configuration process.

The virtual machine is provisioned (1701), management system credentials are installed on the host (1702) (e.g., they are obtained from the management system by the provisioning system, and inserted into the virtual machine image before booting it), the virtual machine is booted (1703), the virtual machine connects to the management system using the installed credentials (1704), the virtual machine is inserted into a host group (1705) (though this could also be performed, e.g., by the provisioning system), and the virtual machine receives keys based on its host group (1706).

In an embodiment, a host key, an identity key, or an authorized key is configured for a virtual machine before the virtual machine is booted.

In an embodiment, a trust relationship (or identity key or authorized key) is installed by a management system on a source host and a destination host that are each active when the trust relationship (or identity key or authorized key) is installed on it.

Figure 18:
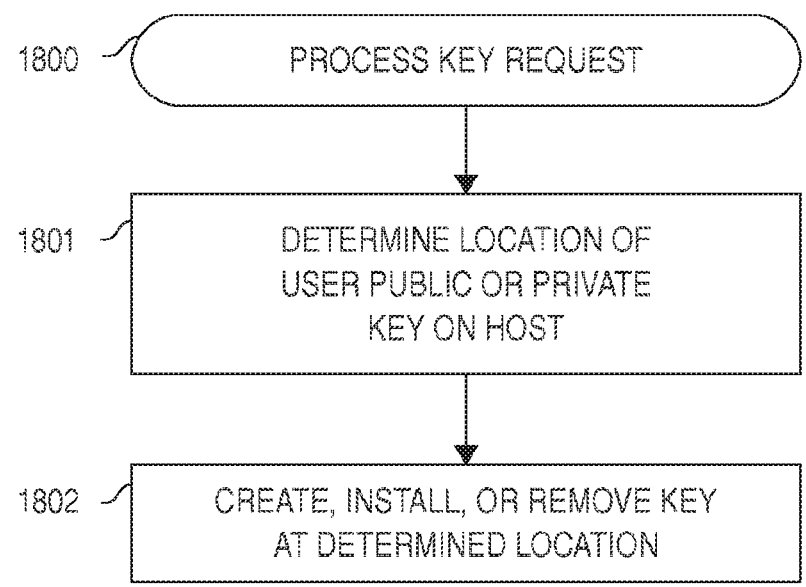
FIG. 18 illustrates processing a key request, taking into account that keys may be stored in non-standard locations as specified in configuration files.

FIG. 18 illustrates processing a key request (1800) in an embodiment, taking into account that keys may be stored in non-standard locations as specified in configuration files. A key request may be, e.g., a request to add or remove a public or private key for an account on a host. The location of the user's public or private keys (as the case may be) is determined (1801) (e.g., by reading and parsing an SSH configuration file on/from the host, reading the location from the management system's database where it has been stored previously, e.g., during key discovery, or reading host group specific settings from the management system's database) and the key is created, installed, or removed (as the case may be) at the determined location (1802).

A standard location here means the default location built into an SSH server or client. The standard location depends on the particular implementation of the SSH server or client installed on a host, and may also depend on the version. Some enterprises have also compiled custom SSH versions that may use unusual default locations for SSH keys. In an embodiment, the default location may be configured in the management system based on the SSH implementation vendor, implementation name (e.g., OpenSSH vs. Tectia SSH), version, operating system, host name, host name pattern (e.g., "*.eng.example.com"), IP address, IP address range, subnet, hash of the SSH client or server binary or some other related file, or any combination of these. The management system may use such configured information for determining the default location used by found SSH implementations.

In an embodiment, the default location is determined based on information read from a host, such as vendor and version number of the SSH server or SSH client, or a hash value of the binary.

Figure 19:
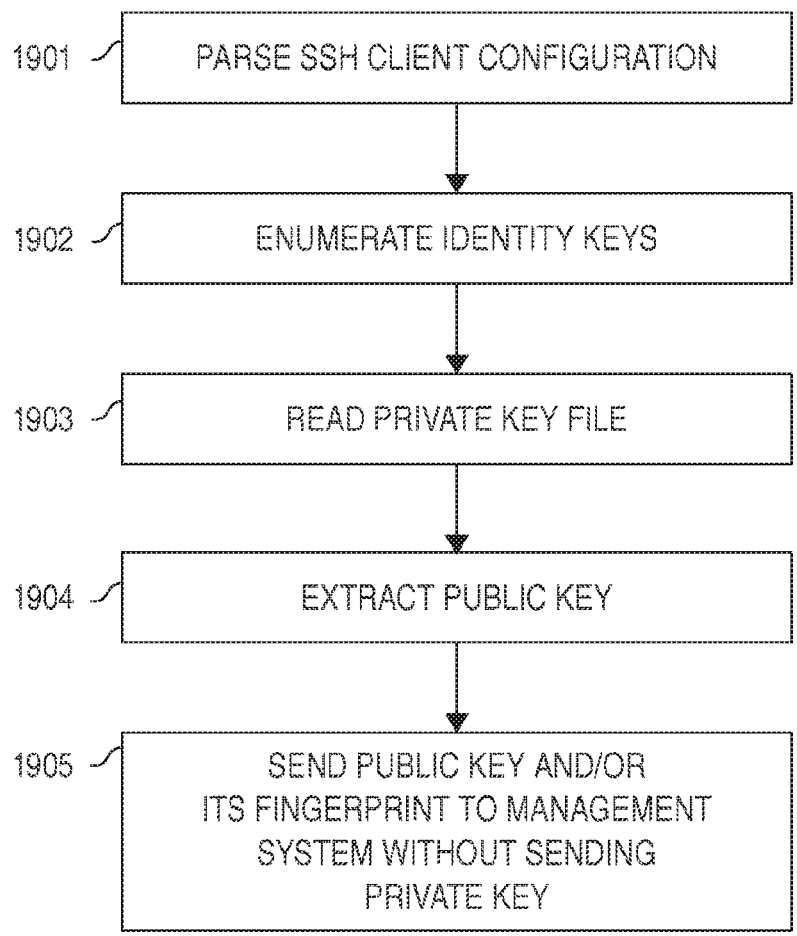
FIG. 19 illustrates processing on a managed host for obtaining the public keys or fingerprints corresponding to private keys used by a user for authentication.

FIG. 19 illustrates processing on a managed host for obtaining the public keys or fingerprints corresponding to private keys used by a user for authentication in an embodiment.

The user's SSH client configuration file (and the server-wide SSH configuration file) is parsed (1901), identity keys are enumerated (1902) (e.g., by extracting IdKey specifications from the configuration file, or enumerating private key files from a directory determined from the configuration file and default values), a private key file (possibly several) is read (1903), a public key is extracted for the private key (1904) (e.g., by reading the corresponding public key file or by computing the public key from the private key), and the public key and/or its fingerprint is sent to the management system without sending the private key (1905).

In (1904), the public key may be extracted (read) from the managed host (it is usually in a ".pub" file in the same directory as the private key in common Unix/Linux SSH implementations) or it may be derived computationally from the private key. Reading the private key file itself is optional if the corresponding public key file is read instead.

In an embodiment, the management system retrieves the SSH client configuration from the managed host, parses the configuration and determines the location of identity keys, and retrieves public keys corresponding to any configured identity keys from the managed host.

The processing may be performed by, e.g., an agent program running on a managed host, may be performed by the management system, may be caused by the management system to be performed on a managed host (perhaps one step or substep at a time), or any combination of these. A separate sending step (1905) is not needed if the public key is sent to the management system already in the earlier steps.

Figure 20:
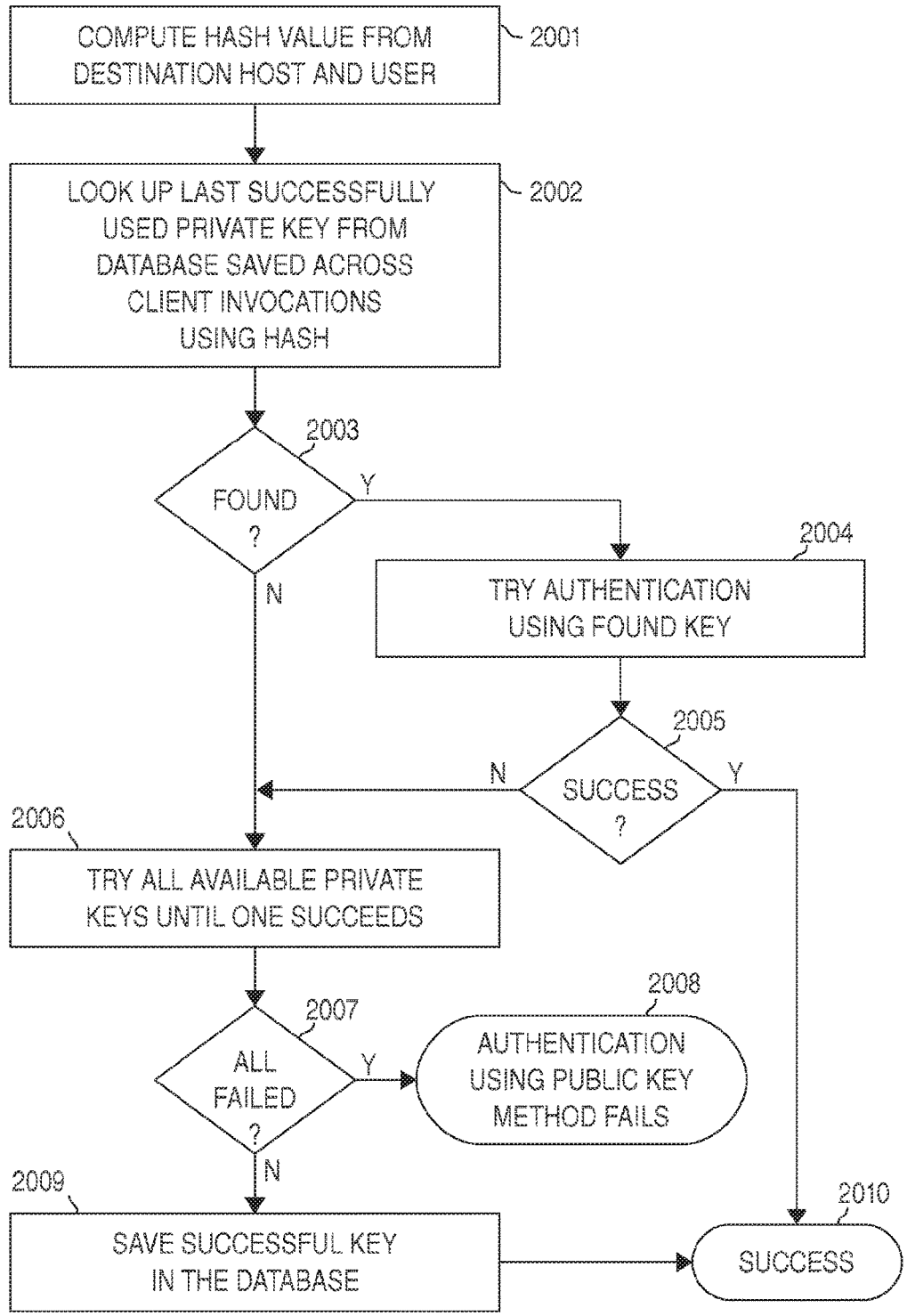
FIG. 20 illustrates speeding up logins in the presence of many private keys for authentication in an SSH client.

FIG. 20 illustrates speeding up logins in the presence of many private keys for authentication in an SSH client in an embodiment when authenticating to an SSH server.

A hash value is computed from a destination host and user (2001). The last successfully used private key is looked up from a database saved across client invocations using the hash (2002) (generally, using the hash here is optional, and with some databases the same could equivalently be achieved using the host and user directly as keys in a query). It is tested whether such key was found (2003), and if so, authentication to the server is attempted using the found key (2004). If successful (2005), authentication succeeds (2010). If no key was found or authentication failed, then all available private keys are tried until one succeeds or there are no more keys (2006), if they all failed (2007), authentication using public key fails (2008), and if one succeeds, the successful key is saved in the database (2009) and public key authentication succeeds (2010).

Figure 21:
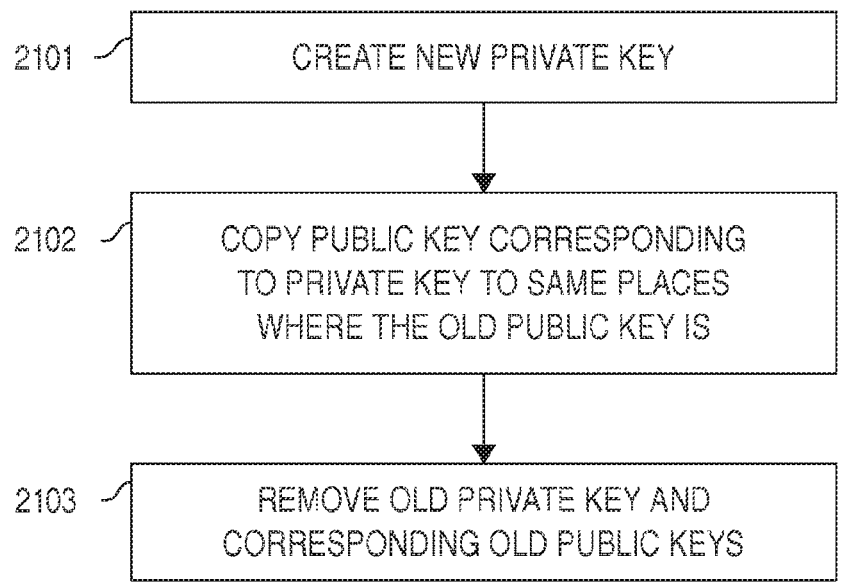
FIG. 21 illustrates renewing a key pair used for public key authentication.

FIG. 21 illustrates renewing a key pair used for public key authentication in an embodiment (renewing is also called rotating a key or recertifying a key in some contexts). First, a new private key is created (2101) (e.g., by causing ssh-keygen to be run on the host where the private key should be stored, and adding it as an identity key in an applicable configuration file, if needed), the public key corresponding to the private key is copied to the same places where the old public key from the key pair being renewed is stored (2102) (possibly being first copied to the management system, and then copied using sub-requests to the key renewal requests during the applicable maintenance windows), and finally the old private key and corresponding old public keys are removed (2103).

Generally, the same places where the old public key is stored means those hosts and accounts where the old public key is configured as an authorized keys (copies that are not configured as authorized keys and copies stored with private keys, corresponding to identity keys, are not taken into account).

It is possible to optimize the process by removing the old public keys as soon as the new public key has been installed on a host (possibly using the same request), but the old private key is advantageously not removed until the new public key has been installed on relevant hosts.

In an embodiment, the management system provides a reporting means for reporting which keys have not been renewed for a given amount of time. In an embodiment this is implemented by recording in a private key record the time when the key was last renewed (for keys that have never been renewed, the creation timestamp of the key file, a timestamp stored within the key file, if any, or the time when the key was first discovered may be used instead). The report may then be implemented by performing an SQL query using the desired cutoff date (e.g., three months back from the current date) as the last time to be shown.

In an embodiment, the management system provides a display screen showing a distribution of ages of identify keys (or corresponding authorized keys, or generally key pairs, certificates, or other credentials used for trust relationships, such as Kerberos PKINIT keys or cached tickets or host secrets), for example as a bar chart. In an embodiment, a bar chart displays key pairs over six months old in red, key pairs over three months old in yellow, and younger key pairs in green. Values for the chart may be obtained by SQL queries using a field recording when the key was last renewed and time intervals computed from the current date and desired renewal period(s) according to configured security policy.

Figure 22:
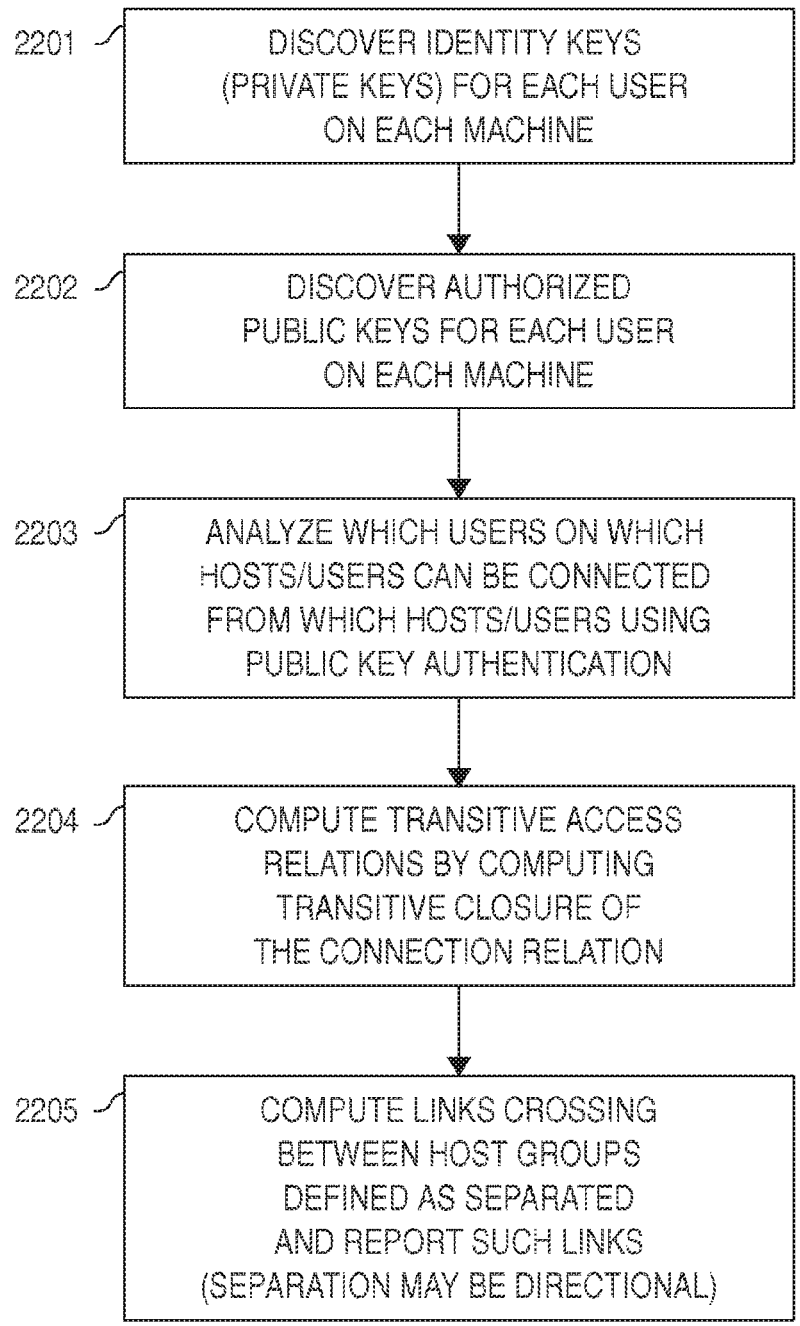
FIG. 22 illustrates discovering public and private keys from hosts and accounts in a managed environment and analyzing the keys to discover authorized connections between accounts.

FIG. 22 illustrates discovering public and private keys from hosts and accounts in a managed environment and analyzing the keys to discover authorized connections between accounts in an embodiment.

Identity keys are discovered for a plurality of users on a plurality of hosts (2201) and authorized keys are discovered for a plurality of users on a plurality of hosts (2202), it is analyzed which users on which hosts can connect to which users at which hosts using public key authentication (2203), transitive closure of the access relations is computed (2204) to determine what accounts can be reached from a particular account by following transitive access relations, and links crossing between host groups specified as separated are reported (2205) as such "red" or "suspicious" links (group separation may be directional, implying that links in one direction may be ok and links in another direction may not be ok).

In an embodiment, the keys are regularly reported by a management agent running on a managed host. In another embodiment, the management system regularly connects a managed host, causing it to report any changes in keys (or existing keys on the first connection). In yet another embodiment, the management system generates a request to extract the keys from a managed host (e.g., using a proxy agent to implement agentless management). In one embodiment, full information is regularly sent from a host to the management system, and the management system compares it with previously sent information to detect changes.

In an embodiment, the connections are analyzed as follows: iterate over all accounts on all hosts; for each, iterate over all private keys of the account; for each, iterate over all accounts on all hosts; for each, iterate over all public keys of the account; if the public key matches the private key, record a connection. Instead of the private keys, public keys or fingerprints derived from them may be used in the comparison. This can be optimized by iterating over private keys and using hash tables to find the matching public keys (instead of hash tables, e.g., database indexes may also be used).

In an embodiment, a discovery script is executed on a plurality of hosts using PowerBroker or other similar tool for executing scripts on multiple hosts. The discovery script discovers identity keys and authorized keys for each user on each of the hosts it executes on and provides the collected information to the management system or a separate tool for analysis (the compiled information advantageously comprising a host name, user name, the key (or its fingerprint(s) or corresponding public key), indication whether it is a public key or private key (if not otherwise clear), and optionally forced command and/or other restrictions for each found identity key and authorized key.

The management system or other analysis tool then computes which accounts can access which other accounts. The information may be imported into a management system's database.

Instead of one discovery script multiple discovery scripts may be used, and the analysis tool or management system may use information from a previous run to construct a script for the next phase.

The collected information may be transmitted from the hosts using various ways, such as writing it as the output of the script, e-mailing it to an e-mail address where the information is collected, or sending it via telnet, SSH or other suitable protocol to a collection point, or writing it to a file or directory in a networked file system.

In an embodiment, the management system determines whether an authorized key or an identity key is stored in an NFS file system (RFC 3560, Network File System (NFS) version 4 Protocol, Internet Engineering Task Force, April 2003) or other networked file system that may not provide adequate security. The determination may be made and stored per-user or separately for each key. Similar determination may also be made for SSH configuration files and other configuration files affecting login. The management system may also determine whether a user's account overall is secured against attacks on weaknesses of the file system (e.g., NFS file systems are generally vulnerable to active data modification attacks as well as to malicious file system mounts, and thus provide little security against data theft or unauthorized modification).

One way of determining whether a file is on an NFS file system is to use the "df" command on Unix/Linux and parse its output to determine which file systems are NFS file systems (identified by Filesystem column in hostname:mount_point format) and parse their mount points, and check for each key file (or other file of interest) whether its part begins with the prefix for the mount point (after removing " . . . " components from the path if necessary). Another mechanism is to parse the output of the "mount" command (lines with "type nfs"). Yet another mechanism is to parse the contents of /etc/mtab (similar to "mount" output). On Windows, the "net" command may be used to determine mounted file systems.

The management system advantageously provides a method of reporting which authorized keys and/or identity keys are on NFS volumes. Advantageously the management system provides a display screen showing an indicator of how many keys are stored on NFS volumes (as a number, or as a fraction of all keys, e.g., as a bar or pie graph).

In an embodiment, a tool comprising an SSH key discovery script is executed using PowerBroker and an analysis tool or management system is used for analyzing the output of the discovery script from multiple hosts and preparing a report or storing information in a database based on the analysis results.

Figure 23:
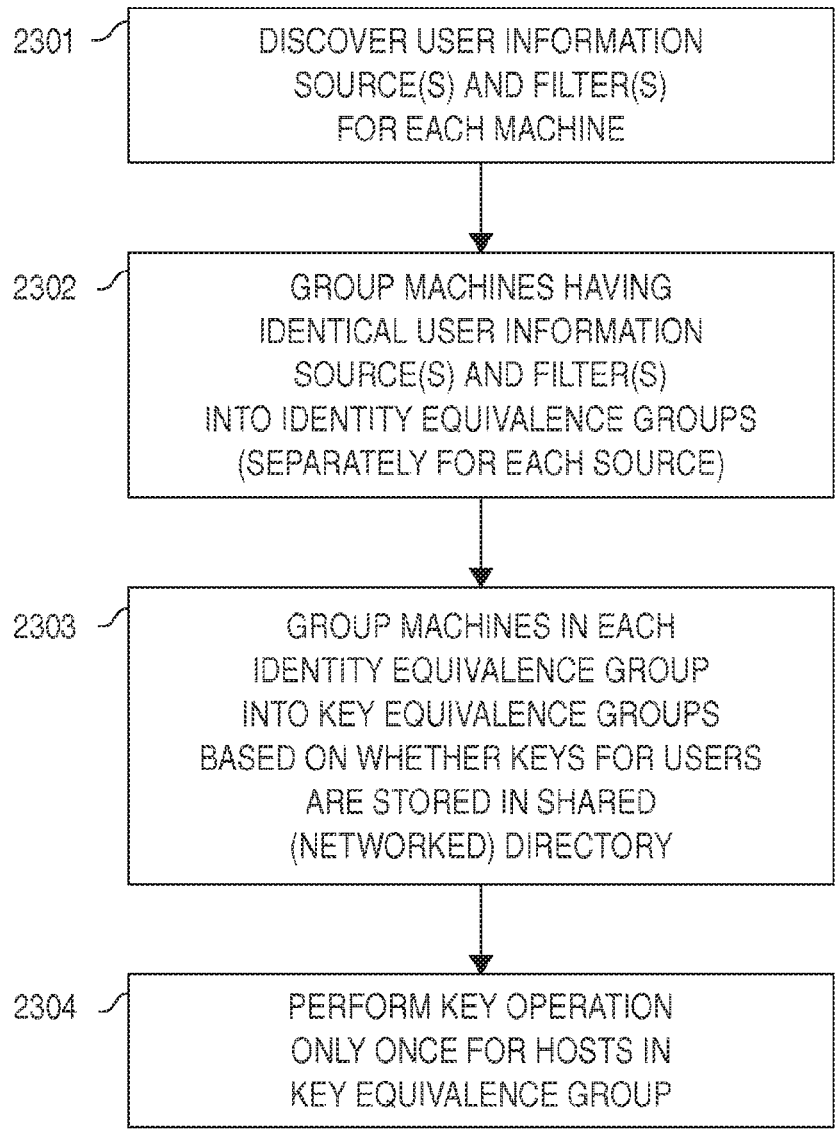
FIG. 23 illustrates grouping hosts into identity equivalence groups and/or key equivalence groups based on discovered information about user information sources.

FIG. 23 illustrates grouping hosts into identity equivalence groups and key equivalence groups based on discovered information about user information sources in an embodiment.

First, information about user information source(s) and filter(s) (e.g., LDAP or Active Directory configuration) is discovered for a plurality of computers using agent-based or agentless discovery (2301). Identity equivalence groups are then formed from computers having identical user information source(s) and filter(s) (2302). Computers in each identity equivalence group are then grouped into key equivalence groups based on whether keys for users in the source(s) (as filtered by the filter(s)) are stored in the same (networked, or shared) directory on each computer (2303). (The two grouping steps can equivalently be combined into a single step that applies both criteria simultaneously.)

In an embodiment, to be in the same key equivalence group the computers must have identical user information source(s) and filter(s), and users obtained from the user information source(s) according to the filter(s) must have the same (shared, or networked) home directory on both hosts or keys are otherwise stored in the same directory for them. The keys do not necessarily need to reside in a user's home directory, as SSH configuration can specify that they be stored in a system directory—in that case the relevant question would be whether that system directory is the same (e.g., networked, shared) directory on both hosts. Shared directories are also common in virtualization environments (especially paravirtualized environments where parts of the kernel are shared by multiple instances). The exact definition of when computers can be grouped into the same key equivalence group many vary in different embodiments.

When two computers are in the same key equivalence group, it is sufficient to install a key on just one of the computers and it will be automatically visible on the other computers in the key equivalence group. In (2304), a key operation (e.g., adding, removing, or renewing a public key or creating a private key) is performed on just one of the computers in a key equivalence group as opposed to performing the operation on each computer in the group. In an embodiment, the operation is performed on a computer that is not a member of the key equivalence group but has access to a directory on which the keys for computers in the group are stored (e.g., is the file server providing the directory, or a computer mounting the directory).

Key equivalence groups can be formed with respect to host keys (host key equivalence groups), user keys (user key equivalence groups), or both. Computers in a host key equivalence group need not necessarily have the same user information source(s) and filter(s), whereas computers in the same user key equivalence group usually do.

In an embodiment, only some user information sources are taken into account in the grouping. For example, LDAP or Active Directory sources may be taken into account while local user accounts (e.g., /etc/passwd file on Unix/Linux) are not taken into account in the grouping. In one such embodiment, a host can be in a key equivalence group with respect to a certain set of users (such as those coming from Active Directory) and not with respect to another set of users (e.g., those coming from a local file).

Figure 24:
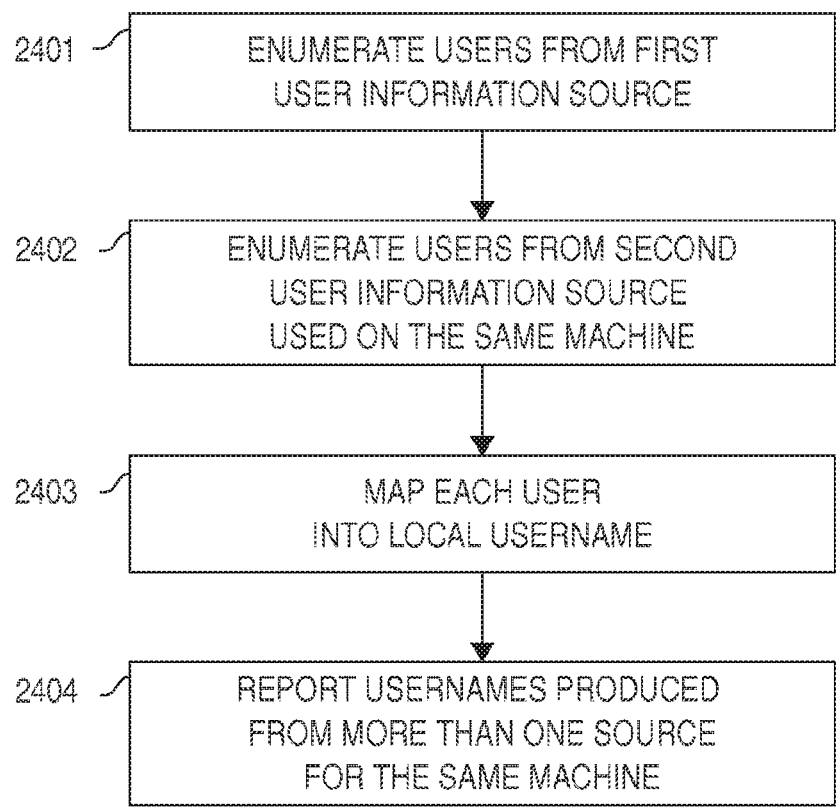
FIG. 24 illustrates detecting user accounts defined in more than one user information source.

FIG. 24 illustrates detecting user accounts defined in more than one user information source in an embodiment.

User accounts are enumerated from a first user information source (2401) and a second user information source (2402) (that are in an embodiment restricted to both be in use on the same host), each user is mapped into a local user name (or numerical user identifier, such as Unix/Linux "uid") (2403), and user names (or identifiers) that result from more than one source (for the same host in an embodiment) are reported (2404). Such reports can be useful for checking the consistency of user databases and ensuring that no user account is multiply defined so that processes for removing user accounts work reliably. It can detect both configuration errors and user errors, and is particularly important in situations like mergers and IT consolidation where IT infrastructures from more than one previously independently managed organization are taken under common management. Generally, detecting multiply defined accounts is useful when combining user information from multiple user information sources.

Figure 25:
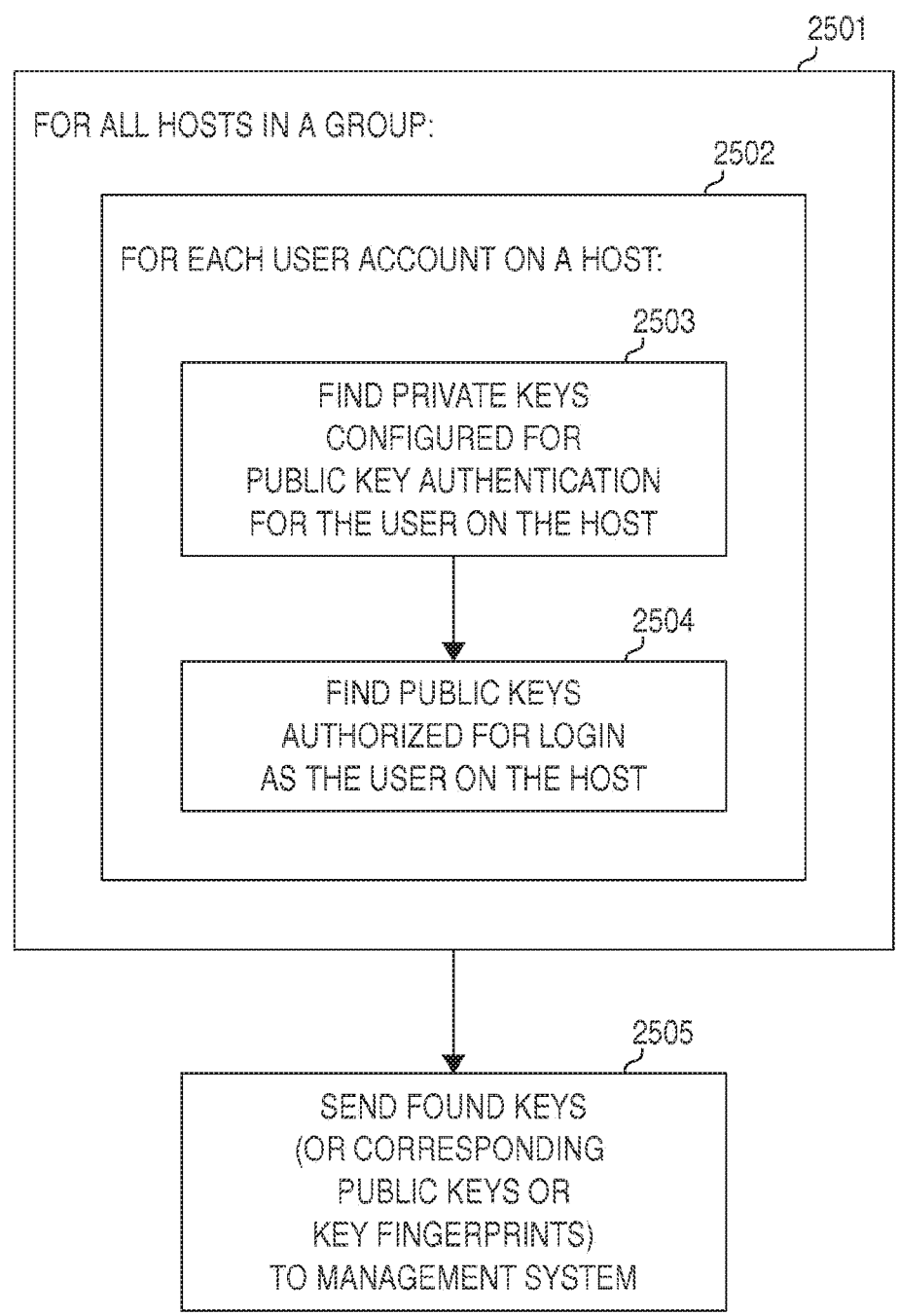
FIG. 25 illustrates the private and public key discovery process in a managed environment having a group of managed hosts.

FIG. 25 illustrates the private key and public key discovery process in a managed environment for a group of managed hosts in an embodiment. For each host in the group (2501) and for each user on each host (2502), find private keys configured for public key authentication for the user on the host (2503) and find public keys authorizing logins as the user on the host (2504). Then send the found keys (and in an embodiment, related additional information, such as a command configured to be executed when the key is used for logging in, or permitted source IP addresses for a connection using the key) are sent to a management system (2505). The sending may be performed separately for each user or information for multiple users may be sent any amount at a time. In an embodiment, an intermediate host collects information for more than one user or host, and then sends the collected information to the management system.

In an embodiment, the OpenSSH /etc/ssh/sshd_config configuration file is read on the host (using, e.g., the SSH protocol to access the host and the SFTP protocol or something equivalent to a Unix/Linux "cat" command to read files), the AuthorizedKeysFile configuration option is parsed from the file, and the file indicated by that option is then parsed to obtain authorized public keys, which are then sent to the management system. In an embodiment, $HOME/.ssh/authorized_keys is used as the default file name if the option is not present in the configuration file ($HOME means user's home directory).

In an embodiment, principal names (for X.509 or equivalent certificate-based authentication) are obtained in addition to or instead of authorized public keys. The OpenSSH /etc/ssh/sshd_config file is read on the server, and the AuthorizedPrincipalsFile configuration option is parsed from the file, and the file indicated by that option is then parsed to obtain a list of authorized principal names, which are then sent to the management system. In an embodiment, the TrustedUserCAKeys option is also parsed, and the corresponding certificates read and sent to the management system.

In an embodiment, substantially all information from configured authorization keys files for one or more users on one or more of the hosts in the group is sent to the management system. In one embodiment, the management system or a management agent running on a host parses the authorized keys file, and obtains keys, certificate authorities, authorized principal names and other information therefrom.

In an embodiment, the management system stores discovered configured certificate authorities in an SQL database, and provides a reporting facility for reporting which CA keys are authorized, the report being implemented using a query to the SQL database as is known in the art.

In an embodiment, the management system collects information about where CA certificates are stored (in which files in which user's directories or in which system-wide directories on which hosts). In an embodiment, the management system replaces one or more CA certificates on one or more managed hosts by one or more new CA certificates.

Certificates may be used with the SSH protocol (and some SSH client/server implementations) for both host keys and user keys. Since certificates are typically only valid for a certain amount of time, detecting expired certificates and renewing them regularly can advantageously also be performed by a management system.

In an embodiment, a management system manages SSH host certificates. The management system reads the SSH server configuration file to locate configured host certificates (by fetching the configuration file or using an agent). The location of the keys and/or certificates and/or the certificates themselves and/or information extracted from them (such as expiration date and cryptographic parameters) is stored in the management system. It may also locate and send chains of higher-level certificates that are needed with some certificate authorities. The management system provides a means for renewing host certificates. In an embodiment, the management system comprises a built-in CA that is used to automatically renew the certificates. In another embodiment, the management system generates a certificate signing request (CSR), sends it to a CA, and obtains a certificate from the CA. In an embodiment, the management system also generates a new private key for the host as needed.

In an embodiment, a management system reads SSH client configuration from an SSH client by reading the client configuration file and parsing it to locate certificate authority certificates (CA certificates) that the client trusts for host certificates. The management system sends the location of such certificates and/or the certificates themselves and/or information extracted from them (such as CA and expiration date) to the management system. In one embodiment, the management system regularly obtains new CA certificates from trusted certificate authorities and installs such new certificates on clients as trusted CA certificates. In an embodiment, the management system configures a certificate revocation list on a client. In an embodiment, the management system configures OCSP (Online Certificate Status Protocol) on the client. In an embodiment, the management system removes expired and/or revoked CA certificates from the trusted CA certificates on the client.

In an embodiment, a management system manages CA certificates that are trusted for user authentication. The management system reads the SSH server configuration files and/or certificate files to discover such certificates and may update configuration files and certificate files to manage such certificates (analogously to what was described for CA certificates for host keys on an SSH client).

In an embodiment, a management system manages private keys for certificates used for user authentication. The management system reads the SSH client configuration files, certificate files, and/or private key files to discover such certificates and private keys, stores information about them in the management system, and provides means for renewing such certificates in an automated or semi-automated fashion.

In an embodiment, public keys and private keys (authorized keys and identity keys) are discovered without using an agent software installed on managed hosts. Generally, any agentless communication mechanism described herein (including those based on connecting using SSH and those using PowerBroker or equivalent) can be used for connecting to the host. Sending the keys (or public keys or fingerprints or other identifying information derived from them) to the management system can be performed directly or through a collection point (such as a "golden host" used to run a script on multiple hosts) and may go through an intermediate processing step (e.g., format conversion) before entry into the management system.

In an embodiment, agentless communication is used to collect the key information and it is then analyzed by a management system that generates reports.

In an embodiment, discovery also collects information about other kinds of trust relationships, including those configured for host-based authentication according to the SSH protocol (typically .shosts, .rhosts, and/or /etc/hosts.equiv files), Kerberos-based trust relationships (typically /etc/krb5.conf and information about authorized principal names), or PKI-based authentication (including authorized CA certificates and authorized distinguished names).

In an embodiment, the management system determines that a Kerberos configuration and SSH version on a host provides automatic Kerberos-based access for all users who have authenticated against one or more Kerberos realms (how to configure SSH and Kerberos in this manner is well known in the art). Such configuration may affect all hosts that allow access based on authentication in the realm, or may be limited by additional constraints to apply only to one or more groups of hosts. In an embodiment, the management system treats such permitted access as a trust relationship between accounts (typically accounts associated with each Kerberos principal). It may optionally generate trust relationship entries for them in its database. It may also dynamically add such trust relationships into reports or displays of trust relationships (the set of hosts in the group where each principal may log in may change dynamically).

In an embodiment, discovery also determines what password vault solutions (e.g., Cyber-Ark PIM) are in use, reads the configuration of at least one password vault, searches the system for installed scripts (e.g., scripts run by the "init" or "cron" programs as well as any scripts identified as "forced commands" or otherwise as commands executed using automated trust relationships), and analyzes at least one script for calls to obtain a password from a password vault. Found calls are then used to determine password-based trust relationships. The management system may also analyze the scripts to find uses of hard-coded passwords. The management system optionally provides reporting of such trust relationships and the scripts where they are used for manual analysis and modification, or may automatically modify a script to use a different kind of trust relationship instead, e.g., by replacing an "ssh" invocation utilizing a hardcoded password by one that uses an identity key for access (and setting up the identity key and key-based or other trust relationship if a suitable one does not already exist).

In an embodiment, discovery also collects information about SSL certificates and other certificates supported by various applications and/or the operating system on the managed host. In an embodiment, information about certificates is collected without using locally installed agent software from at least a subset of managed hosts. In an embodiment, certificates are found by enumerating all installed applications on the host, and applying application-specific mechanisms for discovering certificates for the application (such as reading and parsing a web server application's configuration file to discover certificate locations).

Full certificates may be sent to the management system, or some information (such as principal and CA names and expiration dates) may be extracted from a certificate and sent to the management system. CA (Certificate Authority), RA (Registration authority) and/or intermediate CA certificates (or suitable information extracted from them) are advantageously also sent to the management system. Certificates may be encoded before sending to the management system (using, e.g., base64 encoding).

The management system may determine that a certificate (including possibly a CA certificate, RA certificate, or intermediate CA certificate) should be renewed, and the management system generates a new private key and send it to the managed host or suitable third party (or causes the managed host to generate a new private key), then generates a certificate request (either in the management system or by causing the managed host or a third party to generate it), then submits the certificate request to a CA or RA, and waits for a response from the CA or RA.

The submission may utilize HTTP to a web-based user interface, a certificate management protocol known in the art, such as CMP, or a proprietary mechanism. The certificate authority or registration authority may also be built into the management system (including, in part, possibly in a management agent component running on the managed host).

CMP is described in RFC 4210, Internet X.509 Public Key Infrastructure Certificate Management Protocol (CMP), Internet Engineering Task Force, September 2005.

Further information about implementing certificate management can be found, e.g., in U.S. Pat. No. 7,418,597 as well as U.S. provisional patent applications 60/586,429 and 60/495,864.

Waiting for a response may include polling the CA or RA periodically for the status and possible response to the certificate request. The CA or RA from which a new certificate is selected, including the information to go in the certificate request (including CA name), based on a combination of information from the original certificate and configured policy. Configured policy may specify mappings from old CAs to new CAs, and may specify algorithms and key sizes to be used when generating new private keys. Installing new certificates and private keys may include application-specific or configured steps, such as restarting the application or causing it to re-read certificates after new ones have been installed. New CA, RA, and intermediate CA certificates may be installed with the CA certificates.

In an embodiment, a management system manages certificates and/or shared secrets used for IPSec/IKE authentication in telecommunication networks (see RFC4306, Internet Key Exchange (IKEv2) Protocol, Internet Engineering Task Force, December 2005). In an embodiment, the management system generates a certificate request with a distinguished name identifying a network element in an LTE (Long Term Evolution) 4G network, and requests and installs a certificate for the network element, and optionally installs a trusted CA certificate (and optional intermediate CA certificates) for the network element.

Figure 26:
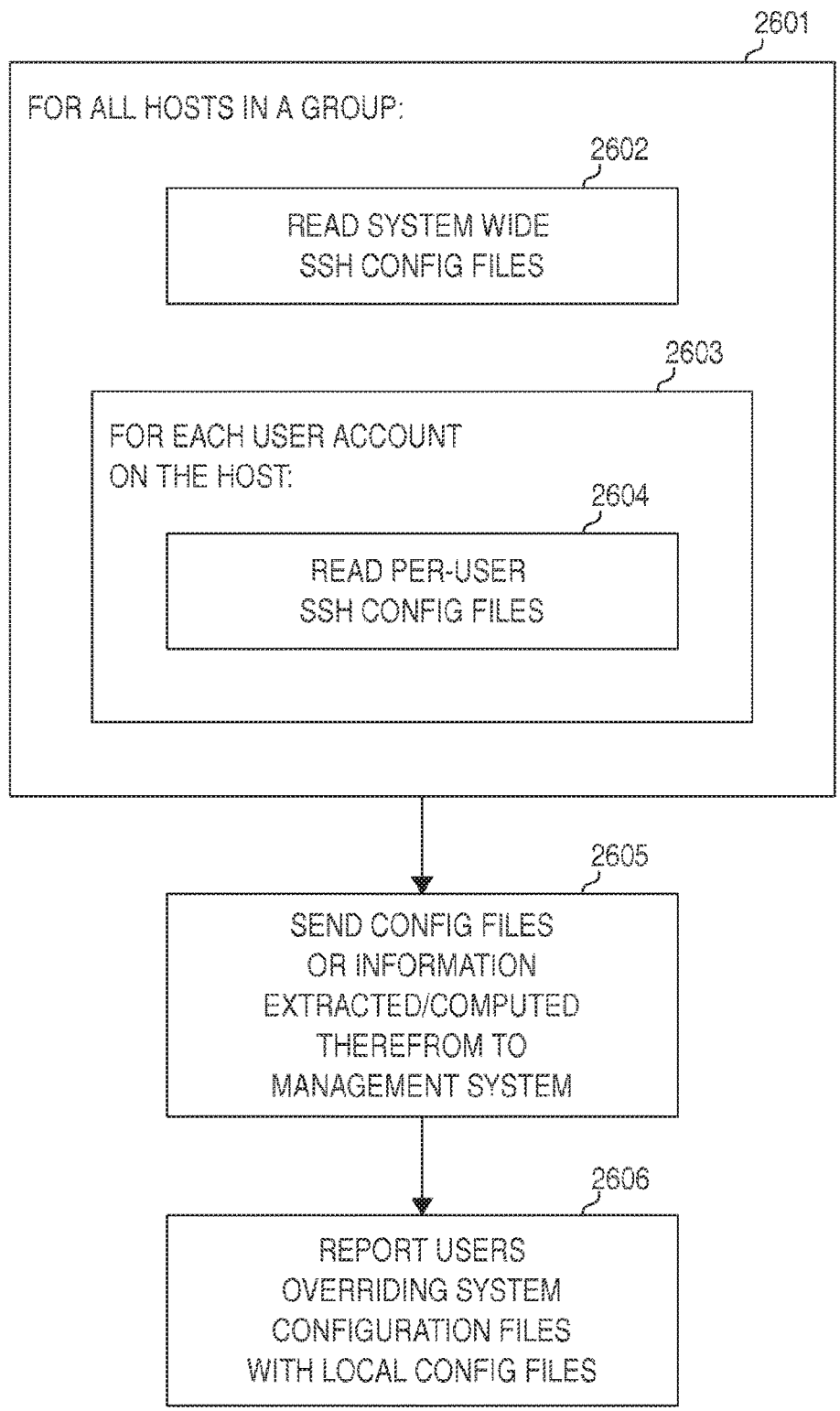
FIG. 26 illustrates discovering existing SSH configurations and reporting user-specific configuration files.

FIG. 26 illustrates discovering existing SSH configurations and reporting user-specific configuration files in an embodiment.

For some or all hosts in a group of hosts (2601), system wide configuration files are read (2602) (using, e.g., SSH to access the host and using the SFTP protocol or system commands to read files, such as /etc/ssh/sshd_config and /etc/ssh/ssh_config for OpenSSH), and for each user account on the host (2603), read per-user config files (2604) (such as .ssh/config in the user's home directory). The configuration files and/or information extracted or computed from them is then sent to a management system (2605) (this may happen separately for each user, or information may be aggregated for several users, possibly all users on a host, before sending, or a host may aggregate information from multiple users and then send the information to the management system).

In an embodiment, a management system provides a mechanism for reporting which users have per-user configuration files that override system configuration files (2606).

In an embodiment, the management system stores the information collected from hosts in an Oracle SQL database, with a field in each user record indicating whether the user has a configuration file that may override the system wide settings, and a report is generated by performing an SQL query against the database to find such users, and optionally further parsing their configuration file(s) and the system wide configuration file(s) to determine how the configurations differ.

Figure 27:
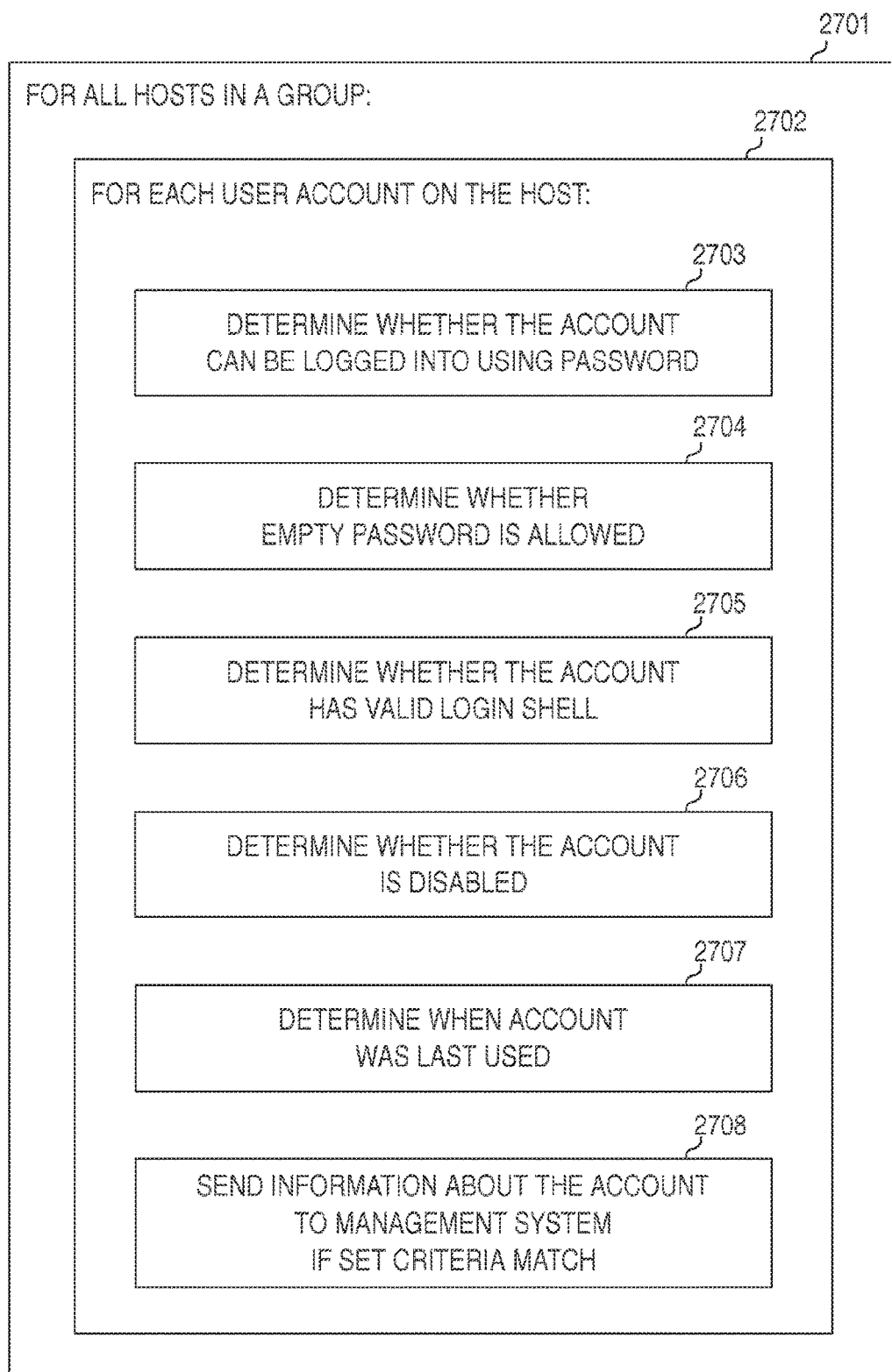
FIG. 27 illustrates discovering information about user accounts on a group of hosts in a managed environment.

FIG. 27 illustrates discovering information about user accounts on a group of hosts in a managed environment in an embodiment.

For all hosts in the group (2701), information about user accounts on the host is discovered, e.g., by enumerating user accounts on the host, e.g., by calling the getpwent function on Unix/Linux, or by querying them from LDAP, Active Directory or other user information source on the host, or on a management server and then sending the information to the host, optionally using a file or a database as an intermediate store.

For each user account on each host (2702), multiple pieces of information may be discovered.

It may be determined whether the account can be logged into using password (2703). On many Unix/Linux systems, for example, this is indicated by a special value in the password field; on other systems this may correspond to reading a field in a user record.

In an embodiment, some of the information is obtained from a user information source by a management system, such as user information for those users configured in a user information directory.

It may be determined whether an empty password is allowed for the account (2704). This can be tested, e.g., by checking whether the password field (in, e.g., a local password file, LDAP, or Active Directory) is empty or by trying to authenticate as the user using an empty password.

It may be determined whether the account has a valid login shell (2705). This can be checked by parsing the shell field in a password file (or directory record). On some systems this may correspond to checking a separate indicator of whether interactive logins or terminal sessions are permitted for the account.

It may be determined whether the account is disabled (2706). This may be tested using fields in a user record in a local file or directory (e.g., LDAP, Active Directory), such as the value (especially the first character) of a password field or value in a separate field indicating whether the account is enabled or disabled (or active or non-active in alternate terminology).

It may be determined when the account was last used (2707). On Windows, this is often recorded in the user record in Active Directory; on many Unix/Linux systems this is recorded in a special file, such as /var/log/lastlog.

Additionally, information about the account is sent to the management system, at least if set criteria match (2708). The information may be sent using any suitable data format known in the art (such as XML over a TCP/IP connection, possibly protected by a security layer such as SSL). Information may be sent in one message or multiple messages per user, or may be combined for multiple users for sending to a management system.

Naturally, any of the steps may be omitted or they may be reordered, or additional steps may be included (such as checking whether the user has a home directory on the host, whether such home directory is local or on a networked file system, and/or where such file system is mounted from). Sending information to a management system may be interleaved with the checks. Hosts and user accounts may be processed in any order, including several in parallel.

Figure 28:
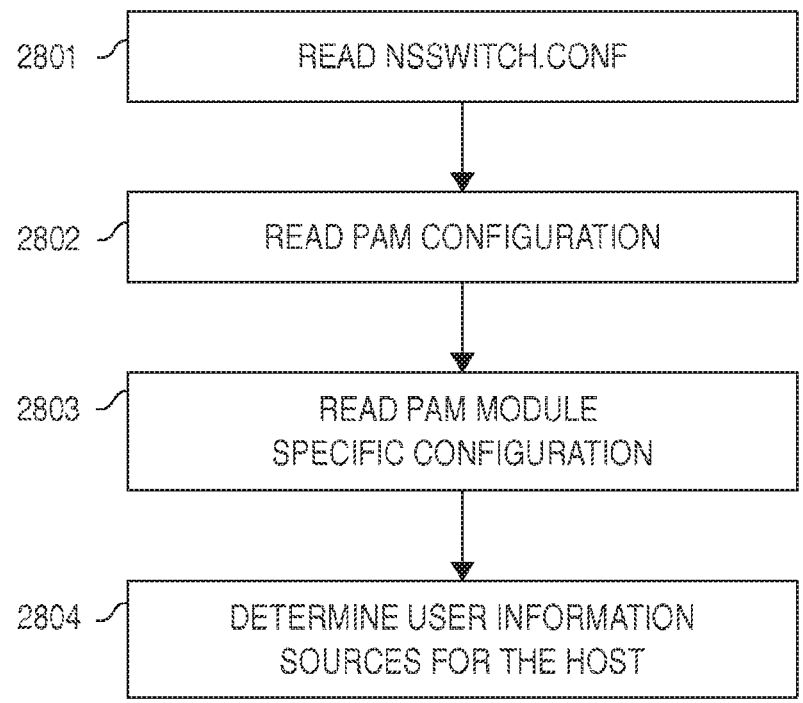
FIG. 28 illustrates extracting user information sources for a host.

FIG. 28 illustrates extracting user information sources for a host in an embodiment. The illustration is for a typical Unix/Linux system; the process for Windows can be found in Microsoft's developer documentation.

The file /etc/nsswitch.conf is read (2801) to discover what system modules will be used for providing user (and other) information. PAM (Pluggable Authentication Module) global configuration file, typically /etc/pam.conf, is read (2802) and parsed. Application-specific PAM module configurations are read from one or more files in /etc/pam.d (2803), especially the one for SSH, typically in /etc/pam.d/sshd.

The PAM configuration files may contain both recognized and unrecognized PAM modules. The management system may allow providing customer-specific plugin modules for handling otherwise unrecognized PAM modules. Some of the PAM modules specify sources of user information. For example, "pam_unix.so" typically specifies using a local password file, "panm_ldap.so" specifies using an LDAP directory for password information, and "pam_winbind.so" provides authentication against the local Active Directory domain.

Some PAM modules have module-specific configuration files. For example, pam_ldap.so typically reads /etc/ldap.conf, which defines LDAP directories that may be used (by host names or IP addresses and optionally TCP/IP port number), and various information about such directories, such as the subtree that contains valid users. The configuration file also specifies the type of record that defines users, and which fields of the record are used for obtaining the local login name and user identifier for the user.

Generally, it is determined what user information sources are used on the host (2804). This information may be a combination of information from nsswitch.conf, PAM configuration, and module-specific PAM configurations (possibly as interpreted by customer-specific plugins). Examples of information sources include "local password file" and "LDAP directory at a given address with certain client configuration parameters".

Some user information sources may also be hard-coded in applications, such as built-in Kerberos support in SSH. Presence of such user information sources may be determined from the application version and presence and contents of various configuration files on the host (such as Kerberos configuration files). Application-specific plugins may be used for discovering such information.

On Windows, the steps basically involve reading Active Directory related configuration information.

Typically the information about the determined sources would be sent to a management system, and would be extracted for a group of managed hosts (possibly all managed hosts in an embodiment). The information may also be used on the managed host. The exact steps vary among systems, and may be performed in a variety of orders.

Figure 29:
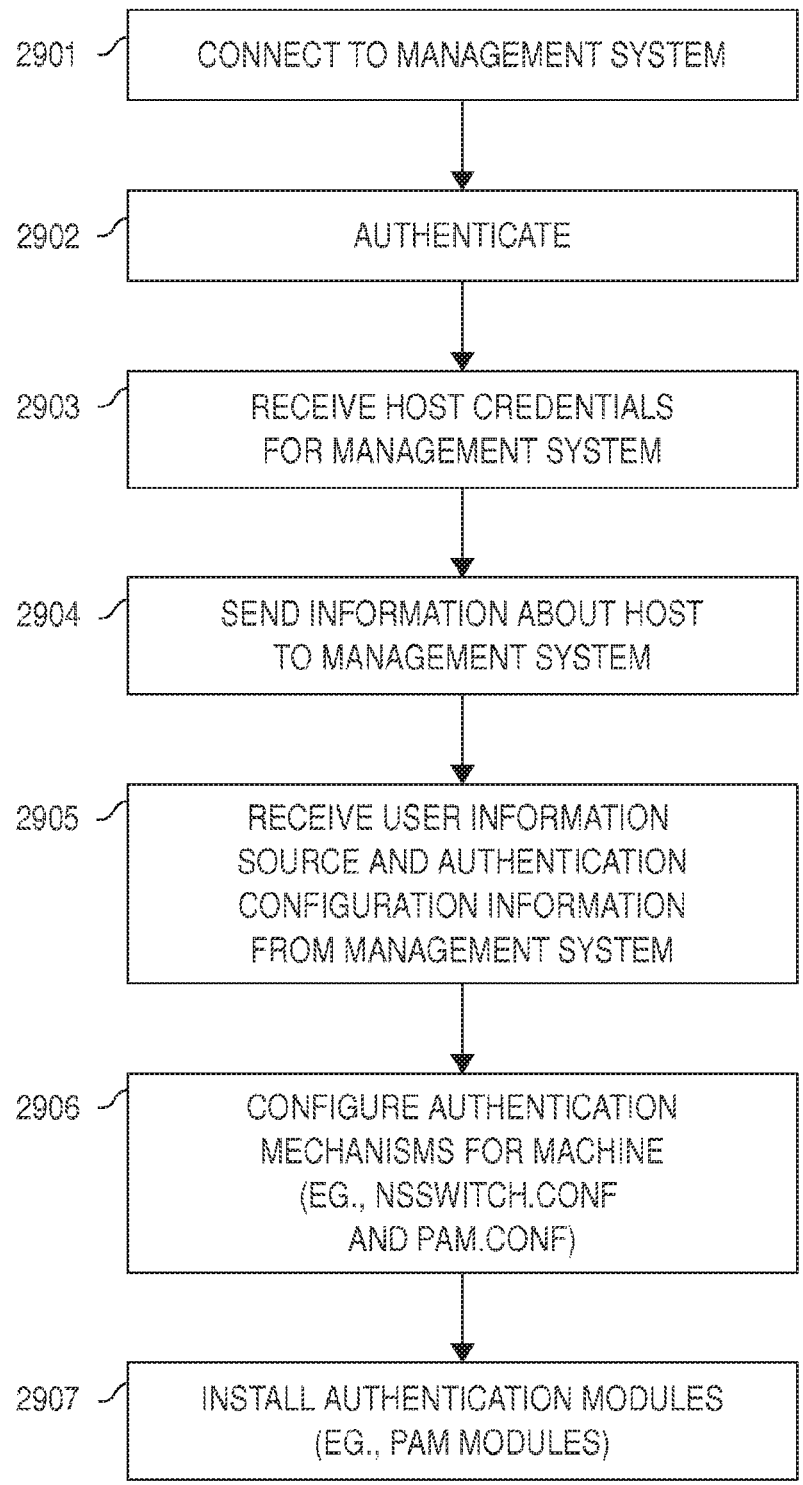
FIG. 29 illustrates configuring the authentication sources for a host using a management system.

FIG. 29 illustrates configuring the authentication sources for a host using a management system in an embodiment.

First, the host is connected with the management system (2901) (the connection may be initiated by the host or by the management system, depending on the embodiment and configuration; typically TCP/IP with some security protocol, such as SSL, SSH, or IPSEC would be used for the connection). The host is authenticated to the management system and/or the management system is authenticated to the host (2902) (either using host-specific credentials, or shared credentials that are used for initial installation of a host into the management system).

Credentials for authenticating the host to the management system in the future are received (2903) (they may be generated by either the host or the management system and relevant information sent to the other side, thus the sending could be in either direction; advantageously public key credentials are used, with only the host having the private key and only public key provided to the management system).

Information about the host is sent to the management system (2904), advantageously including information about the host's operating system, hardware, and installed software. The management system uses the information for generating configuration information for the host.

User information source information and other authentication configuration information is sent by the management system and received by the host (2905). Such information may be in the form of final configuration files that are installed in their appropriate locations, or may be in some generic format (e.g., XML) that is then converted to actual configuration files on the host.

Authentication mechanisms for the host are configured (2906) (including, e.g., /etc/nsswitch.conf, /etc/pam.d/*, and /etc/pam.conf files). Required additional PAM modules, if any, are installed (2907). For example, if the organization uses a particular hardware token for authentication, a PAM module for implementing authentication using the module could be automatically installed.

Naturally, some of the steps might be omitted; for example, if the host is already being managed by the management system, (2903-2904) might be omitted. If a connection with the management system already exists, (2901-2902) might be omitted.

Configuring authentication may also include generating and/or installing private keys, public keys, certificate requests, certificates (possibly including obtaining them from a CA), Kerberos credentials, Kerberos server names, discovering Kerberos or Active Directory servers, configuring VPN connections (including their authentication mechanisms), etc.

In an embodiment, the management system rather than the managed host initiates the connection in (2901), and manages the host agent less.

Figure 30:
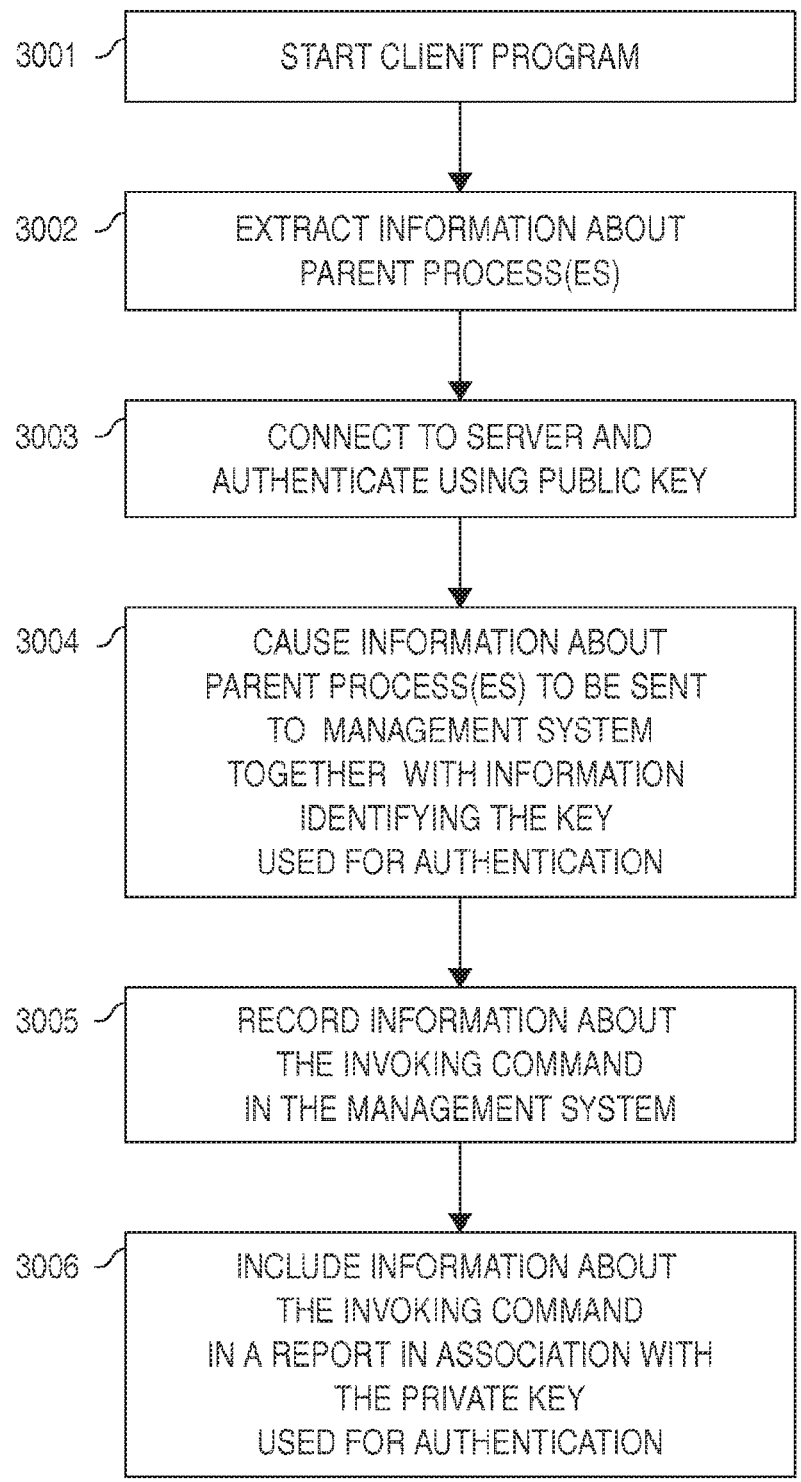
FIG. 30 illustrates extracting information about the invoking command or script in an SSH client for automatically annotating authorized connections with the commands that use them.

FIG. 30 illustrates extracting information about the invoking command or script in an SSH client for automatically annotating authorized connections with the commands that use them in an embodiment. A particular unexpected benefit is that when there are lots of existing undocumented public key login authorization in an organization's computing infrastructure, information about the invoking command reveals which script or application is using each authorization. This is extremely useful for analyzing and sorting the existing connections. Such information substantially reduces the cost of the deployment project when a customer starts to automatically manage user keys in their environment (potentially by millions of dollars in a large environment).

At (3001), an SSH client is started. Information about parent process(es) of the program is extracted (3002), e.g., by using the "ps" command or reading the /proc file system on Unix/Linux and the program/command name (and preferably also path and arguments for each such command is extracted; some commands may be filtered out using, e.g., configured known non-interesting command names or regular expressions), searching for parent processes of the SSH client, and returning command lines from the parent processes as candidate invoking commands. Known non-interesting commands can be filtered out. Such commands may be configured using a user interface or API.

At (3003), the SSH client connects to the SSH server and authenticates using public key authentication (though, password-based authentication can also be used in some embodiments, possibly using passwords stored on the client host). At (3004), information about the parent process(es) is caused to be sent to a management system, preferably together with information identifying the public key and/or user account on the server.

In an embodiment, the client spawns a background process that connects to the management system, authenticates, and sends the information to the management system, without slowing down the client. In another embodiment, the information is sent to a local management agent, which immediately or periodically sends such information to the management system (possibly aggregating information from multiple client instances). In yet another embodiment, the information is saved in a file, and a periodically running management agent sends the information to the management system when it starts the next time. In yet another embodiment, the information is saved in a file, and an agentless management system fetches the file when it connects to the management system the next time. In an embodiment, the information is logged in a system log.

In an embodiment, a shell (command interpreter) (such as a modified /bin/sh program or modified PowerBroker shell) records (e.g., in a system log) which script invoked the SSH application, and the log data is extracted and analyzed to determine who invoked the SSH client.

In an embodiment, an SSH client records (e.g., in a system log) which authentication method was used to authenticate a connection to a server, and the log data is analyzed to determine which key was used for the connection.

At (3005), the management system records the information it has received from one or more clients in the management system's database; for example, it might record for each public key which clients use the public key using which commands (e.g., which command or script invoked the client, causing the key to be used).

At (3006), information about the invoking command(s) is included in a report in association with identifying information about the private key used for authentication, or with the user account on the server. In an embodiment, this step would be performed when computing a report about the use of a public key or user account, and would be generated by performing one or more SQL queries against a relational database on the management system, extracting information about the key or user and the commands that use it (possibly using a join operation, as is well known to one skilled in formulating SQL queries for reports). Certain aspects might be highlighted in such a report, such as a key being used for more than one command, or a key being used for a "unrecognized" or "unauthorized" command. A report may be displayed in a window in a user interface, in an HTML page, output as a spreadsheet or text file, or formatted for printing or page-based viewing (e.g., as a PDF or Postscript file). In an embodiment, further information is collected in addition to parent processes, such as whether the command was run interactively (as determined, e.g., by using the isatty( ) function on the standard input file descriptor).

In an embodiment, identity keys stored on the host from which a connection came are analyzed and their last access timestamps used to determine (with reasonable probability) which key was used for the connection, and recording the likely key in the management system's database. Information from multiple connections may be combined to determine the unique key used for a connection with higher probability. The analysis may be triggered by the server receiving a connection, particularly one with key-based authentication, or by the management system (or some third party analysis module) receiving a log record indicating that a key was used for authenticating into the server. The log data may be obtained directly from the server host or from a centralized log data collection or analysis system (e.g., a SIEM (Security Information and Event Management) system). Information extracted from the log data may include, e.g., the command(s) executed using the key and/or the files transferred using the key, or a directory path prefix that always occurs in file transfers using the key.

Private key timestamps may also be used together with log data to form an initial analysis of which private keys were likely associated with which logins into servers. Such analysis determines the last access timestamp for one or more private keys, and finds one or more closely matching login records from servers using that key (e.g., based on its fingerprint) from any servers (using, e.g., log data obtained from a plurality of servers), and whenever a likely unique match is detected, associating that key with that login. The log data may also readily indicate the command that was used with the key.

Figure 31:
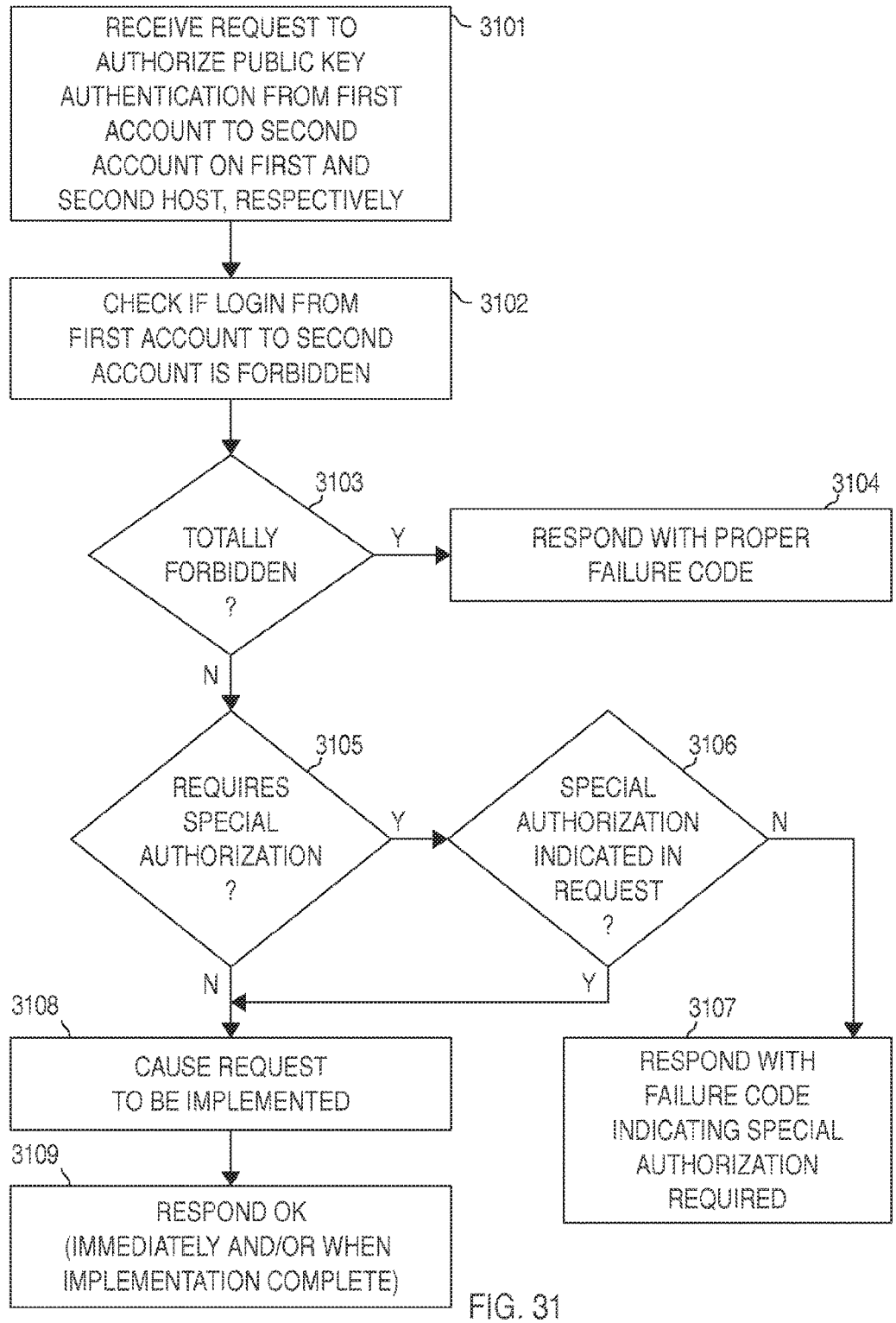
FIG. 31 illustrates checking a request to authorize a first account to log into a second account using public key authentication against rules prohibiting certain connections without special authorization.

FIG. 31 illustrates checking a request to authorize a first account to log into a second account using public key authentication against rules prohibiting certain connections without special authorization in an embodiment. A particular benefit of this embodiment is that it can be used to require special authorization against authorizing connections across "Chinese walls" within a bank, or from, e.g., development hosts to production hosts. Benefits include better protection against human errors (misconfiguration), additional protection layer against unscrupulous administrators trying to escalate their privileges, or developers turned criminal trying to gain access to production systems.

A request to authorize public key authentication from a first account on a first host (or a group of hosts) to a second account on a second host (or a group of hosts) is received (3101). A group of hosts, here and elsewhere in this specification, might contain multiple subgroups and/or individual hosts and might also be a set expression (using, e.g., union, intersection, and set difference operators) or a query or filter with filtering criteria for hosts.

Such a request might be entered on a command line by a system administrator, using a GUI or web interface by an administrator, or received from a separate change control system. Here it is assumed that when the request comes here, the "normal" approvals for a request to connect have already been received (e.g., approval from supervisor and/or approval from security team; the required approvals may depend on the first and second hosts).

It is checked whether some rule prohibits logins from the first account on the first host to the second account on the second host (3102). The management system may allow configuration of such prohibition rules, such as a rule saying that logins from the group of hosts representing development hosts to the group of hosts representing production hosts are absolutely prohibited, or are only permitted after a special review.

If the requested automated login connection is totally forbidden (3103), the management system responds to the request by denying it and sending or displaying an error response with the proper failure code (3104).

If the requested automated login connection requires special authorization and is otherwise forbidden (3105), it is checked whether the request indicates that the special authorization has already been provided (3106), and if not, a response is sent with a failure code that indicates that a special authorization is required (3107). In an embodiment, this causes the change management system to send the request for further authorizations to the appropriate persons (which may be indicated in the response and, e.g., configured in the forbidding rule). In an embodiment, the management system looks up approvals or special authorizations from a ticketing system using a ticketing API.

If the request does not require special authorization or the authorization has already been provided, the management system causes the requested automated login to be implemented (3108) (e.g., by setting up public key authentication from the first host to the second host, or by setting up another kind of trust relationship between the accounts, such as host-based, Kerberos-based, or PKI-based trust relationship).

Finally the management system responds with success (3109) (to the change management system or via a user interface). Such a response might be provided immediately or when the request has actually been implemented (if the request must be implemented during maintenance windows, its implementation could take days or weeks; a user interface may provide a way of viewing pending requests, their status, and/or estimates of when they can be implemented, and provide a way to implement them immediately, overriding normal maintenance windows).

In an embodiment, public key authentication to certain accounts is forbidden (for all hosts or for some group of hosts). For example, public key authentication as "root" might not be permitted, or might require special authorization. In some environments, root logins may be entirely disallowed.

Figure 32:
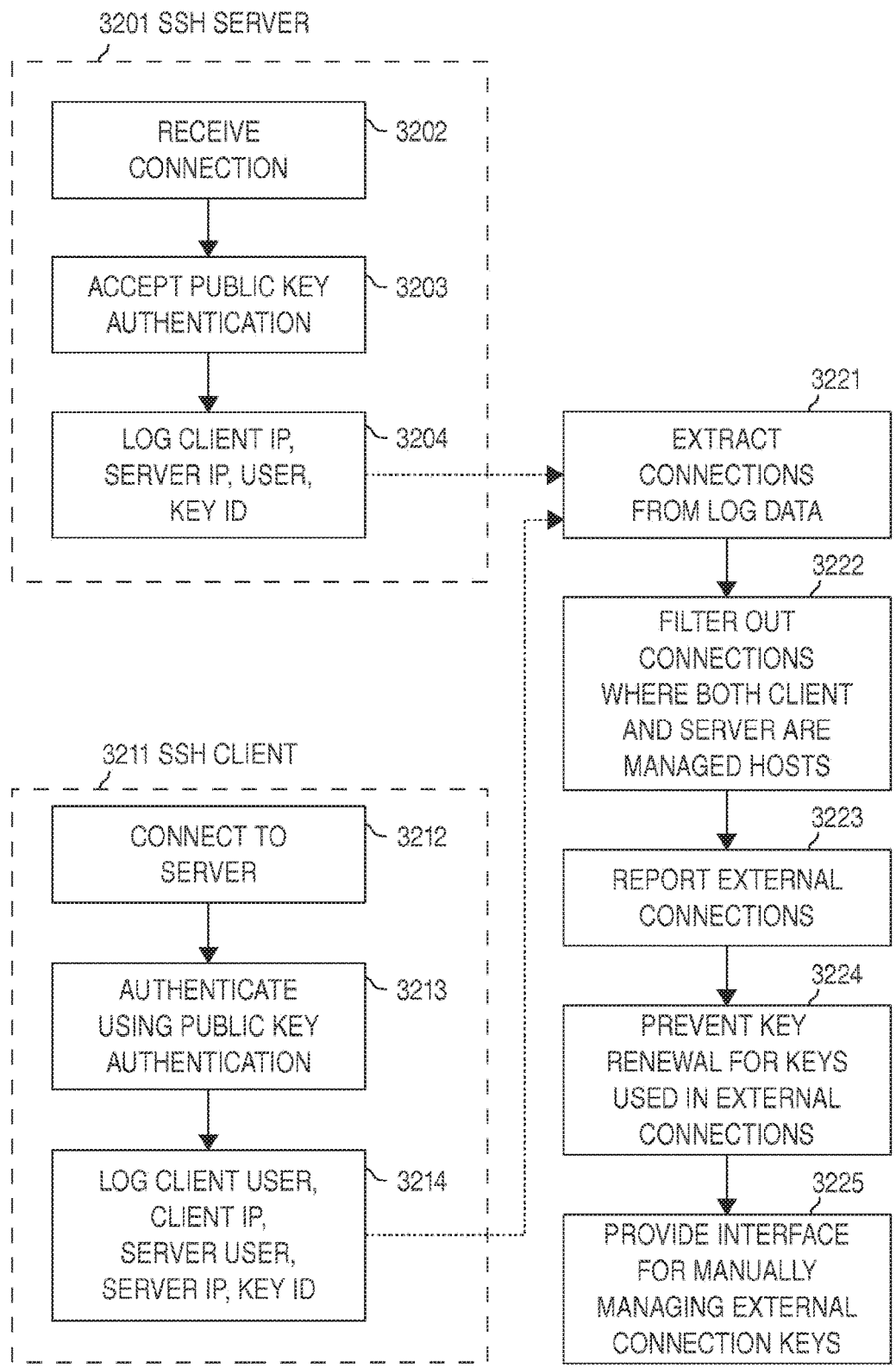
FIG. 32 illustrates detecting connections between the managed hosts and external hosts using information logged by SSH servers and clients.

FIG. 32 illustrates detecting connections between the managed hosts and external hosts using information logged by SSH servers and clients in an embodiment. This is a form of key activity monitoring. In this embodiment, an SSH server (3201) receives a connection (3202), accepts public key authentication for the connection (3203), and logs the connecting client's IP address, the server's IP address, the user name, and a key fingerprint for the key used for authentication (3204).

The logging may take place as one message or multiple messages, and may be interleaved with the other steps. In an embodiment, the information is logged using the syslog service on Unix/Linux. In an embodiment, the server's IP address is implicit in the address/host name that logs the information. In an embodiment, the logging is performed by OpenSSH 5.8 server to syslog.

An SSH client (3211) connects to a server (3212), authenticates a user to the server using public key authentication (3213), and logs the client's user name, IP address, server user name, server IP address, and key fingerprint (or other key identifier) (3214). Again, the logging may be interleaved with the other operations.

In both the client and the server, the information that is logged may vary. Log information may be collected to a central store, such as by using the syslog daemon and protocol on Unix/Linux to collect syslog information into a central repository. In an embodiment, the management system causes the syslog daemon on a group of hosts to be configured to send the information to a central repository and/or to the management system. The management system may configure syslog, e.g., by reading /etc/rsyslog.conf and files in the /etc/rsyslog.d directory, adding the centralized repository as a destination for log data for the desired services (particularly ssh and sshd), and writing back the modified file(s). Such a change may be implemented either agentless by the management system or using a management agent on the host to perform the configuration. On Windows, the Windows event log configuration may be changed correspondingly, as described in Microsoft Windows documentation.

In an embodiment, the management causes log records from syslog to be analyzed on one or more computers, and identifies from the log records which keys are used to log into a computer, and causes, e.g., recording of the date, identity of the key, the identity of the host being logged into, and information identifying the client host (e.g., IP address) in a file database. The management system may also cause SSH servers on one or more computers to be configured so as to cause them to save log data about keys that are used (typically by changing value of a logging level configuration option).

A management system is provided access to collected log data from SSH client and server, and it extracts information about public key authenticated connections from the collected log data (3221), e.g., by parsing the log data using regular expressions, as is known in the log analysis field, possibly combining multiple log records based on process identifier to establish a connection and using IP addresses, time, and public keys (key fingerprints or other identifiers in the log data) to associate the client and server side of a connection to identify which host connected to which server using which public key, preferably further identifying the user at each end (and in an embodiment, also the script application making the connection).

The management system then determines whether each end of the connection is a managed host (by performing a lookup from its database based on the corresponding IP address or host name), and filters out connections where both client and server are managed hosts in the management system (3222). Connections where one or both hosts is unmanaged are recorded in the management system's database or other suitable storage (multiple connections between the same hosts may be combined, and different embodiments may record different information about the connections). In an embodiment, connections where both hosts are unmanaged are not recorded. Connections where at least one endpoint is an unmanaged host are called external connections. In one embodiment, the public keys (or their fingerprints or other suitable identifiers) involved in external connections are stored in a database.

The management system generates a report about external connections (3223), including information about at least one external connection detected by steps (3221-3222). The report is generated, e.g., by querying the management system's database for external connections. In an embodiment, at least one unmanaged endpoint of such a connection is included in the report. Such a report may be used for identifying hosts that should be brought under management so that public keys used for such connections can be properly managed and renewed, allowing better compliance with security standards (such as current and future PCI or SOX standards) by the organization. In another embodiment, at least one public key (identified by fingerprint or other suitable identifier) used in an external connections is included in a report. Such a report is useful for identifying which keys should not be renewed (because renewing such a key could break existing external connections, possibly causing disruptions and downtime in the operation of the organization's IT systems). Not all embodiments necessarily include the report generation.

The management system prevents key renewal (3224) for public keys (or more precisely, the public-private key pair) for keys that are used in external connections. Key renewal means that a new private key is caused to be generated (on/for the client host) and configured as an identity key for the user(s) on the host(s) where the key is used by client(s), communicating the corresponding public key to user(s) on host(s) where the old public key is authorized for login, and then removing the old private key (or at least disabling it as an identity key) and preferably removing the corresponding old public keys. The whole renewal operation comprises multiple parts that may need to be performed during one or more maintenance windows. Advantageously the management system provides a facility for performing key renewals completely automatically in the background, without administrator intervention. However, the management system may also provide a means for performing key renewals immediately on request (this could be beneficial when, e.g., a key is known to be suspected as compromised, or when a user having had access to the key leaves the organization or changes to a different role in the organization). Advantageously the management system enforces key renewal at configured time intervals, such as once per year, limiting key lifetimes.

Renewing a public key that is used for external connections would break the external connection, because the key could be changed on only one side of the connection. Preventing the renewal may mean not renewing the said key at all, or may mean leaving the old key still as authorized on a management server where the client is unmanaged, or leaving the old private key as an alternative identity on the client if the client is managed and the server is unmanaged.

The management system may also provide an interface for manually managing external connection keys (3225). In an embodiment, key renewal is possible for keys used in external connections, but key installations and changes for such hosts must be performed manually by an administrator. An interface (e.g., GUI or web interface) provided to an administrator provides a way to download a public key for a host (when server unmanaged) or upload a key (when client unmanaged). In an embodiment, there is also a control for causing renewal to be manually initiated for a key used in an external connection. In the key renewal process these interfaces substitute the steps of automatically installing a public key as an authorized key on a host, and generating a private key on a host, making it an identity key, and providing the corresponding public key to the management system. In one embodiment, a control is provided for cancelling or postponing renewal for a key.

In an embodiment, the management system provides an interface for configuring IP address or domain name of another management system together with an authentication credential for the other management system (with means for supplying and/or obtaining such authentication credential), and associating a public key with such other management system (either by the host names/IP addresses used in external connections, possibly using subnets, or by manually specifying that an external connection is with a particular other management system).

When a renewal request is made, the management system will connect to the specified other management system, authenticate using the specified credential, request the other management system to perform the part of a key renewal that involves a host managed by it (public key installation as authorized key, or private key generation and installation as identity key, and key removals), and providing a response to the first management system when complete (such operations may need to be performed during maintenance windows on the other management system, thus potentially taking many days or weeks; thus the response may in some embodiments be provided by connecting back to the first management system later).

In an embodiment, the management systems automatically communicate to each other the hosts that they manage, and external connections between such co-operating management systems are automatically caused to be handled co-operatively as described above.

In an embodiment, a management system also provides an interface that permits an administrator to identify a key (e.g., by its fingerprint) and specify that the key is used for an external connection (optionally providing a description, IP address, or domain name that helps to identify where or how it is used). Such an interface may be beneficial for identifying external connections to/from routers or other black-box network devices that have not been brought under management and/or where external connections cannot be automatically detected.

In an embodiment, the access timestamps of private keys are used for correlating keys with log records gathered from servers, as described elsewhere herein. The correlation information is then used instead of information about client key usage extracted from logs by the management system.

Figure 33:
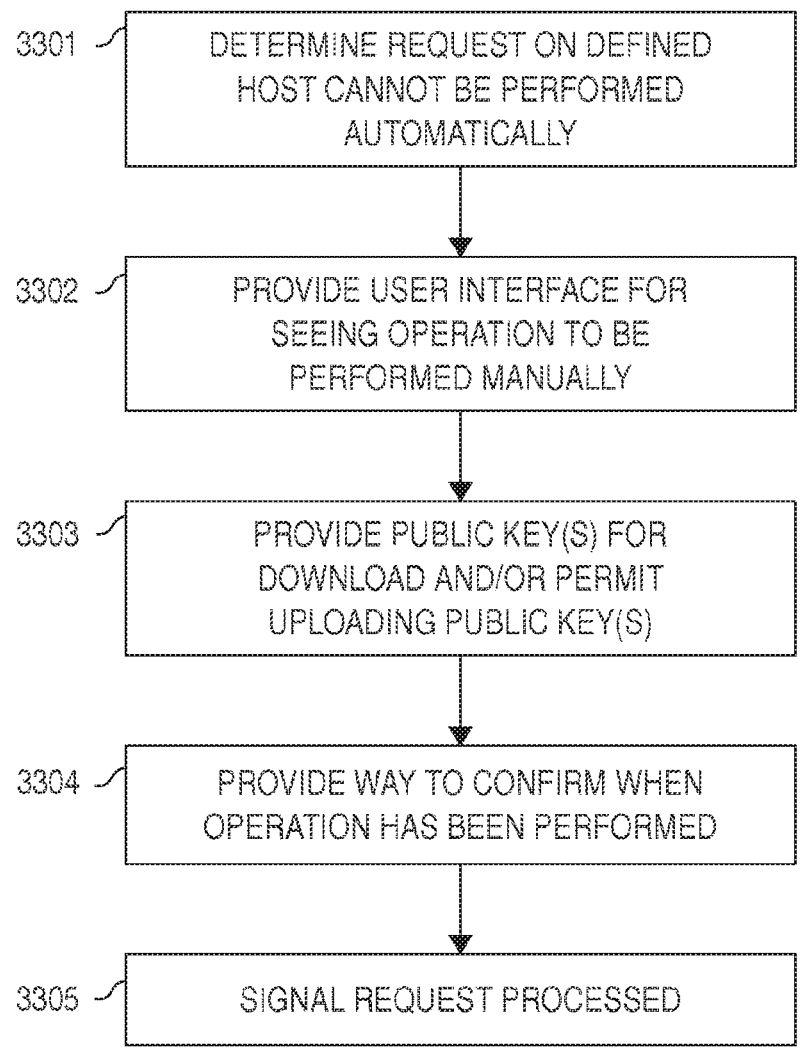
FIG. 33 illustrates performing the part of key management requests that touch external hosts manually.

FIG. 33 further illustrates performing the part of key management requests that touch external hosts manually in an embodiment.

At (3301) it is determined that a request involving a particular host cannot be performed automatically (e.g., because the host is not managed by the management system making the determination). An interface is provided for a system administrator to see the operation(s) that need to be performed manually (3302). The interface also provides means for seeing a description of what needs to be done for the operation and provides a means for downloading (new) public key(s) to be installed (and optionally made authorized keys or identity keys) on host (s) not managed by the management system and/or for uploading (new) public keys for host(s) not managed by the management system (3303). It may also specify that certain keys need to be removed. The interface also provides a means for confirming when the manual part of the operation has been performed (3304). In response to the user confirming the operation as performed, the management system signals the request as processed (3305), which may cause a higher-level request to continue executing.

In an embodiment, a management system installs an identity key for a source account on a source host in an automatic manner, without requiring user assistance for the installation. User assistance here means assistance from a human (e.g., system administrator).

In an embodiment, a management system installs an authorized key for a destination account on a destination host in an automatic manner, without requiring user assistance for the installation.

In an embodiment, a management system installs both an identity key and an authorized key for a trust relationship in an automatic manner, without requiring user assistance for the installation.

Installing a trust relationship or a key in an automatic manner may be in response to receiving a request to install the trust relationship or key from a user interface or, e.g., through a ticketing API from a ticketing system.

Figure 34:
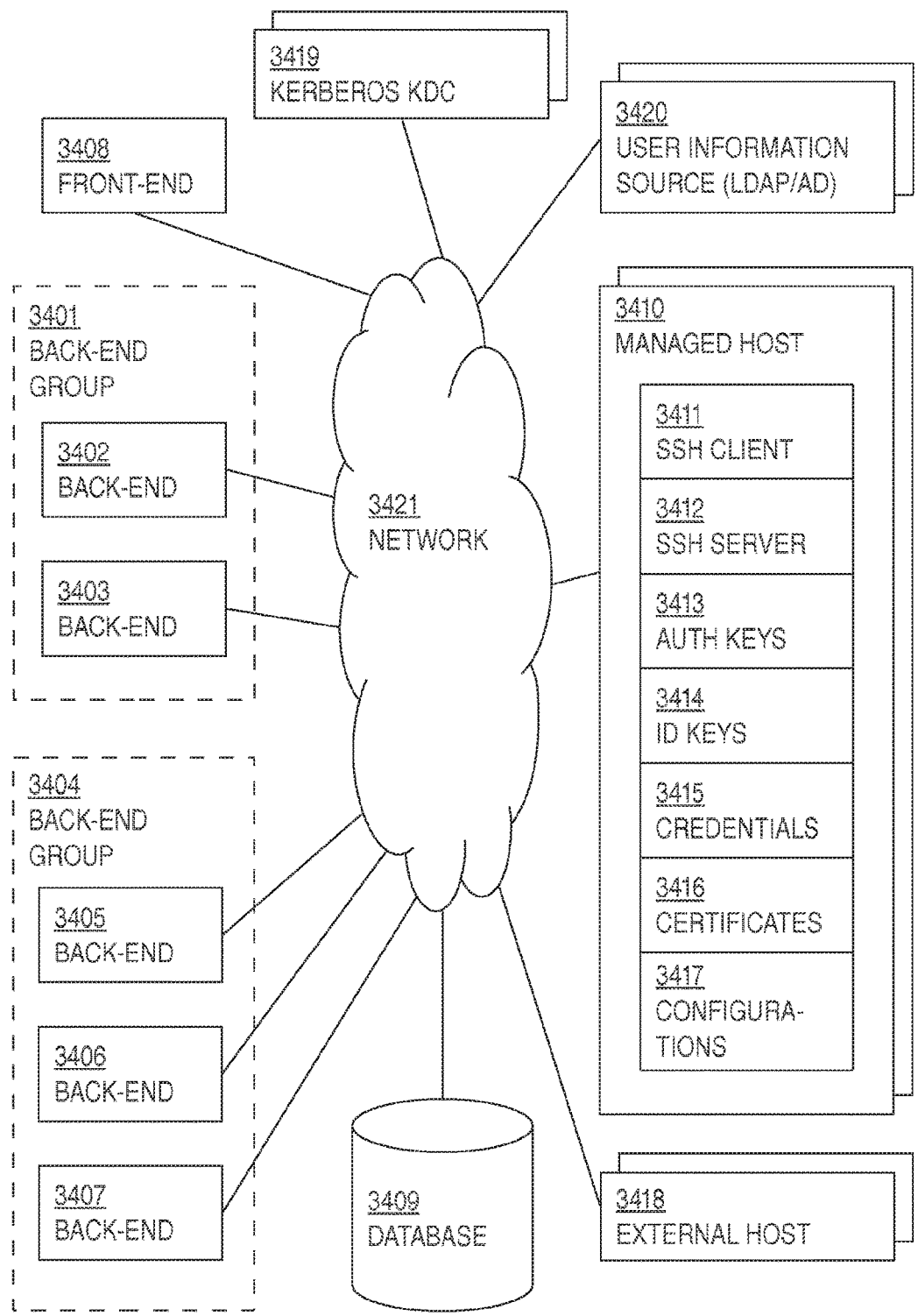
FIG. 34 illustrates an environment with a management system.

FIG. 34 illustrates a management system and a managed environment in an embodiment. A first back-end group (3401) comprises two back-ends (3402, 3403) that can execute jobs based on job records stored in the database (3409) and read/write information in the database. A second back-end group (3404) comprises three back-ends (3405, 3406, 3407). Advantageously, each host is assigned to a back-end group and is managed using back-ends in that back-end group (using agent-based or agentless management).

Basically, a back-end group is a set of back-ends that may interchangeably execute jobs (a back-end group may also have a name and other configuration data in the management system's database). Jobs may be, e.g., requests (or request records) to install private or public keys on hosts, deploying the management system on a host, scanning existing SSH keys on a host, generating a report, or computing statistics.

Back-ends in a back-end group may provide fault tolerance and load balancing for each other. Advantageously, the back-ends in a back-end group have the same access to managed hosts (from a firewalling/routing perspective), whereas back-ends in different back-end groups may have different access on the network level (for example, if the internal network where the management system is deployed is compartmented by internal firewalls, there might be a back-end group in each compartment).

In an embodiment, when a background job is created in a management system, a job record is created in a database. The job record describes what the job is to do, what state it is currently in (e.g., a progress indicator and/or checkpoint for restart), and contains other information about the job. The job record may also identify the back-end group on which the job should run (possibly "any group" for jobs that may run on any back-end, such as those for generating reports or performing other tasks that need not communicate with hosts). There may also be a pseudo-group "near database", which could mean any back-end group that has a fast reliable connection to the database used by the management system (it would make no sense to run database-intensive jobs on the other side of the world).

In an embodiment, each back-end searches the database for runnable jobs associated with that back-end's back-end group. A back-end finds a job record for such a job. The back-end then updates the job record to indicate that it is currently running the job. The back-end then performs the job, and finally updates the job record to indicate that it is done (whether successful or failed). It may also periodically update the job record while the job is running to indicate its status, progress, and possible errors.

In an embodiment, each job (represented by a job record in a database) contains a field indicating the time when the job can next be run. When a back-end starts running a job, it moves this time forward by a predefined amount of time (e.g., one hour). Jobs may be constrained not to run for more than this amount of time (though it is possible to suspend a job by saving its state, so that other jobs can run in between and the job can be continued later). If any job runs too long (e.g., more than 80% of the predefined maximum time), it is forcibly killed by a watchdog program on the back-end computer (the watchdog program may, e.g., read the process list once a minute and forcibly kill all job-execution processes that have run too long). This ensures it is very unlikely that a job could hang for more than the predefined time.

A job is effectively reserved for execution by a back-end by moving the time it can next be run forward by a predefined time; there need not be other indication that it is reserved. Moving the predefined time forward can be done reliably in a standard SQL database using serializable transactions and an "update" statement to update a suitable field in the job record.

In an embodiment, the job record contains a retry counter. If a job fails due to an error, at least for some errors the job will be rescheduled to run again later (by updating the field when it can next run). When a job has failed too many times (and for certain kinds of errors earlier), the job is deemed permanently failed, its status is reported as failed, and other jobs are signaled that it has terminated. A job may fail and need to be retried (e.g., restarted), e.g., if a database transaction aborts due to errors (many databases may spuriously abort transactions due to serialization conflicts or deadlocks), or because of random communication errors. This mechanism also helps to deal with hosts that are temporarily unavailable, e.g., because they are being serviced.

One or more front-ends (3408) implement a web-based user interface (using HTTP, protected using SSL/TLS using a certificate optionally managed by the management system), though other user interface technologies (such as a Windows GUI) and protection technologies could also be used and an API could also be provided. The database may be, e.g., an Oracle version 11g database cluster. The database is advantageously connected to most of the other components of the management system for storing their data. The other components may also communicate with each other through the database. Communicating via a database permits a time delay to occur in the communication, and is helpful for, e.g., delaying some operations until a suitable maintenance window is open.

Multiple management system components may be combined into a single software product or hardware appliance.

One or more managed hosts (3410) may be general-purpose computers (running a general-purpose operating system such as Windows 7 or Red Hat Linux), appliances with an embedded computer (e.g., copier, aircraft, LTE (Long Term Evolution, in 4G cellular or mobile networks) base station), or other hosts, whether physical devices or virtual hosts.

A managed host may or may not have an agent installed for communicating with the management system and for performing management operations (communicating with the management system advantageously takes place by communicating with a back-end or front-end that is a part of the overall management system) and may or may not have an SSH server (3412) or SSH client (3411) installed. The SSH protocol or any other suitable protocol may be used for communicating with a managed host (a suitable protocol providing security and authentication of the communicating parties commensurate with the needs of a particular embodiment).

A managed host may have one or more incoming trust relationships configured, typically represented by authorized keys (3413), but other kinds of trust relations, including Kerberos-based and PKI-based trust relationships, can also be used). Typically the trust relationships are associated with a particular user account (often a functional account) on the managed host, but especially in embedded devices such accounts may also be system-wide (referring to an implied "administrative login").

The managed host may also have one or more outgoing trust relationships configured, typically represented by identity keys (3414). Other kinds of credentials for outgoing trust relationships may also be used, and having a credential for an outgoing trust relationship is in general optional. For example, old ".rhosts" authentication does not use a client-side credential (it relies on the IP address and port number of the client) and in host-based authentication according to the SSH protocol (version 2), a host-wide credential may be used to "vouch for" the identity of the client-side user (by including a signature by the host key in the authentication request).

A host may also have Kerberos credentials (3415) for the host, one or more user accounts, and other Kerberos principals (similarly for Active Directory). The Kerberos credentials may be used for trust relationships or otherwise, such as for host identity or application-specific purposes.

A host may also have one or more certificates (3416) (e.g., X.509v3 certificates). One or more certificate may have an associated private key on the host.

Certificates may be stored in system directories or may be specific to particular users or applications in the environment and stored in user home directories or application directories. Certificates may belong, e.g., to end entities, registration authorities, or certificate authorities, and may be trusted or non-trusted. They may have been issued by one or more CAs, and some may be self-signed. They may use any suitable cryptographic algorithms such as RSA, DSA, ECDSA, MD5, SHA1, SHA2, etc. One or more private keys may be stored in a TPM (Trusted Platform Module) or HSM (Hardware Security Module). Some keys may actually not be stored on the host, and may be referenced by an identifier (the key itself might be stored in, e.g., a KMIP-compliant key management system).

A host typically also has one or more configuration files (3417) or other configuration objects stored in it. Examples include SSH configuration files (including SSH authorized keys files), PAM configuration files, PAM module specific configuration files, Kerberos configuration files, password and shadow password files, file system export and mount lists, application configuration files, SUDO configuration files, other system configuration files, etc.

An external host (3418) is a host that is not managed by the management system. In this specification the term is also frequently used to refer to a host that has a trust relationship between it and a managed host (such a trust relationship is also called an external connection). An external host may include data or components similar to a managed host. An external host may be managed by another management system.

One or more Kerberos KDCs (Key Distribution Centers) (3419) manage Kerberos tickets. The Kerberos protocol or any other suitable centralized authentication protocol may be used. Managed hosts, external hosts, back-ends and/or front-ends may include libraries and configuration files that enable them to communicate with a KDC. An Active Directory server can also act as a KDC.

One or more user information sources (3420) provide centralized repositories for user account information. Examples include, e.g., LDAP, Active Directory, and NIS. They may be used in a configuration where two or more user information sources share the same data, or different user information sources may use different data. Different hosts in the managed environment may use different user information sources, and some may use more than one user information source.

The network (3421) connects the various management system components. When more than one component is integrated into the same software or appliance, no network connection needs to be used between them, or the network connection may be internal to a computer. On the other hand, the network may be a global intranet spanning the entire United States and/or other countries and may comprise thousands of switches, routers, firewalls, wireless base stations, NAT devices, protocol translators, and other equipment. In some cases it may also be or comprise the Internet or VPN connections across the Internet or other telecommunications networks. The network may be considered to be part of the management system.

One or more objects may be embedded within a configuration file; e.g., in OpenSSH, authorized keys are often embedded in a configuration file called an authorized keys file that lists authorized keys and various restrictions for them.

FIGS. 35A, 35B, and 35C (together, FIG. 35) illustrate several components of a management system (3500) in an embodiment. It primarily views the management system from a architectural perspective. Each of the components may be implemented, e.g., in software, script, add-on module, digital logic, or as one or more computers on a network. Many of the components are optional.

A deployment tool (3501) deploys the management system on a host, converting it from an external host to a managed host. The deployment tool may be, e.g., a hardware appliance comprising software that connects to a host using the SSH protocol, logs in using a provided user name and credential, optionally configures the account so that the management system can continue to access it in the future, and optionally triggers key discovery for the host.

The deployment tool may also be a script that is executed on a host to bring a host under management, and may, e.g., create an account for the management system on the host, configure credentials so that the management system can in the future access the account, configure SUDO settings, and/or trigger key discovery for the host.

The deployment tool may also be a computer readable medium comprising instructions executable by a processor that, when executed, may cause a host to create an account for the management system, cause an agent program to execute on the host, connect to the management system, obtain credentials for authentication with the management system for later connections, cause the host to be placed into a host group in the management system, and/or trigger key discovery for the host.

A deployment tool is in part described in FIG. 36. It may be connected to a discovery tool for triggering key discovery. It may be connected to a trust relationship installer for enabling future access to a user account used for management on the managed host. It may also be connected to a database for storing information in it and for obtaining access credentials for a host under deployment from it. It may be connected to a job executor for scheduling retries for deployment, kicking off jobs for discovery, and other operations that may need to be clone on the host. It may be connected to the cloud instance manager for bringing newly provisioned hosts under management. It may be connected to the connector API for communicating with, e.g., routers and other devices that are not running a general-purpose operating system. It may be connected to the privileged access manager for performing the deployment using a non-privileged account. It may be also connected to various components that use log data, as the deployment tool may configure logging on the managed host to generate the needed log data. (There are also many other connections, especially indirect, not expressly mentioned.)

Connections may be indirect, e.g., through the database and/or the job executor.

A discovery tool (3502) discovers SSH keys and other useful information from a managed host. It may comprise, e.g., a software module that causes various operations to be performed on a managed host and/or the management system to discover and store in the management system information about trust relationships, keys, credentials, certificates, configurations, and other aspects of interest on a managed host.

A discovery tool may also be a computer that performs discovery on a host, such as a back-end host. A discovery tool may also be a software module that turns a managed host into a discovery tool (e.g., by installing agent software that performs discovery for the host and sends the relevant information to be stored in the management system's database).

A discovery tool is in part described in FIG. 37. It is advantageously connected to a deployment tool which triggers discovery on a host on which management has been newly deployed, as well as to a key installer, key remover, trust relationship installer, trust relationship remover, non-key trust relationship installer, non-key trust relationship remover, key rotator, report generator, audit tool and various other components for providing them information (typically through the database). It may also be also connected to a continuous monitoring tool, which may trigger new discovery for comparing the current state against a previously known state.

A key use monitor (3503) monitors managed hosts to determine when and how SSH keys (or other credentials or trust relationships) are used. In an embodiment, it analyzes log data from various sources and determines which keys have not been used for an amount of time, what commands are used with each authorized key, and from what IP addresses each key is used. This determination may made by analyzing syslog data generated by SSH servers and/or clients or by correlating access times of key files against events known from log files or otherwise.

A key use monitor may also determine which keys are orphaned. An orphaned authorized key is one for which no corresponding identity key has been found; an orphaned identity key is one for which no corresponding authorized key has been found.

A key use monitor is in part described in FIG. 38. It is advantageously connected to a discovery tool for obtaining information about installed trust relationships and key fingerprints and for obtaining log data, and to an unused key remover for providing information about keys that have not been used recently.

An unused key remover (3504) removes authorized keys that have been determined to be unused or orphaned. It may provide a user interface or reporting facility for a user to list such keys (possibly sorted by host or application that they relate to), and may provide a user interface to control for selecting which keys should actually be removed. It removes the selected keys from hosts where they appear (or changes configurations so that they will no longer be accepted as authorized keys). It may also remove unused or orphaned identity keys. In an embodiment, it may also remove unused Kerberos credentials, unused certificates, or unused symmetric keys.

A key protector (3505) protects authorized keys by moving them to a location where they cannot be modified by users other than root or an account used by a key management system. The general goal is to prevent normal users from adding new authorized keys for themselves. It may also move identity keys away from vulnerable locations, such as NFS file systems.

In an embodiment, a management system (or a helper script) moves or copies private keys (e.g., identity keys) and/or public keys (e.g., authorized keys) from user's home directories to a directory that cannot be modified by normal users. SSH configuration files are changed correspondingly (e.g., by a management system, manually, or by using a helper script) to reflect the new location of the key files. Old copies of the keys may be removed from the original locations. Furthermore, the management system updates the locations of the keys in its database to reflect the new location, without reporting that keys in the old location have disappeared and new keys in the new location have appeared.

In an embodiment, a tool moves authorized keys to a protected location (a root-owned directory or other directory or file that ordinary users cannot write (in particular, where a user cannot write its own authorized keys), such as a directory owned by an account used by a management system for managing SSH keys).

The tool performs, or causes a host to perform, the steps of:
  determining what user accounts exist on the host (or possibly a subset of them for which keys should be moved to protected locations);
  copying or moving authorized keys from the determined user accounts to a protected location (possibly a separate location for each user), preferably such that at least if two users have different sets of authorized keys, they continue to have different sets of authorized keys after the copy or move; and
  changing at least one SSH server configuration file to cause at least one SSH server to use authorized keys from the protected location.

The tool may be a script, program (computer program products), or an apparatus comprising a processor and a memory comprising computer program code for performing the above steps. It may also be divided to multiple tools that perform one or more of the above steps at a time (some of the steps may also be divided to multiple substeps). Some, but not all of the steps may also be performed manually or by using scripts or tools outside the tool for moving authorized keys.

In an embodiment, a tool detects unused keys and comprises a means for determining which authorized keys have not been used for an amount of time and reporting such keys. Advantageously, the tool also comprises a means for removing keys which have not been used for an amount of time.

A key installer (3506) installs an authorized key on a managed host. Its operation is illustrated in, e.g., FIGS. 3, 4, 5, 6, and 7. It is advantageously connected to a discovery tool for obtaining information about the environment and installed trust relationships, to a command restriction enforcer for configuring forced commands for installed keys, and a ticketing system via a ticketing API for automating installation of new approved trust relationships. A key installer may be a part of a trust relationship installer.

A key remover (3507) removes an authorized key from a managed host. Its operation is illustrated in, e.g., FIGS. 2, 3, 4, 5, 6, and 8. It is advantageously connected to an unused key remover for removing unused keys and to a ticketing system via a ticketing API for automating key removals. A key remover may be a part of a trust relationship remover.

A trust relationship installer (3508) installs a trust relationship between managed hosts. It may install key-based trust relationships, Kerberos-based trust relationships, PKI-based trust relationships, or other kinds of trust relationships. Its operation is illustrated in, e.g., FIGS. 3, 4, 5, 6, 7, and 9. It is advantageously connected to a ticketing system via a ticketing API for automating installation of new trust relationships A trust relationship remover (3509) removes a trust relationship between managed hosts. Its operation is illustrated in, e.g., FIGS. 2, 3, 4, 5, 6, 8, and 9. It is advantageously connected to a ticketing system via a ticketing API for automating installation of a new trust relationship.

A non-key trust relationship installer (3510) installs a trust relationship that is not based on SSH user keys. It may, e.g., configure host-based authentication on the destination host from the source account by editing the ".shosts" file on the destination account, and arrange for the destination host to be able to verify the source host's host key (e.g., by copying the host key to the destination host as a known host or causing a trusted host certificate to be used for the source host). Kerberos-based, PKI-based and other trust relationships may also be configured. In an embodiment, such trust relationships may also be stored in a central repository and adding them may comprise storing information about the trust relationship in the repository.

A non-key trust relationship remover (3511) removes a trust relationship that is not based on SSH user keys. It may, e.g., remove a line corresponding to the trust relationship from a ".shosts" file on the destination account. Kerberos-based, PKI-based and other trust relationships may also be removed by editing their respective configuration files on the destination host, the source host, or both. In an embodiment, such trust relationship removal may comprise updating or removing information in a repository.

An external key detector (3512) detects keys that are used from outside the managed environment. Its operation is illustrated in, e.g., FIGS. 32 and 38.

A key rotator (3513) rotates existing key pairs (identity keys, authorized keys). Its operation is illustrated in, e.g., FIGS. 2, 3, 4, 5, 6, 7, 8, 21. It is advantageously connected to a key installer for adding new keys and the key remover for removing old keys, to a command restriction enforcer for retaining command restrictions for keys, to an IP address restriction enforcer for retaining IP address restrictions for keys, and to a passphrase adder for adding passphrases for existing keys.

In an embodiment, a computer program product (possibly embedded in hardware) rotates one or more SSH user keys, performing the steps of:
  determining which identity keys to rotate;
  for each identity key to rotate:
    causing a new private key to be generated;
    adding a public key corresponding to the new private key in each authorized key file where the identity key (or the corresponding public key) was authorized; and
    removing the old identity key (or the corresponding public key) from the authorized keys files.

In an embodiment, a tool determines that one or more keys are used with hosts outside the managed environment (managed environment here meaning the managed hosts).

A trust relationship converter (3514) converts existing trust relationships to a different kind (e.g., public key based trust relationships to Kerberos-based trust relationships). Its operation is illustrated, e.g., in FIG. 48.

A command extractor (3515) determines which commands are actually used with each key. When a command has already been configured for a key, it may be extracted from, e.g., an authorized keys file together with authorized keys as part of discovery. It is also possible to analyze log data to determine the commands actually used with each authorized key.

The management system may also provide a means for determining what command is actually used with each key based on log data collected at servers and obtained by the management system (possibly through a SIEM solution, management agent, or agentless reading of log files), and automatically configuring the command actually used with each key as a "forced command" for those keys, at least for one key that has had only one command used with it during a period of time. In one embodiment, the management system determines the command actually used based on log data, and causes the authorized_keys file(s) on the server host(s) to be modified so that an authorized key listed in the file has the "command=" option configured, with the value specifying the command that was automatically determined from log files.

The command extractor identifies log records identifying key fingerprints used for login and log records identifying commands executed in the same session (the process identifier together with the server identity indicate they belong to the same session).

A command restriction enforcer (3516) adds command restrictions to existing trust relationships. The command restrictions may be determined automatically using a command extractor, or may be manually provided or configured to the management system.

In an embodiment, the management system configures a "forced command" (using, e.g., the "command=" option for an authorized key in OpenSSH 5.8) on a host. The permitted command might be specifiable, e.g., for each authorized connection separately to restrict what can be done on the host. The management system optionally provides a means for defining user-readable names for groups of permitted operations (such as "Backups only", "File transfers to directory" (with a directory path name as argument), or "Run application" (with a path to an executable program as an argument)). When a forced command is specified in a configured connection or rule, or in a request to set up an authorized connection using public key authentication, the management system ensures that the forced command is included in all entries in authorized keys files added for that connection, using the proper syntax for an SSH server on each host to include the forced command.

In an embodiment, the management system includes options in the authorized keys files for a plurality of connections to/from functional accounts to prevent authentication agent forwarding (OpenSSH no-agent-forwarding option), port forwarding (OpenSSH no-port-forwarding option), allocation of pseudo-tty (OpenSSH no-pty option), execution of "rc" files (OpenSSH no-user-rc option), X11 forwarding (OpenSSH no-X11-forwarding option).

In an embodiment, an SSH server or SSH client is modified to record or log information about commands used with each key (or files transferred using each key), and that information is conveyed to a management system and stored in the management system's database.

In an embodiment, a tool adds forced commands to one or more existing authorized keys, comprising:
  determining what command is executed on a user account on a host using an authorized key; and
  modifying an authorized keys file used for the user account on the host to add a restriction limiting the use of that authorized key to executing that command (e.g., adding a "command=" constraint to the key in OpenSSH).

Advantageously, the tool also determines what version of SSH server is used on the host, reads at least one configuration file for the determined SSH server, and uses the configuration file to determine the location of the authorized keys file for the user on the host.

A script analyzer (3517) determines what script or program uses one or more identity keys. Its operation is illustrated, e.g., in FIG. 30. It is advantageously connected to a discovery tool for collecting information.

An IP address detector (3518) determines which IP addresses each key is actually used from. In an embodiment, the management system determines one or more IP addresses from which a key is actually used from log data collected by servers (using data logged by SSH servers—some servers may require configuring them into a "verbose logging" mode for sufficient log data to be generated).

In an embodiment, IP addresses belonging to the same host are identified and handled as alternative identifiers for the same host. In some environments, some hosts may have more than one network interface and/or more than one IP address, typically one IP address for each network they are connected to. Such hosts are said to be multi-homed. Sometimes hosts may also have multiple IP addresses for other reasons, such as distinguishing multiple server instances on the same host (e.g., multiple web sites running on the same server—in this case, IP aliases are commonly used if "virtual hosts" are not usable for some reason, e.g., because some HTTP clients do not send a "Host" header).

In an embodiment, the management system determines IP addresses of a managed host (e.g., using a management agent on the host or using agentless management) by using the "ifconfig" system program on Unix/Linux or the "ipconfig /all" command on Windows, and parsing IP addresses from the output. At least one of the determined IP addresses is sent to the management system and at least one of the sent IP addresses is stored in its database such that the host having the IP address can be determined from the IP address. Advantageously, more than one IP address is stored for multi-homed hosts. In an embodiment, the management system database comprises a table with one field containing the IP address and another field identifying the host (e.g., containing a host record identifier). Advantageously the IP address field is indexed for fast lookups.

In an embodiment, when the management system needs to identify a host from its IP address (e.g., when parsing log data from an SSH server), it looks up the host that the IP address belongs to by using the information stored in its database and determines which host it belongs to. Advantageously, it performs an index lookup using the IP address, reads the record for it, and obtains a host identifier from the record, and then reads the host record it needed.

Some IP addresses do not identify a host. For example, 127.0.0.1 (and ::1 in IPv6) is typically used to indicate the "local host", and is normally never sent out to the network. In an embodiment, the management system identifies an IP address as a "local host" address. For such an address, the management system determines which host generated the log record (or otherwise where the IP address was used), and replaces the "local host" IP address by a "real" IP address for the host (the "real" address might be a globally routable address or a "private" address, such as an address from the 10.0.0.0/8 subnet). It then looks up the host based on information in a database.

Alternatively, the management system may directly identify the host sending the log record in response to determining that an IP address is a "local host" address. It may, for example, have recorded what host the log data was retrieved from, and may thus know the data was from it. Alternatively, it may see host identifying information in the log record (such as a host name or an IP address) and map that to a host using a method separate from the stored IP address information (e.g., using a host name table to map the host name to a host record, or using DNS to map the host name to an IP address, and then perform the described lookup using the obtained IP address).

In an embodiment, the management system determines that an IP address is a link-local IP address. In IPv4, link-local addresses are rarely used (though the 169.254.0.0/16 subnet is reserved for them). In IPv6, however, link-local addresses are quite common and are usually assigned with the fe80::/64 prefix. In IPv6, the link-local address is frequently derived from the MAC address of the network interface and may be globally unique despite being link-local. Such globally unique link-local addresses can be handled, e.g., in the same way as normal IP addresses. (A more complicated approach is to determine which network segment(s) each host is connected to, and look up a link-local address based on both the network segment and the IP address, trying the network segment it was received from if the network interface on the logging host is known, or all network interfaces on the logging host if the interface is not known.)

In an embodiment, at least one IP address of a host changes (e.g., because hosts are renumbered, IPv6 network prefix changes, or a different address is obtained from a DHCP (Dynamic Host Configuration Protocol) server). To deal with such situations, the management system may record the first and last time an IP address was known to belong to a host in its database, and optionally use the time when a log record was generated in identifying the host. Alternatively, it may dynamically update the IP addresses in its database for a host when they change.

In an embodiment, a management system discovers whether a managed host is using a statically configured IP address or an IP address provided dynamically by DHCP (Dynamic Host Configuration Protocol). In an embodiment, the management system causes a managed host to read files whose names match "/etc/sysconfig/network-scripts/ifcfg-*", and parses the value of "BOOTPROTO" option from the file (value "dhcp" indicates that an IP address is obtained using DHCP). The "IPADDR" option may also be parsed to obtain the statically configured IP address (its absence may indicate that the IP address is not statically configured). Other values, such as "PREFIX" (for subnet prefix length, which can be used for determining netmask) may also be extracted from such files.

An IP address restriction enforcer (3519) configures IP address restrictions for authorized keys restricting their use to be from the hosts from which they have actually been used during an investigation period or to configured IP addresses.

In an embodiment, an authorized key is configured to be usable only from IP addresses from which an IP address detector has determined that it was used from during a period of time. The IP address restriction enforcer causes the authorized_keys file(s) on one or more server hosts to be modified so that the authorized key has the "from=" option configured in the file, with the value specifying the IP addresses from which the key has actually been used during the investigation period or that were otherwise configured.

In an embodiment, an SSH server directly informs the management system when an authorized key is used (e.g., IP address, user, command) without going through log files.

In an embodiment, the management system automatically configures IP address restrictions for public keys in the authorized keys file (e.g., by adding a "from=" option in the file when OpenSSH 5.8 is used). The IP address restriction is made to contain those IP addresses from which the management system permits using the key. A benefit of this approach is that it makes it harder for rogue administrators to copy private keys and use them without authorization.

In an embodiment, IP address restrictions are not added automatically for authorized keys that are used from a host that has a dynamically configured IP address. In another embodiment, dynamically configured IP addresses are expanded to the whole subnet in which such addresses reside (e.g., by using something like "1.2.3.*" in a "from=" option for an authorized key if a dynamic IP address is from a subnet with a prefix length of 24).

In an embodiment, an IP address restriction enforcer configures an IP address restriction using a host name or a host name pattern for a host, such as "*.eng.example.com". A host name can be, e.g., the name of the host as returned by a "hostname" command on Linux, as returned by performing a reverse DNS (Domain Name System) lookup, or as supplied by a client trying to connect.

A passphrase adder (3520) adds passphrases for existing identity keys, and a passphrase provider (3521) provides the passphrase for an identity key to an SSH client. (A passphrase is used to derive an encryption key by which the private key is encrypted on disk; see, e.g., the documentation for the ssh-keygen program in the well-known OpenSSH product.)

In an embodiment, passphrase protection is automatically added for one or more existing private keys.

Adding passphrase protection for private keys involves several related aspects (not all of which need to be present in any particular embodiment):

handling private keys with passphrase in discovery;
  converting keys without passphrase to keys with passphrase;
  storing and obtaining the passphrase for private keys;
  using passphrase-protected keys from existing scripts that call an SSH client;
  using passphrase-protected keys from new scripts;
  changing the passphrase on a key; and
  rotating a key that has a passphrase.

In an embodiment, private keys with passphrases are discovered during key discovery.

A private key file may be encrypted by a key derived from the passphrase (with the algorithm optionally indicated in the key file). Typically the encrypted key file itself does not contain a key fingerprint in plaintext, and the key fingerprint cannot be computed without the passphrase, because the fingerprint is typically a hash of the (plaintext) private key in some format that depends on the SSH implementation. The problem here is how to handle a discovered private key file that is encrypted and determine its fingerprint.

In an embodiment, to detect whether a private key is protected by a passphrase, the management system causes (e.g., directly or using a management agent) an operation to be executed on a managed host to generate a fingerprint from the private key file (the operation could be, e.g., invoking the "ssh-keygen" command as known in the OpenSSH distribution). The private key being passphrase-protected is detected by the operation asking for a passphrase or failing due to missing or incorrect passphrase (the operation might be supplied an empty passphrase to try for the detection). At least some private key file formats contain a checksum that can detect an incorrect passphrase with a reasonable probability (e.g., with about 0.5% error margin); the error margin however is large enough that preferably both an "incorrect passphrase" and an "invalid private key file format" error are recognized and interpreted to mean the key is passphrase-protected. (As an alternative to generating a fingerprint, generating a public key might also be attempted with similar handling.)

In another embodiment, passphrase protection is expressly indicated in the file format of the private key. For example, with OpenSSH keys, the presence of a "Proc-Type" and "DEK-Info" fields in the private key file indicate presence and type of encryption for the private key file.

Preferably, when a key with a passphrase is detected, the management system reads the corresponding public key file from the same directory (typically private key file with the file name suffix changed to ".pub"). It is generally not mandatory to have the public key file in the same directory, but it is by default generated by "ssh-keygen", and in most cases is present. The management system then computes (or causes to be computed) one or more fingerprints for the public key or reads the public key, and uses that information to identify the private key file. In an embodiment, the key is marked in the management system as being protected by an unknown passphrase.

In an embodiment, the management system generates a report of private keys with passphrase (or conversely, without a passphrase), and allows an administrator to manually enter the passphrase for the private key through a user interface. An administrator has several options for handling such keys, including providing the passphrase, changing the passphrase to empty (this may require changes to scripts using the key), or generating a new private key that replaces the old key, now with an empty passphrase. The management system may provide a user interface for selecting one of the options and/or providing the required information.

It is generally not necessary for the management system to know the passphrase of a private key in order to manage the key, as long as it has access to the corresponding public key or fingerprint. Trust relationship setup and removal, and key rotation do not depend on being able to use the private key.

It is also often not necessary for the management system to know whether a private key is passphrase-protected. The management system may just try to read the public key, and use it whenever it is available. However, it may be advantageous to know which keys are passphrase-protected, or to verify whether the public key actually matches the private key. The management system may provide a report indicating which keys or what percentage of keys are passphrase-protected, and possibly indicating which keys grant access to certain privileged or critical accounts do not have a passphrase.

It is also possible that no public key corresponding to a private key with a passphrase can be found and the fingerprint cannot be determined (in an embodiment, the fingerprint might be determinable, e.g., from the private key file envelope even if it is encrypted, in which case the problem does not exist). In this case the management system may not be able to determine which key pair (fingerprint or public key) the private key corresponds or belongs to. In an embodiment, the management system creates records also for these private key files in a database, but flags them as being passphrase-protected and that their private key and/or fingerprint is not known. The management system then provides a report for finding such keys and provides a facility for providing the private key or the passphrase for the private key.

Sometimes it may be possible to determine the fingerprint of a private key protected by a passphrase by correlating access times of a private key file with times of logins from the host (or its IP address) having the private key and determining that the login must have been using that particular private key (such correlating is described elsewhere herein). The determined fingerprint may then be stored in the management system's database, associated with the private key record. Knowing the fingerprint makes it possible to automatically rotate the private key even if its passphrase is not known, thereby changing its passphrase to something known.

In an embodiment, a private key without a passphrase or with an unknown passphrase is converted to a private key with a passphrase known to the management system or to a private key without a passphrase.

In an embodiment, this is implemented essentially by performing key rotation (as described elsewhere in this specification) to replace the old private key (and corresponding public keys configured as authorized keys, possibly on multiple hosts). Key rotation does not require using the private key, provided that the key fingerprint or corresponding public key is known. In this way, the need for the old passphrase is eliminated. If the management system can provide the new passphrase when the key is used (advantageously, even if scripts have an outdated passphrase hard-coded) such key rotation and passphrase change does not break existing scripts (see below how the key can be provided).

In an embodiment, passphrases for private keys are stored centrally or locally, or both, and access is provided to the passphrases for using passphrase-protected private keys.

In an embodiment, the management system stores known passphrases in its database or in a secure data vault or password vault using a suitable protocol to access the secure vault (such vaults are commercially available on the market, examples include OASIS KMIP standard compatible vaults from, e.g., Thales and RSA Security, and the Cyber-Ark Digital Vault). The management system may itself also act as a vault. A small program may be installed on managed hosts that provides access to stored passphrases In an embodiment, the "ssh-askpass" program is replaced by one that provides access to a passphrase (or even the decrypted private key) for scripts, SSH clients and/or interactive users. Such replacing may be done by replacing the original file, or putting a directory containing a new "ssh-askpass" program in the command search path (PATH environment variable in Unix/Linux) before the original.

In an embodiment, passphrases for keys on a host are stored (possibly in addition to being stored centrally) in a local file in the file system that is only readable for root or some other user account that does not normally use private keys for authentication. The file could map, e.g., a file path to the corresponding passphrase, or a (cryptographic) hash or fingerprint of the private key file to the corresponding passphase. The file may further contain the name(s) of command(s) that are allowed to use the passphrase.

The file is not accessible for normal users. A small program configured to have escalated privileges (e.g., using the set-user-id mechanism on Unix/Linux) is provided for obtaining access to the passphrase; the program may, e.g., be given the path of the private key file as an argument. The program then reads (searches) the file for a passphrase for the given private key file, validates that any constraints on which programs or users can use the file are met by, e.g., checking its constraints (e.g., which program is running it, by reading process list (e.g., by something like "ps axl" command on Linux or reading files from the /proc directory on Linux, or which user is trying to use the passphrase based on the real user id that the program runs on). The program then prints the passphrase to stdout, so that the calling program or script can use the passphrase. If no passphrase is found, an empty passphrase may be returned. The program may also check whether the passphrase is empty, and may log a message (e.g., in syslog) about an attempt to use a key for which passphrase is not available or in a way that violates its constraints (e.g., from an unauthorized user account, or from an application that is not authorized).

The described program may replace "ssh-askpass" (the program might actually be called "ssh-askpass", and default command search path (typically the PATH environment variable) configured so that this program is found before the normal "ssh-askpass"). Certain other settings might also need to be made, such ensuring that the DISPLAY environment variable is set in some versions of SSH/OpenSSH—for non-interactive scripts it might be set to an arbitrary value. In this way, obtaining the passphrase automatically can be made to work even with existing SSH installations (with most commonly used SSH versions, particular Tectia SSH and OpenSSH).

The PATH and DISPLAY variables might be set in a system start-up script so that they are available to most or all programs. Another option would be to move the SSH client binary to a different location (e.g., moving "/usr/bin/ssh" to "/usr/bin/ssh.real" and adding a front-end script "/usr/bin/ssh" that sets these environment variables). The equivalent of this front-end script could also be integrated to installation packages for SSH versions.

In an embodiment, a program is provided for reading the decrypted private key, as opposed to just the passphrase. This provides the advantage that the private key does not actually need to be stored locally (it could be stored on a server, such as a KMIP-compliant key management server), and in fact the private key file need not even be readable to normal users. The functionality for obtaining the private key (whether from a directory or a local file, and whether decrypted by a passphrase or not) could also be integrated into an SSH client application (including embedded SSH client applications, such as file transfer clients or systems management clients).

It is also possible to hand-code calls to a program that fetches a passphrase for a key file in new scripts. In this case the script would call the program to read the passphrase into, e.g., a shell variable, and would then, e.g., call an SSH client program, "ssh-add", or "ssh-keygen" passing the passphrase to it.

If passphrases are stored in a local file on a host, the file may be caused to be modified by the management system when a new private key with a passphrase is added on the host, a passphrase of a key on the host is changed, or (optionally) when a key with a passphrase is deleted from the host. Note that the file need not be a single file; there could, e.g., be one file per user that has passphrase-protected private keys, and the file could also be structured as an indexed database file (e.g., a "Berkeley DB" (BDB) file).

In an embodiment, the management system automatically changes the passphrases on keys from time to time. This improves protection of private key files without forcing a key rotation (key rotation can sometimes be risky, especially at early stages of key manager deployment, because undetected external connections could break during rotation). To implement this, the management system may cause "ssh-keygen" to be run on the host having a private key, providing it the old passphrase and the new passphrase. (Corresponding functionality, essentially reading and decrypting the private key file using the old passphrase and re-encrypting and writing it using the new passphrase could also be implemented directly in a management system agent or other suitable program.) The management system also updates the passphrase stored in its database, vault, local file, or other suitable location.

Rotating a key with a passphrase can be performed similarly to rotating a key without a passphrase. Advantageously, when a key with a passphrase is rotated, the passphrase is changed at the same time. When the management system generates or causes a host to generate a new key pair, it provides a (new) passphrase using which the new private key will be protected. The management system then adds the new passphrase to its database, vault, local file(s), or other suitable storage. Sometimes a private key might be stored in multiple places, e.g., when the same private key is used for multiple hosts in a cluster, and the key and private key must be copied to each member of the cluster in such cases. An agent could alternatively generate the new passphrase and send it to the management system.

It would also be possible to modify the SSH client application to fetch passphrases automatically from a vault or other suitable source. A custom shell could also be used for similar purposes.

A Kerberos credential rotator (3522) rotates Kerberos credentials. Its operation is illustrated in, e.g., FIGS. 3, 4, 5, 6, and 44.

A certificate discoverer (3523) discovers certificates from managed hosts. It can operate similarly to SSH key discovery. Performing certificate discovery without using an agent program is often organizationally easier for customers, as no new software needs to be approved for installation on numerous servers. Furthermore, risk of disruption to normal operations of a server is reduced when no new software is added.

A certificate manager (3524) manages certificates by requesting and installing new certificates when needed. Its operation is illustrated in, e.g., FIG. 43. It is advantageously connected to a discovery tool for discovering certificates and applications that use certificates.

A certificate authority (3525) issues certificates based on certificate requests received using certificate management protocols or web-based requests. It may be, e.g., the Entrust Authority product from Entrust. It is advantageously connected to a certificate manager and a host key tool for issuing new certificates, certificate revocation lists, and certificate status confirmations. Multiple certificate authorities may be used, including some of which may be part of the management system and some that may be external.

A registration authority (3526) acts as an intermediary between one or more end entities or hosts and one or more certificate authorities. It may provide functions for authenticating/authorizing certificate requests and for selecting from what certificate authority to request a certificate from, and may covert or modify certificate requests into a format and to contain information required by a particular certificate authority. For example, the Entrust Authority product suite also includes a registration authority. A certificate manager (3524) may also act as a registration authority for one or more certificate authorities.

An approval tracker (3527) tracks trust relationships and change requests and/or approvals relating to them. It may also enforce policies relating to approvals, such as requiring special authorization for trust relationships crossing certain boundaries. It is advantageously connected to a ticketing API and ticketing system.

An approval tracker may also provide a user interface for entering and approving trust relationship setup, removal, and change requests as well as certain other requests. It may be internal to the management system or may be an external tool (possibly the same as a ticketing system).

A ticketing API (3528) provides an interface between the management system and the approval tracker. It may include one or more connectors for different approval trackers or ticketing systems. For example, Remedy from BMC Software provides a Java-based API that can be used to integrate with the Remedy product. The management system itself may provide an API for kicking off key setups, key removals, rotations, etc., and a glue application (connector) or script may be used to glue these APIs together. A Java program that periodically polls both Remedy and the key manager through their APIs and sends updates to the other side can be used for this (the required data format conversions are generally rather straightforward). A web services API, SOAP API, or a command-line interface may also be used.

A ticketing system (3529) implements IT change request and/or approval processing. It may be, e.g., Remedy from BMC Software. It may be connected to the rest of the management system via a ticketing API.

A ticketing system may be used for approving trust relation setup, removal, and role change requests. It may also be used for assigning requests or tickets to system administrators, and may be integrated to a management system using a ticketing API for automatic implementation of certain requests.

A report generator (3530) generates reports for display on screen (e.g., in a web browser or Windows user interface), PDFs, for exporting to Microsoft Word and/or Microsoft Excel, for printing, and for other purposes and formats as needed in an embodiment. Various reports are described throughout this specification.

An audit tool (3531) generates a report that compares the managed environment and configured trust relationships and other aspects of it against configured and/or built-in policy rules. Such policy rules may be based on, e.g., corporate policy, PCI (Payment Card Industry) standards, Sarbanes-Oxley regulations, FISMA regulations, and other regulations that may be promulgated from time to time for various industries and may be configured using a user interface.

A continuous monitoring tool (3532) monitors the environment against unapproved key creations and other noteworthy events. Its operation is illustrated in more detail in, e.g., FIG. 47. It is advantageously connected to a discovery tool and a report generator. It advantageously comprises an alarm sender configurable to send alarms via e-mail (e.g., using SMTP (Simple Mail Transfer Protocol)), syslog messages, and/or SNMP (Simple Network Management Protocol) traps.

A virus spread analyzer (3533) analyzes how effectively virus spread using automated trust relationships has been prevented, and displays or reports a metric of the effectiveness of prevention and may report weaknesses that should be addressed, such as authorized keys without a forced command. It is advantageously connected to a discovery tool and a report generator.

An inside threat analyzer (3534) analyzes how effectively insider threats relating to SSH keys and/or automated trust relationships have been prevented. It may compute a metric of the effectiveness of prevention and may report weaknesses that should be addressed, such as keys that have not been rotated for a long time, authorized keys in non-protected locations, identity keys on NFS volumes, and hosts where key-based access is not properly audited (e.g., where no session recording capability is available). Session recording for automated access may be implemented using, e.g., the CryptoAuditor product from SSH Communications Security, Inc.

A potential backdoor analyzer (3535) analyzes trust relationships to determine which trust relationships might represent backdoors into functional accounts. For example, a trust relationship from an ordinary user account to a functional account could be considered suspicious and could be detected by inspecting the type of the user accounts for source and destination of trust relationships. A potential backdoor analyzer may also report cases where backdoors have not been properly closed, such as user accounts where someone logging into that account may acid new authorized keys for the account. A decommissioning analyzer (3536) detects hosts that have likely been decommissioned. For example, if no connection has been made to a host for an extended period of time, such as a week or a month, the host may be deemed decommissioned. Pending jobs for the host may be aborted and signaled as failed (continuing any parent jobs that may have waited for them to complete).

In an embodiment, a decommissioning analyzer may track usage of a host that is up and running to determine whether the host is still being used. It may track, e.g.:
  whether any recognized business application is still running on the host
  whether there are interactive logins to the host
  whether disk space usage on the host is changing
  whether the host communicates with other hosts using TCP/IP (other than known system traffic).

If none of these is happening on the host, the host may be suggested as a possible candidate for decommissioning.

A configuration GUI (3537) can be used for configuring the management system (including back-ends and back-end groups), managed hosts, the managed environment, and various applications on managed hosts, including SSH clients, SSH servers, web servers, business applications, and authentication mechanisms, such as Kerberos or Active Directory. It may provide, for example, a web-based user interface (for rendering pages in a web browser) or a Windows user interface. A configuration GUI is advantageously connected to most of the components of a management system (e.g., by storing configuration information in a database from which the other components access it).

A configuration updater (3538) pushes configuration updates to managed hosts. Its operation is illustrated in, e.g., FIGS. 3, 4, 5, 6, 15, 16, 17, and 19. Generally, configurations can be pushed similarly to key additions or updates, except they may go to different applications than SSH, the configuration files may be different, and the operations for restarting an application or host may be different from restarting an SSH server.

A configuration updater may also automatically modify, e.g., SSH configuration files, e.g., to configure built-in certificate authorities for host keys, to change location of authorized keys files, etc.

A host key tool (3539) manages host keys for SSH. It may support multiple SSH implementations and key formats, such as those for OpenSSH and Tectia SSH. It may automatically configure and manage host certificates for host keys. It may support automatically rotating SSH host keys periodically, such as every six months. It may support automatically distributing SSH host keys to one or more host keys in the environment. It may support configuring SSH to use Kerberos or active directory for host authentication. The Tectia Manager from SSH Communications Security, Inc. is a commercially available host key tool (it also provides configuration management functionality).

A cloud instance manager (3540) helps to provision new virtual machines in a cloud by making it easier to deploy them in a management system, to install any required keys (and certificates, principals, configurations, and other data as appropriate). Its operation is illustrated in, e.g., FIGS. 16 and 17.

A back-end manager (3541) can be used for configuring back-ends and back-end groups (and possibly front-ends) for a management system. It advantageously has a user interface and updates information in the management system's database. It may provide functionality for installing new backends. It may also provide for downloading configuration information for a new back-end, and a back-end may provide a means for updating its configuration information or pointing it to where it can download its configuration information from.

In an embodiment, the management system can generate an installation password, valid for, e.g., 24 hours, for installing a new back-end. The password is stored stored in the management: system's database and displayed on the screen. The back-end is configured with an address for the management system (e.g., address of an existing back-end) and the password. The new back-end connects to the management system, authenticates itself using the password (or uses it as a shared secret in a known key exchange protocol to protect from man-in-the-middle attacks), and then downloads its configuration data from the management system. Such configuration data may include, e.g., information on how to connect to the management system's database and an encryption key used for encrypting sensitive information in the management system's database.

An upgrade handler (3542) implements upgrading the management system software, including software of back-ends and front-ends. It also implements adding new modules, such as connectors or plugins, to a management system. It may also provide for upgrading operating systems and software on management system components as well as on managed hosts.

In an embodiment, an upgrade handler (e.g., a tool, appliance, or user interface function for uploading a new software package) is provided that 1) brings the management system into quiet state, finishing processing of any requests processed by back-ends and prevents starting of new requests or accepting of new connections from managed hosts 2) stores new program code for back-ends and front-ends in the management system's database and makes any required changes to database layouts and database contents 3) permits continuing of processing by the management system, whereby back-ends and front-ends load new program code from the database and restart themselves using the new code, and then resume normal operations.

For example, an indicator may be stored in the management system's database that is checked by all back-ends at least once per hour and causes them to stop processing new jobs; database structures are then upgraded as needed by the upgrade handler; new program code is loaded into the management system's database; the indicator is then removed or changed to indicate "immediate software upgrade"; and the back-ends periodically poll the database for the status of the indicator, and in response to the "immediate software upgrade" status read new software from the database, install it on themselves (e.g., the back-end appliance(s) and/or virtual machine(s)), and then restart (e.g., by rebooting the appliance or virtual machine). Front-ends can be handled same as back-end for upgrading. A front-end may display a "being upgraded, try again later" type message to administrators who try to connect while it is being upgraded. The upgrade handler may also display progress messages about the upgrade through a front-end.

In an embodiment, a new connector or plugin can be added to the management system by uploading it through a front-end, which then saves it to the management system's database and sets an indicator that causes back-ends and front-ends to load the new connector or plugin. Advantageously, the connector or plugin is not taken into use until all back-ends and front-ends have loaded it (each could record in the database when they have loaded it, for example by updating a count field or adding a record indicating they have loaded it). Adding a connector may also create new tables or modify existing tables in a database. Such code could be run, e.g., immediately after it has been loaded into the management system. Alternatively, connector loading could be handled similarly to a full upgrade.

In an embodiment, an upgrade handler manages upgrades and patches to operating systems and/or application software running on managed hosts by identifying their current versions and currently installed patches (e.g., using the "rpm -q -a" command on Red Hat Enterprise Linux), copies patch files or new package files to the managed host as appropriate, and installs the new versions or patches (advantageously during a maintenance window as illustrated in, e.g., FIGS. 3, 4, 5, and 6). For example, the "rpm -i packagefile.rpm" command could be used for the installation in Red Hat Enterprise Linux.

In an embodiment, a back-end is upgraded by installing a new back-end with a new version of the management system, and uploading a configuration data object previously downloaded from the old management system into the new back-end; and keeping the new back-end disabled until the database has been brought to the corresponding version. New back-ends are then installed, generally one corresponding to each old back-end, same for front-ends, and finally the database is upgraded to the new version, e.g., by clicking a button in the upgrade handler user interface. A back-up of the old database may also be taken before the upgrade, or the old database may be copied to a new database space before upgrading the database structures. In this manner, going back to the previous version can be done by returning to the previous version of the database (and the old back-ends are still available).

A TPM (Trusted Platform Module) driver (3543) provides access to a TPM or an HSM (Hardware Security Module) for storing private keys and performing operations on them. In an embodiment, a TPM driver also comprises the TPM or HSM device or appliance (an HSM may be, e.g., a separate hardware appliance connected to a computer using a USB (Universal Serial Bus) port, and a TPM may be part of the computer where a TPM driver runs, the computer thus also being part of the TPM driver). A TPM driver may also provide access to keys stored on a different physical computer by forwarding requests to perform operations using a private key to another computer using a suitable secure protocol, such as TLS or SSH.

A database (3544) acts as a store of information for the management system and as a communications mechanism connecting various components of the management system. The database may be connected to and used by nearly all components of the management system. The database is advantageously a relational database supporting SQL (Structure Query Language) for queries. Advantageously, the database uses atomic serializable transactions to ensure consistency. For example, an Oracle 11g Real Application Cluster database could be used.

In an embodiment, the database comprises information about credentials to access managed hosts (preferably encrypted using a key that is not stored in the database—the key could be stored in each front-end and back-end), managed hosts, discovered SSH keys, certificates, Kerberos credentials, configurations, applications, and other information. It also comprises information about back-ends, front-ends, user information sources (for both managed hosts and those used by the management system itself for administrative access), configuration data, policy configuration, report templates, software updates for back-ends and front-ends, connectors, plugins, etc. It also comprises job records and other information about running and completed jobs. It further comprises information collected about key usage and commands and IP addresses used with particular keys.

A job executor (3545) executes jobs and handles scheduling of jobs to be executed during maintenance windows as appropriate in each case. It also handles retries when jobs fail (whether due to problems with the managed host, communication problems, or database transaction aborts). It also handles eventually completing jobs even if one of the hosts involved in a job (or one of its subjobs) becomes unresponsive or is decommissioned. In an embodiment, the job executor communicates with managed hosts without a management agent by connecting to a managed host using the SSH protocol, logging in to the managed host using credentials stored in the management system's database, and performs operations on the managed host by sending commands to it and parsing responses (possibly using a connector via a connector API).

In an embodiment, the job executor waits for incoming connections from managed hosts using a suitable secure communications protocol (e.g., the SSH protocol), authenticates an incoming connection, and then performs operations on the managed host.

The operation of a job executor is illustrated in, e.g., FIGS. 3, 4, 5, and 6. Many of the components of the management system are advantageously connected to and use the job executor, such as a deployment tool, a discovery tool, an unused key remover, a key installer, a key remover, a trust relationship installer, a trust relationship remover, a non-key trust relationship installer, a non-key trust relationship remover, a key rotator, a trust relationship converter, a passphrase adder, a Kerberos credential rotator, a certificate discoverer, a certificate manager, a report generator, a continuous monitoring tool, and a host key tool.

A maintenance window manager (3546) manages information about maintenance windows. It is advantageously connected to the management system's database and/or through an API or connector to another database, such as a configuration management database. It may also be connected to a job executor for controlling when various tasks can be executed. It may obtain maintenance window information automatically from, e.g., a configuration management database, discover it from a managed host in a configured location, or such information may be configured manually through a user interface.

A user interface (3547) implements interaction with a user, typically a system administrator, security administrator, or IT auditor who uses the management system interactively. A user interface may be implemented using, e.g., web technologies (e.g., Apache web server, Python/Django web application framework, and OpenSSL certificate and SSL implementation, as is well known in the art). A user interface may alternatively or in addition be implemented as a Windows application or DLL (Dynamic-Link Library). Many other user interface technologies can also be used. Different components of the management system may be use different technologies.

Many of the components of the management system have a user interface or are connected to a user interface indirectly (e.g., via a database).

A communications interface (3548) implements various communications protocols for communication with other components of the management system, with managed hosts, and with other devices and systems on a network. Advantageously, the TCP/IP transport protocol is used for communication. A security protocol or application protocol, such as SSH, SSL, TLS, HTTP, SOAP, and/or XMLSEC, is often used on top the underlying transport protocol. The IPSec protocol or other network-level security protocol may also be used in some embodiments. Both wired and wireless network connections may be used. Static IP addresses (whether globally routable or not), dynamic IP addresses (whether globally routable or not), and/or private IP addresses may be used in various embodiments and deployment scenarios.

Various application-level protocols may also be used for communication, including SMTP (Simple Mail Transfer Protocol) or CMP (X.509 Public Key Infrastructure Certificate Management Protocol).

A communications interface advantageously uses authentication information stored in a database. It is connected to various other components of the system, including a job executor, a user interface, and advantageously any component that communicates with other systems.

An agentless interface (3549) implements agentless management operations on a managed host without having agent software installed on the managed host for communicating with the management system. It is advantageously connected to a communications interface through a connector API, and is advantageously connected to and used by a certificate manager, a deployment tool, a discovery tool, a Kerberos credential rotator, a key installer, a trust relationship installer, a key remover, and a job executor. Its operation is in part illustrated in, e.g., FIGS. 3, 4, and 6.

An agent interface (3550) implements management operations on a managed host using an agent software installed on a managed host for communication between the managed host and a management system. Advantageously a management agent also implement various management operations and translates between management operation requests sent by a management system and operations to be performed on a managed host. A management agent may also send requests to a management system. Operation of a management agent is in part illustrated in, e.g., FIGS. 3, 4, and 5. It is connected to, e.g., a job executor and a deployment tool.

A PowerBroker interface (3551) implements executing scripts or programs on multiple managed hosts through one or more intermediate computers. It may comprise, e.g., the PowerBroker tool from BeyondTrust. Other tools that implement execution of a script on multiple hosts can also be used.

A PowerBroker interface can be connected, e.g., to a job executor and a deployment tool. It can also be used for triggering execution of certain parts of the management system manually by a system administrator, and returning results back the management system (e.g., passing the results manually to the management system, or manually triggering a script that automatically sends results back to the management system).

A connector API (3552) implements a mapping between internal operations of a management system and application or device specific operations. In an embodiment, a connector API maps SSH key management operations to actual commands or protocol packets sent to a managed host.

In an embodiment, a connector implementing a connector API connects to a managed host using SSH, and manages it agentless using command-line operations specific to the device (e.g., using Cisco router CLI). In another embodiment, the connector connects to the managed host using HTTP or HTTP/S, and manages it by receiving, optionally parsing, and posting web pages or forms.

In an embodiment, a connector API enables implementing interface plugins for various kinds of managed hosts, such as routers, firewalls and BIOS-level systems management interfaces (e.g., IPMI) that do not run a full operating system or for supporting additional operating systems that are not Unix-like. In an embodiment, the connector API provides at least some of the following functionality:

identify whether the host matches the system supported by the connector
determine capabilities of the connector (which operations are supported)
get host name of a host
get IP address(es) of a host
get a management system unique identifier from a host
deploy management system login credentials on a host
change management system login credentials on a host
install management system unique identifier on a host
read user accounts from a host
obtain information about installed SSH servers on a host
obtain information about installed SSH clients on a host
read global SSH server configuration from a host
write global SSH server configuration to a host
read host keys from a host
update (add/remove) host keys on a host
read known host keys from a host
update (add/remove) known host keys from a host
read trusted host key certificate authorities from a host
update (add/remove) trusted host key certificate authorities on a host
read host certificate(s) from a host
update (add/remove) host certificate(s) on a host
get authorized keys and key constraints for a user on a host
update (add/remove) authorized keys and key constraints for a user on a host
read and update (add/remove) user-specific SSH client and server configuration files for a user on a host
read private keys (identity keys) for a user on a host
update (add/remove) private keys (identity keys) for a user on a host
change passphrase of a private key (identity key) for a user on a host
obtain information about installed applications on a host
read certificates and/or private keys for an application
change a certificate and/or private key for an application
read Kerberos credentials for a user
change Kerberos credentials for a user
read Kerberos host credentials
change Kerberos host credentials
read Kerberos credentials for an application
change Kerberos credentials for an application
read symmetric keys for an application
change symmetric key for an application
read user information sources
configure user information sources
read permitted privilege escalations from a host; and
road permitted privilege transforms from a host.

In an embodiment, the credentials the management system uses to connect to a managed host are an account name and a private key (using public key authentication). In another embodiment, the credentials are a username and a password.

A privilege escalator (3553) escalates privileges of a process on a managed host so that certain privileged operations, such as installation of new authorized keys, can be performed. It comprises two separate parts: a privilege escalation tool used on a managed host (such as "sudo" or PowerBroker) and a configuration mechanism for privilege escalation in a management system (advantageously a user interface implemented in a front-end). It may also be connected to, e.g., an agentless management interface for causing an agentless management interface to, e.g., prefix commands with "sudo" or otherwise modify them to cause them to be executed with sufficient privileges. A process in this context may mean an operating system process (e.g., a running program or thread) in a computer, such as a running agent program or command interpreter, including its subprocesses (e.g., the privilege escalator may start a new subprocess that has the new privileges).

In an embodiment, "sudo" or another privilege escalation command is used from a non-privileged account to execute limited privileged commands to deploy on a managed host, to access and update key information and configuration files from system directories and users' home directories, and to perform other operations on the managed host. In an embodiment, a "sshmgr" account is created for the management system and any required credentials (password or authorized public key) are installed on this account. This step may be performed manually, by script, or by the management system (e.g., using a deployment tool over an SSH connection). The management system is then deployed using this account, using agentless or agent-based connection (or other connection methods).

The "sudo" or equivalent program is configured with authorized privileged commands for this account. The management system may be configured with the name of the account used and the name of the "sudo" command used. Whenever the management system needs to execute a privileged command, it prefixes the command using the configured "sudo" command (in some environments, a slightly more complex formatting may be needed, such as quoting the original command, and providing it as an argument or command-line option value to the "sudo" or equivalent command).

In an embodiment, the management system reads the output of the "sudo" command (even partial output), and parses the output against a regular expression that is designed to match password prompts that may be output by "sudo", and fails the operation if a password prompt is detected.

In an embodiment, the management system allocates a pseudo-tty to ensure that the "sudo" program will prompt for a password if it needs one. A pseudo-tty may be allocated by a management agent using, e.g., the forkpty( ) or openpty( ) functions on Linux, or by giving the "-t" option to the OpenSSH client.

In an embodiment, the management system reads SSH public and private key files and configuration files from a user's home directory using the "su" command to switch to the user account of the user whose home directory is being read. When used together with "sudo", the command being executed may be something like "sudo su user cat file". Other commands are executed similarly, e.g., "sudo su user cat >file" or "sudo su user my file1 file2". The use of "su" here is a solution to not being able to read or write NFS-mounted home directories.

In an embodiment, such as on Red Hat Linux running SELinux, a special helper program, such as "ssh-keycat", may be used for reading keys from a user's home directory. Such programs may help operation when multi-level security is in use and restrictions on accessing files are particularly severe. Updating key files may be done using similar helper programs or by changing the permission settings on the relevant files or programs so that the update is possible.

In an embodiment, the management system uses role-based access control for administrators. Access control can be specified not only based on actions to be performed, but also by host groups. For example, an administrator might be given permission to perform certain key management operations on all hosts in a host group.

A privilege transformer (3554) transforms privileged access on a managed host to be performed with different privileges. For example, on many managed hosts, a "root" account can perform nearly any operation, except read data owned by ordinary users that is stored in files in an NFS file system exported with a "root_squash" option in/etc/exports on Linux operating systems. In an embodiment, root privileges are transformed to privileges of an ordinary user, and read or write of a file is performed using the ordinary user's privileges. An ordinary user here means a user account other than a "root" account and an account used by a management system to connect to a managed host or a user account on which a management agent runs. The ordinary user may be the user owning the files.

In an embodiment, a privilege transformer converts a command to be executed on a managed host to the form "su -c 'command' user" to cause the command to be executed using the user's privileges.

The command could be, e.g., a "cat" or "cp" command to read, write, or copy a file.

A privilege transformer comprises two parts: a privilege transforming tool used on a managed host (such as "su" or PowerBroker) and a configuration mechanism for privilege transforming in a management system (advantageously a user interface implemented in a front-end). It may also be connected to, e.g., an agentless management interface for causing an agentless management interface to, e.g., transform certain commands such that the command is performed using the privileges of an ordinary user.

In an embodiment, a privilege transformer creates a new subprocess for the process transforming its privileges, and uses the new subprocess to perform actions using the transformed privileges.

A Kerberos library (3555) implements the client side of the Kerberos protocol. It may also implement a variation of the Kerberos protocol, such as a protocol for communicating with a Microsoft Active Directory server. It may support multiple KDCs. It may additionally be used for both authentication as well as for obtaining other information, such as group information or policy information, from a directory, such as Active Directory.

A Kerberos KDC (3556) acts as a key distribution center according to the Kerberos protocol. It may also be an Active Directory server. A management system may comprise a Kerberos KDC, or may utilize an external Kerberos KDC.

An LDAP interface (3557) provides access to directory services using the LDAP protocol. A directory server or a virtual directory may be part of the LDAP interface (a virtual directory is a proxy that performs protocol transformations, schema transformations, information combining and/or other transforming operations on data in directories). A directory server can be, e.g., a Microsoft Active Directory server or an Oracle Internet Directory Server.

Typically an LDAP interface is used for fetching information about users, but can also be used for other purposes, such as retrieving policy data, configuration data, host data, user group data, host group data, and other information. An LDAP interface is advantageously connected to a discovery tool and various other parts of the management system that utilize information stored in an LDAP directory.

An extension API (3558) provides a means for plugins and connectors to extend the functionality of a management system. It may, e.g., provide for implementing new job types (possibly adding code to hack-ends), adding additional user interface components, adding additional report types, adding new tables or fields in existing tables in a database, or adding new alarm triggers. It may also It may also be used to bring new functionality and components into the management system, such as management of PGP keys for e-mail and file encryption. Many of the components of the management system, such as a host key tool, certificate manager, Kerberos principal rotator, and a module for managing SSH user keys and other trust relationships, could be implemented as an extension connected to the rest of the management system through an extension API.

An extension API would advantageously provide hooks for registering functions to be called when certain events take place in the management system. It would also advantageously provide functionality for registering new elements in a user interface (such as new menu items, forms, views, screens, and/or dialogs). It would also advantageously provide for registering new report types, alert types, etc. It advantageously also permits registering new operations to be performed during discovery and continuous monitoring.

A privileged access manager (3559) provides controlled and/or audited access to a privileged account. It may provide a gateway through which access to privileged accounts needs to take place, and may implement a password vault and hide actual passwords or other authentication credentials (e.g., private keys) used for accessing privileged accounts. It may perform session logging or recording for access to privileged accounts.

A privileged access manager may be part of the management system or an external component. It may comprise, e.g., the Privileged Identity Management (PIM) suite from Cyber-Ark or the PowerBroker product from BeyondTrust.

Advantageously, a privileged access manager is able to audit and record sessions also for access using identity keys for authentication, even when a user is trying to bypass a privileged access manager or when the access is by an automated script or process. The CryptoAuditor product from SSH Communications Security can be used for implementing auditing and recording of scripted and key-based access.

A configuration management database (3560) stores information about IT infrastructure, such as information about hosts, their role (e.g., production system, development system, disaster recovery system), applications and hosts associated with each application, user accounts, user accounts associated with each application, etc. A management system may include a configuration management database, and may use an external configuration management database. E.g., the Altiris CMDB product from BMC Software may be used. An API or connector may be used for accessing a configuration management database from the management system.

A symmetric key manager (3561) manages and/or monitors symmetric encryption keys, typically for storage applications and/or file encryption. It may implement, e.g., key rotation. It may also manage asymmetric keys (e.g., private keys for public key encryption). Advantageously, it supports the OASIS KMIP protocol for communication. A symmetric key manager can be part of a management system, and products such as RSA Data Protection Manager from RSA Security may be used. An external key manager may also be used (also for storing various sensitive data of the management system, such data that is too sensitive to store in the management system's primary database or encryption keys used for encrypting sensitive data in the database).

A KMIP protocol implementation (3562) may be used for communicating with a symmetric key manager (3561). The protocol also supports asymmetric keys and certificates, and can in some embodiments also be used for managing them. A KMIP protocol implementation may be connected to the symmetric key manager, but may also be connected to and be used for communicating with, e.g., managed hosts.

A dashboard (3563) is a part of the user interface and therefore connected to it. It provides a summary display of the status of the managed environment. The term "dashboard" may refer to both something displayed in a user interface and the code implementing the display.

In an embodiment, a management system provides a dashboard display in a user interface illustrating progress of key remediation, displaying (e.g., as bar charts, pie charts, or numeric values) measures of one or more of:

- on what fraction of hosts in the environment the management system has been deployed;
- on what fraction of hosts in the environment SSH user key discovery has been performed;
- on what fraction of hosts it has been determined which authorized keys or identity keys are actually in use;
- what fraction of identity keys are actually in use;
- what fraction of authorization keys are actually in use;
- what fraction of authorized keys grant access to a root account;
- what fraction of identity keys grant access to a root account;
- what fraction of authorized keys grant access to a privileged account (e.g., root or other account having higher than normal privileges, including those having, e.g., direct access to database files);
- what fraction of identity keys grant access to a privileged account;
- what fraction of authorized keys restrict the command(s) that can be performed using the key;
- for what fraction of authorized keys has the system been able to determine what command(s) they are used with;
- what fraction of authorized keys restrict the IP addresses from which they can be used;
- what fraction of identity keys are protected by a passphrase;
- what fraction of identity keys are protected by a passphrase known to the management system;
- what fraction of identity keys are protected by a passphrase not known to the management system;
- what fraction of passphrase-protected identity keys does the management system know the passphrase for;
- what fraction of servers in a group of servers can be accessed using keys, possibly excluding certain keys;
- what fraction of user accounts can add new authorized keys for themselves;
- the user that they grant access to;
- what fraction of identity key files are in NFS directories;
- what fraction of trust relationships have no approval recorded;
- what fraction of trust relationships do not have a purpose recorded for them;
- what fraction of trust relationships are not associated with an application;
- what fraction of Kerberos PKINIT keys have not been rotated in an amount of time (e.g., last 90 days);
- what fraction of Kerberos cached tickets have not been rotated in an amount of time (e.g., last 90 days);
- what fraction of Kerberos host secrets (host keys) have not been rotated a given amount of time (e.g., last 90 days);
- what fraction of keys have not been rotated in an amount of time (e.g., last 90 days); and
- what fraction of trust relationship cross a configured boundary (and optionally, have not been approved to cross the boundary).

The dashboard implementing code may query the information from a database and format it into HTML for display.

Instead of fractions absolute numbers may also be reported. Trust relationships may be based on keys (referring to identity key, authorized key, or both), but other kinds of trust relationships can also be used. Any report may also be generated for a subset of hosts, users, or keys, as the case may be (for example, only for those granting access to a privileged account or a functional account). Any report for something having happened/been done may equivalently be for that something not having happened/been done.

In an embodiment, the dashboard or a report shows the distribution of trust relationship types (e.g., what fraction of trust relationships are key-based, what are certificate-based, what are Kerberos-based, and what are something else).

FIG. 36 illustrates components of a deployment tool (3600) in an embodiment. Not all of the illustrated components are present in all embodiments. Each of the components may be implemented, e.g., as software, script, digital logic, or one or more computers on a network.

A password-based deployer (3601) deploys management on a host using a provided user name and password. It logs into an account at the host using a suitable protocol, such as SSH or RDP (Remote Desktop Protocol).

An SSH key based deployer (3602) deploys management on a host using a preconfigured authorized key and the SSH protocol, using a provided private key (or a private key internal to the management system for which the corresponding public key was preconfigured as the authorized key; the management system may, e.g., offer it for downloading). The SSH key based deployer logs into an account using a provided user name and the private key using the SSH protocol.

A scripted deployer (3603) uses a script that configures a host for use with a management system. Advantageously, the script can be downloaded from the management system, but it may also be separately available and may have configurable sections for, e.g., an IP address or host name for the management system. The script may be run on one or more hosts using, e.g., PowerBroker, using a suitable user account.

An account creator (3604) configures a user account for use with the management system. The account may be the account used for logging into a host (or on which a deployment script is run), or it may be a new account that is created for use with the management system. The management system may create a new user account for this purpose.

A management credential installer (3605) configures credentials for the selected account such that the management system can log into the account (or when used with an account, so that the host can connect to the management system using those credentials and sufficiently authenticate itself to the management system). Such credentials may comprise, e.g., an authorized key that the management can use in future to log into the account. For an agent, such credentials may include one or more IP addresses for the management system (or its back-ends), one or more SSH host keys for the management system, a user account to log into on the management system, and an identity key to use for authenticating to the management system.

A privilege escalation configurator (3606) configures a privilege escalation tool, e.g., "sudo", on a host to allow the user account used for management to perform certain commands needed for managing keys and other desired aspects of the system, even if the account would not normally be permitted to perform them. It may, e.g., add desired configuration options to the/etc/sudoers file on the host.

A logging configurator (3607) configures a system event logger on the host and/or an SSH server on the host to, e.g., log sufficient information for determining which keys are in use and what commands are executed using them. It may also configure an SSH client or other parts of the system to record which script or program uses an identity key. It may, e.g., modify /etc/ssh/sshd_config to modify the logging level or to enable verbose logging, and may modify/etc/rsyslog-.conf or files in /etc/rsyslogqd.conf to log messages generated by an SSH server in sufficient detail in a suitable file (such as/var/log/sshdlog).

A network scanner (3608) scans IP addresses and ports in an IP address range for SSH servers, web servers, or other applications of interest. It can, e.g., use the "scanssh" tool version 2.1 (open source software) and parse its output. More information on ScanSSH can be found from N. Provos and P. Honeyman: ScanSSH—Scanning the Internet for SSH Servers, 16th USENIX Systems Administration Conference (LISA), December 2001. A deployment tool may periodically rescan various IP address ranges to detect new servers that may have been added.

A host key extractor (3609) extracts a host key from a found SSH server over the network, without logging into the server. (An agentless discovery tool can also extract a host key before or after login.) Basically it begins a key exchange with the SSH server, and obtains the host key from the exchange. The SSH protocol RFCs provide more details of the key exchange.

The host key extractor may also extract host certificates and CAs configured as trusted for host certificates.

An agent (3610) is a software package or program installed on a managed host for bringing it under management. An agent communicates with a management system and optionally translates requests between the management system and the underlying operating system and applications. Some of the code of the agent may be downloaded from a management system as needed (e.g., certain connectors may add code to agents; an agent may provide a scripting interface for this and may accept code added as, e.g., DLLs). An agent may itself connect to a management system (using, e.g., the SSH protocol or the TLS protocol), or it may accept connections from a management system using, e.g., the same protocols, or both.

An initial connection authorizer (3611) generates an ICB (Initial Configuration Block), a file that contains enough information for an agent to connect to a management system. An ICB may comprise, e.g., one or more IP addresses for the management system (e.g., for back-ends), one or more host authentication keys for the management system, a user name and login credential (e.g., password or private key) for authenticating to the management system. An ICB would usually be generated by a management system and downloaded and copied to a managed host, and installed together with a management agent. It may also be embedded in a management agent package. An ICB is usually used by an agent for making an initial connection with a management system; once the initial connection has been made, the agent would typically obtain per-host credentials for future communication with a management system.

An agent may also automatically discover a management system, e.g., by broadcasting a UDP packet to a port that the management system listens on, and waiting for a reply from a management system. Multicast addresses could be used instead of broadcast addresses. The address of a management system may also be configured in DNS (Domain Name System).

A group installer (3612) installs a newly deployed host in one or more host groups on a management system. Advantageously, a group is associated with an ICB or an agentless deployment request (e.g., by having a field in an ICB record in the management system's database indicate the group), and when the host is registered in a management system, a record for it is created in the management system's database, and one or more records are created indicating its membership in the desired group(s).

A non-OS device deployer (3613) deploys management on a non-OS device, such as a router, IPMI port, or other device without a general-purpose operating system and/or command line access. It would typically use a connector via a connector API to communicate with the non-OS device, though direct support could also be built into the management system. It may connect to the host (in this case a non-OS device) using, e.g., SSH or HTTP/S. It may or may not create a new user name and credentials for managing the non-OS device.

FIG. 3'7 illustrates components of a discovery tool (3700) in an embodiment. Not all of the illustrated components are present in all embodiments. Each of the components may be implemented, e.g., as software, script, digital logic, or one or more computers on a network.

An authorized key discoverer (3701) discovers authorized keys. Its operation is illustrated in, e.g., FIGS. 3, 4, 5, 6, 18, 19, and 22.

An identity key discoverer (3702) discovers identity keys. Its operation is illustrated in, e.g., FIGS. 3, 4, 5, 6, and 22.

An SSH version discoverer (3703) discovers what SSH versions are installed on a host. In an embodiment, it connects to an SSH port (typically TCP port 22) on a host, and reads the version string from the port. In another embodiment, it runs an SSH client (e.g., /usr/bin/ssh) or SSH server (e.g., /usr/sbin/sshd) with the -V command line option on a managed host and parses the output (a management system may send a request to run the command to a managed host). Its operation is also illustrated in, e.g., FIGS. 3, 4, 5, 6, and 18.

A user information source discoverer (3704) discovers user information sources used on a managed host. Its operation is illustrated in, e.g., FIGS. 3, 4, 5, 6, 23, and 28.

A user account discoverer (3705) discovers user accounts (user names and other related information) for one or more users. User account discovery may be run on one or more managed hosts (by sending them requests from the management system and parsing the responses) and/or from the management system. For example, user accounts defined in user account sources such as Active Directory, LDAP, or NIS may be advantageously discovered by reading information from the user information source by the management system and sharing the information for hosts that use the same user information source with the same configuration options. The operation of a user account discoverer is illustrated in, e.g., FIGS. 3, 4, 5, 6, 24, and 27.

A configuration reader (3706) finds and reads configuration files from a managed host. It may read system configuration files, user-specific configuration files, and/or application-specific configuration files. Its operation is illustrated in, e.g., FIGS. 3, 4, 5, 6, 26, and 28.

A configuration parser (3707) parses configuration files read by a configuration reader. It may operate on a management system (e.g., in a back-end), on a managed host, or split between the two (e.g., doing preliminary parsing or format conversion using commands or, e.g., "awk" scripts on the managed host).

A Kerberos discoverer (3708) finds and/or parses Kerberos configuration files and/or uses Kerberos commands (e.g., "klist" or "kadmin") to obtain information about KDCs, realms, tickets, principals, and/or other Kerberos-related data from a managed host. Its operation is illustrated in, e.g., FIGS. 3, 4, 5, 6, and 44.

An Active Directory discoverer (3709) determines used Active Directory servers, domains, principals, and/or other information from a managed host. It may be the same as a Kerberos discoverer. Its operation is illustrated in, e.g., FIGS. 3, 4, 5, 6, and 44.

An application discoverer (3710) discovers applications installed on a managed host. It may, e.g., use the "rpm" or "dpkg" commands on Linux to list installed applications and their versions or read the Windows registry (e.g., under "HKEY_LOCAL_MACHINE\SOFTWARE\Microsoft\Windows\" "CurrentVersion\Uninstall") and parse their output. Aspects of its operation are illustrated in, e.g., FIGS. 3, 4, 5, and 6.

An application-specific discoverer (3711) discovers application-specific configuration files, keys, certificates, credentials, or other information of interest. Various plugins or add-on modules (such as PAM modules) may also be supported by application-specific discoverers.

For example, a discoverer for the Apache web server specific discoverer could read files in "/etc/apache2/sites-enabled" directory and parse them for SSLCertificateFile and SSLCertificateKeyFile options.

An SSH-specific discoverer could read SSH client or server configuration files to determine location of identity keys, authorized keys, and host keys, and do related discovery.

Various application-specific discoverers are also illustrated in, e.g., FIGS. 3, 4, 5, 6, 28, 43, 44, and 45.

A certificate discoverer (3712) discovers certificates, CA certificates, and private keys corresponding to installed certificates from a managed host. It may discover information from system-wide configurations, application-specific configurations, and per-user configurations.

For example, it may read SSH server configuration files to parse TrustedUserCAKeys, HostCertificate, and HostKey options.

As another example, in response to detecting a Postfix mail server on a managed host, a certificate discoverer may read the "/etc/postfix/main.cf" configuration file and parse the smtp_tls_CApath, smtpd_tls_cert_file, and smtpd_tls_key_file configuration options.

As a further example, a certificate discoverer may find all files on a host with a name ending in ".pem", try to parse the file as a certificate, and if successful, discover the file as a certificate. It may also similarly discover PEM (Privacy Enhanced Mail) format private keys, which often have a ".prv" name or are stored in the same directory as a certificate file. Such files are easily recognized from their content, which typically starts with a line "-----BEGIN RSA PRIVATE KEY-----" or something similar (depending on the used algorithms). Private keys can be easily matched with certificates by parsing a private key, computing a public key from the private key, and checking which certificate(s) have the same public key.

A certificate discoverer may also scan the entire file system on a host to determine if any file could be parsed as a certificate or a private key. A certificate discoverer may also read the Windows registry and discover certificates from known locations containing certificates. It may also scan the entire Windows registry for objects that can be parsed as certificates or private keys or file names that point to files that can be so parsed.

Operation of a certificate discoverer is illustrated in, e.g., FIGS. 3, 4, 5, 6, 25, and 43.

A TPM discoverer (3713) determines whether a managed host has a TPM (Trusted Platform Module) installed. It may also discover what keys are available through the trusted platform module. On Linux, it may use programs from the "tpm-tools" package (e.g., tpm_version). On Windows, it may use the TPM Base Services (TBS) API.

A non-key trust relationship discoverer (3714) discovers non-key-based trust relationships. It reads, e.g., ".shosts" and ".rhosts" files, Kerberos configuration files, authorized principal names and trusted certificates as configured in SSH server and client configuration files, etc.

In an embodiment, trust relationships based on host-based authentication in the SSH protocol are discovered. In OpenSSH, for example, such authentication is typically configured using ".shosts", ".rhosts", and/or "hosts.equiv" files. (Host-based authentication may also need to be enabled in the SSH server and/or client configuration files.)

Host-based authentication may comprise the following parts:
 authenticating the client host to the server using its host key;
 client telling server what is the name of the user on the client side; and
 server checking whether that user on that client host is authorized to connect to the requested account on the server side.

Authenticating the client host and the client telling the server the name of the user may be accomplished as described in the SSH protocol standards.

The server generally checks whether the user is authorized by reading the .shosts, .rhosts, and hosts.equiv files from the user's home directory, as well as checking/etc/hosts.equiv files (use of the hosts.equiv mechanism is quite rare nowadays for security reasons). The formats of these files are well known and documented in Unix/Linux manual pages. Basically, the .shosts and .rhosts files list host name—user name pairs that are permitted to log into that account without a password. On some systems some of these files (particularly hosts.equiv) may be stored in NIS (Network Information Service), and may reference netgroups and user groups, frequently also stored in NIS.

In an embodiment, the management system reads, in addition to public and private key files, the .shosts and/or .rhosts files (and possibly hosts.equiv and/etc/hosts.equiv and other files that may be used for configuring host-based authentication). The management system then parses these files (expanding netgroups and user groups as appropriate), and creates non-key-based trust relationship records in its database identifying which users on which hosts are authorized to log as which users on which hosts. While known file formats for host-based authentication do not permit configuration of forced commands to or other constraints on what may be done with the login, if a mechanism supports them, they could be parsed here as well and stored with the trust relationship.

In an embodiment, the SSH client and server support host-based authentication using a trusted intermediary (such as a Kerberos or Active Directory server) to prove the client host's and client user's identities to the server. In an embodiment, the client-side user has logged in (to the client host) using Kerberos (or Active Directory, which uses Kerberos underneath). The SSH client on the client host obtains a ticket (or tickets) from the Kerberos server for authenticating the client-side user and the client-side host to the server host. The SSH client connects the server host (before or after obtaining said ticket(s)) and as part of a specialized authentication mechanism, sends said Kerberos ticket(s) to the server (and identifies the user account to log in as). The SSH server then validates said Kerberos ticket(s). If the validation is successful, the server then checks whether login should be permitted. This check may be performed similarly as for host-based authentication.

In an embodiment, a management system detects trust relationships based on such host-based authentication using a trusted intermediary. The process is very similar to the process for normal host-based authentication (configuration options may be slightly different). Additionally, in an embodiment, the management system may read the configuration for the trusted intermediary, and validates that both client and server trust the same intermediary.

In an embodiment, the SSH server supports managing host-based authentications centrally (this can be used both with traditional host-based authentication and with host-based authentication using a trusted intermediary, such as Kerberos or Active Directory).

In an embodiment, a central directory (which may be, e.g., the Active Directory or an LDAP directory) contains records identifying which client-side users on which client-side hosts are allowed to log into which accounts on which servers. The SSH server may read this information from the directory (preferably just for the current server host and the server user for which the login is attempted), and check the attempted login against the configured trust relationships.

In an embodiment, the SSH server queries the directory (or central server) for the exact four-tuple (client host, client user, server host, server user) to determine whether it is permitted. In another embodiment, it sends this tuple to a server using a specialized protocol, to which the server responds "yes" or "no" in a suitable protocol (the protocol could use, e.g., simple XML-encoded request tuples sent over HTTP over SSL).

The connection between the SSH server (server host) and the directory (or central server) should be cryptographically protected or the requests and responses properly signed and protected against replay and man-in-the-middle attacks. One option is to use properly authenticated SSL (or TLS or IPSec) protocol. Another option is to use XMLSEC on request/response level.

The configuration for an SSH server may also reference host groups and user groups. Such groups could be expanded into the directory, so that simple queries using host names and user names would find all combinations. However, such expansions can sometimes be large. To avoid this, the SSH server may read the full configuration for that server (if host groups for the destination server are expanded) or the whole configuration overall.

If a specialized centralized server is used, the server may store the data structures in any way it likes (e.g., linking hosts to host groups) and can perform the permission checks very efficiently, as should be easily implementable by one skilled in the art.

In an embodiment, the centralized server or the permission rule also contains additional constraints on the connection, such as the commands that may be executed.

In an embodiment, the centralized server periodically (e.g., every five minutes) sends a local copy of the permission rules to one or more managed servers (in each case preferably just a copy of those rules affecting the server to which it is sent—this generally implies expansion of host groups for the destination server). The local copy could also be requested by the SSH server whenever a new connection is attempted and the cached copy is more than a predefined amount of time old (e.g., five minutes). The cached local copy has the benefit that logins may continue even if the centralized server is inaccessible. (However, the trusted intermediary, e.g., Kerberos or Active Directory server would still need to be active for logins to operate in this approach.)

The centralized server storing the permission rules may be an Active Directory server, or it may be a separate server.

In an embodiment, the management system provides discovery of trust relationships configured in a centralized server. In an embodiment, the management system determines that a centralized server is in use based on identification of the SSH server version in use. In another embodiment, the management system identifies the use of a centralized server from the SSH server's configuration file. In yet another embodiment, the management system determines from its own database that the SSH server is configured to use a centralized server. The management system then optionally determines which centralized server is used, and connects to the centralized server and requests the configured trust relationships from that server. If the centralized server is part of the same management system, the information may also be read directly from the management system's database. Otherwise certain credentials may be configured in the management system to authorize reading trust relationships from the centralized server.

In an embodiment, a management system provides a means for configuring trust relationships in the centralized server. In an embodiment, an API is provided for adding or removing trust relationships on the centralized server. Such updates may trigger distributing the trust relationships to managed clients.

One problem in Kerberos or Active Directory based authentication for non-interactive accounts is obtaining the initial ticket granting ticket for the non-interactive account, as no interactive user is present to supply a password. In an embodiment, a ticket granting ticket is obtained (caused to be obtained) by the management system and installed for use by a non-interactive account.

In an embodiment, each non-interactive account is configured with a private key that can be used for obtaining a ticket-granting ticket from a Kerberos server or Active Directory using the Kerberos PKINIT exchange (RFC 4556, Public Key Cryptography for Initial Authentication in Kerberos (PKINIT), Internet Engineering Task Force, June 2006).

Private keys used for PKINIT are important for security—in fact, they are more powerful than any identity key configured for that same user account and used for normal public key authentication can be, because a key used for PKINIT for a user account can be used to obtain a ticket granting ticket for that user account, which can be used for authenticating any trust relationship from that user account. Therefore, the key should be carefully protected.

In an embodiment, the private key used for PKINIT is protected (encrypted) by a passphrase. The problem then becomes how to protect the passphrase. In an embodiment, the passphrase is protected in the same way as the passphrases for private keys used for public key authentication above. In another embodiment, the passphrase is actually stored in a KMIP server or secure vault, and obtained similarly to how obtaining private key for public key authentication was described above.

A further issue is rotating the private key used for PKINIT. Since this key is important for security, it is usually important to protect it appropriately.

In an embodiment, a host can have multiple configured private keys for PKINIT. In an embodiment, it will attempt these keys in sequence, until one works.

In an embodiment, the management system is configured to discover the key used for PKINIT. It may discover this key by reading configuration files. Alternatively, the management system may permit configuring the path of this file (the same path would presumably be used for all hosts in an organization, or at least in certain host groups—though nothing prevents configuring it per-host). The management system then checks this key, and if it exists (or if any of the keys exist, if multiple keys may be present), and obtains public keys or fingerprints corresponding to the PKINIT private key(s) and copies the public keys or fingerprints to the management system's database. The key can then be shown in the management system's user interface and included in reports. A separate private key may be present for each non-interactive account that uses Kerberos-based trust relationships.

In an embodiment, the private key used for PKINIT is rotated as follows (not all of the steps are necessarily present in a particular embodiment):
- cause the managed host to generate a new key pair (possibly with a passphrase generated by the management system, similar to rotating user keys with passphrase) for the relevant user account and host;
- acid the new key (the corresponding public key or fingerprint) in the management system's database;
- configure the new private key as available for use with PKINIT;
- configure the Kerberos server or Active Directory to accept the new key for PKINIT for the user account;
- remove the old key used for PKINIT from the Kerberos or Active Directory server for the user account; and
- remove the old private key (and public key) from the user account on the relevant host(s), deconfiguring the key if needed.

Other suitable servers may also be used and configured instead of Kerberos or Active Directory (in some cases the configuration may be just updating the management system's database).

In an embodiment, the key used for PKINIT is shared between more than one host to authenticate the user (this can be useful if the key is, e.g., stored in a network file system). In that case the update only needs to be done once for these hosts.

In an embodiment, the key used for PKINIT is stored in a local file system (possibly in a directory only readable and/or writable by root or a special management account). In such an embodiment, the key would typically be distributed separately to all such hosts. In an embodiment, each such host would use a different key, and each of these keys would be configured as authorized for PKINIT for the user.

FIG. 38 illustrates data flow in a key usage analyzer (3801) in an embodiment. A key usage analyzer may use a database (3802) to store data (and may in fact read its data from the database if it is stored in the database by other tools or by components of a key usage analyzer).

A key usage analyzer may process already available data (from files, database, or network connections), or may use various management system components to obtain the data as needed.

User account information (3803) provides information to the analyzer about user accounts configured in the environment (different managed hosts may have different user accounts configured). User group information, host information, and host group information may also be provided.

Discovered authorized keys (3804) provide information about authorized keys installed on various managed hosts (advantageously also identifying the host(s) and user account(s) for which they are authorized in each case). Identity key information may also be provided.

Syslog data (3805) provides information from a system log or event log. Such data may be collected from syslog log files on one or more managed hosts and/or one or more centralized log collection hosts and/or from one or more SIEM (Security Incident and Event Management) systems (e.g., Splunk). The data may be in original format or may have been preprocessed into a different format, possibly combining information from multiple log records in the processing into more easily parseable format.

Key access time data (3806) provides information about when authorized keys and/or identity keys have last been accessed (on Unix/Linux, this would advantageously return the last access time, which can be determined using the "stat" system call or a command such as "ls -lu file"). The "stat" function can also be used on Windows and many other operating systems.

External key data (3807) is an output provided by the analyzer and indicates which keys are used with hosts outside the managed environment.

Configuration (3808) represents configuration data for the key usage analyzer, as well as any configuration data obtained from managed hosts that may be used in the analysis.

Key usage data (3809) is an output provided by the analyzer and describes how certain keys are used. For identity keys it may identify the script or program that uses the key to connect to a server. For authorized keys it may identify one or more commands that are executed on a server host using that key, and may also identify one or more IP addresses from which the key is used. Which user accounts and which hosts use them can be recorded (this information can be found from log data on the server, and in most cases each identity key is stored on just one user account on a source host; it may not be possible to determine the source account if it is stored on more than one account, unless the SSH client implementation on the source host logs the user name and identification of the key used).

Unused key data (3810) is an output provided by the analyzer and identifies certain keys that were likely not used according to the available data (if the data is comprehensive for a period of time, that likely means the keys were not used during that period in the managed environment). It may identify both identity keys that have not been used and authorized keys that have not been used.

The analyzer may also produce other outputs and may combine several outputs into one output. Output data may also be stored in the database. Output data may also be further analyzed to trigger alerts and used in reports, and the analysis process itself may trigger alerts if it detects certain conditions. Not all output items are necessarily produced with full confidence; some items may be marked with varying degrees of uncertainty.

The analyzer may also provide outputs or reports, such as a report of keys that are used to execute a shell or that are used to execute commands that are not on a list of approved commands. Such keys might be more likely to be used as backdoors, and could be reported in backdoor analyses or insider threat analyses. They could also be reported by an audit tool.

FIG. 39 illustrates protecting keys for an account (3900) in an embodiment, by moving keys from users' home directories to system directories that cannot be modified by ordinary users (and in particular, not by the user to which the keys provide authorized access, unless the user is a root user or other privileged user).

Advantageously, the management system determines for each user whether authorized keys are stored in a directory where the user can add (or remove) authorized keys. This information may be recorded in the management system's database on a per-user or per-key basis (for authorized keys and/or for identity keys). The management system advantageously also provides a display showing the number of users that can add new authorized keys for themselves (optionally excluding root users and certain other special users), whether as a numeric value or other indication such as a bar chart or pie chart.

Advantageously, the management system provides a means for automatically moving authorized keys from user's home directories to system owned directories. Such system owned directories could mean root-owned directories or directories owned by (or writable only to) one or more special users, such as the account used for managing SSH keys on the managed host.

Moving keys away from the users' home directories advantageously includes:
creating the directory where they are to be stored (if one does not already exist) (3901);
moving authorized keys to the desired directory; and
modifying SSH server configuration file to use the authorized keys from that directory.

Additionally, the keys are advantageously removed from the old location. One or more of these steps may be performed outside the management system, and they may be performed by executing a separate tool, such as a script to perform them. They may also be performed by the management system (via a management agent or agentless management or using something like PowerBroker to execute commands on hosts). A "sudo" or equivalent mechanism may be used to perform the operations from a non-privileged account and "su" or equivalent may be used to read key files from user's home directories (particularly when they are not readable as "root").

The directory where the keys are stored may be, e.g., under /etc or /var (say, /etc/ssh/authorizations, with subdirectories for each user). They may also be stored under an account used by the key management system (e.g., "sshmgr/authorizations, with subdirectories for each user).

Moving authorized keys to the desired directory is advantageously performed by copying them to the directory (3902) (advantageously without actually removing the original authorized keys until the SSH server configuration has been changed). A subdirectory may need to be created for the user if one does not already exist (it is also possible to just have a file for each user in the same directory).

The permissions of the new authorized keys file(s) may be set so that ordinary users cannot modify them (in particular, it is advantageous to prevent a user account from modifying its own authorized keys, so that no keys can be added that could leave backdoors into the account).

Modifying the SSH configuration may be delayed until keys for all users on that host have been moved (or copied) to the new locations (it may also be delayed until this has been done on all hosts or a group of hosts).

With OpenSSH, the value of the AuthorizedKeysFile option may be modified from the /etc/ssh/sshd_config configuration file (and the option added if it does not exist in the file). The new value could be, e.g., "/etc/ssh/authorizations/%u/authorized_keys" (3904).

The SSH server may be caused to reload its configuration file, e.g., by running something like "/etc/init.d/sshd restart" or sending a SIGHUP signal to "sshd" (e.g., "kill -1 'cat /var/run/sshd'") (3904). On Windows, the SSH server service may be stopped and then restarted.

When key files are moved (and the server restarted or reloaded), it may be desirable to update their locations (file paths) in the management system's database so that the keys are not reported as having disappeared and appeared without approval by continuous monitoring.

Authorized keys are advantageously removed from their original location after the server has been made to reload its configuration (3905).

In an embodiment, a management system moves identity keys away from a user's home directory (in particular, away from an NFS directory). In an embodiment, the management system copies the private key files for identity keys to a directory such as /etc/ssh/authorizations/username/identities, and leaves symbolic links to the private keys in the ".ssh" directory in the user's home directory (3903), and removes the identity keys from the old location (3906).

In an embodiment, a management system causes the managed hosts to move authorized keys and/or identity keys to a non-NFS directory. Essentially the same mechanism can be moved for moving authorized keys away from NFS file systems, providing a non-NFS directory for the new location of the keys.

In an embodiment, a management system moves an "authorized principals" file and/or a "trusted user CA keys" file away from a user's home directory. In this case, the AuthorizedPrincipalsFile option and/or TrustedUserCAKeys configuration file options would typically be used.

In an embodiment, a management system moves Kerberos credentials from user's home directory or another insecure directory, such as NFS directory.

In an embodiment, a management system changes or fixes permission settings for an identity key, authorized key, credential, configuration file, or some other object.

In an embodiment, the management system provides for backing up SSH keys and SSH configuration files on a host before starting to manage them. In an embodiment, a script is provided to be run on a managed host (preferably all managed hosts) that iterates over user accounts on the system, and copies ".ssh" and ".ssh2" directories from users' home directories as well as "/etc/ssh" and "/etc/ssh2" to a backup directory that may reside, e.g., in a root-owned location on the local computer).

The script may use "sudo" or some other privilege escalation command to execute privileged commands if run as non-root, and may use "su" to read each user's home directory using that user's permissions (it may be impossible to read home directories on NFS file systems, depending on system configuration). When using Kerberos, the "ksu" command can conveniently be used instead of "sudo" or "su".

A restore script, may be provided that performs the reverse copying, restoring SSH keys and configurations to what they were at the time of the backup.

FIG. 40 illustrates preventing virus spread (4000) in a managed environment in an embodiment. Certain actions are taken and configuration changes made (or caused to be made) on one or more hosts in the environment that are aimed at reducing the likelihood of a virus spreading from one server to another using automated trust relationships. However, such actions may also serve other purposes.

At (4001), configured command restrictions (or "forced commands") are discovered for one or more authorized keys (or other kinds of trust relationships) for one or more user accounts on one or more managed hosts. This can advantageously utilize a command extractor.

At (4002), actually used commands are determined for one or more authorized keys (or other kinds of trust relationships) based on information collected about the environment (e.g., by a key usage analyzer).

At (4003), command restrictions are added to one or more authorized keys (or other kinds of trust relationships) based on the determined actually used commands or command restrictions configured manually (possibly using templates or rules, such as a rule saying that only a certain command is permitted for a certain user name). Adding command restrictions is advantageously performed by a command restriction enforcer.

At (4004), unused authorized keys (or other kinds of trust relationships) are removed based on information determined by a key usage analyzer, possibly augmented, modified, or approved manually. This is advantageously performed by an unused key remover.

At (4005), one or more reports are generated. Such reports may include reports about keys without command restrictions, reports about commands that specify file transfers but do not restrict which files are transferred (in an embodiment, file transfer restrictions, such as path name pattern or directory limitations, are configured for certain authorized keys and enforced by an SSH server or file transfer application). Generating reports may be implemented by a report generator.

At (4006), virus prevention progress is reported in a user interface by displaying one or more data items indicating overall virus spread prevention progress or progress in various aspects of it. This is advantageously implemented using a dashboard.

FIG. 41 illustrates tracking what each key in an environment is used for (4100) in an embodiment. The general idea is to associate keys in a legacy environment with applications, scripts, or programs that use them or that they relate to. The goal is to provide some structure and understanding to how keys are used and a justification for the existence of each key (though the goal may not be achieved for all keys).

At (4101), trust relations are discovered, advantageously using a discovery tool. In addition to merely discovering SSH keys, trust relationships may be computed from discovered identity keys and corresponding authorized keys.

At (4102), one or more keys are associated with applications. A configuration management database may be used to obtain information about applications that each host is associated with. If a host is associated with an application and the host is a source host or a destination host for a trust relationship, the trust relationship is likely to be associated with that application (a trust relationship may be associated with more than one application). Any identity keys and authorized keys used for configuring the trust relationship may, by implication, also be associated with the application(s).

Source and destination user accounts for a trust relationship may be used to provide a more accurate determination of the application(s), particularly when there are multiple applications running on the same host or when the configuration management database associates user names with applications.

At (4103), key approvals (or trust relationship approvals) are tracked. This primarily applies to trust relationships created after the environment was brought under management, though approvals may also be tracked for legacy trust relationships created earlier. In particular, bringing the environment or part of it into managed state can be seen as a kind of approval for the existing trust relationships.

Advantageously, one or more trust relationships in the management system's database may be associated with an approval. For example, a trust relationship record in the database may comprise a field that identifies a record or ticket in a ticketing system (as seen through a ticketing API—the APT may convert between different identifier formats, and may add, e.g., a component in a ticket identifier that identifies a particular ticketing system (from among the possibly multiple ticketing systems used by a management system).

At (4104), key approvals (or trust relationship approvals) are associated with applications. For example, a ticket may be required to comprise an identifier for an application. This could be very helpful when an application is later removed for finding and removing all trust relationships relating to the application. An application identifier may be stored, e.g., in a field in a trust relationship record in a database.

At (4105), it is determined which program or script and/or what host/user account uses each trust relationship. This can be done using a key usage analyzer.

At (4106), it is recorded in a database which script or program uses each identity key (or trust relationship). This can be done using a key usage analyzer.

At (4107), one or more reports are generated using a report generator. One report may list keys (or trust relationships or associated hosts or users accounts) by applications. Another may list applications by keys (or trust relationships or associated hosts or user accounts). Another report may list who approved each key, or approvals by an approver. Another report may list the calling script (and optionally a host and/or user that it runs on) or application for one or more keys or trust relationships.

At (4108), information about progress in knowing what each key is used for is displayed using a dashboard. The information may be displayed as an overall measure or multiple items, such as the fraction of keys that have been associated with applications and/or the fraction of keys for which the script/program using them is known.

At (4109), one or more legacy keys (or trust relationships) are approved. Advantageously, they are also converted into managed state.

In an embodiment, discovered keys (or trust relationships) are marked in the management system's database as "legacy" keys (or trust relationships).

Legacy keys are distinguished in the management system's database, for example, by having a key state field indicate they are legacy keys. Legacy keys might not be automatically rotated, and might, for example, not be available for automatic removal or certain other automatic management operations. Continuous monitoring might not report them even if no approval exists for them.

A legacy key may be converted to a managed state. One way of performing the conversion is to perform a search for keys (e.g., selecting all keys in a host group, or all keys matching other suitable filtering criteria) and instructing the management system to convert the keys to management state. Typically the status, use, and reason for existence of keys would be evaluated manually or using automated tools before a key is converted to managed state. Such conversion may also be used to create an approval record that serves to explain the existence of a key (such approval records might be, e.g., global, separate for each trust relationship, separate for each private key (regardless where used or for how many trust relationships), or for a group of hosts or keys).

In an embodiment, only keys in managed state are available for automatic rotation.

FIG. 42 illustrates securing an environment against insider threats (4200) in an embodiment.

At (4201), keys may be moved to a protected location. This can be done using a key protector.

At (4202), approvals may be enforced for each key setup. This can be done using an approval tracker. This is also illustrated in, e.g., FIG. 31.

At (4203), key setups and removals may be performed automatically. A ticketing API is used for receiving key setup and removal requests from a ticketing system. The request may be checked to confirm no additional approvals are needed and may be passed to a key installer or key remover for implementation. FIG. 31 also further illustrates the operation in an embodiment. Setup and removal of other kinds of trust relationships can also be automated similarly, as can, e.g., key rotation.

Automating key setup and removal processing may reduce the need for system administrators to have sufficient privileges for installing new keys. For example, root access is needed much less frequently. Reducing the number of administrators with high-level access can reduce the risk for security compromises by malicious insiders.

In an embodiment, when a request to install or remove an authorized key or identity key is received from a change control/approval system (whether implemented as a separate software system or as part of the management system), the request is tagged with a reference to the change control ticket explaining its creation and related approvals. Advantageously, when information about keys is stored and available in the management system, the reference is made available in the user interface, and a means (e.g., an HTML link) is provided for viewing the associated request. In an embodiment, a reporting facility is provided that generates a report showing the approval/change control ticket number authorizing the creation or installation of a key. Alternatively, other information relating to the approval/ticket may be shown, such as the person who approved it or the application that the request relates to.

At (4204), an SSH server or RDP (Remote Desktop Server) or a proxy processing connections to such servers (either in a network or by an agent program or proxy software on the destination server host) may audit and/or record sessions using passwordless logins. A network-based tool can be advantageously used for recording sessions and for performing privileged access management for such connections. The CryptoAuditor product from SSH Communications Security can be used for implementing this functionality.

At (4205), privileged access management may be performed for access to user accounts on a server. Privileged access management may include password vaulting, where actual passwords for privileged accounts are hidden from the system administrators, who are restricted to accessing privileged accounts using a gateway host (also called a bastion host) that records the session and/or provides credentials for accessing a privileged account on a host. Privileged access management may also be performed by a device that is "on the wire" on the network, without requiring changes in the way administrators work or requiring them to change the tools they use. The CryptoAuditor product from SSH Communications Security can be used also for this purpose.

In an embodiment, a privileged access management solution restricts access to a host based on the system administrator having a ticket or change request assigned to himself/herself in a ticketing system and optionally the ticket identifying the host and/or user account and/or an application associated with the host and/or user account. A ticketing APT may be used for obtaining open tickets assigned to the system administrator and checking whether any of them identifies the host.

A system administrator may also be requested to provide an identifier for a ticket, or the ticketing system may provide a link or button that the system administrator can click to open access to a host and/or user account that the ticket relates to. The privileged access management system may require additional authentication before granting access, or may rely on previously performed authentication and use, e.g., single-sign-on technology such as Kerberos or Active Directory to provide authentication to the privileged access management system.

In an embodiment, privileged access management and/or session logging may be required for scripted access to a host, which can be implemented, e.g., on the network (e.g., using the CryptoAuditor) or by using an SSH server which has been modified to record a session by saving at least part of the transmitted data in a file or by sending it to a data collection device.

Performing privileged access management and auditing also for automated access helps to ensure that automated trust relationships cannot be used for creating backdoors that bypass auditing and/or privileged access management systems.

At (4206), the environment may be continuously monitored by a continuous monitor. Authorized keys that are added outside the management system may be detected, and alerts about such keys may be generated. This may be used to detect, e.g., an authorized key added by a root account in an attempt to create a backdoor into a host.

FIG. 43 illustrates managing certificates (4300) on one or more managed hosts in an environment.

Applications that potentially use certificates may be discovered using an agent program to communicate with a managed host (4301). Advantageously, one or more applications that may potentially use certificates are identified on a managed host. Operation using an agent is further illustrated in, e.g., FIGS. 3, 4, and 5.

Discovery of certificates using an agent (4302) may be implemented using a certificate discoverer communicating with an agent program on the managed host.

Communication with a managed host can advantageously be performed without an agent software installed on the managed host. Agentless discovery provides advantages in many environments. It is often difficult to get permissions to install agent software on computers, particularly if the agent program needs to run using "root" or local/domain administrator privileges.

Advantageously, applications are first discovered without using an agent (4303) (e.g., connecting to a host using the SSH protocol, authenticating using supplied user account and credentials, and then sending commands to the host using the SSH protocol and parsing responses). Agentless operation is illustrated in, e.g., FIGS. 3, 4, and 6.

Advantageously, certificate discovery is implemented using a certificate discoverer that operates without using an agent (4304). The certificate discoverer sends commands to the host using the SSH protocol and parses any responses.

Certificate discovery can also be performed without first discovering applications, as illustrated in the exemplary embodiments of a certificate discoverer. Certificate discovery is also illustrated in FIG. 25 and its description.

Advantageously, information about certificates (advantageously including the certificates themselves, applications they are associated with, and file names/paths where they are stored) is sent to the management system by the agent, and upon reception by the management system (e.g., by a back-end), stored in the management system's database.

Advantageously, a non-privileged account is used for the management connection both in the agent-based and in the agentless cases for discovery and certificate management, and a privilege escalator and/or privilege transformer is used for performing commands using the privileges of a different account from the account used for the connection.

At (4305), it is determined that a certificate needs to be renewed. Such determination may be made by a periodically running process that checks the expiration dates of certificates against current time, and determines that renewal is needed if the expiration is less than a configured amount of time (e.g., 90 days) in the future. It may also determine that a renewal is needed if, e.g., a certificate revocation list exists for the certificate, or if one of its CA certificates has been revoked or renewed.

Determining whether a certificate needs to be renewed is an ongoing process that is performed repeatedly (the loop is not shown in the figure for simplicity). The determination generally triggers actions for renewing the certificate and/or generating a new private key and/or generating a certificate request.

A new certificate is normally issued by a certificate authority (several certificate authorities may be used in a managed environment and the authority to use may be selected, e.g., based on an issuer name field in a certificate, configured policy rules for selecting a certificate, or manual selection using a user interface, possibly based on a default certificate authority selection).

Generating a new private key may be performed by, e.g., a managed host (possibly using a TPM or HSM), the management system (e.g., a back-end), a registration authority, or a certificate authority. A registration authority can act as a proxy for certificate requests.

At (4306), the old private key is reused, and a new certificate is requested for the same key.

At (4307), a managed host generates a new private key. The new private key is used for requesting a new certificate.

At (4308), a management system generates a new private key. It may be generated, e.g., by a back-end or a registration authority. Generally, the new private key would need to be communicated to the managed host on which it will be used, or a means will need to be provided for the host to use the key (e.g., by forwarding requests to use the private key to another host using a suitable protocol, such as the protocol used by the "ssh-agent" program).

At (4309), a TPM or an HSM generates a new private key for a managed host. Advantageously, the private key never leaves the hardware module (and cannot be extracted from the module, ensuring it cannot be copied). The TPM or HSM may be connected to the managed host or may be at another host (in which case a means will need to be provided for the host to use the private key).

At (4310), a certificate request is generated and sent to a configured certificate authority or registration authority, possibly through a management system or other intermediate system(s).

A certificate request may be generated for obtaining a new certificate. A certificate request may be generated, e.g., by a managed host, a management system (e.g., a back-end), a registration authority, or internally by a certificate authority. A certificate request may be formatted, e.g., as specified in RFC2511, Internet X.509 Certificate Request Message Format, Internet Engineering Task Force, March 1999, as an HTML form submitted to a certificate authority or registration authority, or in some other applicable format.

A certificate request is generally sent to a certificate authority or a registration authority (which would typically pass it on to a certificate authority, possibly after modifications, including possibly selecting the certificate authority to use). It may be sent by, e.g., a managed host or a management system (e.g., a back-end).

At (4311), a certificate is received by a managed host from a certificate authority (possibly through a management system, registration authority, and/or one or more other intermediaries), and the certificate is installed.

A new certificate may be installed so that it replaces the old certificate. The corresponding private key may be replaced at the same time. Alternatively, the new key and certificate may be installed using new file names and one or more configuration files may be modified to cause an application to use the key and certificate from the new files.

Installation may also involve, e.g., storing the certificate in a Windows registry, modifying a configuration file to edit a certificate or private key object in the file, using a command-line operation to cause an application to start using the new certificate or private key, or, e.g., running a graphical application on the managed host and controlling the application by sending suitable events and/or messages to it to cause it to start using the new certificate and/or private key (a new private key and certificate request may also be generated similarly in some cases).

One or more application programs may also be restarted or caused to reload their configurations (including certificates) so that new keys and/or certificates are taken into use. For example, in the case of an Apache web server, the command "/etc/init.d/apache2 restart" might be used (the exact commands or operations are application-specific and may be configured in, e.g., a configuration file or using a script).

FIG. 44 illustrates managing Kerberos credentials and/or principals in an embodiment. The credentials may belong to any kind of principals, including but not limited to host principals, user principals, and application principals. Active Directory uses the Kerberos protocol for various operations, and what is described as managing Kerberos principals and/or credentials also applies to managing Active Directory principals and/or credentials.

Credentials may be, e.g., passwords, private keys (for the PKINIT method), or cached tickets.

Management of Kerberos principals may be performed at one or more managed hosts that are in a Kerberos realm (or Active Directory domain) or may be performed by a management system (particularly if it is a member of the realm (or domain) and has been configured with a principal and credentials with sufficient rights to manage credentials for other principals. In an embodiment such a principal name is of the format "username/admin@realm".

In an embodiment, one or more credentials used for authenticating one or more principals into a Kerberos KDC or Active Directory is rotated. In an embodiment, such rotation comprises:
- discovering configurations and an authentication credential for a first Kerberos principal (4401);
- determining that the authentication credential needs to be rotated (4402);
- generating a new authentication credential (4403);
- arranging to try both the old and new credential if the managed host is rebooted; this may, e.g., install a script to be run at boot (by putting it in, e.g., /etc/rc3.d on Linux) that tries both credentials and leaves the one that works (though in some embodiments the credential may just be installed in the hope that no errors occur) (4403);
- using an existing authentication credential for the first Kerberos principal to configure the new authentication credential as an authorized credential for the first Kerberos principal (alternatively, an authentication credential for a second Kerberos principal authorized to configure authorization credentials for the first Kerberos principal may be used) (4405); and
- causing the first Kerberos principal to use the new authentication credential for authentication (e.g., replacing the original credential and removing the mentioned script) (4406).

Advantageously, configuring the credential comprises communicating with a Key Distribution Center (KDC) (which may be an Active Directory Server). The communication with the KDC may take place from the host having the principal or from a host that is part of the management system. The new credential may be generated, e.g., on the management host or on a host where the first Kerberos principal can be used.

If an authentication credential for a Kerberos principal is stored in multiple locations (such as multiple copies of the user's home directory), the new authentication credential is advantageously caused to be used in each such case (e.g., by copying the new authentication credential to each such location and, if necessary, updating Kerberos configuration files to cause the new credential to be used).

Advantageously, the method further comprises discovering the of the first Kerberos principal and determining that it does not represent an actual person. Discovering the first Kerberos principal can advantageously be performed in conjunction with discovering SSH keys, or generally using similar mechanisms for communicating with a managed host or executing scripts, tools or an agent program on a managed host.

The discovery of principals comprises in an embodiment:
- determining whether Kerberos used on a host, and in response to determining that it is used:
  - discovering Kerberos principals and their credentials for the host;
  - for one or more user accounts on the host:
    - discovering Kerberos principals and their credentials for the user account.

Kerberos principals and credentials may be discovered, e.g., by reading a Kerberos "keytab" file. Host principals typically have names of the format "host/hostname@realm", as is known in the art.

The /etc/krb5.conf file is advantageously read from a host during discovery of principals from the host.

The discovery may assume a principal for each user account on a host.

The discovery may also discover principals and credentials used by "ksu", which often have names like "username/root@realm" and may have separate credentials (password) from a normal user account.

The discovery may also discover principals and credentials granting access to the "kadmin" command or equivalent. Such principals often have the format "username/admin@realm", or "/admin@realm".

The location of "keytab" files for Kerberos may vary between organizations. The tool may provide a means (such as a user interface, configuration file, or editable portion of a script) for configuring from which locations to look for keytab files. It may also scan all scripts found on a host for calls to the "kinit" program to locate keytab files. One approach is also to replace the "kinit" program by one that records the locations of all keytabs used (such as a simple shell script wrapper that logs the information in system log), or perform such recording by a shell (command interpreter).

The discovery may also comprise discovering Kerberos principals and credentials for at least one application installed on the host or accessed from the host.

Discovering credentials for a principal may mean just discovering the location of the principals, and may be delayed until the time the credentials actually need to be changed (and sometimes it is not necessary to discover even the actual location of the old credentials at all).

Configuring a new authorization credential to be used for a principal can be performed, e.g., by the "kpasswd" command or the "kadmin" command. Typically one would first authenticate to the KDC using the old authentication credentials (or other credentials used for the configuring), and then invoking the command (or performing comparable library calls or sending suitable protocol packets) to change the credential.

Inter-realm keys for cross-realm authentication may also be discovered and automatically rotated.

On Windows, service principal names are advantageously also discovered and automatically rotated. Service principal names are often of the format "ServiceClass/Host:Port" (port is optional). On Windows, long-term keys (authentication credentials) are stored in the credential store on a domain controller and in the credential cache in the LSA (Local Security Authority). The LSA API can be used to perform operations on the credentials, as known in the art and described in Microsoft Developer Network documentation and other Microsoft documentation. On Windows, several kinds of authentication credentials are used: user keys, service keys, system keys (host keys), and inter-realm keys.

In an embodiment, the management system manages certificates and private keys used for obtaining initial Kerberos tickets for a system account using the PKINIT method in Kerberos (see RFC 4556, Public Key Cryptography for Initial Authentication in Kerberos (PKINIT), Internet Engineering Task Force, June 2006) or some other initial authentication method for Kerberos. Such certificates and/or private keys may be stored on a smartcard or other secure device.

In an embodiment, the management system manages Kerberos certificates both on the end host, on which the certificate is used, as well as on the Kerberos Key Distribution Center (KDC) or Active Directory server to keep them synchronized. In an embodiment, the management system manages other kinds of credentials used for initial authentication in Kerberos, such as passwords or shared secrets, by causing the password or shared secret to be changed in KDC (e.g., by logging into the account normally using the password, issuing the kpasswd command to change the password, and entering old and new passwords), and changing the locally configured password or shared secret used for authentication. In an embodiment, the management system manages contents of cached Kerberos tickets. In one embodiment, the Kerberos credentials (of any type) are managed for functional accounts that are not normally used by people. In one embodiment, the management system creates and/or configures the initial Kerberos credentials for a functional account.

FIG. 45 illustrates managing keys (symmetric keys and/or other kinds of keys used for applications such as storage encryption, backup encryption, file encryption, and e-mail encryption) in an embodiment. Asymmetric keys and shared secrets (e.g., for VPN authentication, using IPSec/IKE pre-shared secret authentication) can also be managed. The actual keys may be symmetric encryption keys or asymmetric keys (e.g., private keys for public key cryptography). The KMIP protocol is frequently used for communicating with hosts for management of symmetric keys and other mentioned keys.

A symmetric key means an encryption key used with an encryption algorithm that uses the same key for encryption and decryption. An asymmetric key means an encryption key or signing key for an encryption or signing algorithm that uses a different key for encryption and decryption, or for signing and verification. Public key cryptosystems use asymmetric keys, usually called a private key and a public key.

At (4501), a key is received from an entity (such as a storage subsystem, backup software, or e-mail server) using, e.g., the KMIP protocol.

At (4502), the key is saved in a management system's database.

At (4503), a key is sent to an entity in response to a request for the key supported by proper authentication that shows the end entity is authorized to access the key.

At (4504), an entity is caused to change a key it uses. This can be used for key rotation.

At (4505), a new key is saved in the management system's database. This can be used for key rotation.

FIG. 46 illustrates determining who can access what (hosts, user accounts, data, networks, or other resources) in an embodiment.

At (4601), SSH host user keys are discovered using a discovery tool, e.g., an authorized key discoverer and/or identity key discoverer.

At (4602), other kinds of trust relationships are discovered using a discovery tool, e.g., a non-key trust relationship discoverer.

At (4603), generic Kerberos access and hosts.equiv or shosts.equiv based access is discovered. Generic Kerberos access here means that an account on a source host can automatically log into the same account on a destination host if they belong to the same realm. This is in practice a very common configuration when using Kerberos with OpenSSH. Host equivalence based access works in a similar way.

In both cases, a trust relationship is implied from every user account on every host in a realm to every other host in the same realm having the same account (having the same account name on the source and destination realms). For host equivalence, a trust relationship is implied between hosts configured as equivalent. (Host equivalence specifications sometimes use NIS netgroups to specify a large number of hosts.) Generally, these trust relationships have the same user account name at both the source host and the destination host, but it is also possible in some cases to have a different mapping to a user name (or user id) configured on different hosts, in which case the account names at the source and destination ends may be different as long as they refer to the same account (or identity) in the directory. The accounts may be interactive user accounts or functional accounts.

The number of trust relationships detected in this manner may become very large, and the set may be dynamic (e.g., changes whenever new user accounts are added), and thus it may be advantageous to add such trust relations dynamically whenever a report or display is generated, or transitive closure computed, rather than storing them in explicitly in a database (though that is also a possibility).

At (4604), it is discovered which user accounts can escalate privileges using, e.g., "sudo" or PowerBroker (see the description of a privilege escalator and a privilege transformer). If a user account can escalate privileges to those of another user account, the user may be able to use identity keys of that other user account (and authorized keys of that user provide access to that other account, at least if no further authentication is needed for the privilege escalation).

In an embodiment, new trust relationships may be dynamically generated or stored in the management system's database based on such privilege escalation possibilities. If privileges of a first account can be escalated or transformed to those of a second account, for any trust relationship where the first account is the destination account another trust relationship is added where the second account is the destination account. Also, for any trust relationship where the second account is the source account, another trust relationship is added where the first account is the source account.

If the second account further provides privilege escalation or transformation to a third account, the third account needs to be handled similarly (possibly recursively to any depth—which implies that a known infinite recursion prevention technique may need to be used).

Alternatively, new trust relationships may be created for each privilege escalation or transformation possibility, and access using trust relationships can be handled when considering transitive reachability.

At (4607), transitive reachability using trust relationships is computed (advantageously, using all kinds of discovered trust relationships, including those generated dynamically or based on privilege escalation). In an embodiment, the trust relationships are enumerated, and then a transitive closure computation algorithm is used to determine the transitive reachability, using the trust relationships as links and user account-host combinations as nodes.

The transitive reachability graph may be stored in the management system's database.

At (4608), one or more reports are generated based on the computed transitive reachability information. One possible report may display which accounts and/or hosts can be reached from each account and/or host. Another report may show who can access what accounts/hosts. A third report may show who can access root accounts or privileged accounts. Such reports may be generated by performing SQL queries to the management system's database and formatting the results.

At (4609), an alert is generated in response to a trust relationship (or transitive chain of trust relationships) crossing a configured boundary that trust relationships should not cross, unless the trust relationship has been approved or accepted as crossing the boundary. Reports could also be generated of such trust relationships. Such alerts and reports can be used for, e.g., enforcing security boundaries and "chinese walls" in banks.

At (4610), configured security policy is enforced. A security policy may, e.g., restrict permitted algorithms and key sizes or trust relationship configuration methods. It may also, e.g., state that trust relationships between functional accounts and normal user accounts are not permitted, or that access from development to production systems is not permitted unless a trust relationship has been duely approved or accepted. Reports and alerts may also be generated about or in response to violations.

FIG. 47 illustrates continuous monitoring (4700) in an embodiment. Continuous monitoring is an ongoing process, involving performing certain operations on a regular basis (e.g., once per hour or once per day). Monitoring operations may also be triggered by, e.g., an agent detecting that some monitored object on a managed host has changed.

At (4701), trust relationships are discovered (or re-discovered). This is advantageously done using a discovery tool (possibly modified to perform one or more of the other operations indicated here during discovery as new, removed or changed keys, trust relationships, certificates, credentials, configurations, or other managed objects are detected).

At (4702), newly discovered keys, trust relationships, certificates, credentials, configurations, or other managed objects are compared against previously discovered ones. Changes that are due to approved requests are filtered out (the database contents could also be changed to match the new state when such requests are processed, in which case they need not be filtered out here).

At (4703), it is determined if any new policy violations have been detected with respect to a configured policy. This may also, e.g., detect certificates that are too close to expiration or already past expiration.

At (4704), it is determined whether new trust relationships crossing configured boundaries have been detected.

At (4705), it is determined whether any keys, trust relationships, certificates, credentials, or other objects have not been used for an amount of time, such as 90 days. Access times may be used for detecting use for objects whose use cannot be determined based on log data. A key use monitor may be used for this.

At (4706), it is determined whether one or more managed hosts have been decommissioned. A decommissioning analyzer can be used for this.

At (4707), it is determined whether any applications have been decommissioned. One way to detect a decommissioned application is to detect that the application is no longer installed on a host.

At (4708), one or more reports are generated. Any of the aspects detected above may be included in a report. For example, a daily abnormality report might be generated that includes detected issues.

At (4709), one or more alerts are generated. Any of the aspects detected above may be configured to generate an alert.

In an embodiment, a management system generates alerts or notifications about unauthorized changes to public keys or private keys on managed hosts (an unauthorized change is basically a change made outside the management system and detected when key discovery is performed the next time, e.g., once per day). Once a host is in a state where it is managed by the management system, when a new authorized public key is detected on the host, or a new identity private key appears, or an authorized key or identity key changes, or constraints associated with an authorized key are detected to have been changed, a notification or alert is generated.

Alerts may also be generated when an SSH configuration file changes (either a global client or server configuration file, or a per-user configuration file). An alert may be, e.g., a message logged to syslog, an e-mail sent to a configured address, an SNMP trap that is sent to a monitoring system, or a command (program) that is run.

In an embodiment, the management system continuously monitors the environment, e.g., by repeatedly determining what authorized keys, identity keys, and/or other trust relationships exist in the environment, and reporting or generating alerts from any trust relationships that have not been expressly approved (e.g, by an approved request in a ticketing system, or by separate approval of legacy trust relationship that existed before a formal approval system was taken into use or before such continuous monitoring was started).

Advantageously, the management system records information about approved trust relationships in a database, and uses the database for determining whether a discovered trust relationship has been approved.

Advantageously, a ticketing API query is used to query a ticketing or approval system whether a discovered trust relationship has been approved (the trust relationship possibly represented by a key used for implementing it, possibly in combination with the user account and host identities associated with it).

FIG. 48 illustrates converting trust relationships (4800) from one kind to another in an embodiment.

At (4801), existing trust relationships are discovered.

At (4802), a new kind of trust relationship is selected for one or more of the trust relationships.

At (4803), a trust relationship is converted to a trust relationship using host-based authentication.

At (4804), a trust relationship is converted to a trust relationship using public key authentication.

At (4805), a trust relationship is converted to a trust relationship based on using an intermediary.

At (4806), a trust relationship is converted to use Kerberos or Active Directory.

In an embodiment, a trust relationship is converted by removing the old trust relationship (of the old kind) and setting up a new trust relationship (of the new kind but otherwise same source, destination, and preferably restrictions).

In an embodiment, trust relationships based on public key authentication (and/or other authentication mechanisms) are discovered and and converted them to trust relationships configured in a different way, such as using a centralized server. This may be used, e.g., for converting public key authentication based trust relationships to Kerberos or Active Directory based trust relationships (possibly using a centralized server or directory to store the permission rules specifying authorized trust relationships or allowed passwordless logins between accounts).

Converting trust relationships may comprise, e.g.:
discovering trust relationships;
selecting which trust relationships are to be converted;
converting trust relationships to host-based authentication (.shosts);
converting trust relationships to public key authentication; and
converting trust relationships to trusted intermediary based authentication.

Discovering trust relationships was already described in detail above for various kinds of trust relationships (including trust relationships based on public key authentication). Basically this step is discovery of trust relationship. Organizing and/or converting trust relationships or keys to managed state may also be needed as a preparatory step.

Selecting which trust relationships are to be converted would advantageously be done through the management system user interface or API. In an embodiment, an administrator selects a host group (or otherwise uses, e.g., filters to select one or more hosts). Alternatively, trust relationships could be selected. The administrator then requests (e.g., by selecting a menu item or clicking a button) that the selected trust relationships are to be converted to a different kind of trust relationship. The desired kind of trust relationship may also be selected. The selection may also utilize application identifiers associated with host, user accounts, trust relationships, or keys.

The management system may then perform the conversion immediately or as a background job (which advantageously honors maintenance windows to make the changes, as this would typically be a fairly invasive change.

To perform the conversion, the management system creates permission rules authorizing the selected trust relationships using the desired authentication method. Often there would be a one-to-one mapping between key-based trust relationships and the generated new trust relationships. Configuration changes are made in SSH servers and/or clients (or possibly new SSH servers and/or clients are installed that support the new kind of trust relationships—this may also be done before the other steps). Some testing (possibly automated) may be performed to test the new trust relationships. Finally, the old trust relationships are removed (public key trust relationships are removed as described earlier in this specification; .shosts and similar trust relationships by removing relevant lines from those configuration files; and centralized server based trust relationships by updating configuration on such servers—if the centralized server is part of the management system, then this may mean just updating the management system's database).

Creating permission rules may mean establishing new trust relationships using the new authentication method. The new trust relationships may utilize host groups or user groups (generally if the original ones were using host groups or user groups and both mechanisms support the same groups). Groups may also be expanded to the individual hosts or users if the target authentication method does not support the same groups.

FIG. 49 illustrates a system and method for discovering existing keys and trust relationships, automating creation of new trust relationships, and rotating existing keys in an embodiment.

The computer (4900) illustrates a management system (in this case on a single computer). One or more processors (4901) execute an operating system (not shown) and one or more programs (4902) that implement a management system.

The management system discovers keys and trust relationships on one or more managed hosts (4903), automates creation and removal of keys and trust relationships (4904), and rotates authorized keys and identity keys (4905).

A working memory (4906) is used for holding the program and its main memory data during execution. A storage system (4907) is a non-volatile memory (computer readable medium), and may comprise the management system's database as well as comprise the program. A communication system (4908) is used for communicating with managed hosts.

The management system addresses issues with existing large complex legacy corporate networks: legacy keys; heterogeneous environments with multiple operating systems, multiple vendors for SSH servers, diverse configurations, multiple key formats, and varying key locations; diverse user information sources, such as AD, LDAP, NIS, RACF, and local accounts; internal compartmentalization of networks; maintenance zones; restrictions on critical systems; and public key trust relationships with external service providers and contractors.

Many organizations have problems in SSH user key management, such as:
some large organizations have over 100 000 user key pairs (or trust relationships) in their systems
many organizations don't know what each key is used for or what might break if a key is removed, and thus cannot remove or rotate keys
there is no visibility to who can really access what
with no key rotation, administrators may have stolen copies of private keys, which remain valid and usable
thousands of new trust relationships are set up every year, sometimes costing millions per year in labor
for some large IT environments, unmanaged user keys have become a major security problem, a substantial cost, and a key audit finding.

Many organizations urgently need solutions for discovering and monitoring existing SSH user keys, automating setups, and rotating keys.

In an embodiment, the management system:
discovers existing legacy keys and trust relationships in the environment and starts monitoring changes;
automates creation and removal of keys and trust relationships (integrated to existing change control/approval systems); and
automatically rotates (renews) keys every X months (includes discovery of external connections, i.e., trust relationships leading out from the environment, as they may need manual configuration).

In an embodiment, discovering keys and trust relationships:
may be done using agent or agentless
discovers users and SSH user keys configured for each user (also non-key-based trust relationships if configured, e.g., host-based)
may need to recognize Active Directory, Kerberos, LDAP, NIS, RACF, local users
may need to understand installed SSH server and client versions and how they configure/store keys
computes trust relationships from the keys
provides visibility to who can access what, once legacy keys have been extracted
monitors the environment, detects any changes to underlying keys and trust relationships, and can generate notifications; and
solves a basic audit requirement: visibility.

In an embodiment, automating creating and removal of keys and trust relationships:
  brings changes under control by having trust relationship setups approved in existing corporate change tracking system
  may be automatically triggered by approved requests from a change tracking system
  may perform actual key setups fully automatically, reducing manual work and human errors
  may be especially beneficial for setups involving many hosts or multiple SSH implementations or black-box devices, or involving key format conversions
  may detect unauthorized user key setups by local administrators and creates notifications or alerts
  may transition gradually from monitored legacy trust relationships to fully managed trust relationships
  may organize legacy keys into trust relationship rules and bridging legacy keys under management
  may use various tools (e.g., analyzing syslog) for determining which keys are still used
  may use front-end scripts or changes to SSH client to determine which script is using which key
  may provide substantial operational cost savings (millions per year in some organizations), may reduce outages, and may solve important compliance requirements.

In an embodiment, SSH user keys may enable password-less authentication to a functional account or to a root account.

Security standards may require SSH user keys to be changed every X months (prudent security standards generally require passwords and encryption keys to be changed every X months). Some security standards may also require rotating keys. Old keys may involve real security issues.

In an embodiment, automatically rotating keys:
  includes creating a new private key, copying public keys to right places, removing old public and private keys (and must take into account maintenance windows, Christmas lock-downs, external trust relationships, etc)
  identifies keys involved in external trust relationships with hosts outside a managed environment before key rotation
  may discover external connections from syslog data for may SSH versions
  may rotate external keys semi-manually or with system-to-system integration
  may bring important security benefits and solve an audit requirement In an embodiment, a management system:
  may provide visibility to SSH user keys
  may automate setup of SSH user keys, possibly saving millions annually in largest organizations
  may automate key rotation, as manual solutions may not be practical due to number of keys
  can solve audit requirements relating to who can access what (using SSH keys), getting visibility to unauthorized trust relationship creation, and forcing rotation of SSH user keys.

In an embodiment, bringing a large SSH environment under management comprises the phases of deploying the management agent (or deploying authorization credentials for agentless management) on a plurality of hosts that then become managed hosts, discovering existing SSH identity keys and authorized keys for users on a plurality of the managed hosts, analyzing the identity keys and authorized keys to detect authorized connections between user accounts on the managed hosts, and then managing the connections automatically using the management system. Some of the managed hosts may be fully managed, meaning the management system may deploy new trust relationships on them (and perform other key management operations that modify their state), whereas some others may only have discovery (and perhaps continuous monitoring) performed on them. Furthermore, in some environments, only a subset of the hosts that are fully managed may be enabled for key rotation.

In an embodiment, a management system scans a network (e.g., IP address range or subnet) for hosts that run SSH at given TCP/IP port(s) (normally port 22). The management system may also scan for other ports, particularly those normally used for running services that use certificates, such as HTTP/S (default TCP port 443), IMAP over SSL (default TCP port 993), or SMTP over SSL (default TCP port 465, or 25 if using the STARTTLS method in SMTP). The management system stores information about scanned hosts in its database, indicating whether the host responded to a "ping" or TCP/IP connection request, which ports were running protocols that use certificates or cryptographic keys, cryptographic key parameters, certificate parameters (e.g., expiration), and which protocol was encountered in each case, SSH version number, which hosts run an SSH server, etc. The management can be configured to repeat the scan regularly (e.g., once per week) to discover new hosts. The scan can be configured to skip hosts that are already under management.

HTTP/S (HTTP Over SSL or TLS) is described in RFC 2818, HTTP Over TLS, Internet Engineering Task Force, May 2000.

IMAP (Internet Message Access Protocol) and the STARTTLS method are described in RFC 3501, Internet Message Access Protocol, Internet Engineering Task Force, March 2003. Its use over SSL or TLS is described in RFC 2595, Using TLS with IMAP, POP3 and ACAP, Internet Engineering Task Force, June 1999.

The STARTTLS method for SMTP is described in RFC 3207, SMTP Service Extension for Secure SMTP over Transport Layer Security, Internet Engineering Task Force, February 2002.

In an embodiment, the management system makes hosts that were discovered by scanning visible in its user interface (e.g., web interface). It may implement automatically deploying management on them (whether using agent or otherwise) by allowing entry of username and password (and possibly another password for "sudo" or a privilege escalation system such as PowerBroker). It can also use an existing key-based trust relationship (preconfigured authorized key) or other trust relationship to make the initial connection to the management system. These can be used by the management system to log into the host to be managed and obtain sufficient access for deploying management on the host.

The management system can also provide for downloading a public key that can be manually added as an authorized key for root on hosts to be taken under management (or an automated installation system can be used to install the public key as an authorized key on a group of hosts). The management system may also install an agent program on the hosts being taken under management.

The management system may also be deployed on a host using a mechanism for centrally executing a script on the host (e.g., PowerBroker). The mechanism may configure the host for agentless management (e.g., creating non-privileged user account, updating "sudo" or PowerBroker configuration to permit privilege escalation for certain commands needed by the management system, and configuring the account for management, e.g., by installing a suitable authorized key for initial deployment; it may also install a management agent together with a suitable initial configuration data that permits the managed host to make an initial connection to the management system to bring the host under management).

When the management system is deployed on a host, advantageously an internal identifier for the host is stored in a file in the host's file system (e.g., in/etc/ssh/sshmanager_id). Additionally, credentials permitting the management system to connect to the host and/or the host to connect to the management system are installed on the host. In an embodiment, installing the credentials comprises installing a public key as an authorized key for the "root" or "Administrator" user on the host, so that the management system can use the SSH protocol and public key authentication to log into the managed host. Advantageously the host's public host key would be copied to the management system so that the management system can reliably identify the host using the host key (the StrictHostKeyChecking option can be enabled if an SSH implementation is used for connecting).

During deployment or soon thereafter, the management system obtains information about the managed host using the management agent or agentless management connection, such as the agent's operating system, SSH versions, configurations, etc.

In an embodiment, the management system manages a host that requires a special interface not directly supported by management agents and agentless management. For example, Cisco routers are often managed over SSH, and their public host keys should be made available to other hosts and if public key authentication is used for login, the management system should advantageously be able to configure public key authentications on such systems. The management system supports connectors, small programs that implement management of such hosts. In an embodiment, connectors are programs written in, e.g., Python that are uploaded into the management system and convert an API implemented by the management system to a protocol implemented by the managed device (e.g., using command line over SSH to configure the device). In another embodiment, the management system opens a connection to a helper host on which a connector is run, logging into the helper host using SSH, and runs a connector program on that host, giving instructions to the connector program by, e.g., talking a suitable protocol (e.g., the same protocol that is used with management agents) with the connector, or by supplying command line arguments to the connector program to specify what it is to do.

In an embodiment, a management system is configured with a set of certificate authorities (e.g., CA certificates) that are accepted for authentication throughout the environment or on a group of hosts. The management system adds an OpenSSH "cert-authority=" option (or its equivalent for other implementations) in one or more authorized keys files, and adds one or more principal names from the user's certificate in an OpenSSH "principals=" option (or equivalent) to list users that are permitted to authenticate using a certificate issued by that certificate authority to the given target account. Such a management system could be used for managing connections in environments where certificates instead of public keys are used for authenticating connections that do not require a password. Managing connections may include, e.g., creating new passwordless login connections (and installing related identity keys and authorized keys as needed), removing existing passwordless login connections (and removing related authorized keys and identity keys as needed), and renewing existing identity keys and corresponding public keys used as authorized keys.

In an embodiment, host-based authentication (preferably with public key based host authentication) according to the SSH protocol is used for authenticating passwordless logins. A management system modifies a $HOME/.ssh/.shosts file to permit or deny passwordless logins from other accounts. The management system also ensures that the SSH server has access to the current host keys for clients that connect to accounts on that host using host-based authentication.

In an embodiment, a management system reduces operational costs in an enterprise by automating the set-up of passwordless logins (using, e.g., public key authentication for such logins). The management system receives a request to set up public key authentication from a workflow, change control, or other system, creates (or causes creation of) private keys as needed, configures the key as an identity key, copies the appropriate public key to one or more servers and configures it as an authorized key for one or more user accounts to which login using it should be permitted according to the request, and when done, notifies the requesting system that the operation is complete.

The management system optionally also reduces operational costs due to removing passwordless login connections (e.g., public key authenticated connections). The management system receives a request to remove public key authentication from a workflow, change control, or other system, determines from which hosts and users the authorized public key used for the connection should be removed (it can be conservative in this determination, trying to remove it from more hosts than necessary), and causes the key to be removed from the determined users on the determined hosts.

In an embodiment, a user account has more than one private key that is used for public key authentication, such as a separate key for every authorized passwordless login connection that the user is authorized to make.

In another embodiment, at least one private key (identity key) is used for more than one authorized passwordless login connection. The authorized public keys on servers may result from more than one requested connection or policy rule that establishes connections. An unexpected benefit of this approach is that it works reliably with OpenSSH servers, as OpenSSH servers count queries about whether a certain private key is authorized to login as login attempts, therefore working unreliably if a user has several private keys as identity keys.

A potential problem with this approach, however, is that when removing an authorized connection (or trust relationship), one cannot always remove all authorized public keys corresponding to the private key used for the connection, because the key might also be used for another connection (trust relationship). Therefore, the management system determines on which user accounts on which hosts the public key was configured as an authorized key based on the trust relationship being removed using information in its database, and only removes the key from those user accounts on those hosts that were (exactly) determined. Furthermore, it is possible that more than one rule, or more than one prior connection authorization request, causes a public key to be authorized for logging into an account on a host. The management system determines whether any other rule or prior request is authorizing the public key before removing it from an authorized keys file.

In an embodiment, an SSH client connects to an SSH server on a managed host. The SSH client determines that the server is managed by a management server that is authorized to manage also the client, and requests client configuration information from the SSH server (without necessarily having a direct connection to the management system, or even being able to directly connect the management system as the client may be, e.g., outside the enterprise firewall). The authorization to manage the client may be determined by having a management system public key (or certificate) stored in the client, and having information indicating that the SSH server is managed by the server be digitally signed by that public key (or a public key in the certificate). The client then receives configuration information from the management system indirectly through the SSH server. The configuration information exchange may take place, e.g., already before the client has authenticated itself to the SSH server (the configuration information might be obtained, e.g., by requesting a special "service" (according to the SSH Transport Layer Protocol) instead of the normal user authentication service. After receiving the configuration information, including the server's proper host key (digitally signed by the management system), the client can validate the server's host key even if it did not previously know the server's key. This permits even the first connection from an SSH client to an SSH server to properly authenticate the server and prevent unwanted man-in-the-middle attacks.

In an embodiment, an SSH client receives a host key that it does not recognize (or associate with the server host) from an SSH server. The client connects to a management system (directly or through the SSH server) and requests the management system to confirm that the host key is a valid host key for the host. If the management system confirms that it is a valid host key for the contacted host, the client accepts the server as valid and continues establishing the SSH protocol session (or saves the key as a valid host key for the server host and restarts the connection). The host key is optionally saved in the client's records (either permanently or cached for a time) as a valid host key for the requested host.

In an embodiment, one or more private keys are associated with one or more application descriptors. An application here refers to a business application that is managed as a separate application by an enterprise (typically the enterprise would have a team of engineers responsible for the application), or an identifier identifying such application. An application could comprise several programs and could run on many, even hundreds of servers, possibly in many countries, and possibly as a cloud service (the number of hosts running or implementing the application could change dynamically and automatically based on load). Often, the organization using the key manager would like to associate each private key and trust relationship with a particular application, and the organization may deploy the key manager an application at a time. Knowing what application each key belongs to may be useful, e.g., for auditing purposes. It may also be beneficial to generate reports about trust relationships from one application to another.

Generally, keys on disk are not associated with any particular application. Thus, it is somewhat problematic to associate them with an application.

In an embodiment, each application uses separate user accounts or separate servers, and the keys (public or private keys) may be identified by the account or host on which they reside or for which they are configured. One or more applications may be configured into the management, system, and at least some hosts or host groups may be associated with an application. Alternatively, a set of user account names or user groups may be configured into the management system, and at least some of the user accounts may be associated with applications.

In an embodiment, a management system is configured to access an inventory database maintained by the organization that associates at least one computer and/or user account with an application identifier. In another embodiment, the management system reads information about at least one user or computer from Active Directory or LDAP or other suitable directory, the information specifying the associated application for the user or computer.

In an embodiment, the application is stored separately with at least one public or private key. In an embodiment, the (initial) application is specified when deploying the management system on a host (and applies to the initial discovery for that host), and the application identifier is set based on the identifier that was configured for the deployment during which the key was found.

The management system advantageously provides for reporting keys by application, or keys crossing applications (e.g., transferring data from one application to another). It may also provide a visual connectivity graph viewer, where each application (regardless of the number of hosts or programs related to it) is shown as a single entity, with trust relationships connecting applications shown as links. Ideally, such a visual connection viewer would be capable of displaying condensed views and then drilling into nodes and links of the condensed view to expand them into individual hosts, accounts, applications, and/or trust relationships, possibly at multiple levels of expansion.

In an embodiment, an administrative user account is defined in Active Directory (or other user information directory), and a list of group memberships is determined for the administrator (the group membership determination may involve processing group inclusions and other known Active Directory constructions to determine the actual groups the user is a member of). These group memberships may have been associated with management system actions, and optionally, certain hosts or host groups. The action and host group may also be configured in the group name, e.g., "sshmgr-actionname-groupname". In an embodiment, the allowed action(s) and host group(s) are defined in Active Directory, in the group definition (possibly with extensions to the Schema used). A field in the group object may indicate one or more actions to be performed, and another field may define one or more host groups. Alternatively, a field may indicate action-host group pair(s). Also, instead of determining the list of groups, it may be advantageous in some embodiments to just determine whether the administrator is a member of a particular group (without ever listing all groups), particularly if a readily usable function call or tool is provided by the operating environment for this purpose.

In an embodiment, the management system reads the user's groups from active directory when the user logs in, and caches the user's access rights for the duration of the session (or part thereof).

In an embodiment, the management system caches permissions for a user across sessions for a predefined length of time (e.g., five minutes). This can significantly improve performance when using an API provided by the management system, as many calls might be performed using such API in quick succession to perform various small operations.

In an embodiment, when a new private key needs to be created for a managed host (e.g., for a new host key or a new identity key), the private key may be generated on the managed host itself, in a management system (e.g., by a back-end), or the management system or the managed host may cause a third party to create the private key. Generally regardless of who generates the private key for a managed host, the private key will need to be made available to the managed host (either by copying the private key to the managed host if not already there, or by providing a method for the managed host to perform private key operations such as signing using the private key). In most cases, the public key corresponding to the private key (or at least information identifying it, such as a key fingerprint) must be made available to the management system, for example, by copying the public key to the management system (if it was not created by the management system). The "ssh-keygen" program that is available in most Unix/Linux SSH implementations (such as OpenSSH, Tectia SSH, and Attachmate SSH) may be used for deriving a fingerprint from a key.

In an embodiment, the management system receives a public key from a managed host and generates from the public key a key fingerprint in at least two different formats (e.g., the format used by OpenSSH and the format used by Tectia SSH) and stores the generated fingerprints in a database. A particular benefit of this arrangement is that the log data generated by various SSH implementations refers to public keys using key fingerprints, and in an environment containing multiple SSH implementations the different implementations may use different fingerprint formats for identifying keys. Storing the fingerprint in the management system in each supported format permits the corresponding public key to be quickly looked up using the fingerprint. Without having the fingerprint in the proper format in the management system it might be necessary to iterate over many public keys in the management system computing fingerprints for them in the proper format, until a matching fingerprint is found (or all keys have been tried). (It is not possible to derive a key from its fingerprint.) Equivalently, unique values derived from the fingerprints can be used (e.g., cryptographic hashes of fingerprints).

In an embodiment, a management system or other component (e.g., management agent) generates a fingerprint for a public key in more than one format and sends the generated fingerprints to the management system. For example, it may generate the fingerprint in both OpenSSH and Tectia formats. When fingerprints are used in log records generated by different SSH implementations, it is then possible to find the related private key regardless of which SSH implementation runs on the server to which it was used to log in (each SSH implementation generally logs the used key fingerprint in its own format).

In an embodiment, a management system maintains a cache of fingerprints in more than one format in main memory. The management system (or part thereof, such as a back-end) initializes the cache by reading public keys from its database, computing a fingerprint (or other suitable unique value) from each key in each desired format, and stores the value in the cache. (The initialization may also be delayed, e.g., adding fingerprints for each different format only when an SSH implementation for that format is first encountered.) Found new keys are added to the cache by deriving their fingerprints in all desired formats and adding the key to the cache in all formats. The cache itself is a mapping from a fingerprint (possibly combined with a format identifier or a separate cache for each format) to a public key or something identifying a public key (e.g., a record identifier into a public key table).

In an embodiment, an SSH host key of the target is checked by an initiator when the initiator connects to the target using SSH. The initiator is the side initiating the connection and the target is the side that the connection is to. Each side may be either a managed host or a management system (or a part of it, such as a back-end).

In an embodiment, the expected host key is changed in the initiator's database of known hosts file in response to rotating the host key for a target. When rotating the host key, the management system generates (or causes the target to generate) a new private host key, copies the corresponding new public key to the initiator, optionally distributes it to other hosts, installs the new (private) key as a host key for the target, removes the old (private) host key for the target, and removes the old (public) host key from other managed hosts. Additionally, the management system records the new (public) host key in its database as a host key for the target and removes the old (public) host key from being used as a host key for the target or marks it inactive.

Certificates may also be used for authenticating the managed host (in agentless management) and the management system (for agent-based management). Certificates may be used instead of host keys and/or instead of public keys for user authentication when establishing the management connection.

In an embodiment, a management connection may be secured using SSL or TLS (RFC 5246, The Transport Layer Security (TLS) Protocol Version 1.2, Internet Engineering Task Force, August 2008). SSL/TLS client certificates may also be used for authenticating the connecting party to the other party.

When certificates are used for authenticating the management connection (the server and/or the client side of the management connection), the certificates are advantageously regularly renewed (rotated) by the management system, using the same management connection. The certificate management mechanisms described elsewhere herein may be used.

In an embodiment, host keys and/or certificates as well as the authentication credentials used for a management connection are synchronized to two or more back-ends. New credentials may be created whenever a new host is deployed, and that host initially typically communicates with just one back-end, and the new credentials must often be propagated to one or more other back-ends, as the managed host may later connect to or be contacted by another management back-end (particularly when they are used in load-balancing or fault tolerant configuration, e.g., when using back-end groups).

In an embodiment, the credentials for authenticating with managed hosts are stored in a database which is accessible to all back-ends in a management system.

Before contacting a managed host, a back-end reads the current credentials for the managed host from its database, and uses the read credentials for the connection. This may, e.g., mean saving the SSH host key of the managed host in a known hosts file and saving an identity key or password used for authenticating to the managed host in a local file on the back-end, and calling an external SSH client such that it uses these credentials (e.g., giving it the "-oGlobalKnownHostsFile" and "-i" options if the OpenSSH client is used).

For incoming connections, the management system can use a security protocol implementation (e.g., SSH, SSL, or TLS) that fetches the current host key/certificate from the database and validates any received credentials against information in the database). Alternatively, each back-end may periodically, e.g., once per minute, read updated credentials from the management system's database and update them in local storage on the back-end.

In an embodiment, a management system encrypts sensitive information in its database using a key that is not stored in the database. In an embodiment, the sensitive information comprises any private keys or other authentication credentials for managed hosts.

In an embodiment, an encryption key is generated during management system installation and stored on each back-end and front-end but not in the management system's database. The encryption key may be generated from a passphrase provided by an administrator installing the management system (advantageously the same passphrase provided when installing each back-end). Alternatively, the encryption key may be generated automatically when installing the first back-end (possibly using some random seed information obtained from an administrator).

In either case, one option is to provide a means for extracting the key (and possibly other configuration information, such as how to connect to the central database, which might mean database host name, user name, password, and database name) from an existing back-end or front-end in a suitable format, and upload that information to a new back-end or front-end when installing it.

In an embodiment, a management system appliance may be installed as 1) initial installation, in which case it prompts for database connection information and initializes the database and configures itself as a front-end, and 2) back-end installation, in which case it expects the administrator to upload a configuration blob (advantageously comprising a secret encryption key for sensitive information in the management system's database and information how to connect to the database).

In an embodiment, a method, apparatus (possibly for downloading a computer program), and/or computer program product for bringing unmanaged trust relationships under management, performs one or more of the following steps (or means or components for implementing them):

Discovering existing trust-relationships (who can access what). This requires discovering of user keys that are authorized for login ("authorized keys") and private keys ("identity keys"). This is preferably done for all users on all servers (and preferably also desktops), and involves several special issues.

Monitoring the environment in order to determine which keys are actually used and where the keys are used from (one or multiple sources) and removing those keys that are no longer in use. In one embodiment, this is implemented by performing discovery, saving discovered information in a database, re-performing discovery at a later time, computing a difference of the previously found set of users and their corresponding keys and the newly found set of users and their corresponding keys, eliminating those differences that were caused by key addition, key removal, or key rotation requests since the previous set was discovered, and reporting remaining key removals and additions as unauthorized or unexpected. Alternatively to the elimination step above, the contents of the database may be modified when requests to add, remove, or rotate keys are processed, and the difference computation may be performed incrementally, and the discovery process may be optimized to only detect addition of unexpected keys.

Enforcing proper processes for all or most key setups and other key operations by relocating authorized keys to a root-owned location and changing SSH configuration accordingly, so that only the key manager (or root) can remove or install new authorized keys, and detecting unauthorized key operations occurring outside the key manager (e.g., keys set up by a root user) and generating alerts about such key activities.

Automating key setups and key removals, eliminating manual work and human errors, and reducing the number of administrators who need to have sufficient privileges to do key setups (though root can do it, but such setups are detected, and the few administrators with high-level access to a key manager can also cause it to create new keys).

Rotating authorized keys and identity keys regularly, so that any compromised (copied) keys cease to work and proper termination of access can be ensured.

Controlling where each key can be used from and what commands can be executed using the key. This would typically be done using a "from" and/or "forced_command" option in an SSH authorized keys file. A key manager or SSH server or a wrapper script used as replacing a user's login shell may analyze which commands are run using each login and the login may be associated with a key, which can be automatically used for determining which commands are normally executed by each key.

A further risk mitigation technique is to define certain internal boundaries within the organization, and strictly control what key-based trust relationships can cross which boundaries and in which direction, and enforce strict IP address restrictions and "forced command" restrictions at least for authorized keys involving trust relationships crossing such boundaries.

In an embodiment, an agentless discovery system uses the SSH protocol to communicate with hosts, optionally determining which version of SSH server and/or client is used on a host, determining which user accounts on the host may contain authorized keys and/or identity keys, obtaining information about authorized keys and/or identity keys associated with the determined user accounts, optionally using "su" or similar tool to access NFS home directories or other locations that cannot be accessed as root (or using "ssh-keycat" or other similar application to access keys for a user), and sending the information (in original or processed form) from the host to the management system.

Advantageously, the system uses a non-root account on the host for login and uses "sudo" or other privilege escalation mechanism for performing key operations on the managed host that need higher privileges.

Advantageously, the system parses at least one SSH configuration file based on the determined version of the SSH server and/or client on the host.

Advantageously, the system reads a public key file associated with a private key file (e.g., having .pub appended to the private key file name) to determine the public key corresponding to an identity key.

In an embodiment, an agentless discovery system uses PowerBroker to execute a script on a plurality of hosts, the script collecting information about user accounts, authorized keys, and identity keys on each host and conveying at least part of the collected information (in original or processed form) to an analysis system that determines which user accounts can be accessed from which user accounts and/or hosts.

In an embodiment, a management system causes a host to perform the operations described herein as performed on a host or by a host, or causes a host to send information described as obtained from a host.

A management system may be an apparatus, a set of apparatuses, or a computer program product. A management system may comprise components implementing or causing a computer to perform various methods, processes, or steps described herein in addition to components expressly described as components of a management system.

In an embodiment, IP addresses from which one or more existing authorized keys can be used are restricted, advantageously by a tool or management system, by performing:
  determining from what IP addresses logins to a user account on a host occur using an authorized key occur during a period of time; and
  modifying an authorized keys file used for that user on that host to contain a "from=" restriction for that authorized key.

In an embodiment, a private key for an identity key, an SSH host key, or an authentication credential for a Kerberos principal is stored in a TPM (Trusted Platform Module). The Trusted Platform Module is described in ISO/IEC 11889-1: 2009 (Information technology—Trusted Platform Module—Part 1: Overview), ISO/IEC 11889-2:2009 (Information technology-Trusted Platform Module-Part 2: Design principles), ISO/IEC 11889-3:2009 (Information technology-Trusted Platform Module-Part 3: Structures), and ISO/IEC 11889-4:2009 (Information technology-Trusted Platform Module-Part 4: Commands).

The generation of a private key means either causing the TPM to generate the private key, and storing an identifier for the private key in a private key file or other storage where identity keys (or authentication credentials for Kerberos principals) are stored, or generating a private key on a computer, causing the private key to be stored in the TPM, and causing other copies of the private keys than the one in the TPM to be destroyed (in an embodiment, an escrow or backup copy may be kept outside the TPM with suitable protections).

The identity of the private key is then used for performing cryptographic operations using the private key on the TPM. In an embodiment, an "ssh-agent" application forwards identity key operations to a TPM. In another embodiment, an SSH server or SSH client calls a library for interfacing with a TPM module to perform such operations.

In an embodiment, a tool restricts unauthorized backdoor access to a host by:
  restricting where keys can be used from by adding IP address restrictions to authorized keys (limiting damage from copied keys);
  restricting commands that can be executed using keys (preventing unexpected ways of using keys and making using them for virus spread much harder); and
  preventing addition of new keys by non-root users by moving authorized keys to protected locations (so that users and administrators cannot add new keys that would allow them to access an account after their normal permission to access it has ended).

Advantageously, the tool also comprises detecting whether additional processes have been left behind by a user, and if so, checking whether the processes are allowable, and if their allowability cannot be confirmed, requesting another person to verify their allowability. The allowability of a process may be automatically confirmed, e.g., by checking whether the binary being executed by the process is a binary that has previously been verified as allowable, and optionally that its command line matches a permitted command line pattern for that binary. When a person confirms the allowability of a started process, the binary and command line of the process may be recorded for future use as automatically allowable (the user making the approval may be provided with the option of allowing the process for all future instances or for just the one instance).

In an embodiment, access to a first user account on a host is controlled based on whether a user trying to access the account has a change control ticket or support case pending and assigned to the user that identifies the host or the first user account as an affected host or account (possibly indirectly by identifying an application or other entity that indirectly identifies one or more hosts or accounts, advantageously using a configuration database). Advantageously, an API or connector is used for integrating with a change control, approval, and/or ticketing system.

In an embodiment, an SSH server determines whether access should be permitted in part based on such considerations (possibly delegating the determination to a management system or policy server). In an embodiment, a front-end for an RDP server makes the determination. In an embodiment, a bastion host or gateway in a privileged access management system makes the determination.

In an embodiment, configured public key based trust relations are discovered by a management system without using an agent.

In an embodiment, a management system installs a new trust relationship using an identity key and an authorized key corresponding to the identity key by causing a first host to install the identity key on a first account on the first host and causing a second host to install the authorized key for a second account on the second host, the first and second hosts not being part of the management system.

In an embodiment, a management system installs a trust relationship from a source account on a source host to a destination account on a destination host in response to receiving information about a ticket authorizing the installation of the trust relationship having been approved in a ticketing system.

In an embodiment, a management system removes a trust relationship from a source account on a source host to a destination account on a destination host in response to receiving a request to remove the trust relationship.

In an embodiment, a management system rotates an identity key and an authorized key used for configuring a trust relationship.

In an embodiment, a computer obtains, for each of a plurality of user accounts on a host, a set of authorized keys configured as permitting access to the account on the host using the Secure Shell (SSH) protocol, without using agent software running on the host, where the agent software means software installed on the host for obtaining authorized keys and sending them to another computer and wherein the set is non-empty for at least one account.

In an embodiment, a computer reads a configuration file comprising at least one authorized key for a user account on a host, wherein the configuration file is selected based on the version of the SSH server software installed on the host and the contents of a configuration file used by the SSH server software, wherein an authorized key means a public key corresponding to a private key whose possession grants access to the user account on the host.

In an embodiment, a computer:
  causes each of a plurality of hosts to convey information about authorized keys configured for user accounts on the host to a management system where records derived from the information are stored in a database, the records comprising:
    a public key for each authorized key, together with identification of a host and user account for which the public key identifies an authorized key; and
    a command configured to be executed when the key is used for authentication, if any;

wherein an authorized key means a public key corresponding to a private key whose possession grants access to a user account on a host using the SSH protocol.

In an embodiment, a data structure stored on a non-volatile computer-readable medium for causing a computer to install an authorized key on a host, comprises:
identification of a host on which the authorized key should be installed;
identification of a user account on which the authorized key should be installed;
identification of a key to be installed as an authorized key;
identification of a command to be executed when the key is used to log into the user account on the host, if any.

In an embodiment, the data structure further comprises:
identification of how to signal completion of installing the authorized key on the host.

In an embodiment, a management system comprises:
a means for discovering identity keys for at least one user account on at least one host having an SSH client installed;
a means for discovering authorized keys for at least one user account on at least one host having an SSH server installed; and
a means for analyzing discovered identity keys and authorized keys to determine authorized passwordless login connections.

In an embodiment, a management system comprises:
a means for discovering identity keys and authorized keys for a plurality of users on a plurality of hosts;
a means for analyzing discovered identity keys and authorized keys to determine authorized passwordless login connections; and
a means for managing passwordless login connections on the plurality of hosts.

In an embodiment, a computer implements a method comprising:
receiving a request to remove a key used for public key authentication in SSH;
determining one or more hosts and user accounts on those hosts that the key should be removed from;
causing a key removal request to be sent to each of the determined hosts.

In an embodiment, a computer processes a request to perform an operation on a host during the host's maintenance window, the processing comprising:
inserting a request in a database with information identifying its maintenance window;
finding, from the database for the host, pending requests whose maintenance window is open;
sending the request to the host;
receiving a response from the host; and
updating database to indicate the request has been processed.

In an embodiment, a computer implements a method of processing a request to authorize a passwordless login connection from a first user account on a first host to a second user account on a second host, comprising:
causing creating a private key and adding it as an identity key for the first user account if the user account does not already have an identity key;
causing installing the public key corresponding to an identity key of the first user account as an authorized key for the second user account.

In an embodiment, a computer is used for implementing a method comprising: in response to receiving a request to de-authorize a previously authorized public key login from a first account on a first host to a second account on a second host, causing the public key corresponding to the identity key used by the first account for the login to be removed from the authorized keys on the second account.

In an embodiment, a computer:
receives information about a user changing to a different role in an organization;
causes those passwordless logins that were authorized for the user's previous role but not for the user's new role to be de-authorized; and
causes those passwordless logins that were not authorized for the user's previous role but are authorized for the user's new role to be authorized.

In an embodiment, one or more computers execute instructions from a computer-executable medium causing the one or more computers to:
detect changes to user information in a directory service;
determine which new passwordless logins should be authorized as a result of a change in the user information, and cause such logins to be authorized; and
determine which previously authorized passwordless logins should no longer be authorized as a result of a change in the user information, and cause such logins to no longer be authorized.

In an embodiment, a management system:
collects SSH host keys from a plurality of hosts;
forms equivalence groups from hosts having the same SSH host key; and
distributes a private key to at least two hosts in one of the formed equivalence groups, the private key being the same key for each host in the group.

In an embodiment, a newly provisioned virtual machine:
connects to a management system according to information configured before the virtual machine was booted; and
receives management system credentials for the virtual machine.

In an embodiment, a management system:
causes parsing an SSH client configuration file, using information about the installed SSH client version;
causes enumerating identity keys configured in the client configuration file;
causes obtaining a public key corresponding to a private key that is one of the identity keys; and
causes the public key to be stored in the management system without storing the private key in the management system.

In an embodiment, a management system causes:
creating a new private key and configuring it as an identity key in addition to a second private key already being used as an identity key for the SSH protocol by a user;
copying the public key corresponding to the new private key to those user accounts on those hosts where the public key corresponding to the second private key is an authorized key, and making the copied public key an authorized key for those accounts on those hosts;
removing the second private key from being an identity key and removing the corresponding public keys from being authorized keys.

In an embodiment, a computer program product for installing a trust relationship is operable to:
cause having an identity key installed for a source account on a source host of the trust relationship; and
cause having an authorized key corresponding to the identity key installed for a destination account on a destination host of the trust relationship.

In an embodiment, the computer program product causes these steps when executed on a third host that is not the source host or the destination host.

In an embodiment, a computer provides the computer program product for downloading.

In an embodiment, a computer downloads the computer program product.

In an embodiment, a management system causes public key authentication according to the SSH protocol to be authorized from a first account on a first host to a second account on a second host, wherein the first host and the second host are not part of the management system.

In an embodiment, the management system further causes:
creating a first cryptographic key pair comprising a public key and a private key;
configuring the private key as an identity key for at least one SSH client on a first account on the first host; and
configuring the public key as an authorized key for at least one SSH server on a second account on the second host;
wherein an identity key is a private key that can be used for public key authentication according to the SSH protocol by an SSH client, and an authorized key is a public key or key fingerprint identifying a key pair that can be used to login to a user account on an SSH server.

In an embodiment, the causing of authorizing is triggered automatically in response to a key setup request having been approved in a change management system.

In an embodiment, a management system causes a configured authorized key on a user account on a host to be deconfigured and/or removed. In an embodiment, the causing of a key to be deconfigured and/or removed is triggered automatically in response to a key removal request having been approved in a change management system.

In an embodiment, a management system causes an authorized key to be rotated.

In an embodiment, a management system causes an identity key to be rotated.

In an embodiment, a management system or a component thereof causes:
rotating a first key pair used for public key authentication according to the SSH protocol to be, the first key pair comprising a first public key and a first private key, the rotation comprising:
causing generating a second key pair comprising a second public key and a second private key;
causing the second private key to be configured as an identity key for at least one SSH client on at least one account on at least one host that was previously configured to use the first private key as an identity key;
causing the second public key to be configured as an authorized key for at least one SSH server on at least one account on at least one host that was previously configured to use the first public key as an authorized key;
causing the first private key to be deconfigured as an identity key for at least one SSH client on at least one account on at least one host that was previously configured to use the first private key as an identity key; and
causing the first public key to be deconfigured as an authorized key for at least one SSH server on at least one account on at least one host that was previously configured to use the first public key as an authorized key;

wherein an identity key is a private key that can be used for public key authentication according to the SSH protocol by an SSH client, and an authorized key is a public key or key fingerprint identifying a key pair that can be used to login to a user account on an SSH server.

In an embodiment, a computer determines when an authorized key has last been used to login to a user account on a host.

In an embodiment, a management system determines when the private key belonging to a key pair has last been used to login to any user account on any host managed by the management system.

In an embodiment, a management system determines which key pairs configured for public key authentication according to the SSH protocol have not been used for an amount of time, such key pairs hereinafter called unused user keys.

In an embodiment, a management system removes and/or deconfigures an authorized key in response to the authorized key not being used for an amount of time, wherein an authorized key is a public key or key fingerprint identifying a key pair that can be used to login to a user account on an SSH server.

In an embodiment, a management system causes removing and/or deconfiguring at least one identity key corresponding to an unused user key, wherein an identity key is a private key that can be used for public key authentication according to the SSH protocol by an SSH client.

In an embodiment, a management system causes reading of at least one user key configured for a first user account on a first host, wherein the at least one key is readable by the first user account on said host and the management system only has access to a second user account distinct from the first user account on the first host, and a user key means a key used for user authentication according to the SSH protocol.

In an embodiment, a management system causes a managed host to escalate privileges to a root account, and then to transform privileges to a non-root user's privileges, and read or write a file using the non-root user's privileges.

In an embodiment, a management system:
causes a process executing using the privileges of a first user account on a host to escalate privileges such that it has the privilege to use the privileges of a second user account;
causes the process to transform its privileges to include the privileges of the second user account; and
causes the process to read or write a file using the privileges of the second user account.

In an embodiment, a management system causes setting up a trust relationship enabling passwordless login from a first account on a first host to a second account on a second host to be enabled, in response to receiving a trust relation setup request from a user interface or an application programming interface (API).

In an embodiment, a management system causes removing a trust relationship enabling passwordless login from a first account on a first host to a second account on a second host in response to a user interface action, an application programming interface (API) action, or a change in a host group or a user group.

In an embodiment, one or more management system back-ends connected to a database with all essential information stored in the database, wherein essential information means information needed for recovering from the failure of a back-end, cause setting up or removing a trust relationship between a first account on a first host and a second account on a second host.

In an embodiment, a management agent installed on a host connects to a management system back-end using the SSH protocol and authenticates the agent to the management system back-end using public key authentication according to the SSH protocol.

In an embodiment, an agent program installed on a host connects to a management system back-end using the SSH protocol and verifies that the host key provided by the management system back-end is a known host key for the management system.

In an embodiment, a management system:
connects to a host using the SSH protocol;
authenticates as a first user on the host using public key authentication according to the SSH protocol; and
performs at least one key management operation on the host using the connection.

In an embodiment, the key management operation relates to managing SSH keys. In an embodiment, the key management operation comprises installing an identity key. In an embodiment, the key management operation comprises installing an authorized key. In an embodiment, the key management operation comprises configuring a command restriction for an authorized key. In an embodiment, the key management operation comprises configuring an IP address restriction for an authorized key. In an embodiment, the key management operation comprises installing a host key for the host. In an embodiment, the key management operation comprises removing a host key from the managed host.

In an embodiment, the key management operation comprises removing an authorized key from the host. In an embodiment, the key management operation comprises removing identity key from the host. In an embodiment, the key management operation comprises installing a Kerberos credential on the host. In an embodiment, the key management operation comprises creating a key pair.

In an embodiment, the management system further retrieves configured authorized keys for at least one user on the host using the connection.

In an embodiment, the management system further retrieves configured identity keys for at least one user on the host using the connection.

In an embodiment, the management system further retrieves a configuration file for at least one SSH client using the connection.

In an embodiment, the management system further modifies a configuration file for at least one SSH server using the connection.

In an embodiment, the management system further retrieves pluggable authentication modules (PAM) configuration from the managed host using the connection.

In an embodiment, the management system uses a privilege escalation command to perform at least part of the at least one key management operation using escalated privileges.

In an embodiment, a host:
connects to a management system;
receives instructions from the management system using the connection to modify configured user keys on the host; and
modifies configured user keys on the host according to the received instructions.

The instructions may be, e.g., in the form of a request packet, a command-line command to execute, a script, byte code, or directly executable processor instructions (e.g., a DLL).

In an embodiment, the instructions cause the host to generate a new user key pair. In an embodiment, the instructions cause the host to install an authorized key for a user on the managed host. In an embodiment, the instructions cause the host to remove an authorized key from a user on the host. In an embodiment, the instructions cause the host to remove an identity key from a user on the host. In an embodiment, the instructions cause the host to use a passphrase for at least one identity key on the host.

In an embodiment, the instructions cause the host to modify a configuration file. In an embodiment, the instructions cause the host to retrieve log data. In an embodiment, the instructions cause the host to collect log data comprising information about key usage. In an embodiment, the instructions cause the host to collect log data comprising information about IP addresses from which a key is used. In an embodiment, the instructions cause the host to collect information about access times of identity key files. In an embodiment, the instructions cause the host to collect information about user accounts and user groups configured for the host. In an embodiment, the instructions cause the host to collect information about configured user information sources for the host. In any of these embodiments, the collected information or information derived from it may be sent to the management system over the connection or using some other suitable method to communicate it to the management system.

In an embodiment, a job record is created and stored in a database in a management system in response to a user interface action, an API operation, or a change in a host group or user group, the job record configured to cause installation of an authorized key for a user on a host. In an embodiment, the job record is configured to take place during a maintenance window for the host.

In an embodiment, a management system determines, by consulting its database, which managed hosts have a given public key configured as an authorized key for public key authentication according to the SSH protocol.

In an embodiment, a host sends, over a connection with a management system, an acknowledgement that a key management operation requested by the management system to be performed on the managed host has successfully completed. In an embodiment, the key management operation comprises installing an authorized key for a user on the host. In an embodiment, the key management operation comprises generating a new key pair for public key authentication according to the SSH protocol. In an embodiment, the key management operation comprises configuring a passphrase for a private key.

In an embodiment, implementation of a received request to remove an authorized key from a first user account on a managed host is delayed until such time that a maintenance window is open for the managed host; and the request is implemented during the maintenance window.

In an embodiment, a management system:
attempts to perform a key management operation on a host;
in response to the attempt failing, retries the operation after a wait period; and
in response to the operation having failed a configured number of times, signals that the operation has failed.

In an embodiment, a management system:
  creates a background job configured to perform a key management operation on a managed host; and
  associates the key background job with a first back-end group, the back-ends in the group being able to establish a management connection with the managed host.

In an embodiment, the management system attempts to perform the job on a first back-end belonging to the first back-end group, the attempt failing; and then attempts to perform the job on a second back-end distinct from the first back-end, the second back-end belonging to the first back-end group.

In an embodiment, a management system:
  performs a first part of a first background job;
  creates one or more additional background jobs, each configured to perform a part of the overall operations to be performed by the first background job;
  suspends performing operations of the first background job until the one or more additional background jobs have completed; and
  in response to the one or more additional background jobs having completed, resumes performing the first background job.

In an embodiment, a management system, in response to detecting a change in a user group or in a host group, causes adding or removing an authorized key for at least one user on at least one managed host.

In an embodiment, in response to a first managed host and a second managed host belonging to the same host equivalence group, the same authorized keys and identity keys for public key authentication according to the SSH protocol are installed on the first managed host and the second managed host.

In an embodiment, a management system detects a host equivalence group comprising at least two managed hosts.

In an embodiment, in response to provisioning a new virtual machine, the virtual machine is enrolled in a key management system; and at least one key for use by an SSH server or SSH client on the virtual machine is configured by the management system.

In an embodiment, a discovery tool determines where SSH user keys are stored on a host based on information read from the host. In an embodiment, the information comprises the version of an SSH server and/or client, installed on the host. In an embodiment, the information comprises at least one configuration file for an SSH server and/or client installed on the host.

In an embodiment, a management system provides a report indicating, for a first user account on a first host, which user accounts on which hosts the first user is able to access using passwordless login trust relationships, taking into account at least one transitive trust relationship going through an intermediate account on an intermediate host.

In an embodiment, a management system provides a report indicating at least one passwordless login trust relationship crossing a boundary between two groups of hosts that trust relationships are not allowed to cross without special approval.

In an embodiment, a management system causes user information sources for at least one host to be determined and reported to the management system over a connection between the management system and the host.

In an embodiment, a management system performs a trust relationship management operation on a managed host, the operation comprising managing principal names in certificates that grant access to a first account on the managed host, principal names referring to principal names in certificates that are authorized for public key authentication using a certificate for a user account on the managed host.

In an embodiment, the managing of principal names comprises reading authorized principal names. In an embodiment, the managing of principal names comprises configuring a principal name as authorized for logging into a user account. In an embodiment, the managing of principal names comprises removing a principal name from the principal names configured as authorized for logging into a user account.

In an embodiment, a management system configures, over a management connection between the management system and a host, a certificate authority (CA) certificate as a trusted CA certificate for public key authentication according to the SSH protocol for at least one user on the host.

In an embodiment, a management system reads, over a management connection between the management system and a managed host, a list of user accounts configured on the managed host, and for a user account on the list, extracts at least one public key configured as an authorized key for the user account for public key authentication according to the SSH protocol.

In an embodiment, a processor determines, for an SSH client program invocation on a first user account on a first host, the SSH client program invocation using passwordless authentication to log into a second user account on a second computer, which script or program invoked the SSH client program.

In an embodiment, the processor further communicates the information about which script or program invoked the SSH client program, together with information identifying the key used for the passwordless authentication and/or the hosts and user accounts involved, to a management system.

In an embodiment, a management system:
  receives a request to authorize passwordless login trust relationship from a first user account on a first host to a second user account on a second host;
  determines what approvals are required before the request can be implemented; and
  in response to receiving the required approvals, implements the request.

In an embodiment, the processor determines whether the passwordless login trust relationship crosses a boundary requiring special approval as part of the determining of what approvals are required.

In an embodiment, a management system determines, for a first key configured as an authorized key for a first user account on a first host, that the first key is used for login from a host that is not managed by the management system.

In an embodiment, the management system:
  causes reading a system log in which an SSH server executing on the first host logs information and determining from the log that the key was used from a first IP address; and
  determines that the IP address does not belong to any host managed by the management system.

In an embodiment, the management system further marks the first key in the management system's database as having been used for an incoming connection from an external host.

In an embodiment, a management system:
  determines the key used for public key authentication according to the SSH protocol by an SSH client invoked on a first user account on a first host, and the IP address that the SSH client connects to; and
  determines that the IP address does not belong to any host under management.

In an embodiment, the management system further marks the key, in the management system's database, as being used for an outgoing connection to an external host.

In an embodiment, a management system:
receives a request to rotate a user key; and
determines whether the user key is used for an incoming or outgoing connection with an external host, and if so, prevents execution of the request.

In an embodiment, the management system further:
presents a request to a human to manually perform a part of a key rotation involving an external host; and
in response to the human indicating that the part has been performed, permits the rest of the request to execute.

In an embodiment:
a connection is established between a management system and a host;
an indicator file that determines whether the host is already under management by a management system is read; and
if the host is not already under management by the management system, the host is configured to be under management by the management system and an indicator file indicating that the host is already under management by the management system is created.

In an embodiment:
a connection is established between a host and a management system that manages SSH user keys for the host;
restrictions configured for an authorized key for a user account on the host are managed using the connection.

In an embodiment, the managing of the restrictions comprises reading what restrictions are configured for the authorized key.

In an embodiment, the managing of the restrictions comprises adding a restriction on the IP address from which the authorized key can be used.

In an embodiment, the managing of the restrictions comprises adding a restriction on the command that can be executed when logging in using the authorized key.

In an embodiment, the number of identity keys configured for public key authentication according to the SSH protocol for a user account on a host is limited to be below a preconfigured maximum number of identity keys. In an embodiment, further when configuring a new trust relationship from the user account on the host to a second user account on a second host, an existing identity key for the user account is reused if the user account already has at least one identity key configured, and otherwise a new identity key for the user account is created.

In an embodiment, an initial connection using the SSH protocol from a management agent executing on a host to a management system is secured by checking the host key received from the management system against a host key provided in an initial configuration block file present on the host.

In an embodiment, a management system causes a first identity key that is not protected by a passphrase to be converted to an identity key protected by a non-empty passphrase.

In an embodiment, a management system:
causes reading of a private key file for a first identity key on a first host; and
causes writing of the private key file for the first identity key with the private key encoded using a passphrase for encrypting it.

In an embodiment, the management system further:
causes executing a program on the first host to change the passphrase of the private key file for the first identity key.

In an embodiment, the management system further:
causes creating a second identity key for the user on the first host, the second identity key having a non-empty passphrase;
causes a public key corresponding to the second identity key to be configured as an authorized key for all user accounts on any host that have a public key corresponding to the first identity key configured as an authorized key;
causes removing the first identity key; and
causes removing a public key corresponding to the first identity key from being an authorized key for a user account.

In an embodiment, the following steps are performed:
configuring a first program to be executed instead of the default ssh-askpass program for a user account on a host;
determining, by the first program, whether it is being invoked to request a passphrase for an identity key and if so, trying to look up a passphrase for the identity key, and if such passphrase is obtained, printing it to standard output.

In an embodiment, the looking up reads a file that is not normally readable for the user, and extracts the passphrase for the identity key from the file.

In an embodiment, the lookup connects to a service that can provide the passphrase for an identity key.

In an embodiment, a management system:
connects to a host using the SSH protocol;
determines what operating system is used on the host, or in case it does not use a general purpose operating system, what kind of device it is;
selects a connector module selected based on the results if the determination; and
uses the connector module to translate key management operations, requests, and/or responses understood by the management system to commands understood by the host and for interpreting responses given by the host.

In an embodiment, the connector module can translate at least one of the following operations:
changing login credentials used by the management system to authenticate to the host;
obtaining the version numbers of SSH servers installed on the host;
obtaining the version numbers of SSH clients installed on the host;
listing user names on the host;
reading configured authorized keys for one or more users from the host;
adding an identity key for a user on the host;
removing an identity key for a user on the host;
adding an authorized key for a user on the host; and
removing an authorized key for a user on the host.

In an embodiment, a program code module stored on non-transitory computer readable medium for causing a computer to translate between key management operations understood by a management system and operations for implementing them on a managed host comprises:
computer readable program code means for receiving an SSH user key management operation from a management system and sending one or more commands for implementing it to a managed host;

reading a response to at least one of the commands, converting the response into a format understood by the management system, and providing the converted response to the management system.

In an embodiment, the SSH user key management operation is a request to add an authorized key for public key authentication according to the SSH protocol for a user.

In an embodiment, the SSH key management operation is converted into commands understood by a Cisco router.

In an embodiment, a management system stores information about a trust relationship in its database together with an identifier for a business application that uses the trust relationship.

In an embodiment, a management system acts as a "third party" that configures a trust relationship that allows a source host to log into a user account at a destination without an interactive user typing a password, where neither the source host nor the destination host is the management system or part thereof.

The invention is not limited to the described embodiments. The scope of the invention is only limited by the claims read in light of the specification. When "an embodiment", "one embodiment", or "another embodiment" is described, they refer to particular embodiments or classes of embodiments (or variations of a broader class of embodiments), not necessarily to the same embodiment.

The aspects, embodiments, and elements described herein may be used in any combination to form a new aspect or embodiment of the invention, including but not limited to method, apparatus, computer readable medium, and data structure embodiments. For any computer readable medium embodiment, there is also a corresponding appliance embodiment comprising the computer readable medium, as well as an appliance embodiment offering for downloading information sufficient for essentially reconstructing the instructions on contained on the computer readable medium.

The invention may also be claimed as a method comprising providing downloadable software to a computer system, which when executed by a computer system causes the computer system to perform operations comprising or performing the steps of any of the methods that are aspects or embodiments of the invention.

Exemplary embodiments of the invention may be embodied in many different ways as a software component. For example, it may be a stand-alone software package, or it may be a software package incorporated as a "tool" in a larger software product. It may be downloadable from a network, e.g., from a website via the Internet, as a stand-alone product or as an add-in package for installation in an existing software application. It may also be available as a client-server software application or as a web-enabled software application.

Any aspect, embodiment, or element of the invention may be claimed as a method, apparatus, computer software product (or computer readable program code on computer-readable medium), or as a data structure, containing the steps, components, or data items implementing them, as applicable in each case. An apparatus that is an aspect or embodiment of the invention advantageously comprises a processor and a memory connected to the processor, the memory comprising computer readable program code configured to perform various steps described herein or comprising other components described herein or that would be understood by one skilled in the art to be used for implementing the methods, data structures, and operations described herein.

When something is described as sending one or more messages to another entity, it is understood that there is another entity that receives the messages in the corresponding order, and analogously if messages are described as received, there must be another entity sending the messages; sometimes only one side is expressly described herein when the other side is implicitly understood. Such exchanges may be claimed as the whole system involving multiple components, as any entity involved in the exchange from the viewpoint of that entity (e.g., a host, a management system, a back-end belonging to the management system, a certificate authority or registration authority, an SSH client software package, or an SSH server software package), or as a method or a computer program product from the viewpoint of the whole system or one of the communicating entities.

Generally, any of the actions said herein to be performed by the key manager (or management system) or any other component described herein may be performed directly by that component or the key manager or the referred component may cause the action to be performed (possibly on another computer, using a network protocol to communicate with it, which would involve sending and receiving, possibly in a complex interaction with acknowledge, error handling, and retries).

In particular, when, e.g., it is said that the management system reads a file from a managed host, it can mean that the management system causes the file to be read on managed host and sent to the management system. The actual reading and communication may be performed using an agent program running on the managed host or, e.g., agentless over SSH or .NET remote procedure calls. The same applies for the management system writing a file on a managed host (which may mean sending it (or part of it, or differences) to the managed host, and writing the file to persistent storage on the managed host). Likewise, if the management system runs a command on a managed host, it is implied that the management system causes the command to be run on the host (and, in most cases, results or output of the command to be returned to the management system, possibly after further processing).

Where some information is said to be stored in a file or database, it might actually be stored in a database, file, Windows registry, flash memory, or some other suitable storage mechanism (including network file systems) accessible to the host where it is said to be stored.

Selecting in this specification has its usual meaning, with the extension that selecting from one possible value means taking that value, and selecting when there are no possible values means selecting no value, signaling a value, requesting a value from a user, or computing a new value (depending on the embodiment). Selecting may be performed by a computational process (including random choice) or by user (e.g., by prompting the user to select one of the values in a user interface).

An aspect of the invention is an apparatus, comprising: a manager configured to manage secure shell protocol (SSH) related keys, said keys utilized between a first managed host having an SSH client and a second managed host having an SSH server; wherein said manager is external to said first managed host and second managed host.

Another aspect of the invention is an apparatus, comprising: a managing means for managing secure shell protocol (SSH) related keys, said keys utilized between a first managed host having an SSH client and a second managed host having an SSH server; wherein said manager is external to said first managed host and second managed host.

Another aspect of the invention is a method, comprising: managing secure shell protocol (SSH) related keys, said keys utilized between a first managed host having an SSH client and a second managed host having an SSH server; wherein said managing is performed ex-ternally to said first managed host and second managed host.

The various steps in many of the flowcharts and processes may be reordered or performed in parallel or interleaved, even when illustrated in order (e.g., using "then" or arrows between them), whenever this makes technical sense and produces substantially the same end result. Some of the steps in most of the flowcharts and process descriptions could be omitted in an embodiment.

There is no intention in this specification to draw restrictions into the claim from the specification. No reference to "this invention" or the use of "all" or similar in the description of any particular embodiment, aspect or drawing should be interpreted as limiting the overall invention or particular aspects of it. The scope of the invention is specified by the claims read in light of the specification (especially the particular embodiments that the claims relate to).

The invention claimed is:

1. A method of provisioning a virtual data processing instance in a virtualized environment, comprising:
   provisioning, by a data processing apparatus configured for hosting virtual data processing instances, a new virtual data processing instance for retrieval of credential information from a credential management system;
   connecting, by the new virtual data processing instance hosted in the data processing apparatus, to the credential management system;
   authenticating the new virtual data processing instance to the credential management system; and
   receiving, by the new virtual data processing instance, the credential information from the credential management system.

2. The method according to claim 1, wherein the receiving comprises receiving at least one key from a key management system.

3. The method according to claim 2, wherein the at least one key comprises a host key.

4. The method according to claim 3, wherein the new virtual data processing instance comprises a virtual host and the host key is for another host.

5. The method according to claim 2, wherein the at least one key comprises a private key that authorizes the new virtual data processing instance to log into at least one other data processing instance.

6. The method according to claim 2, wherein the at least one key comprises a public key that authorizes an account on another data processing instance to log into the new virtual data processing instance.

7. The method according to claim 1, further comprising:
   receiving credential information from the credential management system allowing the new virtual data processing instance to authenticate itself to the credential management system; and
   using the received credential information by the new virtual data processing instance for authentication to the credential management system.

8. The method according to claim 7, wherein the received credential information comprises one of: a shared secret; and a public key for the credential management system and a private key for the new virtual data processing instance.

9. The method according to claim 1, comprising using management system information that has been preconfigured into a virtual machine image for the connecting and authenticating to the credential management system.

10. The method according to claim 1, further comprising installing credentials for the credential management system on the new virtual data processing instance before booting thereof or during a booting process.

11. The method according to claim 10, wherein the credentials for the credential management system are inserted into a virtual machine image before the booting.

12. The method according to claim 10, wherein the credentials for the credential management system are installed into the new virtual data processing instance by a provisioning system.

13. The method according to claim 1, further comprising configuring the new virtual data processing instance based on the received credential information for at least one of: authentication to the credential management system, use of a host key for at least one other host in the virtualized environment, enabling an account in another data processing instance to log into the new virtual data processing instance, and logging into at least one other data processing instance.

14. The method according to claim 1, wherein the virtualized environment comprises a paravirtualized environment where parts of a kernel are shared by multiple instances.

15. A data processing apparatus for providing a virtual data processing instance in a virtualized environment, configured to:
   host virtual data processing instances;
   provision a new virtual data processing instance for retrieval of credential information from a credential management system;
   connect the new virtual data processing instance to the credential management system;
   authenticate the new virtual data processing instance to the credential management system; and
   configure the new virtual data processing instance based on credential information received from the credential management system.

16. The data processing apparatus according to claim 15, wherein the new virtual data processing instance is configured to receive at least one of:
   at least one key from a key management system; and
   credential information from the credential management system allowing the new virtual data processing instance to authenticate itself to the credential management system.

17. The data processing apparatus according to claim 15, configured to use credential management system information that has been preconfigured into a virtual machine image for connecting and authenticating to the credential management system.

18. The data processing apparatus according to claim 15, comprising a provisioning system configured to install credentials for the credential management system on the new virtual data processing instance before booting thereof or during a booting process.

19. The data processing apparatus according to claim 15, comprising a provisioning system configured to install credentials for the credential management system on the new virtual data processing instance before booting thereof or during a booting process.

20. The data processing apparatus according to claim 15, further configured to configure the new virtual data processing instance based on the received credential information for at least one of: authentication to the credential management system, use of a host key for at least one other host in the virtualized environment, enabling an account in another data processing instance to log into the new virtual data processing instance, and logging into at least one other data processing instance.

21. The data processing apparatus according to claim 15, wherein the virtualized environment comprises a paravirtualized environment where parts of a kernel are shared by multiple instances.

22. A non-transitory computer readable media comprising program code for causing an apparatus, operable in a virtualized environment to host virtual data processing instances and comprising a processor, to perform instructions for:

hosting a new virtual data processing instance by the apparatus in the virtualized environment, wherein the hosting comprises:

provisioning the new virtual data processing instance for retrieval of credential information from a credential management system;

connecting the new virtual data processing instance to the credential management system;

authenticating the new virtual data processing instance to the credential management system; and configuring the new virtual data processing instance based on credential information received from the credential management system.

\* \* \* \* \*

UNITED STATES PATENT AND TRADEMARK OFFICE
CERTIFICATE OF CORRECTION

| | | |
|---|---|---|
| PATENT NO. | : 10,171,508 B2 | Page 1 of 1 |
| APPLICATION NO. | : 15/277491 | |
| DATED | : January 1, 2019 | |
| INVENTOR(S) | : Tatu J. Ylonen | |

It is certified that error appears in the above-identified patent and that said Letters Patent is hereby corrected as shown below:

On the Title Page

On Page 2, Column 1, Under U.S. Patent Documents, Line 8:
Please delete "13,316,429" and insert --8,316,429 B2--

Signed and Sealed this
Twenty-first Day of May, 2019

Andrei Iancu
*Director of the United States Patent and Trademark Office*